US012608853B1

(12) United States Patent
Rose et al.

(10) Patent No.: US 12,608,853 B1
(45) Date of Patent: Apr. 21, 2026

(54) SYSTEMS AND METHODS FOR GENERATING GOLF SCREEN CHARACTERISTICS

(71) Applicant: Acushnet Company, Fairhaven, MA (US)

(72) Inventors: Gregory Alan Rose, Carlsbad, CA (US); Brett J. Killian, Oceanside, CA (US); Aaron Bengtson, London (GB); Luke Tiday, London (GB); Jonathan Hanzelka, London (GB); Jacob Berrier, London (GB); Dan Danciu, London (GB); Bogdan-Adrian Musat, London (GB); Daniel Gabriel Susanu, London (GB)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 19/247,850

(22) Filed: Jun. 24, 2025

(51) Int. Cl.
| | |
|---|---|
| *A63B 24/00* | (2006.01) |
| *A63B 69/36* | (2006.01) |
| *A63B 102/32* | (2015.01) |
| *G06T 11/00* | (2006.01) |

(52) U.S. Cl.
CPC .............. *G06T 11/00* (2013.01); *A63B 69/36* (2013.01)

(58) Field of Classification Search
None
See application file for complete search history.

(56) References Cited

U.S. PATENT DOCUMENTS

| | | | |
|---|---|---|---|
| 7,395,696 | B2 | 7/2008 | Bissonnette et al. |
| 8,758,201 | B2 | 6/2014 | Ashby et al. |
| 9,364,714 | B2 | 6/2016 | Koduri et al. |
| 9,782,654 | B2 | 10/2017 | Molinari et al. |
| 9,898,675 | B2 | 2/2018 | Yee et al. |
| 10,137,348 | B2 | 11/2018 | Molinari et al. |
| 10,668,342 | B2 | 6/2020 | Amarant et al. |
| 10,799,759 | B2 | 10/2020 | Hixenbaugh et al. |
| 10,929,654 | B2 | 2/2021 | Iqbal et al. |
| 11,222,428 | B2 | 1/2022 | Lee et al. |
| 11,263,919 | B2 | 3/2022 | Malhotra |
| 11,458,362 | B1 | 10/2022 | Berme et al. |
| 11,461,905 | B2 | 10/2022 | Lee et al. |
| 11,521,733 | B2 | 12/2022 | Song et al. |
| 11,615,648 | B2 | 3/2023 | Lee et al. |
| 11,620,858 | B2 | 4/2023 | Lee et al. |
| 11,636,777 | B2 | 4/2023 | Shteren et al. |

(Continued)

FOREIGN PATENT DOCUMENTS

| | | | |
|---|---|---|---|
| WO | 2022251680 | A1 | 12/2022 |
| WO | 2022251686 | A1 | 12/2022 |

(Continued)

*Primary Examiner* — Martin Mushambo
(74) *Attorney, Agent, or Firm* — Mike S. Kim

(57) ABSTRACT

Systems, methods, and apparatuses for generating golf screen characteristics are disclosed herein. In accordance with the presently disclosed technology, a method may include obtaining an initial golf screen characteristic model, obtaining training golf screen point data and training golf screen characteristic data, generating a conditioned golf screen characteristic model, storing the conditioned golf screen characteristic model, obtaining target golf screen point data, and generating target golf screen characteristic data.

9 Claims, 67 Drawing Sheets

(56) References Cited

U.S. PATENT DOCUMENTS

| | | | |
|---|---|---|---|
| 11,640,725 B2 | 5/2023 | Menaker et al. | |
| 11,642,047 B2 | 5/2023 | Zhang et al. | |
| 11,645,873 B1 | 5/2023 | Lui | |
| 11,727,728 B2 | 8/2023 | Mehl et al. | |
| 11,759,126 B2 | 9/2023 | Juhas et al. | |
| 11,790,536 B1 | 10/2023 | Berme et al. | |
| 11,798,318 B2 | 10/2023 | Prince et al. | |
| 11,819,734 B2 | 11/2023 | Lee et al. | |
| 11,918,883 B2 | 3/2024 | Kim | |
| 11,935,330 B2 | 3/2024 | Lee et al. | |
| 11,941,915 B2 | 3/2024 | Tyomkin | |
| 11,941,916 B2 | 3/2024 | Lee et al. | |
| 11,992,745 B2 | 5/2024 | Kulangara Muriyil et al. | |
| 12,008,839 B2 | 6/2024 | Menaker et al. | |
| D1,035,720 S | 7/2024 | Lee et al. | |
| D1,035,721 S | 7/2024 | Lee et al. | |
| D1,036,464 S | 7/2024 | Lee et al. | |
| 12,048,868 B2 | 7/2024 | Augustin et al. | |
| 12,097,422 B2 | 9/2024 | Tawiah | |
| 12,257,479 B2 | 3/2025 | Hixenbaugh et al. | |
| 2006/0247070 A1 | 11/2006 | Funk et al. | |
| 2013/0304417 A1* | 11/2013 | Mooney | A63B 71/06 |
| | | | 702/153 |
| 2014/0156040 A1 | 6/2014 | Mooney | |
| 2014/0342844 A1 | 11/2014 | Mooney | |
| 2016/0360378 A1 | 12/2016 | Borowski et al. | |
| 2018/0169471 A1* | 6/2018 | Kondo | A63B 69/3605 |
| 2018/0200605 A1 | 7/2018 | Syed et al. | |
| 2018/0357472 A1* | 12/2018 | Dreessen | G06V 20/49 |
| 2019/0224528 A1* | 7/2019 | Omid-Zohoor | G16H 40/67 |
| 2022/0262013 A1 | 8/2022 | Decker et al. | |
| 2022/0273984 A1 | 9/2022 | Lee | |
| 2022/0273998 A1 | 9/2022 | Park | |
| 2022/0362630 A1 | 11/2022 | Lee | |
| 2023/0181970 A1 | 6/2023 | Lee | |
| 2023/0267768 A1 | 8/2023 | Menaker et al. | |
| 2023/0285802 A1 | 9/2023 | Lee | |
| 2023/0342969 A1 | 10/2023 | Jiang et al. | |
| 2023/0356033 A1 | 11/2023 | Augustin | |
| 2023/0381584 A1 | 11/2023 | Lee | |
| 2023/0398408 A1 | 12/2023 | Lee | |
| 2023/0419731 A1 | 12/2023 | Prince et al. | |
| 2024/0123284 A1 | 4/2024 | Barbalinardo et al. | |
| 2024/0123290 A1 | 4/2024 | Mccants et al. | |
| 2024/0185637 A1 | 6/2024 | Lee | |
| 2024/0185638 A1 | 6/2024 | Lee | |
| 2024/0245972 A1 | 7/2024 | Jurczak | |
| 2024/0299803 A1 | 9/2024 | Lee | |

FOREIGN PATENT DOCUMENTS

| | | | |
|---|---|---|---|
| WO | 2022251688 A1 | 12/2022 | |
| WO | 2022256912 A1 | 12/2022 | |
| WO | 2023277381 A1 | 1/2023 | |
| WO | 2023205423 A1 | 10/2023 | |
| WO | 2024159402 A1 | 8/2024 | |

* cited by examiner

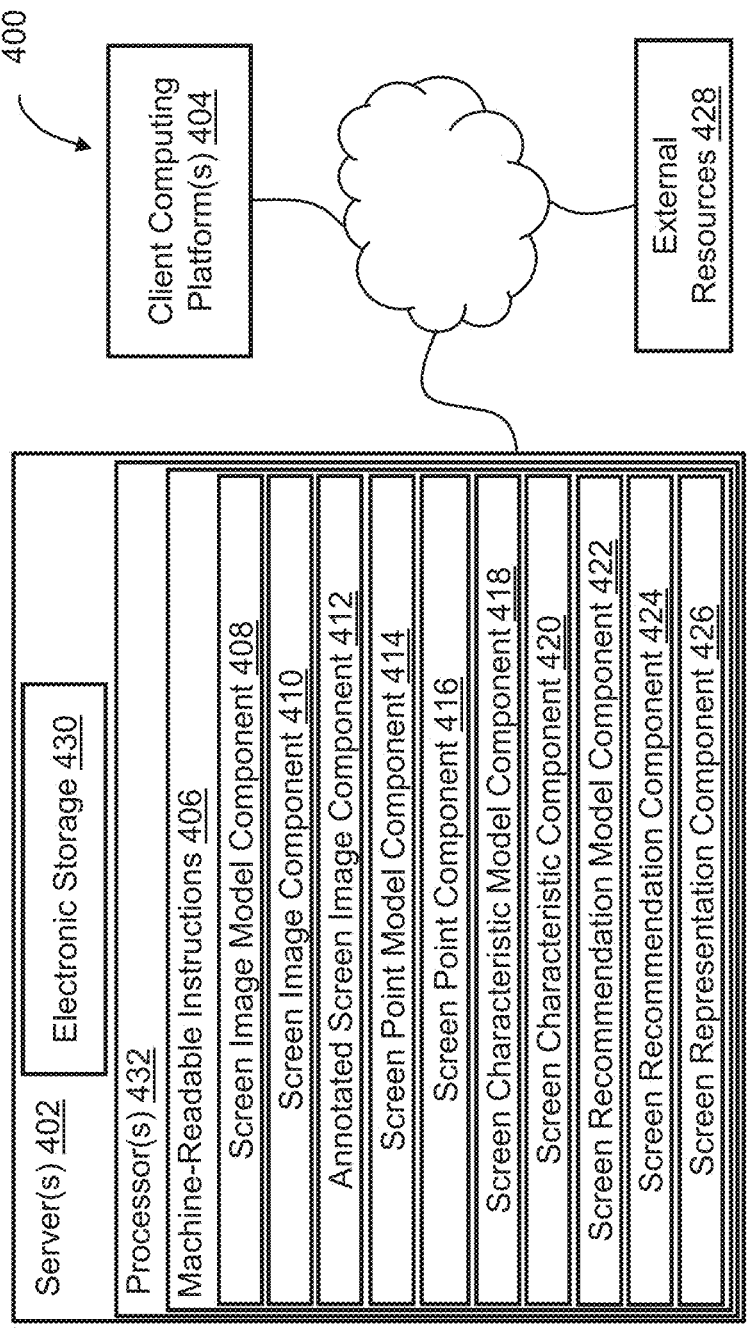

400

Client Computing Platform(s) 404

External Resources 428

Server(s) 402

Electronic Storage 430

Processor(s) 432

Machine-Readable Instructions 406

Screen Image Model Component 408

Screen Image Component 410

Annotated Screen Image Component 412

Screen Point Model Component 414

Screen Point Component 416

Screen Characteristic Model Component 418

Screen Characteristic Component 420

Screen Recommendation Model Component 422

Screen Recommendation Component 424

Screen Representation Component 426

652 Obtain Conditioned Swing Image Model

654 Obtain Target Swing Image Set

656 Generate Target Annotated Swing Image Set

658 Generate Swing Image Representation

660 Display Swing Image Representation

950

952 — Obtain Conditioned Swing Characteristic Model

954 — Obtain Target Swing Point Data

956 — Generate Target Swing Characteristic Data

958 — Generate Swing Characteristic Representation

960 — Display Swing Characteristic Representation

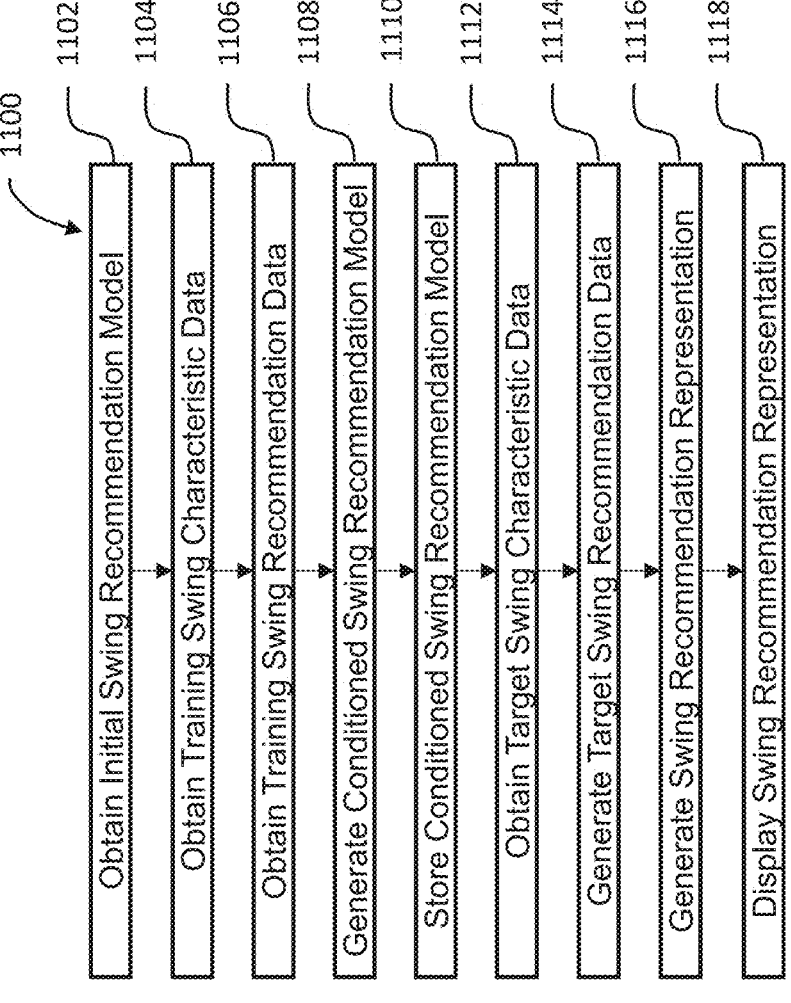

Obtain Initial Swing Recommendation Model — 1102

Obtain Training Swing Characteristic Data — 1104

Obtain Training Swing Recommendation Data — 1106

Generate Conditioned Swing Recommendation Model — 1108

Store Conditioned Swing Recommendation Model — 1110

Obtain Target Swing Characteristic Data — 1112

Generate Target Swing Recommendation Data — 1114

Generate Swing Recommendation Representation — 1116

Display Swing Recommendation Representation — 1118

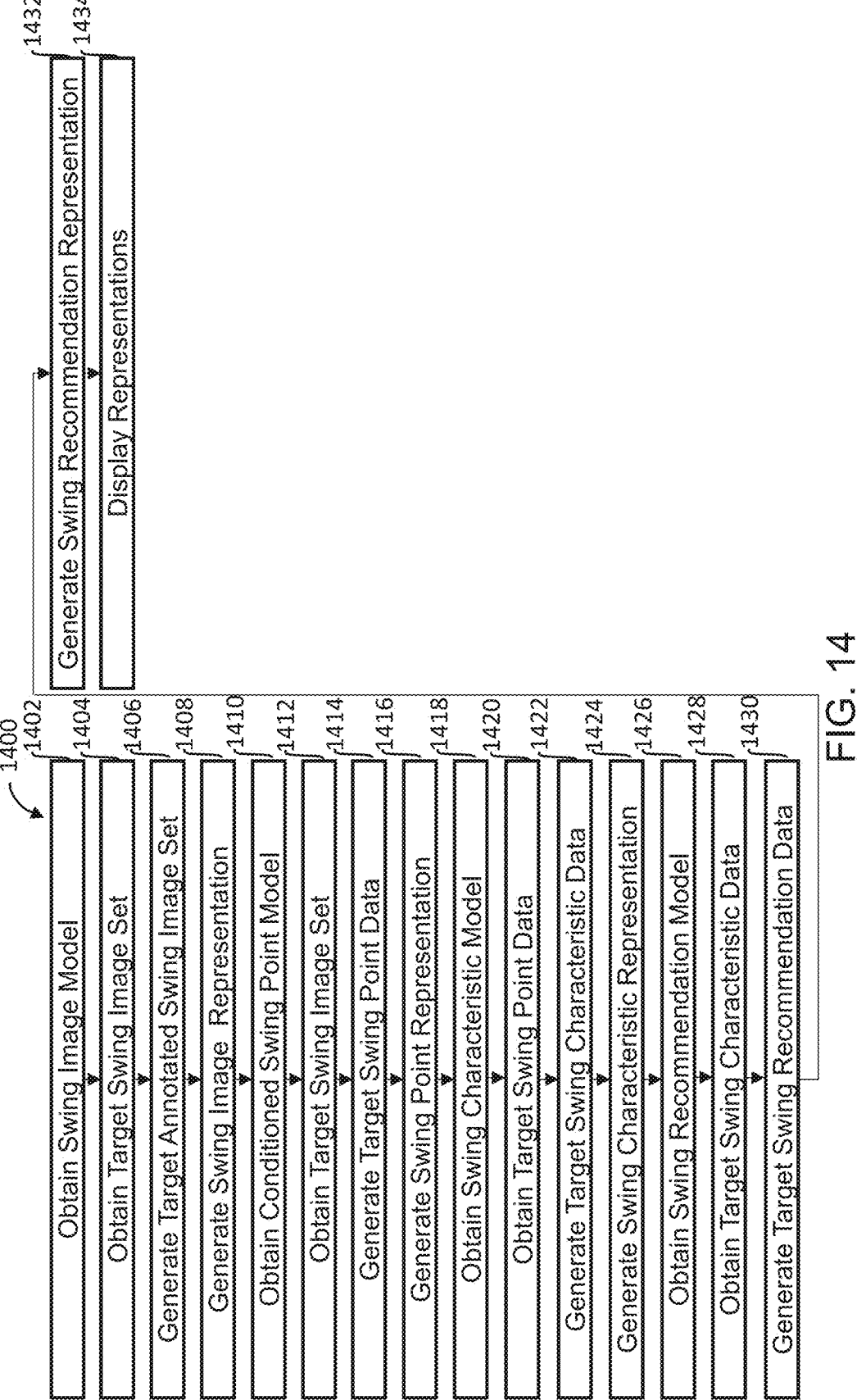

1402 Obtain Swing Image Model

1404 Obtain Target Swing Image Set

1406 Generate Target Annotated Swing Image Set

1408 Generate Swing Image Representation

1410 Obtain Conditioned Swing Point Model

1412 Obtain Target Swing Image Set

1414 Generate Target Swing Point Data

1416 Generate Swing Point Representation

1418 Obtain Swing Characteristic Model

1420 Obtain Target Swing Point Data

1422 Generate Target Swing Characteristic Data

1424 Generate Swing Characteristic Representation

1426 Obtain Swing Recommendation Model

1428 Obtain Target Swing Characteristic Data

1430 Generate Target Swing Recommendation Data

1432 Generate Swing Recommendation Representation

1434 Display Representations

1600

1602

1604

1606

1608

1610

Obtain Screen Image Model

Obtain Target Screen Image Set

Generate Target Annotated Screen Image Set

Generate Screen Image Representation

Display Screen Image Representation

1700

1702 Obtain Initial Screen Point Model

1704 Obtain Training Screen Image Set

1706 Obtain Training Screen Point Data

1708 Generate Conditioned Screen Point Model

1710 Store Conditioned Screen Point Model

1712 Obtain Target Screen Image Set

1714 Generate Target Screen Point Data

1716 Generate Screen Point Representation

1718 Display Screen Point Representation

1750

1752 Obtain Conditioned Screen Point Model

1754 Obtain Target Screen Image Set

1756 Generate Target Screen Point Data

1758 Generate Screen Point Representation

1760 Display Screen Point Representation

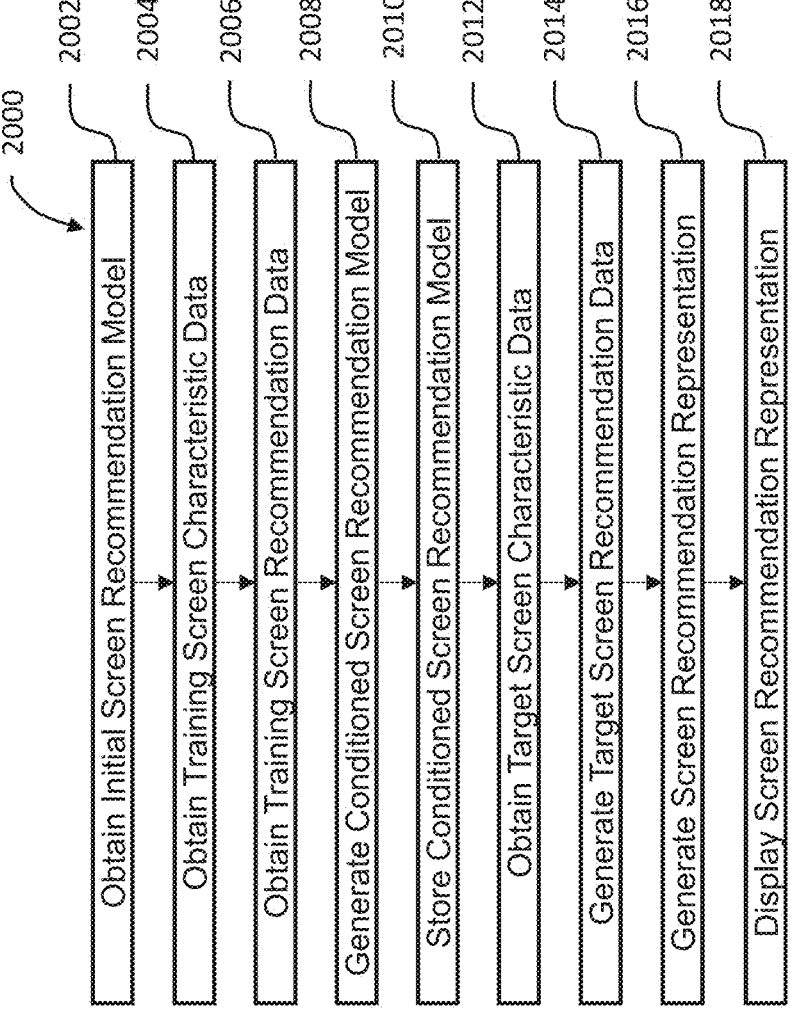

2000

2002 Obtain Initial Screen Recommendation Model

2004 Obtain Training Screen Characteristic Data

2006 Obtain Training Screen Recommendation Data

2008 Generate Conditioned Screen Recommendation Model

2010 Store Conditioned Screen Recommendation Model

2012 Obtain Target Screen Characteristic Data

2014 Generate Target Screen Recommendation Data

2016 Generate Screen Recommendation Representation

2018 Display Screen Recommendation Representation

2052 Obtain Conditioned Screen Recommendation Model

2054 Obtain Target Screen Characteristic Data

2056 Generate Target Screen Recommendation Data

2058 Generate Screen Recommendation Representation

2060 Display Screen Recommendation Representation

2100

2102 Obtain Screen Recommendation Model

2104 Obtain Target Screen Characteristic Data

2106 Generate Target Screen Recommendation Data

2108 Generate Screen Recommendation Representation

2110 Display Screen Recommendation Representation

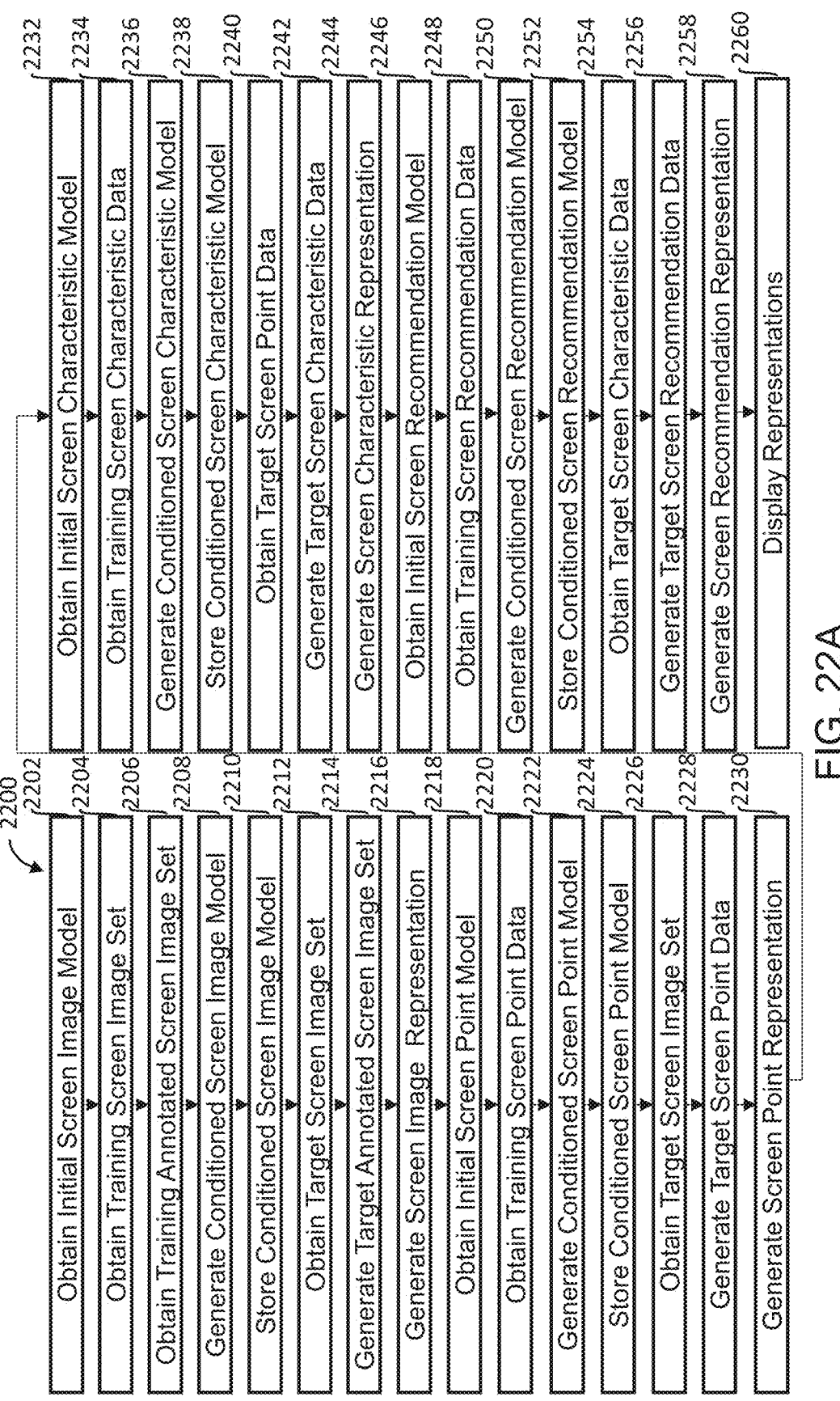

2202 — Obtain Initial Screen Image Model
2204 — Obtain Training Screen Image Set
2206 — Obtain Training Annotated Screen Image Set
2208 — Generate Conditioned Screen Image Model
2210 — Store Conditioned Screen Image Model
2212 — Obtain Target Screen Image Set
2214 — Generate Target Annotated Screen Image Set
2216 — Generate Screen Image Representation
2218 — Obtain Initial Screen Point Model
2220 — Obtain Training Screen Point Data
2222 — Generate Conditioned Screen Point Model
2224 — Store Conditioned Screen Point Model
2226 — Obtain Target Screen Image Set
2228 — Generate Target Screen Point Data
2230 — Generate Screen Point Representation 2232 — Obtain Initial Screen Characteristic Model
2234 — Obtain Training Screen Characteristic Data
2236 — Generate Conditioned Screen Characteristic Model
2238 — Store Conditioned Screen Characteristic Model
2240 — Obtain Target Screen Point Data
2242 — Generate Target Screen Characteristic Data
2244 — Generate Screen Characteristic Representation
2246 — Obtain Initial Screen Recommendation Model
2248 — Obtain Training Screen Recommendation Data
2250 — Generate Conditioned Screen Recommendation Model
2252 — Store Conditioned Screen Recommendation Model
2254 — Obtain Target Screen Characteristic Data
2256 — Generate Target Screen Recommendation Data
2258 — Generate Screen Recommendation Representation
2260 — Display Representations

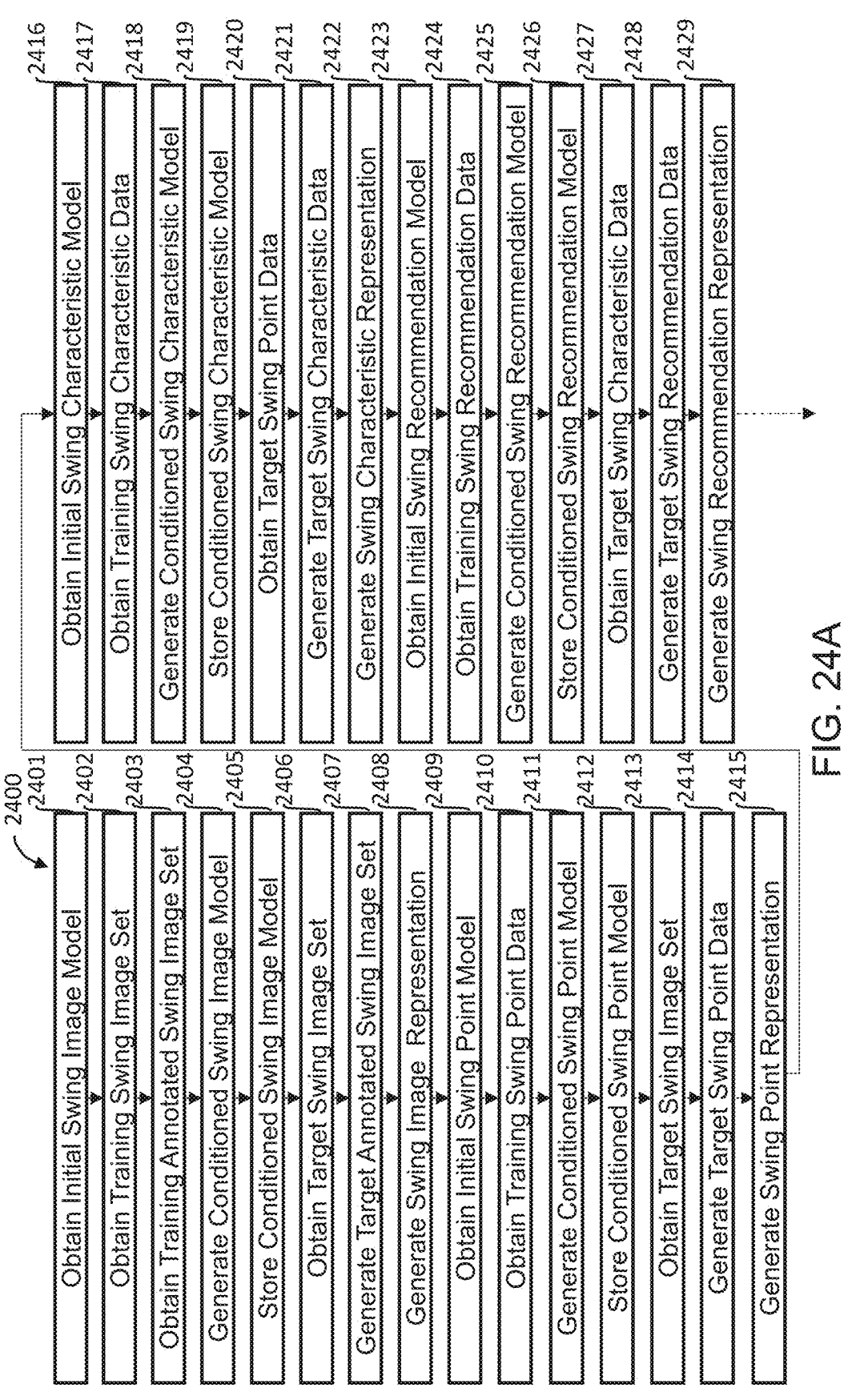

FIG. 24A 2400
2401 Obtain Initial Swing Image Model
2402 Obtain Training Swing Image Set
2403 Obtain Training Annotated Swing Image Set
2404 Generate Conditioned Swing Image Model
2405 Store Conditioned Swing Image Model
2406 Obtain Target Swing Image Set
2407 Generate Target Annotated Swing Image Set
2408 Generate Swing Image Representation
2409 Obtain Initial Swing Point Model
2410 Obtain Training Swing Point Data
2411 Generate Conditioned Swing Point Model
2412 Store Conditioned Swing Point Model
2413 Obtain Target Swing Image Set
2414 Generate Target Swing Point Data
2415 Generate Swing Point Representation 2416 Obtain Initial Swing Characteristic Model
2417 Obtain Training Swing Characteristic Data
2418 Generate Conditioned Swing Characteristic Model
2419 Store Conditioned Swing Characteristic Model
2420 Obtain Target Swing Point Data
2421 Generate Target Swing Characteristic Data
2422 Generate Swing Characteristic Representation
2423 Obtain Initial Swing Recommendation Model
2424 Obtain Training Swing Recommendation Data
2425 Generate Conditioned Swing Recommendation Model
2426 Store Conditioned Swing Recommendation Model
2427 Obtain Target Swing Characteristic Data
2428 Generate Target Swing Recommendation Data
2429 Generate Swing Recommendation Representation

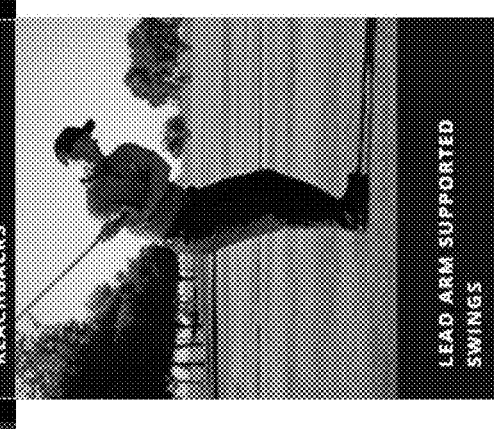
FIG. 34

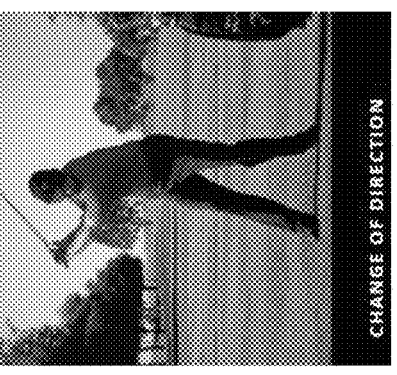
FIG. 37

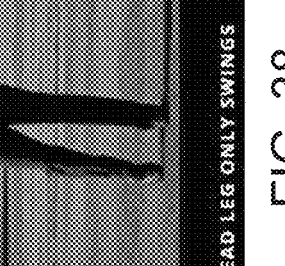
FIG. 38

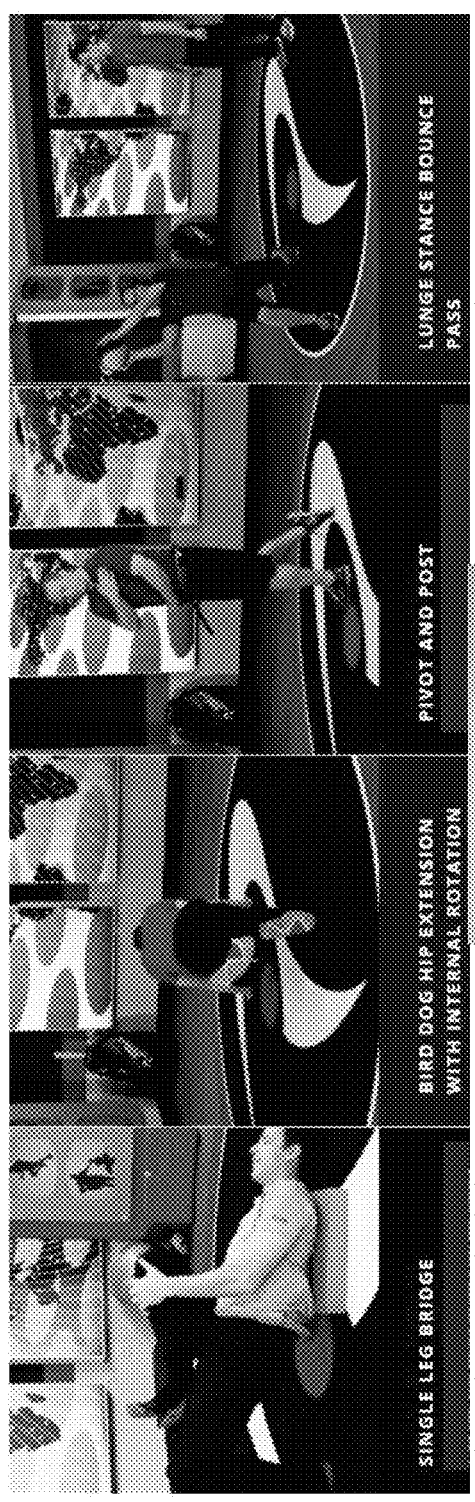
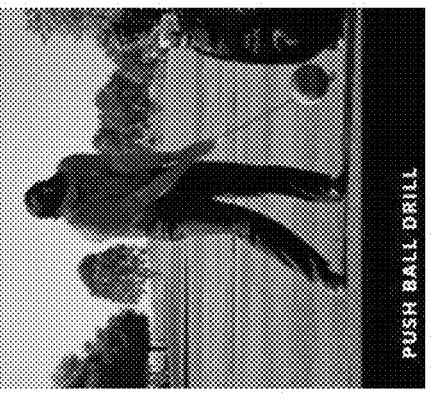
FIG. 39

FIG. 40

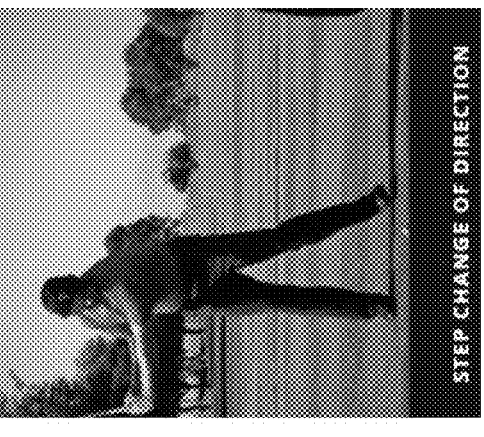
FIG. 41

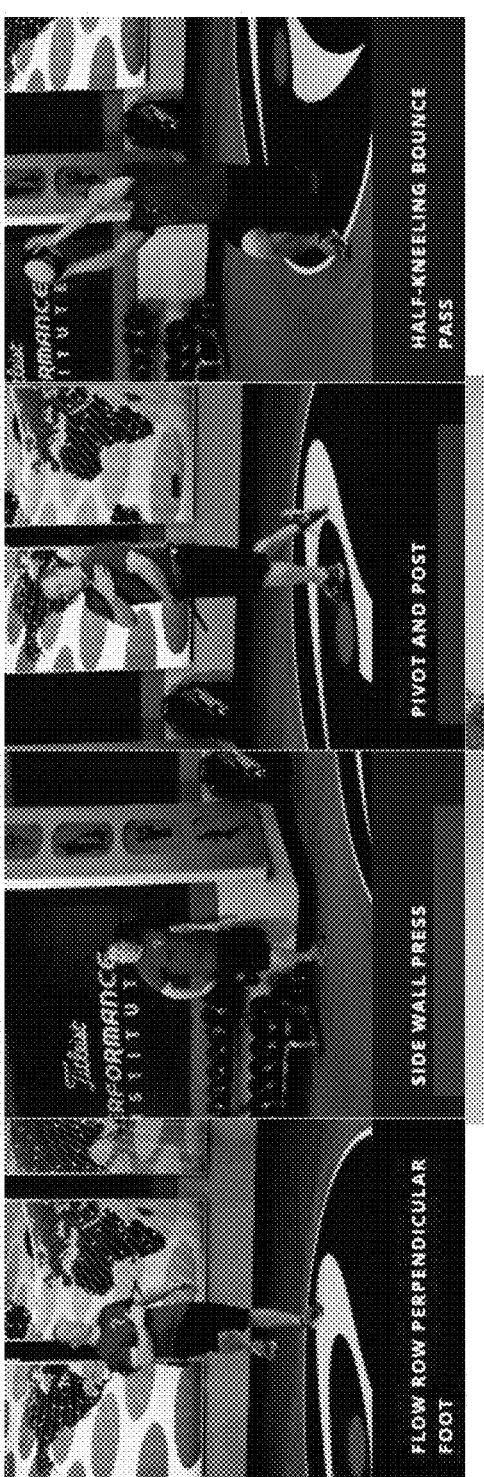
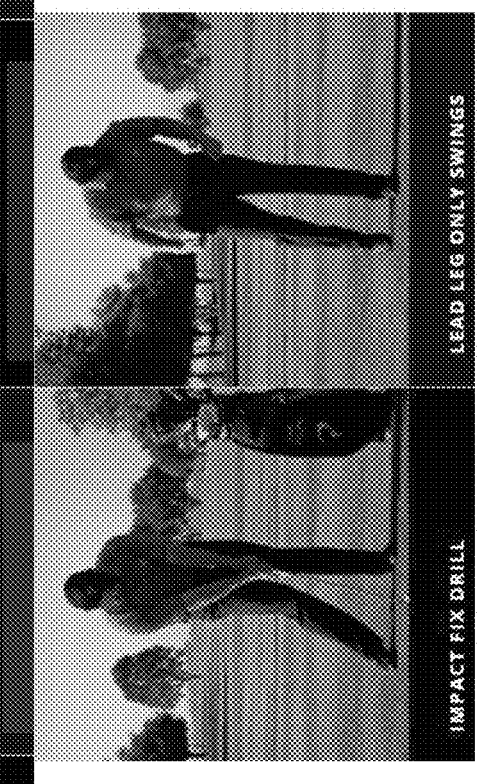
FIG. 42

SYSTEMS AND METHODS FOR GENERATING GOLF SCREEN CHARACTERISTICS

FIELD OF THE DISCLOSURE

The present disclosure generally relates to systems, methods, and apparatuses for generating golf screen characteristics.

SUMMARY

Embodiments of the presently disclosed technology are directed to systems and methods for generating golf screen characteristics. In accordance with some aspects of the presently disclosed technology, a method for training an initial golf screen characteristic model to generate golf screen characteristics is disclosed. The method may be implemented in a computer system including electronic storage and a physical computer processor. The method may include a number of steps. One step may include obtaining, from the electronic storage, an initial golf screen characteristic model. Another step may include obtaining, from the electronic storage, (i) training golf screen point data specifying golf screen points of one or more objects as a function of position and time and (ii) training golf screen characteristic data including the golf screen characteristics specifying golf screen characteristic values. Yet another step may include generating, with the physical computer processor, a conditioned golf screen characteristic model by training the initial golf screen characteristic model using the training golf screen point data and the training golf screen characteristic data, thereby generating a set of golf screen characteristic relationships between the golf screen point data and the golf screen characteristic data. Another step may include storing the conditioned golf screen characteristic model in the electronic storage. Yet another step may include obtaining, from the electronic storage, target golf screen point data. Another step may include generating, with the physical computer processor, target golf screen characteristic data by applying the conditioned golf screen characteristic model to the target golf screen point data. The target golf screen characteristic data includes golf screen characteristics specifying golf screen characteristic values corresponding to the target golf screen point data.

In embodiments, another step may include generating, with the physical computer processor, a golf screen characteristic representation of the target golf screen characteristic data using visual effects to depict at least some of the target golf screen characteristic data.

In embodiments, the computer system may further include a display. The method may further include displaying the golf screen characteristic representation via the display.

In embodiments, the golf screen characteristics may be one or more traits corresponding to one or more screen poses in a golf screen.

In embodiments, the one or more screen poses may include one or more of a multi-segmental rotation screen, seated windshield wipers screen, limited 90/90 golf posture screen, wrist flexion and extension screen, wrist forearm supination and pronation screen, wide base deep squat screen, toe touch screen, or standing shoulder flexion screen.

In embodiments, the golf screen characteristics may include one or more of a limited multi-segmental rotation swing characteristic, limited seated windshield wipers swing characteristic, limited 90/90 golf posture swing characteristic, limited wrist flexion and extension swing characteristic, limited wrist forearm supination and pronation swing characteristic, limited wide base deep squat swing characteristic, limited toe touch swing characteristic, or limited standing shoulder flexion screen characteristic.

In embodiments, the golf screen characteristic values may include one of detecting a given golf screen characteristic, detecting a potential given golf screen characteristic, or detecting no given golf screen characteristic.

In accordance with some aspects of the presently disclosed technology, a method for generating golf screen characteristics is disclosed. The method may be implemented in a computer system that includes a physical computer processor and electronic storage. The method may include a number of steps. One step may include obtaining, from the electronic storage, a conditioned golf screen characteristic model. The conditioned golf screen characteristic model may have been generated by applying an initial golf screen characteristic model to training golf screen point data specifying golf screen points of one or more objects as a function of position and time and the training golf screen characteristic data including the golf screen characteristics specifying golf screen characteristic values, thereby generating a set of golf screen characteristic relationships between golf screen points and the golf screen characteristics. Another step may include obtaining, from the electronic storage, target golf screen point data. Yet another step may include generating, with the physical computer processor, target golf screen characteristic data by applying the conditioned golf screen characteristic model to the target golf screen point data. The target golf screen characteristic data may include golf screen characteristics specifying golf screen characteristic values corresponding to the target golf screen point data.

In embodiments, another step may include generating, with the physical computer processor, a golf screen characteristic representation of the target golf screen characteristic data using visual effects to depict at least some of the target golf screen characteristic data.

In embodiments, the computer system may further include a display. The method may further include displaying the golf screen characteristic representation via the display.

In embodiments, the golf screen characteristics may be one or more traits corresponding to one or more screen poses in a golf screen.

In embodiments, the one or more screen poses may include one or more of a multi-segmental rotation screen, seated windshield wipers screen, limited 90/90 golf posture screen, wrist flexion and extension screen, wrist forearm supination and pronation screen, wide base deep squat screen, toe touch screen, or standing shoulder flexion screen.

In embodiments, the golf screen characteristics may include one or more of a limited multi-segmental rotation swing characteristic, limited seated windshield wipers swing characteristic, limited 90/90 golf posture swing characteristic, limited wrist flexion and extension swing characteristic, limited wrist forearm supination and pronation swing characteristic, limited wide base deep squat swing characteristic, limited toe touch swing characteristic, or limited standing shoulder flexion screen characteristic.

In embodiments, the golf screen characteristic values may include one of detecting a given golf screen characteristic, detecting a potential given golf screen characteristic, or detecting no given golf screen characteristic.

In accordance with some aspects of the presently disclosed technology, a system for generating golf screen characteristics is disclosed. The system may include electronic storage and a physical computer processor configured by machine readable instructions to perform a number of steps. One step may include obtaining, from the electronic storage, a conditioned golf screen characteristic model. The conditioned golf screen characteristic model may have been generated by applying an initial golf screen characteristic model to training golf screen point data specifying golf screen points of one or more objects as a function of position and time and the training golf screen characteristic data including the golf screen characteristics specifying golf screen characteristic values, thereby generating a set of golf screen characteristic relationships between golf screen points and the golf screen characteristics. Another step may include obtaining, from the electronic storage, target golf screen point data corresponding to at least part of a golf screen. Yet another step may include generating, with the physical computer processor, target golf screen characteristic data by applying the conditioned golf screen characteristic model to the target golf screen point data. The target golf screen characteristic data may include golf screen characteristics specifying golf screen characteristic values corresponding to the target golf screen point data.

In embodiments, the physical computer processor may be further configured by machine readable instructions to generate, with the physical computer processor, a golf screen characteristic representation of the target golf screen characteristic data using visual effects to depict at least some of the target golf screen characteristic data.

In embodiments, the system may further include a display. The physical computer processor may be further configured by machine readable instructions to display the golf screen characteristic representation via the display.

In embodiments, the golf screen characteristics may be one or more traits corresponding to one or more screen poses in a golf screen.

In embodiments, the one or more screen poses may include one or more of a multi-segmental rotation screen, seated windshield wipers screen, limited 90/90 golf posture screen, wrist flexion and extension screen, wrist forearm supination and pronation screen, wide base deep squat screen, toe touch screen, or standing shoulder flexion screen.

In embodiments, the golf screen characteristic values may include one of detecting a given golf screen characteristic, detecting a potential given golf screen characteristic, or detecting no given golf screen characteristic These and other features of the presently disclosed technology, as well as the methods of operation and functions of the related elements of structure and the combination of parts, may be clearer upon consideration of the following detailed description and the claims with reference to these drawings, all of which form a part of this specification, with like reference numerals designating corresponding parts in the various figures. It is to be expressly understood that these drawings are for illustration purposes and description and are not intended to be limiting. It should be noted that for clarity and ease of illustration these drawings are not necessarily made to scale. As used in the specification and in the claims, the singular form of "a", "an", and "the" may include plural referents unless the context clearly dictates otherwise.

The technology disclosed herein, in accordance with one or more various embodiments, is described in detail with reference to the following figures. The drawings are provided for purposes of illustration only and merely depict example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

BRIEF DESCRIPTION OF THE DRAWINGS

FIG. 4 illustrates a system for generating annotated screen images, screen point data, screen characteristic data, and/or screen recommendation data in accordance with one or more embodiments of the presently disclosed technology.

FIG. 11A illustrates an example operational flow diagram for training an initial swing recommendation model to generate swing recommendation data in accordance with one or more embodiments of the presently disclosed technology.

FIG. 14 illustrates an example operational flow diagram for generating annotated swing images, swing point data, swing characteristic data, and/or swing recommendation data in accordance with one or more embodiments of the presently disclosed technology.

FIG. 20A illustrates an example operational flow diagram for training an initial screen recommendation model to generate screen recommendation data in accordance with one or more embodiments of the presently disclosed technology.

FIG. 22A illustrates an example operational flow diagram for training an initial screen image model to generate annotated screen images, training an initial screen point model to generate screen point data, training an initial screen characteristic model to generate screen characteristic data, and/or training an initial screen recommendation model to generate screen recommendation data in accordance with one or more embodiments of the presently disclosed technology.

FIG. 24A illustrates an example operational flow diagram for training an initial swing image model to generate annotated swing images, training an initial swing point model to generate swing point data, training an initial swing characteristic model to generate swing characteristic data, and/or training an initial swing recommendation model to generate swing recommendation data in accordance with one or more embodiments of the presently disclosed technology.

FIG. 34 illustrates example exercises and drill in accordance with one or more embodiments of the presently disclosed technology.

FIG. 37 illustrates example exercises and drill in accordance with one or more embodiments of the presently disclosed technology.

FIG. 38 illustrates example exercises and drill in accordance with one or more embodiments of the presently disclosed technology.

FIG. 39 illustrates example exercises and drill in accordance with one or more embodiments of the presently disclosed technology.

FIG. 40 illustrates example exercises and drill in accordance with one or more embodiments of the presently disclosed technology.

FIG. 41 illustrates example exercises and drill in accordance with one or more embodiments of the presently disclosed technology.

FIG. 42 illustrates example exercises and drill in accordance with one or more embodiments of the presently disclosed technology.

DETAILED DESCRIPTION

Figure 1A:
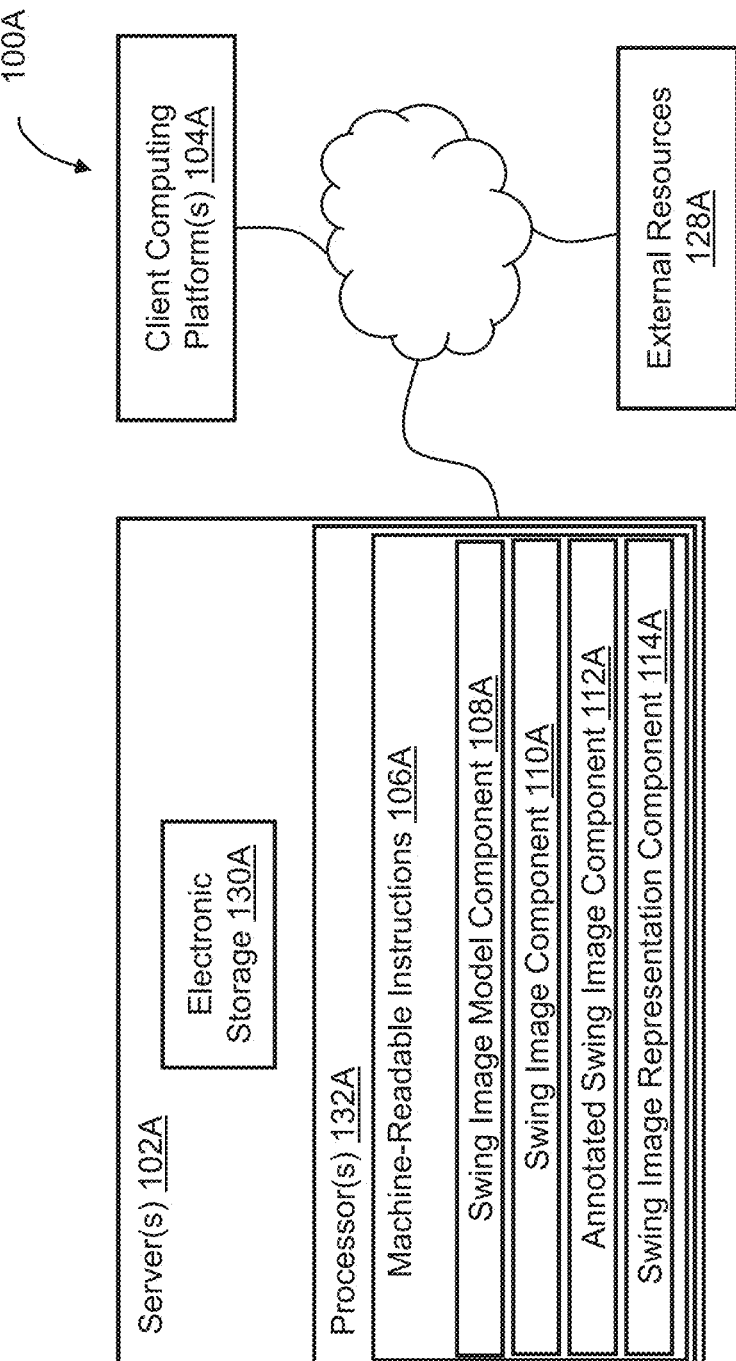
FIG. 1A illustrates a system for generating annotated swing images in accordance with one or more embodiments of the presently disclosed technology.

Golfers aspire to improve their game with a tour player experience, seeking expert guidance and tailored solutions to enhance their performance. However, there are challenges in accessing the right resources, understanding how fitness and physical limitations impact their swing, and navigating the overwhelming abundance of information available. The presently disclosed technology solves these challenges by providing a convenient, personalized, and holistic approach to training that integrates fitness, swing mechanics, and/or injury prevention. Golfers want to efficiently unlock their potential, optimize their swing, and improve key aspects of their game, such as distance and flexibility, without risking injury, but lack the tools and clarity to achieve these goals effectively. Existing approaches to analyze images and/or videos for golf swings and physical screens may rely on markers or multiple cameras or other multi-capture systems to identify key points on a person. Some of these system may be able to analyze movement. These systems often do not consider machine-learning to generate: annotated images from images as input; points from images as input; characteristics from points as input; and/or recommendations from characteristics as input. Those that do may not be accurate, scalable, too general, or otherwise not consider relevant domain expertise to provide a meaningful solution. Current approaches to point generation and swing and screen analysis may rely on large amounts of real-world data, suffer from expensive setups, and/or rely on a person to analyze the movement and/or other data.

Disclosed are systems and methods for generating annotated swing images, swing points, swing characteristics, swing recommendations, annotated screen images, screen points, screen characteristics, and/or screen recommendation data, as well as training machine-learning models to generate such data. As used herein, position may refer to a 1D, 2D, and/or 3D space. The presently disclosed technology may use machine-learning techniques (e.g., neural networks, supervised or unsupervised machine-learning models, as well as, more specifically, convolutional neural networks, reinforcement learning, transfer learning, other neural networks, support vector machines, regressions, Bayesian networks, and/or other machine-learning technologies) to train a model using training data. The model may use relationships between the input and the output, for example, annotated swing image relationships between swing images and annotated swing images, swing point relationships between swing images and swing points, swing characteristic relationships between swing points and swing characteristics, swing recommendation relationships between swing characteristics and swing recommendations, annotated screen image relationships between screen images and annotated screen images, screen point relationships between screen images and screen points, screen characteristic relationships between screen points and screen characteristics, and/or screen recommendation relationships between screen characteristics and screen recommendations. The model may use these relationships to define an importance, or weight, to different inputs, and how the different inputs affect the output. The trained model can be applied to any target input data, whether synthetically generated or obtained from a capture system (e.g., optical sensor system, radar sensor systems, cameras, launch monitors, swing trackers, golf-swing monitors, ball-flight tracker, ball-flight monitors, and/or other performance tracking devices) to generate corresponding target output data.

FIG. 1A illustrates a system for generating annotated swing images in accordance with one or more embodiments of the presently disclosed technology. In some embodiments, system 100A may include server 102A. Server 102A may be configured to communicate with client computing platform 104A according to an architecture, including, for example, a client/server architecture and/or other architectures. Client computing platform 104A may be configured to communicate with other client computing platforms via server 102A, peer-to-peer architecture, and/or other architectures. Users may access system 100A via client computing platform 104A.

Server 102A may be configured by machine readable instructions 106A. Machine readable instructions 106A may include an instruction component (not shown). The instruction component may include computer program component (s). For example, the instruction component may include swing image model component 108A, swing image component 110A, annotated swing image component 112A, swing image representation component 114A, and/or other instruction components.

Swing image model component 108A may be configured to obtain an initial swing image model. Initial swing image model, conditioned swing image model, and/or swing image model may be used interchangeably with initial golf swing image model, conditioned golf swing image model, and/or golf swing image model, respectively, herein. It should be appreciated that while certain terms may be identified as being interchangeable herein, there may be other uses of swing or screen that may be used interchangeably with golf swing or screen, respectively, without specific identification as such. For example, while these may be specifically identified as being interchangeable, swing point may be interchangeable with golf swing point, swing characteristic model may be interchangeable with golf swing characteristic model, screen image may be interchangeable with golf screen image, screen recommendation relationship may be interchangeable with golf screen recommendation relationship, and so on. The initial swing image model may be based on machine-learning techniques to map at least one variable to another variable. For example, the initial swing image model may receive images, virtual body models, text, swing image properties, and/or other input and output annotated swing images. The initial swing image model may be "untrained" or "unconditioned," indicating it may not estimate or generate an output based on the input as accurately as a "trained" or "conditioned" model. Conditioned or trained may be used interchangeably herein.

Images may include two-dimensional images or three-dimensional images. Images may be of people in various poses. A pose may be a position of a person. The position of a person may include different positions and orientations of any part of the body. For example, a pose may include a golf pose. Images of a golf swing may be referred to as a swing image. The golf pose may include one or more poses of a golf swing, a standing pose, a seated pose, a leaning pose, and/or other anatomically possible poses for a person. The one or more golf poses of a golf swing may include a pose at address, takeaway, halfway back, top of backswing, transition, early downswing, pre-impact, impact, release, finish, end of swing, and/or other poses. In some embodiments, the one or more poses may be referred to using a P classification system, going from P1 to P10, as known to a person of ordinary skill in the art. For example, P1 may correspond to address, P2 may correspond to takeaway, P3 may correspond to halfway back, P4 may correspond to top of backswing, P5 may correspond to early downswing, P6 may correspond to pre-impact, P7 may correspond to impact, P8 may correspond to release, P9 may correspond to finish, and P10 may correspond to end of swing. In some embodiments, images may be a variety of single images of one or more people, a sequence of connected images (e.g., consecutive, or sequential, frames of a video), and/or other images. The image may be unannotated, as will be discussed herein. In embodiments, the one or more poses may be detected based on changes to one or more swing points. For example, from a face on perspective, a beginning may be P1. When a golf club shaft is parallel to the ground, P2 may be detected, P3 may correspond to a line from a swing point near a shoulder joint to a swing point near a corresponding elbow joint is parallel to the ground. P4 may be detected by transitioning to a downswing. P5 may be detected when the golf club shaft is parallel to the ground again. P6 may be immediately after P5. P7 may be detected by returning to P1. P8 may be detected to immediately after P7. P9 may be detected by a golf club in front of the player. P10 may be detected at the end of the swing.

Virtual body models may be computer-generated humanoid bodies. The virtual body models may not have any features, such as, for example, faces, textures, and so on. The virtual body models may be posable (i.e., put into various poses) or otherwise manipulable. The virtual body models may be a template to add or otherwise attribute one or more features or swing image properties to. In some embodiments, the virtual body models may be unannotated.

Text may include descriptions of people in poses, including, for example, golf swings (e.g., "a golfer's backswing"), surrounding environments (e.g., "on a golf course"), as well as other text.

Swing image properties may be properties of one or more objects in each of the swing images. Swing image properties may be used interchangeably with golf swing image properties herein. The one or more objects may include a person, an accessory, an environment, and/or other objects. The person may include possible shapes, sizes, dimensions, poses, textures, annotations, swing points, and/or other properties corresponding to a person. The accessory may include accessories for the person, including, for example, one or more golf clubs, golf balls, range finder, phones, tees, ball markers, golf glove, clothing (e.g., hat, glasses, shirts, jackets, sweaters, shorts, pants, socks, shoes, jewelry, watches, wallets, and so on), annotations, swing points, and/or other accessories and their corresponding textures as the person goes through poses. The environment may include everything around the person that is not the person or the accessory. The environment may be an area surrounding the person and the accessory. The environment may include, for example, one or more exterior spaces (e.g., golf courses, driving ranges, and so on), interior spaces (e.g., gyms, workout equipment, cameras, and so on), lighting, camera positions (e.g., far, close-up, and so on), camera effects (e.g., shutter speed, ISO, aperture, depth of field, filters, and so on), buildings, grass, sky, water, sand, sun, lighting, golf carts, fencing, bags, backpacks, headcovers, brushes, performance tracking devices (e.g., optical sensor systems, radar sensor systems, cameras, launch monitors, swing trackers, golf-swing monitors, ball-flight tracker, ball-flight monitors, and so on), gps devices, speakers, divot tools, towels, umbrellas, annotations, swing points, and/or other environments, including the effect the person and the accessories may have on the environment. Swing image properties may specify swing image property values of the one or more objects in each of the swing images. Swing image property values may include a quantitative and/or qualitative value corresponding to the swing image property.

As an example of a swing image property of a person, the swing image property may include a pose, a height, a body type, a weight, a skin tone, a hair, a hair color, a size and shape of one or more body parts, a position of the person in the environment, and so on as would be understood by a person of ordinary skill in the art. Continuing this example, a swing image property value of the height may be about 5 foot 10 inches or a swing image property value of a pose may be a P3 golf pose and so on. In one example of a swing image property of an accessory, such as sunglasses, the swing image property may include a style, a size, a shape, a color, a position of the sunglasses in the environment, and so on as would be understood by a person of ordinary skill in the art for this and other accessories. Continuing this example, the swing image property value of the style may be wayfarer or located on the person's face as if wearing the sunglasses. In an example of a swing image property of an environment, such as a driving range, the swing image property may include a distance from a perceived, virtual, or actual camera, a position and orientation of lighting from the sun and/or other light sources, an amount, size, and color of grass, an amount, size, and color of sand, an amount, size, and color of flags, an amount, size, and color of golf carts, an amount, size, and type of hitting bays, and so on as would be understood by a person of ordinary skill in the art for this and other environments. Continuing this example, a swing image property value of the distance from a perceived, virtual, or actual camera may be about 20 feet from the person, lighting may be only from the sun directly above, or three different colored flags of the same size at different distances from hitting bays.

Annotated swing images may include computer-generated images of a player or person in a pose. Annotated swing images and/or swing images may be used interchangeably with annotated golf swing images and/or golf swing images, respectively, herein. The pose may include a golf pose as discussed herein. The annotated swing images may include one or more swing image properties specifying swing image property values. The annotated swing images may be generated using the initial swing image model, the conditioned swing image model, and/or the swing image model discussed herein. The annotated swing images may include swing points and/or other annotations. Annotations may refer to metadata attributed to the annotated swing images, which may be included in swing image properties and corresponding swing image property values. For example, labeled or otherwise attributed swing image properties and corresponding swing image property values of the one or more objects in an annotated swing image may be annotations of the annotated swing image. In some embodiments, the person, accessories, and environments may be annotated with swing points.

The swing points may be one or more position-specific areas on a given object in a given annotated swing image. Swing points may be used interchangeably with golf swing points herein. The swing points may be identifiable, convertible, extractable, or otherwise processed to generate swing point data. The swing point data may specify a position and time. The position may be in a two-dimensional or three-dimensional space. The swing point data may include metadata attributing the position and time to a given object in a swing image. In some embodiments, one or more swing points may be extrapolated or interpolated from other swing points. For example, referring to FIG. 27, swing points 2702 may be on various parts of swing image model 2700. As illustrated, there may be ten swing points 2702 on a head region, five swing points 2702 on a trunk region, eight swing points 2702 on each arm region down to the hand region, seven swing points 2702 on a hip region, and five swing points 2702 on each leg region down to the foot region for a total of forty-eight swing points 2702 on swing image model 2700. It should be appreciated that there may be fewer or more swing points 2702 than illustrated for various situations. For example, there may be additional swing points 2702 near the leg region and the foot region to analyze foot movement and less swing points 2702 around the head region. The positions of swing points 2702 may be used to determine changes in movement of the given object, an orientation of the given object, swing characteristics, as will be discussed herein, and/or other characteristics. As an example of interpolation, a swing point may be on a left part of the head and a swing point may be on a right part of the head. A swing point in the middle of the head may be interpolated by taking a middle point between the swing point on the left part of the head and the swing point on the right part of the head. In embodiments, the swing point in the middle of the head may be otherwise generated, identified, converted, extracted, or otherwise processed.

Figure 28:
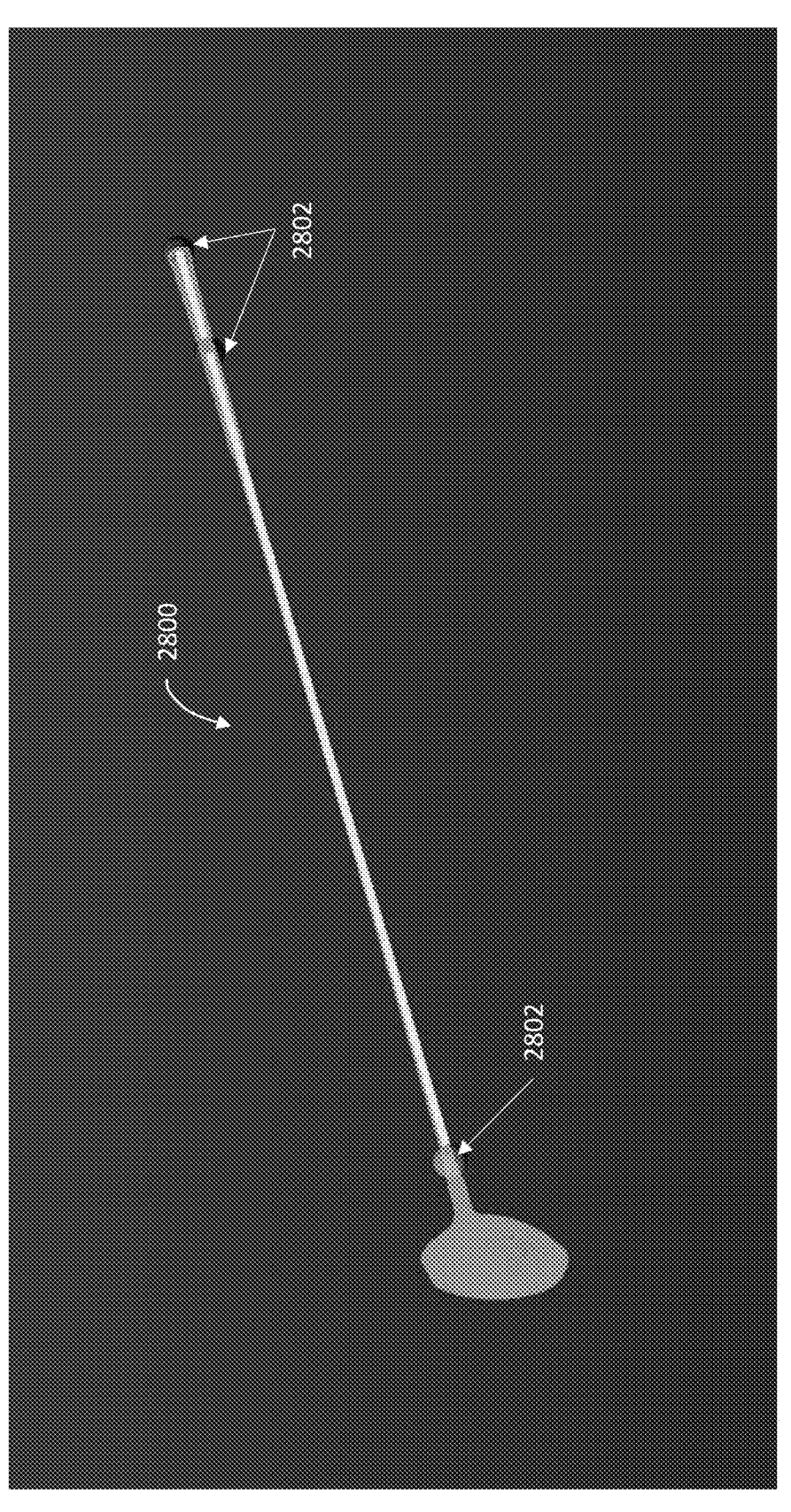
FIG. 28 illustrates a golf club model in accordance with one or more embodiments of the presently disclosed technology.

As an example, referring to FIG. 28, golf club model 2800, an object, may include swing points 2802. As illustrated, there may be one swing point 2802 on a butt end of golf club model 2800, another swing point 2802 midway down a grip of swing points 2802, and another swing point 2802 at a top of a hosel of golf club model 2800 for a total of three swing points 2802 on golf club model 2800. It should be appreciated that there may be fewer or more swing points 2802 than illustrated for various situations. For example, a golf club head speed may need to be determined, and three or more swing points may be added on to a face of golf club model 2800 and one or more of the swing points on the grip may be removed. It should be appreciated that other objects discussed herein may include swing points to identify points of interest on the object to determine or identify characteristics corresponding to the object. It should be appreciated that swing points may be used to identify golf ball flight characteristics in some applications.

Referring back to FIG. 1A, the machine-learning models discussed herein may include, for example, more generally, supervised or unsupervised machine-learning models, as well as, more specifically, convolutional neural networks, reinforcement learning, transfer learning, other neural networks, support vector machines, regressions, Bayesian networks, k-means system, k-nearest neighbor, gradient boosting, and/or other machine-learning technologies.

The machine-learning models may include a model design, one or more model components, a machine-learning technology, a set of parameters, and/or other features discussed herein. A given model design may include a machine-learning model, a design, a model parameter, and/or a threshold. For example, different model designs may include different structure parameters (e.g., first neuron number, hidden layer number, batch size, drop out, and/or activation), hyperparameters (e.g., learning rate, optimizer, losses, and/or epochs), functions (e.g., objective functions), thresholds (e.g., measure of model effectiveness), and/or other design features, such as, for example, running time. The machine-learning models may make connections, relationships, or identify patterns between the input and output of the model to improve the output.

For example, a first neuron number may refer to the number of neurons in a first layer of a neural network. A hidden layer number may refer to the number of layers between the first (input) and last (output) layers of a neural network. Batch size may refer to the number of samples processed in one iteration. Drop out may refer to the rate at which randomly selected neurons are ignored during training. Activation may refer to a function that defines the output of a neural-net node given an input or set of inputs. Learning rate may refer to the amount that the weights in a neural network are updated during training, generally expressed as a number between 0 and 1. Optimizer may refer to an algorithm that alters the attributes of a neural network in order to minimize losses and provide the most accurate results possible. Loss may refer to the value calculated by the objective (or loss) function. Epoch may refer to the number of complete passes, or iterations, through the training dataset. Objective function may refer to a function (also known as the cost, or loss, function) that represents the error of a set of weights in a neural network. Threshold may refer to a measure that determines whether a trained neural network adequately reproduces the training data to sufficient accuracy. Running time may refer to the computational runtime required to train a neural network.

In some embodiments, structure parameters may have more of an impact on optimizing the machine-learning model than the hyperparameters or other design features. For example, this might mean that a 1% change in a structure parameter value changes the accuracy, speed, and/or other elements of the initial swing image model up to the conditioned swing image model more than a 1% change in the hyperparameter values or other design feature values. In embodiments, the hyperparameters and/or other design features have more of an impact on optimizing the machine-learning model than the structure parameters. In one example, the neuron numbers, hidden layer numbers, and epochs may have the greatest impact on optimizing a machine-learning model. The model components may include a different combination of machine-learning models.

In some embodiments, swing image model component 108A may be configured to obtain a swing image model. The swing image model may be a graphical representation of a person. The swing image model may be a two-dimensional or three dimensional model of the person. In some embodiments, the swing image model may include graphical representations of other objects, as discussed herein. The swing image model may be similar to the virtual body models discussed herein. The swing image model may generate annotated swing images by attributing the one or more swing image properties to the swing image model or otherwise annotating the swing image model. For example, each of the possible swing image properties may be randomly assigned a corresponding swing image property value (e.g., height of 6 feet, man, weight of 150 pounds, standing, and so on) and these swing image property values are attributed to the swing image model to form a person in an annotated swing image. Other objects and corresponding swing image properties and swing image property values may be attributed to the annotated swing image (e.g., the person is holding a wedge, with sunglasses of a specific style, with tan shorts, with a white polo, at a driving range with various colored flags, and so on). This may be repeated until a sufficient number of annotated swing images are generated. The swing image model may use annotated swing image relationships to connect the input to the output. Annotated swing image relationships may be used interchangeably with golf annotated swing image relationships herein. For example, an annotated swing image relationship may identify how to attribute annotations and/or swing image properties to the swing image model. Existing methods may rely on pre-existing images to train a machine-learning model or other model. However, not enough data may be available, or even if there is enough data, that data is exhaustible. With the presently disclosed technology, an infinite number of images and data are capable of being generated at scale to supply a machine-learning model or other model to generate sufficient training data.

In some embodiments, swing image model component 108A may be configured to generate or obtain a conditioned swing image model. The conditioned swing image model may be generated by training the initial swing image model using a training swing image set and a training annotated swing image set, including swing image property data, which may include swing image properties and corresponding swing image property values. In embodiments, the conditioned swing image model is "conditioned," indicating the conditioned swing image model may have been trained to optimize performance and/or improve accuracy of the initial swing image model. For example, the conditioned swing image model may more accurately output annotated swing images based on images, virtual body models, text, swing image properties, and/or other input. In embodiments, the conditioned swing image model may have generated a set of annotated swing image relationships between the input and the annotated swing images. The annotated swing image relationships may be formed or generated during training. The relationships discussed herein may be generated by determining a pattern or connection between the input and the validated output. For example, an annotated swing image relationship may identify a group of one or more pixels and determine it is an object of interest, a swing point of interest, and so on. Validation of this annotated swing image relationship may further strengthen the annotated swing image relationship. In some embodiments, the conditioned swing image model may have been stored and swing image model component 108A may retrieve or obtain the conditioned swing image model from storage.

Training the initial swing image model may include applying the training swing image set and/or other input to the initial swing image model based on an initial set of annotated swing image relationships to generate a first iteration of annotated swing images. The initial swing image model may be adjusted to more accurately generate the annotated swing images based on differences between the first iteration of the annotated swing images and the ground truth input that correspond to the initial training swing image set and/or other input (i.e., training annotated swing images). This may be understood to a person of ordinary skill in the art as tuning, training, and/or validation. As an example, the ground truth input may have pre-annotated swing images corresponding to the input. In some embodiments, a training annotated swing image set may be processed to remove annotations to form the training swing image set. This tuning, training, and validation cycle may be repeated numerous times until the initial swing image model is "conditioned," i.e., it is able to output annotated swing images that are consistently within a threshold of the ground truth input. The tuning may include adjustments to one or more of the structure parameters, hyperparameters, functions, thresholds, running time, model design, weighting of one or more swing image properties, other feature engineering, and/or other features. Feature engineering may refer to one or more inputs in the relationships discussed herein and how they may be selected based on an impact the input has on the desired output. In implementations, feature engineering may be accomplished based on machine learning, domain knowledge, and/or other techniques. In some embodiments, the conditioned swing image model may find an annotated swing image relationship or annotated swing image pattern that an image and/or a set of pixels in an image indicate one or more annotations.

In some embodiments, the threshold may depend on the speed of the conditioned swing image model, resources used by the conditioned swing image model, and/or other optimization metrics. This threshold may be based on an average of values, a maximum number of values, and/or other parameters. Other metrics may be applied to determine that the conditioned swing image model is "conditioned." As an example, the threshold may be with 5% of the accuracy value, efficiency value, or other value, though it should be appreciated that the threshold may be 10%, 15%, 25%, and so on. The accuracy value may be based on at least (1) a precision value, which itself quantifies a number of correct positive results made (e.g., a number of true positive predictions divided by the number of all positive predictions) and (2) a recall value, which itself quantifies a number of correct positive results made out of all positive results that could have been made (e.g., a number of true positive predictions divided by the number of all predictions that should have been identified as positive). The accuracy value may range from 0 to 1 and maximizing the accuracy value may mean adjusting variables to increase the accuracy value toward 1.

In some embodiments, swing image model component 108A may be configured to store the conditioned swing image model. For example, the conditioned swing image model can be stored in a non-transitory storage medium, electronic storage 130A, non-transient computer readable mediums, optical storage, and/or other storage. It should be appreciated that these are merely examples and that the conditioned swing image model can be stored in other storage as well (e.g., structured storage, unstructured storage, and/or virtual storage).

In some embodiments, swing image model component 108A may be configured to store the swing image model. It can be stored the same as, or substantially similar to, how the conditioned swing image model is stored.

Swing image component 110A may be configured to obtain a training swing image set. Training swing image set, target swing image set, training annotated swing image set, and/or target annotated swing image set may be used interchangeably with training golf swing image set, target golf swing image set, training annotated golf swing image set, and/or target annotated golf swing image set, respectively, herein. The training swing image set may be used to train an initial swing image model, as discussed herein. The training swing image set may be collected by taking pictures or videos of people in various situations, including golf poses. As an example, an image from the training swing image set may be of a specific person in a normal portrait. There may be another image of the same person in a golf pose that is annotated to identify objects in the image and any relevant swing points. As another example, provided text may correspond to an annotated swing image. As another example, a list of swing image properties and corresponding property values may correspond to an annotated swing image. The training swing image set may be collected physically (e.g., through cameras) and/or virtually (e.g., generated through computer models), as discussed herein. The training swing image set may be stored as discussed herein.

In embodiments, the training swing image set may correspond to a training annotated swing image set. In some embodiments, the training swing image set may be derived, processed, or extracted from the training annotated swing image set using existing annotated swing image relationships between swing images and annotated swing images, such as, for example, swing image properties, anatomical limits, poses, and/or other models/information.

In some embodiments, swing image component 110A may be configured to obtain a target swing image set. The target swing image set may be used to generate a target annotated swing image set by applying the conditioned swing image model and/or the swing image model to the target swing image set. The target swing image set may be a set of images captured from an optical sensor, camera, or another capture system. In some embodiments, the capture system may be 60 frames per second (fps), 120 fps, 240 fps, and so on. In embodiments, there may be motion blur. The conditioned swing image model may be trained using images and/or video with motion blur and/or other artifacts. In some embodiments, a best frame may be selected per second. The best frame may be a frame or image without motion blur or the least amount of motion blur. The best frame may clearly identify one or more objects. It should be appreciated that more than one best frame may be selected and used per a selected time period. The conditioned swing image model may select the best frame based on the training data. In embodiments, every frame collected may be analyzed or processed. In some embodiments, fewer frames may be analyzed or processed to reduce the processing time. The set of images may be consecutive, sequential, or otherwise temporal. For example, one or more frames between frames may be removed or not processed, yet the processed frames may still be consecutive, sequential, or otherwise temporal. For example, the target swing image set may include a golf swing, one or more golf poses, and/or other poses. In some embodiments, the target swing image set may be a set of computer-generated images.

Annotated swing image component 112A may be configured to obtain a training annotated swing image set. The training annotated swing image set may be used to train an initial swing image model, as discussed herein. In some embodiments, a portion of the training annotated swing image set may be set aside and used to validate the conditioned swing image model and/or the swing image model. The training annotated swing image set may be generated by annotating swing images, as discussed herein, or from pre-annotated swing images. The training annotated swing image set may include one or more swing image properties. The one or more swing image properties may correspond to the training swing image set. The training annotated swing image set may be stored as discussed herein.

Annotated swing image component 112A may be configured to generate a target annotated swing image set. The target annotated swing image set may be generated by applying the conditioned swing image model and/or the swing image model to the target swing image set. As discussed herein, the conditioned swing image model and/or the swing image model can accurately estimate, attribute, and/or generate the target annotated swing image set using the target swing image set as input because the conditioned swing image model has been "trained" or "conditioned." As an example, the target annotated swing image set may include one or more objects and one or more swing image properties and corresponding swing image property values. The one or more swing image properties may correspond to the target swing image set.

Swing image representation component 114A may be configured to generate a swing image representation of the swing image set using visual effects to depict at least a portion of the swing image set. Swing image representation may be used interchangeably with golf swing image representation herein. This may be accomplished by the one or more physical computer processors. The swing image representation of the swing image set may be used by one or more physical computer processors in a computer vision process. In some embodiments, a visual effect may include one or more visual transformations of the swing image representation. A visual transformation may include one or more visual changes in how the swing image representation is presented or displayed. In some embodiments, a visual transformation may include one or more of a visual zoom, a visual filter, a visual rotation, a visual stretching or change in aspect ratio, and/or a visual overlay (e.g., text and/or graphics overlay). In some embodiments, the swing image representation may be a video.

Swing image representation component 114A may be configured to generate a swing image representation of the annotated swing image set using visual effects to depict at least a portion of the annotated swing image set. This may be accomplished by the one or more physical computer processors. The swing image representation may be used by one or more physical computer processors in a computer vision process. In some embodiments, a visual effect may include one or more visual transformations of the swing image representation. Each of the one or more objects may be identified or labeled and corresponding swing image properties and swing image property values may be attributed to the one or more objects.

Swing image representation component 114A may be configured to display the swing image representation. The swing image representation may be displayed on a graphical user interface and/or other displays. The graphical user interface may include a user interface based on graphics, audio, and/or text. In embodiments, a user may zoom in on and/or view one or more regions on the swing image representation to illustrate more detail on a given region. The graphical user interface may be configured to receive voice input, gestures, haptic input, keyboard, mouse, pen, touch input and/or other input. System 100A may include one or more output devices such as a display, speakers, printer, haptic feedback, and so on.

In some embodiments, server 102A, client computing platform 104A, and/or external resources 128A may be operatively linked via an electronic communication link. For example, the electronic communication link may be established, at least in part, via a network such as, the internet and/or other networks. It should be appreciated that server 102A, client computing platform 104A, and/or external resources 128A may be operatively linked via other communication media.

Client computing platform 104A may include a processor to execute computer program components as discussed herein. The computer program components may enable a user corresponding to client computing platform 104A to interface with system 100A and/or external resources 128A and/or provide other functionality attributed herein to client computing platform 104A. For example, client computing platform 104A may include a mobile device, smartphone, desktop computer, laptop computer, handheld computer, tablet computing platform, netbook, gaming console, smart device, wearable, another input device, and/or other computing platforms.

External resources 128A may include information sources outside of system 100A, external entities interacting with system 100A, and/or other resources. In some embodiments, some or all of the functionality attributed herein to external resources 128A may be provided by resources included in system 100A.

Server 102A may include electronic storage 130A, processor 132A, and/or other components. Server 102A may include communication lines or ports to enable exchange of information within a network, with a network, and/or other computing platforms. It should be appreciated that the illustration of server 102A in FIG. 1A is not intended to be limiting. For example, server 102A may be implemented by a cloud of computing platforms operating together as server 102A.

Electronic storage 130A may include storage media that electronically store information, such as, for example, data and/or other digital information. The electronic storage media of electronic storage 130A may include system storage that is provided integrally (i.e., substantially non-removable) with server 102A and/or removable storage that is removably connectable to server 102A via, for example, a port (e.g., a USB port, a firewire port, digital port, and/or other ports) or a drive (e.g., a disk drive, thumb drive, and/or other drives). Electronic storage 130A may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130A may include a virtual storage resource (e.g., cloud storage, a virtual private network, and/or other virtual storage resources). Electronic storage 130A may store software algorithms, information determined, generated, and/or otherwise processed by processor 132A, information received from server 102A, information received from client computing platform 104A, and/or other information that enables server 102A to function as described herein. It should be appreciated that the information may be stored in its natural and/or raw format (e.g., data lakes).

Processor 132A may provide information processing capabilities in server 102A. For example, processor 132A may include a physical computer processor, a digital processor, an analog processor, a digital circuit designed to process information, an analog circuit designed to process information, a state machine, and/or other mechanisms for electronically processing information. Although processor 132A is shown in FIG. 1A as a single entity, this is for illustrative purposes only. In some embodiments, processor 132A may include a plurality of processing units. These processing units may be physically or geographically located or packaged within the same device, or processor 132A may represent processing functionality of a plurality of devices operating in coordination. Processor 132A may execute components 108A, 110A, 112A, 114A, and/or other components by software, hardware, firmware, and/or other mechanisms for configuring processing capabilities on processor 132A. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 108A, 110A, 112A, and 114A are illustrated in FIG. 1A as being implemented within a single processing unit, in embodiments, for example, in which processor 132A includes multiple processing units, one of components 108A, 110A, 112A, and/or 114A may be implemented remotely from other components. The description of the functionality provided by the different components 108A, 110A, 112A, and/or 114A described herein is for illustrative purposes, and is not intended to be limiting, as any of components 108A, 110A, 112A, and/or 114A may provide more or less functionality than is described. For example, one or more of components 108A, 110A, 112A, and/or 114A may be eliminated, and some or all of its functionality may be provided by other ones of components 108A, 110A, 112A, and/or 114A. For example, processor 132A may execute an additional component that may perform some or all of the functionality attributed herein to components 108A, 110A, 112A, and/or 114A.

Figure 1B:
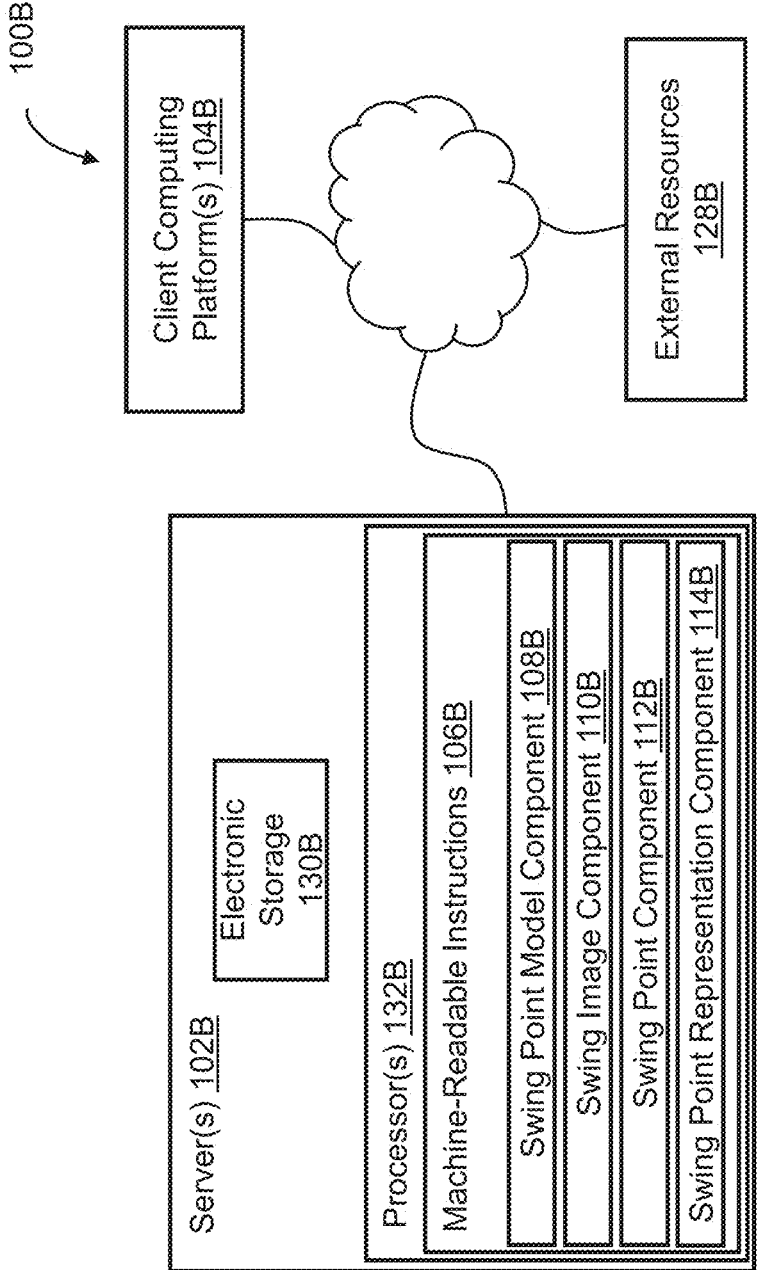
FIG. 1B illustrates a system for generating swing point data in accordance with one or more embodiments of the presently disclosed technology.

FIG. 1B illustrates a system for generating swing point data in accordance with one or more embodiments of the presently disclosed technology. In some embodiments, system 100B may include server 102B. Server 102B may be configured to communicate with client computing platform 104B according to an architecture, including, for example, a client/server architecture and/or other architectures. Client computing platform 104B may be configured to communicate with other client computing platforms via server 102B, peer-to-peer architecture, and/or other architectures. Users may access system 100B via client computing platform 104B.

Server 102B may be configured by machine readable instructions 106B. Machine readable instructions 106B may include an instruction component (not shown). The instruction component may include computer program component (s). For example, the instruction component may include swing point model component 108B, annotated swing image component 110B, swing point component 112B, swing point representation component 114B, and/or other instruction components.

Swing point model component 108B may be configured to obtain an initial swing point model. Initial swing point model and/or conditioned swing point model may be used interchangeably with initial golf swing point model and/or conditioned golf swing point model, respectively, herein. The initial swing point model may be based on machine-learning techniques, as discussed herein, to map at least one variable to another variable. For example, the initial swing point model may receive swing images and/or other input and output swing points. The initial swing point model may be "untrained" or "unconditioned," as discussed herein. It should be appreciated that the swing points may be extracted or converted from an annotated swing image as discussed herein.

In some embodiments, swing point model component 108B may be configured to generate or obtain a conditioned swing point model. The conditioned swing point model may be generated by training the initial swing point model using a training swing image set and training swing point data. In embodiments, the conditioned swing point model is "conditioned," indicating the conditioned swing point model may have been trained to optimize performance and/or improve accuracy of the initial swing point model. For example, the conditioned swing point model may more accurately output swing points based on swing images and/or other input. In embodiments, the conditioned swing point model may have generated a set of swing point relationships between the images and the swing point data. Swing point relationships may be used interchangeably with golf swing point relationships herein. The swing point relationships may be generated by determining a pattern or connection between the input and the validated output. For example, a swing point relationship may identify a group of one or more pixels and determine where on each object of interest there are swing points of interest. Validation of this swing point relationship may further strengthen the swing point relationship. In some embodiments, the conditioned swing point model may have been stored and swing point model component 108B may retrieve or obtain the conditioned swing point model from storage.

Training the initial swing point model may include applying the training swing image set and/or other input to the initial swing point model based on an initial set of swing point relationships between the swing image set and the swing point data to generate a first iteration of swing point data. The initial swing point model may be adjusted to more accurately generate the swing point data based on differences between the first iteration of the swing point data and the ground truth input that corresponds to the initial training swing image set and/or other input. As an example, the ground truth input may be swing points extracted from an annotated swing image that has been processed to separate the swing points and/or other annotations from the swing image. This tuning, training, and validation cycle may be repeated numerous times until the initial swing point model is "conditioned," as discussed herein. In some embodiments, the conditioned swing point model may find a swing point relationship or swing point pattern that one or more swing images and/or sets of pixels indicates positions of one or more swing points.

In some embodiments, swing point model component 108B may be configured to store the conditioned swing point model. It can be stored the same as, or substantially similar to, how the conditioned swing image model is stored.

Swing image component 110B may be configured to obtain a training swing image set. Swing image component 110B may be the same as, or substantially similar to, swing image component 110A and/or annotated swing image component 112A. The training swing image set may be used to train an initial swing point model, as discussed herein. The training swing image set may be generated by annotating swing images, as discussed herein, or from pre-annotated swing images and processing the annotated swing images to remove swing points and/or other annotations, and/or the training swing image set may be collected by taking real photos or videos of people performing a golf swing. As an example, system 100A may be used to generate annotated swing images as discussed herein. The annotated swing images may be processed such that the swing points and/or other annotations are extracted or otherwise removed. The training swing image set may be stored as discussed herein. In some embodiments, the training swing image set may be trained such that system 100B does not have access to annotations as part of the input to the initial swing point model. In embodiments, the training swing image set may be the same as, or substantially similar to, the training swing image set discussed herein with respect to system 100A.

In embodiments, the training swing image set may correspond to training swing point data. In some embodiments, the training swing point data may be derived, processed, converted, or otherwise extracted from the training swing image set using existing swing point relationships between swing images and swing point data, such as, for example, marker-based and markerless motion capture systems, anatomical structures, swing image properties, poses, and/or other models/information.

In some embodiments, swing image component 110B may be configured to obtain a target swing image set. The target swing image set may be used to generate target swing point data by applying the conditioned swing point model to the target swing image set. The target swing image set may be a set of images captured from an optical sensor, camera, or another capture system, as discussed herein. The set of images may be consecutive, sequential, or otherwise temporal. For example, the target swing image set may include a golf swing, one or more golf poses, and/or other poses, as discussed herein. The target swing image set may be the same as, or substantially similar to, the target swing image set discussed herein with respect to system 100A.

Swing point component 112B may be configured to obtain training swing point data. Training swing point data and/or target swing point data may be used interchangeably with training golf swing point data and/or target golf swing point data, respectively, herein. The training swing point data may be used to train an initial swing point model, as discussed herein. In some embodiments, a portion of the training swing point data may be set aside and used to validate the conditioned swing point model. The training swing point data may be generated by deriving, processing, converting, or otherwise extracting swing points from the training swing image set. The swing points may be put into a structured data format with position, time, object data, and/or other metadata or used visually in a virtual space. The object data may include which object the swing points correspond to, where the object is located in the image, metadata on the object, and/or other annotations as discussed herein. The training swing point data may correspond to the training swing image set. The training swing point data may be stored as discussed herein.

Swing point component 112B may be configured to generate target swing point data. The target swing point data may be generated by applying the conditioned swing point model to the target swing image set. As discussed herein, the conditioned swing point model can accurately estimate and/or generate the target swing point data using the target swing image set as input because the conditioned swing point model has been "trained" or "conditioned." As an example, the target swing point data may include one or more swing points with position, time, and/or object data, as discussed herein. In some embodiments, one or more swing points, at least compared to the swing points in FIGS. 27 and 28, may not be generatable because there is no corresponding region visible in the target swing image. In embodiments, the one or more swing points that may not have a corresponding region that is visible in the target swing image may be interpolated, extrapolated, or otherwise estimated/predicted. The target swing point data may correspond to the target swing image set.

Swing point representation component 114B may be configured to generate a swing point representation of the swing image set using visual effects to depict at least a portion of the swing image set, as discussed herein. Swing point representation may be used interchangeably with golf swing point representation herein. Swing point representation component 114B may be the same as, or substantially similar to, swing image representation component 114A with respect to the swing image set.

Swing point representation component 114B may be configured to generate a swing point representation of the swing point data using visual effects to depict at least a portion of the swing point data. This may be accomplished by the one or more physical computer processors. The swing point representation of the swing point data may be used by one or more physical computer processors in a computer vision process. In some embodiments, a visual effect may include one or more visual transformations of the swing point representation.

Swing point representation component 114B may be configured to display the swing point representation. The swing point representation may be displayed on a graphical user interface and/or other displays, as discussed herein. System 100B may include one or more output devices such as a display, speakers, printer, haptic feedback, and so on.

In some embodiments, server 102B, client computing platform 104B, and/or external resources 128B may be operatively linked via an electronic communication link. For example, the electronic communication link may be established, at least in part, via a network such as, the internet and/or other networks. It should be appreciated that server 102B, client computing platform 104B, and/or external resources 128B may be operatively linked via other communication media.

Client computing platform 104B may include a processor to execute computer program components as discussed herein. The computer program components may enable a user corresponding to client computing platform 104B to interface with system 100B and/or external resources 128B and/or provide other functionality attributed herein to client computing platform 104B. For example, client computing platform 104B may include a mobile device, smartphone, desktop computer, laptop computer, handheld computer, tablet computing platform, netbook, gaming console, smart device, wearable, another input device, and/or other computing platforms.

External resources 128B may include information sources outside of system 100B, external entities interacting with system 100B, and/or other resources. In some embodiments, some or all of the functionality attributed herein to external resources 128B may be provided by resources included in system 100B.

Server 102B may include electronic storage 130B, processor 132B, and/or other components. Server 102B may include communication lines or ports to enable exchange of information within a network, with a network, and/or other computing platforms. It should be appreciated that the illustration of server 102B in FIG. 1B is not intended to be limiting. For example, server 102B may be implemented by a cloud of computing platforms operating together as server 102B.

Electronic storage 130B may include storage media that electronically store information, such as, for example, data and/or other digital information. The electronic storage media of electronic storage 130B may include system storage that is provided integrally (i.e., substantially non-removable) with server 102B and/or removable storage that is removably connectable to server 102B via, for example, a port (e.g., a USB port, a firewire port, digital port, and/or other ports) or a drive (e.g., a disk drive, thumb drive, and/or other drives). Electronic storage 130B may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130B may include a virtual storage resource (e.g., cloud storage, a virtual private network, and/or other virtual storage resources). Electronic storage 130B may store software algorithms, information determined, generated, and/or otherwise processed by processor 132B, information received from server 102B, information received from client computing platform 104B, and/or other information that enables server 102B to function as described herein. It should be appreciated that the information may be stored in its natural and/or raw format (e.g., data lakes).

Processor 132B may provide information processing capabilities in server 102B. For example, processor 132B may include a physical computer processor, a digital processor, an analog processor, a digital circuit designed to process information, an analog circuit designed to process information, a state machine, and/or other mechanisms for electronically processing information. Although processor 132B is shown in FIG. 1B as a single entity, this is for illustrative purposes only. In some embodiments, processor 132B may include a plurality of processing units. These processing units may be physically or geographically located or packaged within the same device, or processor 132B may represent processing functionality of a plurality of devices operating in coordination. Processor 132B may execute components 108B, 110B, 112B, 114B, and/or other components by software, hardware, firmware, and/or other mechanisms for configuring processing capabilities on processor 132B. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 108B, 110B, 112B, and 114B are illustrated in FIG. 1B as being implemented within a single processing unit, in embodiments, for example, in which processor 132B includes multiple processing units, one or more of components 108B, 110B, 112B, and/or 114B may be implemented remotely from other components. The description of the functionality provided by the different components 108B, 110B, 112B, 114B, and/or 114B described herein is for illustrative purposes, and is not intended to be limiting, as any of components 108B, 110B, 112B, 114B, and/or 114B may provide more or less functionality than is described. For example, one or more of components 108B, 110B, 112B, and/or 114B may be eliminated, and some or all of its functionality may be provided by other ones of components 108B, 110B, 112B, and/or 114B. For example, processor 132B may execute an additional component that may perform some or all of the functionality attributed herein to components 108B, 110B, 112B, and/or 114B.

Figure 1C:
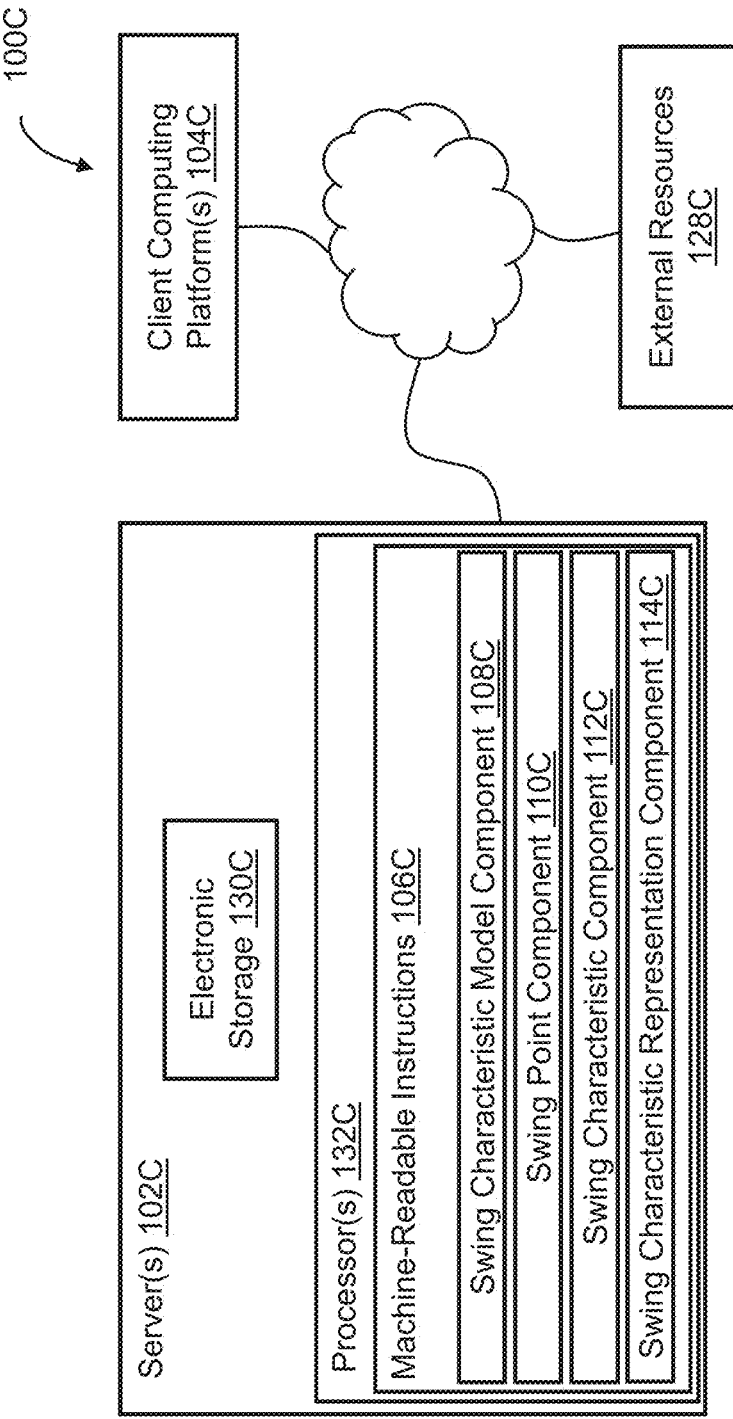
FIG. 1C illustrates a system for generating swing characteristic data in accordance with one or more embodiments of the presently disclosed technology.

FIG. 1C illustrates a system for generating swing characteristic data in accordance with one or more embodiments of the presently disclosed technology. In some embodiments, system 100C may include server 102C. Server 102C may be configured to communicate with client computing platform 104C according to an architecture, including, for example, a client/server architecture and/or other architectures. Client computing platform 104C may be configured to communicate with other client computing platforms via server 102C, peer-to-peer architecture, and/or other architectures. Users may access system 100C via client computing platform 104C.

Server 102C may be configured by machine readable instructions 106C. Machine readable instructions 106C may include an instruction component (not shown). The instruction component may include computer program component(s). For example, the instruction component may include swing characteristic model component 108C, swing point component 110C, swing characteristic component 112C, swing characteristic representation component 114C, and/or other instruction components.

Swing characteristic model component 108C may be configured to obtain an initial swing characteristic model. Initial swing characteristic model, conditioned swing characteristic model, and/or swing characteristic model may be used interchangeably with initial golf swing characteristic model, conditioned golf swing characteristic model, and/or golf swing characteristic model, respectively, herein. The initial swing characteristic model may be based on machine-learning techniques, as discussed herein, to map at least one variable to another variable. For example, the initial swing characteristic model may receive swing point data and/or other input and output swing characteristic data. The swing characteristic data may include swing characteristics specifying screen characteristic values. The swing characteristic values may include detecting a given swing characteristic, detecting a potential given swing characteristic, or detecting no given swing characteristic. In some embodiments, the swing characteristic values may be either detecting or not detecting a given swing characteristic. In embodiments, the swing characteristic values may be specific degrees, distances, an/or other measurements as will be discussed herein. The initial swing characteristic model may be "untrained" or "unconditioned," as discussed herein. The swing point data may specify positions of swing points of one or more objects as a function of time.

Swing characteristics may be one or more traits at different golf poses in a golf swing. Swing characteristics may be used interchangeably with golf swing characteristics herein. For example, swing characteristics may include an S-posture, C-posture, loss of posture, flat shoulder plane, flying elbow, early extension, hiking, reverse pivot, over the top, sway, slide, late buckle, reverse spine angle, forward lunge, hanging back, casting, scooping, chicken winging, and/or other swing characteristics. One or more of the swing characteristics can happen at one or more golf poses in a golf swing. For example, loss of posture and early extension may happen in a backswing and a downswing. It should be appreciated that swing characteristics may describe a different set of characteristics from golf club swing characteristics, which may include at least one of swing data of the golf club, which may be captured from a swing tracker, force data, which may be captured by player monitors (e.g., force plates, insole sensors, and the like), ball-flight data, which may be captured from a flight tracker, motion-capture data, which may be captured from player monitors (e.g., motion-capture devices, wearable devices, and the like), or electromyography data. The swing data of the golf club may include at least one of club speed, attack angle, path, dynamic loft, face angle, droop, face and loft spin, or impact location; the ball-flight data, which may include ball speed, launch angle, azimuth angle, spin characteristics (e.g., back spin, side spin, and/or rifle spin), carry distance, roll distance, total distance, maximum height, and/or trajectory characteristics; the force data may include at least one of vertical force left foot, vertical force right foot, vertical weight shift, vertical force magnitude, toe force, heel force, torque right foot, torque left foot, torque, center of pressure, center mass, moment arm, and forces applied by the player on equipment (e.g., shaft forces, rates of loading, and so on); the motion-capture data may include at least one of wrist rotation, hip angle, hip translation, torso angle, torso translation, spine rotation, upper body position, or other characteristics of the motion of the golfer during a swing; and the electromyography data may include at least one of leg muscle group electromyography data, torso muscle group electromyography data, arm muscle group electromyography data, integrated electromyography data, root-mean square electromyography data, peak amplitude electromyography data, median power frequency electromyography data, or other characteristics of the electrical activity of the muscles of the golfer during a swing. The golf club swing characteristics may include the swing data of the golf club, the force data, and the motion-capture data. It should be appreciated that swing characteristics may be a result of analyzing golf club swing characteristics.

Figure 29A:
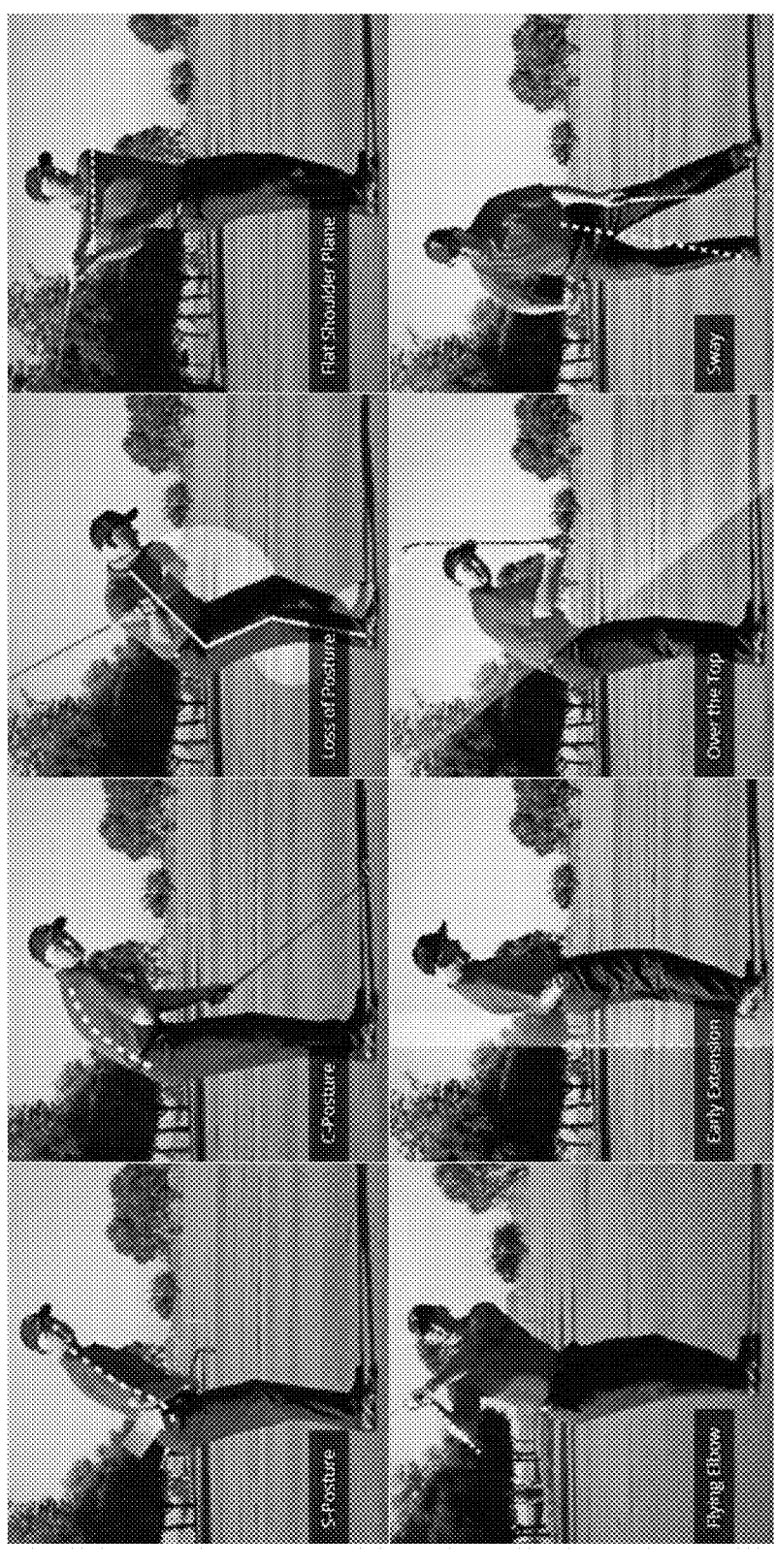
FIG. 29A illustrates example swing characteristics in accordance with one or more embodiments of the presently disclosed technology.
Figure 29B:
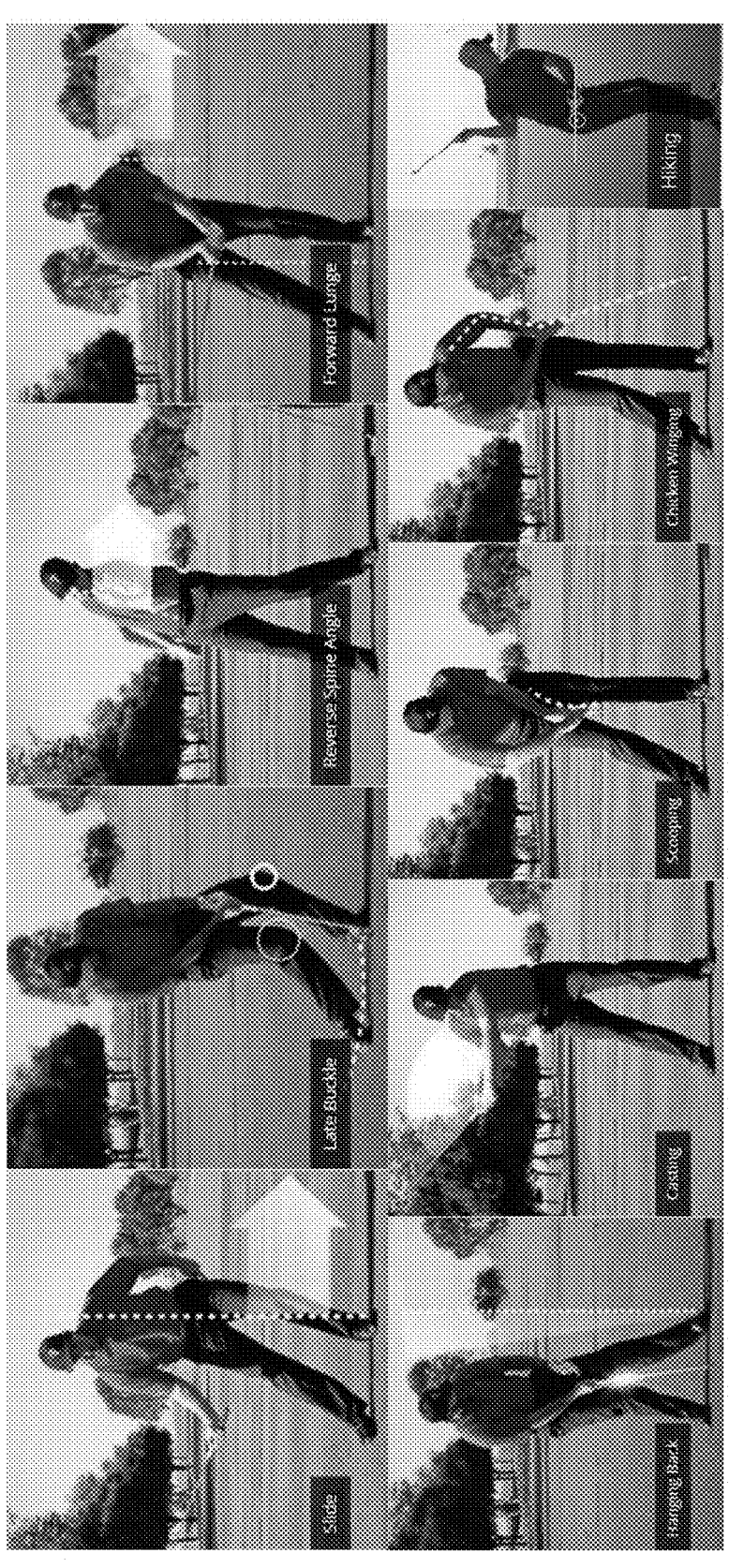
FIG. 29B illustrates example swing characteristics in accordance with one or more embodiments of the presently disclosed technology.

An S-posture swing characteristic may refer to creating too much arch in a lower back. This may be caused by sticking a tail bone out too much in a setup pose or address pose. S in S-posture may refer to how a spine looks down the line, that is on a trail side of a player at address. This excessive curvature in the lower back or S-posture may put abnormally high stress on the muscles in the lower back and causes the abdominal muscles to relax. A C-posture swing characteristic may refer to shoulder being slumped forward or a definitive roundedness in a player's thoracic spine. C in C-posture may refer to how a spine looks down the line. A loss of posture swing characteristic may refer to significant alteration of a body of a player's original set up angles from during the golf swing. For example, one of the original set up angles may be a spine angle or otherwise shifting a posture. A flat shoulder plane swing characteristic may refer to a substantially horizontal plane of a player's shoulders as the player turns to a top of a backswing. Instead of a player's shoulders turning perpendicularly to the titled spin angle at address, which be an angled shoulder plane, a flat shoulder plane may have a player's shoulders turning on a more horizontal plane. A flying elbow swing characteristic may refer to a trailing elbow leaving the trailing side of a player on the backswing. The trailing elbow may "fly" (i.e., move) away from the trailing side as the golf club reaches the top of the backswing, and the elbow may point behind the player, instead of toward the ground. An early extension swing characteristic may be any forward movement of the lower body toward the golf ball during the backswing and/or the downswing. A hiking swing characteristic may refer to movement of a player's trail hip remaining high for too longer or going higher (i.e., tilting left more for a right-handed golfer) during transition and into the downswing. A reverse pivot swing characteristic may refer to excessive weight on the lead leg during the backswing leading to a weight shift to the trail leg on the downswing. An over the top swing characteristic may refer to a path of a golf club approaching a golf ball starting outside an intended swing plane and moving inside the intended swing plane. A sway swing characteristic may refer to any excessive lower body lateral movement away from the target during a backswing. A slide swing characteristic may refer to any excessive lower body lateral movement toward the target during the downswing. A late buckle swing characteristic may refer to dipping or dropping of the lower body toward the ground after impact with the ball. A reverse spine angle swing characteristic may refer to excessive upper body bend toward the target (i.e., trunk leaning towards the target) during the backswing. A forward lunge swing characteristic may refer to any excessive lateral movement of the upper body toward the target during transition and/or the downswing. The transition may refer to a transition from a backswing to a downswing. A hanging back swing characteristic may refer to a lack of weight shift toward the target on the downswing, or "hanging back" during the downswing and staying on the trail foot at impact. A casting swing characteristic may refer to an early release of the golf club during the downswing. Casting may have the shaft neutral or leaning away from the target at impact. A scooping swing characteristic may refer to a premature release of wrist angles on the downswing. Scooping may have the golf club head pass the hands through impact. A chicken winging swing characteristic may refer to bending a lead elbow and/or cupping the lead wrist through impact. Referring to FIGS. 29A and 29B, exemplary frames of one or more of the swing characteristic may be illustrated to provide additional context of the one or more swing characteristics.

In some embodiments, two or more swing characteristics may be detected for a golf swing. In embodiments, all of the detected swing characteristics may be identified to the user. In some embodiments, a subset of the detected swing characteristics may be identified to the user. In embodiments, the subset of the detected swing characteristics may be presented based on a priority of the swing characteristics. For example, the priority may be based on affecting the greatest change in a player's swing, such that improving a prioritized detected swing characteristic improves a player's swing more than improving any other detected swing characteristic. In some embodiments, the priority may be based on how easy it is perceived to be to improve a swing characteristic of the detected swing characteristics.

Referring back to FIG. 1C, in some embodiments, swing characteristic model component 108C may be configured to obtain a swing characteristic model. The swing characteristic model may receive or obtain swing point data and process the swing point data into swing characteristic data. The swing characteristic model may track position and/or movement of swing points as a function of position and/or time. The swing characteristic model may identify or detect one or more swing characteristics. The swing characteristic model may use data analysis to quantitatively analyze swing point data or computer vision to visually track swing point data. For example, the swing characteristic model may identify one or more swing characteristics at address. Address may be identified as near the beginning of the relevant swing point data, as discussed herein. The swing characteristic model may use swing characteristic relationships, discussed herein, between the input and the validated output. Swing characteristic relationships may be used interchangeably with golf swing characteristic relationships herein. For example, a swing characteristic relationship may determine that a position of a group of swing points indicate an S-posture swing characteristic.

Figure 27:
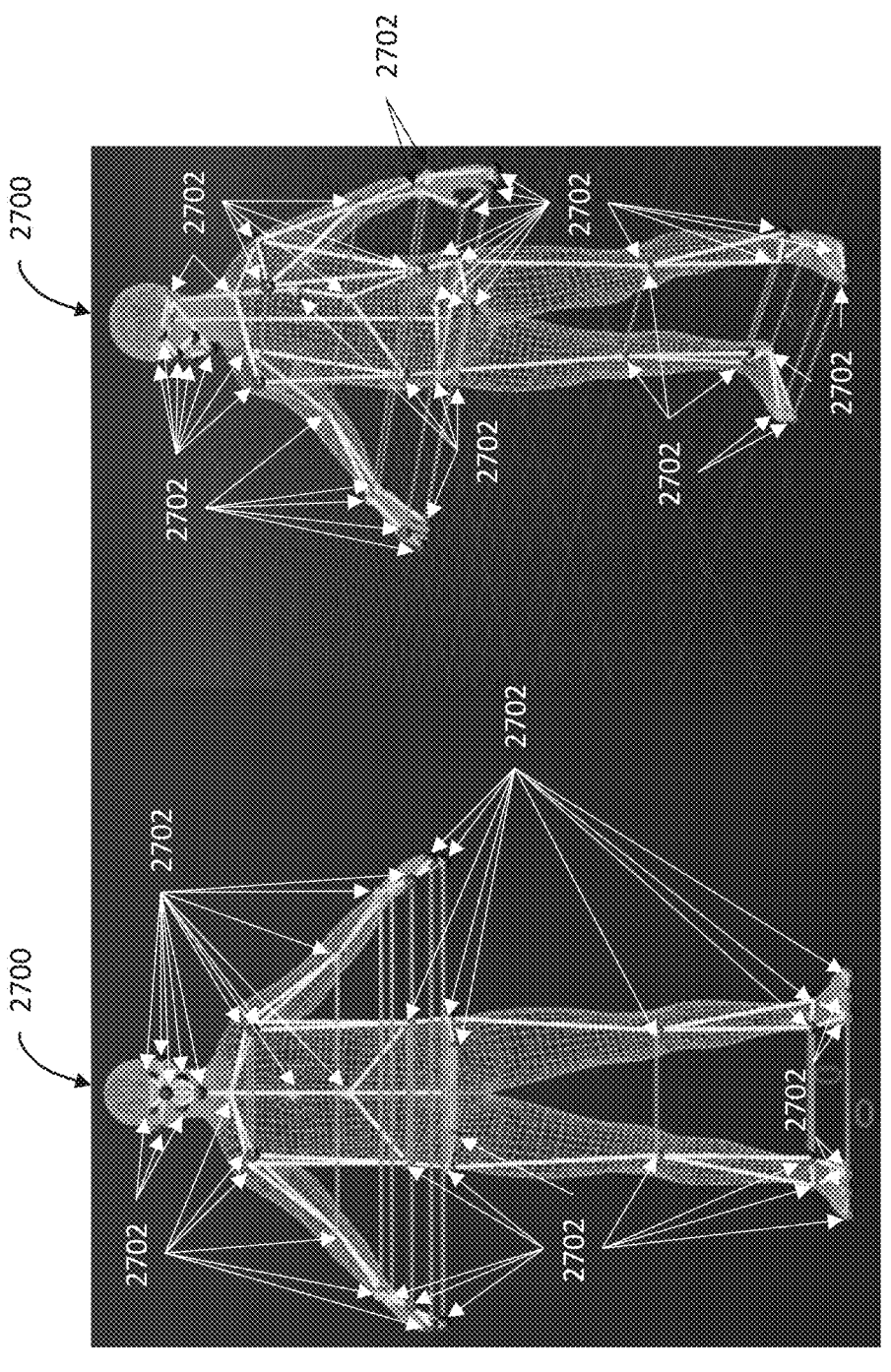
FIG. 27 illustrates a swing image model in accordance with one or more embodiments of the presently disclosed technology.

Using the swing points illustrated in FIG. 27, as an example, an S-posture swing characteristic may be identified, detected, determined, generated, or otherwise returned based on analysis of the five swing points on a trunk region at least at address. A line, from at least a down the line perspective, may be drawn, generated, or otherwise tracked that extends from a swing point on a hip region to a lower swing point on the trunk region on a side corresponding to the swing point on the hip region, and another line from the lower swing point to a middle swing point on the trunk region. These two lines may be compared to determine whether they are substantially linear or that the angle may be about 180 degrees. Based on the comparison, the conditioned swing characteristic model and/or the swing characteristic model may indicate there is an S-posture swing characteristic. Another example may have the line drawn or otherwise tracked that extends from a bottom swing point to a middle swing point on the trunk region compared to a vertical line extending from the middle swing point on the trunk region, and an angle between the two lines may indicate an S-posture swing characteristic. In some embodiments, the first line may be drawn or otherwise tracked that extends from a swing point on a side of the hip region and a corresponding swing point on the same side of the trunk region. For example, an angle less than 135 degrees may indicate an S-posture swing characteristic. An angle between about 135 degrees and about 150 degrees may indicate a potential S-posture swing characteristic. An angle greater than about 150 degrees may indicate no S-posture swing characteristic. In embodiments, a swing point near a lower bottom and a swing point near a middle of the back may define a first line. A second line may be defined by a swing point near a center of the hip region and a swing point near a bottom center of the torso region. These two lines may be tracked. At address, intersecting lines may indicate a potential S-posture swing characteristic or an angle greater than about 5 degrees. An angle formed between the two lines being between about 0 degrees and about 5 degrees may indicate a potential S-posture swing characteristic. Parallel lines may indicate no S-posture swing characteristic. In embodiments, these two lines may be compared to a horizontal line. The first angle being less than the second angle may indicate a S-posture swing characteristic. A difference between the two angles between about 0 degrees and about 5 degrees may indicate a potential S-posture swing characteristic. The second angle being greater than the first angle may indicate no S-posture swing characteristic. It should be appreciated that these values and others discussed below with respect to swing characteristics may vary up to about 30 degrees for any angles without departing from the spirit and scope of the presently disclosed technology. It should be appreciated that there are other methods as would be obvious to a person of ordinary skill in the art to implement the swing characteristic to identify an S-posture swing characteristic. For example, other methods or techniques may be used to compare the swing points of interest to each other to indicate an S-posture swing characteristic. It should be appreciated that any lines or angles drawn, measured, or tracked, may be a part of swing point data, swing characteristic data, and/or swing recommendation data. For example, the lines or angles may become part of the swing points.

Continuing to use the swing points of FIG. 27 as reference, a C-posture swing characteristic may be identified, detected, determined, generated, or otherwise returned based on analysis of at least the five swing points on the trunk region as a function of position and/or time. As an example at least from a down the line perspective, a line may be generated between the upper two swing points on the trunk region and may be compared to a virtual vertical line extending upward from the lower of the upper two swing points on the trunk region, and an angle between the two lines may indicate a C-posture swing characteristic. For example, an angle greater than about 25 degrees may indicate a C-posture swing characteristic. An angle between about 15 degrees and about 25 degrees may indicate a potential C-posture swing characteristic. An angle less than about 15 degrees may indicate no C-posture swing characteristic. In another example, a line, from a down the line perspective, may be drawn, generated, or otherwise tracked that extends from a middle swing point to an upper middle swing point on the trunk region, and another line from the upper middle swing point to an upper swing point on the trunk region. These two lines may be compared to determine whether they are substantially linear. Based on the comparison, the conditioned swing characteristic model and/or the swing characteristic model may indicate there is a C-posture swing characteristic. For example, an angle between the lines of greater than 205 degrees may indicate a C-posture swing characteristic. An angle between about 195 degrees and about 205 degrees may indicate a potential C-posture swing characteristic. An angle of about 180 degrees may indicate no C-posture swing characteristic. It should be appreciated that there are other methods as would be obvious to a person of ordinary skill in the art to implement the swing characteristic to identify a C-posture swing characteristic. For example, other methods or techniques may be used to compare the swing points of interest to each other to indicate a C-posture swing characteristic.

Continuing to use the swing points of FIG. 27 as reference, a loss of posture swing characteristic may be identified, detected, determined, generated, or otherwise returned based on analysis of at least the swing points on the head region, the swing points on the trunk region, the swing points on the hip region, the swing points on the leg regions, and/or the swing points on the arm regions as a function of position and/or time. At least at address from a down the line perspective, at least three different angles may be measured. The first angle may be from a line between the head and the hip joint to a line from the hip joint to a knee joint. The second angle may be from a line between the hip joint and the knee joint and another line from the knee joint to the ankle joint. The third angle may be from a line between the knee joint to the ankle joint and another horizontal line across the ground. As the swing progresses, at least these three angles may be compared. Based on over a 10 degree change in one or more of the angles, a loss of posture swing characteristic may be detected. Changes between about 5 degrees and about 10 degrees of the one or more angles may indicate a potential loss of posture swing characteristic. An angle less than about 5 degrees of the one or more angles may indicate no loss of posture swing characteristic. It should be appreciated that there are other methods as would be obvious to a person of ordinary skill in the art to implement the swing characteristic to identify a loss of posture swing characteristic. For example, other methods or techniques may be used to compare the swing points of interest to each other to indicate a loss of posture swing characteristic.

Continuing to use the swing points of FIG. 27 as reference, a flat shoulder plane swing characteristic may be identified, detected, determined, generated, or otherwise returned based on analysis of at least the swing points on the arm regions as a function of position and/or time. The upper swing points on the arm regions may form a rectangular shape when viewed from above. At least at address from a down the line perspective, a line may be drawn or otherwise tracked that extends from an upper swing point of a lead arm region to a corresponding upper swing point on a trail arm region, and another line may extend horizontally in front of the player from the swing point on the trail arm region. An angle between these lines may be measured at least during the backswing and/or the downswing, and this angle may be used to indicate a flat shoulder plane swing characteristic. For example, an angle less than about 15 degrees may indicate a flat shoulder plane swing characteristic. An angle between about 15 degrees and about 25 degrees may indicate a potential flat shoulder plane swing characteristic. An angle greater than about 25 degrees may indicate no flat shoulder plane swing characteristic. It should be appreciated that there are other methods as would be obvious to a person of ordinary skill in the art to implement the swing characteristic to identify a flat shoulder plane swing characteristic. For example, other methods or techniques may be used to compare the swing points of interest to each other to indicate a flat should plane swing characteristic.

Continuing to use the swing points of FIG. 27 as reference, a flying elbow swing characteristic may be identified, detected, determined, generated, or otherwise returned based on analysis of at least the swing points on the arm regions as a function of position and/or time. At address from a down the line perspective, a line may be drawn or otherwise tracked that extends from a swing point near an elbow joint on a trailing arm region to a swing point near a shoulder joint on a trailing arm region and a horizontal line may extend in front of the player from the swing point near the elbow on the trailing arm region. An angle between these lines may be measured at least during the backswing, transition, and/or the downswing, and this angle may be used to indicate a flying elbow swing characteristic. An angle below the horizontal line may be positive, and an angle above the horizontal line may be negative. For example, an angle less than about 0 degrees (i.e., at about 0 or negative) may indicate a flying elbow swing characteristic. An angle between about 0 degrees and about 5 degrees may indicate a potential flying elbow swing characteristic. An angle of greater than about 5 degrees may indicate no flying elbow swing characteristic. It should be appreciated that there are other methods as would be obvious to a person of ordinary skill in the art to implement the swing characteristic to identify a flying elbow swing characteristic. For example, other methods or techniques may be used to compare the swing points of interest to each other to indicate a flying elbow swing characteristic.

Continuing to use the swing points of FIG. 27 as reference, an early extension swing characteristic may be identified, detected, determined, generated, or otherwise returned based on analysis of at least the swing points on the leg regions, the hip region, and/or the trunk region as a function of position and/or time. At least at address from a down the line perspective, a line may be drawn or otherwise tracked that extends vertically downward from a rearward most swing point on the hip region. In some embodiments, a reference point may be used at the rearward most swing point on the hip region. A distance of a rearward most swing point on the hip region, which may change between different swing point on the hip region through the backswing, transition, or downswing, may be measured at least during the backswing, transition, and/or the downswing. This distance may be used to indicate an early extension swing characteristic. For example, a distance in front of the player of more than about 6 inches may indicate an early extension swing characteristic. A distance of between about 3 inches and about 6 inches may indicate a potential early extension swing characteristic. A distance of less than about 3 inches may indicate no early extension swing characteristic. It should be appreciated that these values and others discussed below with respect to swing characteristics may vary up to about 3 inches for any values measured in inches without departing from the spirit and scope of the presently disclosed technology. It should be appreciated that there are other methods as would be obvious to a person of ordinary skill in the art to implement the swing characteristic to identify an early extension swing characteristic. For example, other methods or techniques may be used to compare the swing points of interest to each other to indicate an early extension swing characteristic.

Continuing to use the swing points of FIG. 27 as reference, a hiking swing characteristic may be identified, detected, determined, generated, or otherwise returned based on analysis of at least the swing points on the hip region as a function of position and/or time. At least at a top of a backswing from a down the line perspective, a horizontal line may be drawn or otherwise tracked starting from a swing point of a trailing hip side on a hip region moved to a rearward most swing point on the hip region (i.e., take a vertical direction from the trailing hip side and move it to the swing point furthest behind the player) or a horizontal line along either of the above identified swing points. Another line may be drawn or otherwise tracked along the swing point of a trailing hip side on a hip region to the point that is furthest behind the player of the horizontal line. In some embodiments, just the swing point of the trailing hip side on the hip region or the rearward most swing point on the hip region may be tracked. An angle between these lines may be measured during at least the transition and the downswing, and this angle may be used to indicate a hiking swing characteristic. An angle counter-clockwise of the starting angle at or near the top of the backswing may be negative, and an angle clockwise of the starting angle may be positive. For example, an angle of less than about −2 degrees (i.e., more negative) may indicate a hiking swing characteristic. An angle between about −2 degrees and about 0 degrees may indicate a potential hiking swing characteristic. A change in angle of greater than about 0 degrees (i.e., about 0 degrees or a positive angle) may indicate no hiking swing characteristic. As another example, at least at a top of a backswing from a down the line perspective, a position of the swing point of the trailing hip side on the hip region may be marked. The position or change in position may be measured at least during the transition and/or downswing, and this position or change in position may be used to indicate a hiking swing characteristic. For example, a position or distance greater than about 3 inches above the swing point of the trailing hip side on the hip region may indicate a hiking swing characteristic. A position or distance between about 0 inches and about 3 inches above the swing point of the trailing hip side on the hip region may indicate a potential hiking swing characteristic. A position or distance less than about 0 inches above the swing point of the trailing hip side on the hip region may indicate no hiking swing characteristic. It should be appreciated that there are other methods as would be obvious to a person of ordinary skill in the art to implement the swing characteristic to identify a hiking swing characteristic. For example, other methods or techniques may be used to compare the swing points of interest to each other to indicate a hiking swing characteristic.

Continuing to use the swing points of FIG. 27 as reference, a reverse pivot swing characteristic may be identified, detected, determined, generated, or otherwise returned based on analysis of at least the swing points on the leg regions and/or the hip region as a function of position and/or time. At least at address from a face on perspective (i.e., the player is facing the camera), a first line may be drawn or otherwise tracked from a swing point near a trailing ankle joint on a trailing leg region to a corresponding swing point on a trailing hip joint, and a second line may be drawn or otherwise tracked from a swing point near a lead ankle joint on a lead leg region to a corresponding swing point on a lead hip joint. A change to the first line may form a first angle measured at least during the downswing, and a change to the second line may form an angle measured at least during the backswing and/or transition, and one or more of these angles may be used to indicate a reverse pivot swing characteristic. A clockwise angle for the first angle may be negative and a counter-clockwise for the first angle may be positive, while a clockwise angle for the second angle may be positive and a counter-clockwise for the second angle may be negative. For example, an angle less than about −1 degrees (i.e., −1 degrees or more negative than −1 degrees) for one or both of the angles may indicate a reverse pivot swing characteristic. An angle between about −1 degrees and about 1 degrees may indicate a potential reverse pivot swing characteristic. An angle of greater than about 1 degrees may indicate no reverse pivot swing characteristic. It should be appreciated that there are other methods as would be obvious to a person of ordinary skill in the art to implement the swing characteristic to identify a reverse pivot swing characteristic. For example, other methods or techniques may be used to compare the swing points of interest to each other to indicate a reverse pivot swing characteristic.

Using the swing points of FIG. 27 and/or FIG. 28 as reference, an over the top swing characteristic may be identified, detected, determined, generated, or otherwise returned based on analysis of at least the swing points on the lead arm region and swing points on the golf club head as a function of position and/or time. At least at address from a down the line perspective, a line may be drawn or otherwise tracked that extends along the shaft axis (e.g., from a butt end swing point to the top of hosel swing point). At a golf pose where the lead arm is substantially horizontal (e.g., within 5 degrees of horizontal), another line may be drawn or otherwise tracked that extends along the shaft axis. In some embodiments, at least at address from a down the line perspective, the second line may be drawn or otherwise tracked from a golf ball or a golf club head to a swing point on a trailing shoulder joint of the trailing arm region. A region between these two lines may be a swing slot region. At least during the downswing, a position of at least a swing point on the golf club head, such as, for example, the swing point on the top of hosel swing point on the golf club head, may be measured at least during the downswing. The position or distance as a function of time may be used to indicate an over the top swing characteristic. For example, a position or distance of at least 6 inches in front of and above the player may indicate an over the top swing characteristic. It should be appreciated that these values and others discussed below with respect to swing characteristics may vary for any values measured based on a swing slot region distance without departing from the spirit and scope of the presently disclosed technology. A position or distance of between about 3 inches and about 6 inches in front of and above the swing slot region may indicate a potential over the top swing characteristic. A distance of less than about 3 inches may indicate no over the top swing characteristic. In some embodiments, an angle may be formed by the two lines that define the swing slot region. The angle may be formed at the top or the bottom. Based on the angle being formed at the top, another line may be drawn at the shaft axis at least during the downswing. An angle between this new shaft line and the rearward most shaft line may be measured at least during the transition and/or the downswing, and this angle may be used to indicate an over the top swing characteristic. For example, an angle greater than about 10 degrees compared to the angle between the two lines that define the swing slot region may indicate an over the top swing characteristic. An angle between about 5 degrees and about 10 degrees compared to the angle between the two lines that define the swing slot region may indicate a potential over the top swing characteristic. An angle of less than about 5 degrees compared to the angle between the two lines that define the swing slot region may indicate no over the top swing characteristic. Based on the angle being formed at the bottom, the angle formed between the new shaft line may be measured at least during the transition and/or the downswing, and this angle may be used to indicate an over the top swing characteristic. For example, an angle greater than about 10 degrees compared to the angle between the two lines that define the swing slot region may indicate an over the top swing characteristic. An angle between about 5 degrees and about 10 degrees compared to the angle between the two lines that define the swing slot region may indicate a potential over the top swing characteristic. An angle of less than about 5 degrees compared to the angle between the two lines that define the swing slot region may indicate no over the top swing characteristic. It should be appreciated that there are other methods as would be obvious to a person of ordinary skill in the art to implement the swing characteristic to identify an early extension swing characteristic. For example, other methods or techniques may be used to compare the swing points of interest to each other to indicate an early extension swing characteristic.

As another example, at least at impact from a down the line perspective, another line, which may be referred to as an impact plane line may be drawn or otherwise tracked that extends along a shaft axis. At least a few consecutive, or sequential, frames before impact, another point may be drawn or otherwise tracked of a swing point on the top of the hosel of the golf club head. A position or distance may be measured at least during the downswing near impact, and this position or distance may be used to indicate an over the top swing characteristic. For example, a position or distance greater than about 3 inches in front of and above the impact plane line may indicate an over the top swing characteristic. A position or distance between about 0 inches and about 3 inches in front of and above the impact line may indicate a potential over the top swing characteristic. A position or distance less than about 0 inches may indicate no over the top swing characteristic.

As another example, at least at impact from a down the line perspective, the impact plane line may be drawn or otherwise tracked that extends along a shaft axis. At least a few consecutive, or sequential, frames before impact, another line may be drawn or otherwise tracked of the shaft axis of the golf club head. An angle may be measured between these two lines at least during the downswing near impact, and this angle may be used to indicate an over the top swing characteristic. An angle counter-clockwise from the impact plane line may be positive while an angle clockwise from the impact plane line may be negative. For example, an angle of about −10 degrees or less (i.e., more negative) may indicate an over the top swing characteristic. An angle between about −10 degrees to about 0 degrees may indicate a potential over the top swing characteristic. An angle greater than about 0 degrees may indicate no over the top swing characteristic. It should be appreciated that there are other methods as would be obvious to a person of ordinary skill in the art to implement the swing characteristic to identify an over the top swing characteristic. For example, other methods or techniques may be used to compare the swing points of interest to each other to indicate an over the top swing characteristic.

Continuing to use the swing points of FIG. 27 as reference, a sway swing characteristic may be identified, detected, determined, generated, or otherwise returned based on analysis of at least the swing points on the leg regions and/or the hip region as a function of position and/or time. At least at address from a face on perspective (i.e., the player is facing the camera), a line may be drawn or otherwise tracked from a swing point near a trailing ankle joint on a trailing leg region to a corresponding swing point on a trailing hip joint. An angle may be formed, measured, or otherwise tracked from the original line to the line along the same swing points during swing at least during the back-swing and/or transition, and this angle may be used to indicate a sway swing characteristic. An angle clockwise may be positive and an angle counter-clockwise may be negative. For example, an angle less than about −3 degrees may indicate a sway swing characteristic. An angle between about −3 degrees and about 0 degrees may indicate a potential sway swing characteristic. An angle of greater than about 0 degrees may indicate no sway swing characteristic. It should be appreciated that there are other methods as would be obvious to a person of ordinary skill in the art to implement the swing characteristic to identify a sway swing characteristic. For example, other methods or techniques may be used to compare the swing points of interest to each other to indicate a sway swing characteristic.

Continuing to use the swing points of FIG. 27 as reference, a slide swing characteristic may be identified, detected, determined, generated, or otherwise returned based on analysis of at least the swing points on the leg regions and/or the hip region as a function of position and/or time. At least at address from a face on perspective (i.e., the player is facing the camera), a line may be drawn or otherwise tracked from a swing point near a lead ankle joint on a lead leg region vertically upward. At least during the transition and/or downswing, another line may be drawn or otherwise tracked from a swing point near the lead ankle joint to a corresponding swing point on a lead hip joint. An angle between these lines may be measured at least during the transition and/or downswing, and this angle may be used to indicate a slide swing characteristic. An angle counter-clockwise of the vertical line may be positive, and an angle clockwise of the vertical line may be negative. For example, an angle less than about −3 degrees (i.e., more negative) may indicate a slide swing characteristic. An angle between about −3 degrees and about 0 degrees may indicate a potential slide swing characteristic. An angle of greater than about 0 degrees (i.e., about 0 degrees or a positive angle) may indicate no slide swing characteristic. It should be appreciated that there are other methods as would be obvious to a person of ordinary skill in the art to implement the swing characteristic to identify a slide swing characteristic. For example, other methods or techniques may be used to compare the swing points of interest to each other to indicate a slide swing characteristic.

Continuing to use the swing points of FIG. 27 as reference, a late buckle swing characteristic may be identified, detected, determined, generated, or otherwise returned based on analysis of at least the swing points on the leg regions as a function of position and/or time. At least near impact from a face on perspective, at least one angle may be measured. The first angle may be from a line drawn or otherwise tracked from a swing point near the trailing ankle joint to a corresponding swing point near the trailing knee joint, and another line drawn or otherwise tracked extending from the corresponding swing point near the trailing knee joint to a swing point near the trailing hip joint. The second angle may be from a line drawn or otherwise tracked from a swing point near the lead ankle joint to a corresponding swing point near the lead knee joint, and another line drawn or otherwise tracked extending from the corresponding swing point near the lead knee joint to a swing point near the lead hip joint. At least before or at impact, the first angle and the second angle may be measured. As the swing progresses to impact and after impact, changes to these angles may be measured. Based on over a 15 degree change in one or more of the angles, a late buckle swing characteristic may be detected. In some embodiments, based on greater than about a 10% change in one or more of the angles, a late buckle swing characteristic may be detected. Changes between about 5 degree and about 15 degrees of the one or more angles may indicate a potential late buckle swing characteristic. In some embodiments, based on between about a 1% and a 10% change in one or more of the angles, a potential late buckle swing characteristic may be detected. Changes less than about 5 degrees may indicate no late buckle swing characteristic. In some embodiments, based on less than about a 1% change in one or more of the angles, no late buckle swing characteristic may be detected. It should be appreciated that these values and others discussed below with respect to swing characteristics may vary up to about 10% for any percentage values without departing from the spirit and scope of the presently disclosed technology. It should be appreciated that there are other methods as would be obvious to a person of ordinary skill in the art to implement the swing characteristic to identify a late buckle swing characteristic. For example, other methods or techniques may be used to compare the swing points of interest to each other to indicate a late buckle swing characteristic.

Continuing to use the swing points of FIG. 27 as reference, a reverse spine angle swing characteristic may be identified, detected, determined, generated, or otherwise returned based on analysis of at least the swing points on the hip region, trunk region, and/or the head region as a function of position and/or time. At least at or near a top of the backswing from a face on perspective, a line may be drawn or otherwise tracked from a swing point near a center of the hips on the hip region vertically upward. Another line may be drawn or otherwise tracked from a swing point at a center of the hips on the hip region to a swing point at a center of the head on the head region. An angle between these lines may be measured at least during the top of the backswing or near the top of the backswing, and this angle may be used to indicate a reverse spine angle swing characteristic. An angle counter-clockwise of the vertical line may be positive, and an angle clockwise of the vertical line may be negative. For example, an angle less than about −3 degrees (i.e., more negative) may indicate a reverse spine angle swing characteristic. An angle between about −3 degrees and about 0 degrees may indicate a potential reverse spine angle swing characteristic. An angle of greater than about 0 degrees (i.e., about 0 degrees or a positive angle) may indicate no reverse spine angle swing characteristic. It should be appreciated that there are other methods as would be obvious to a person of ordinary skill in the art to implement the swing characteristic to identify a reverse spine angle swing characteristic. For example, other methods or techniques may be used to compare the swing points of interest to each other to indicate a reverse spine angle swing characteristic.

Continuing to use the swing points of FIG. 27 as reference, a forward lunge swing characteristic may be identified, detected, determined, generated, or otherwise returned based on analysis of at least the swing points on the leg regions, hip region, and/or trunk region as a function of position and/or time. At least at or near a top of the backswing from a face on perspective, a line may be drawn or otherwise tracked from a swing point near a center of the hips on the hip region vertically upward. Another line may be drawn or otherwise tracked from a swing point at a center of the hips on the hip region to a swing point at a middle center of the body on the trunk region. An angle between these lines may be measured at least during the top of the backswing or near the top of the backswing, and this angle may be used to indicate a forward lunge swing characteristic. An angle counter-clockwise of the vertical line may be positive, and an angle clockwise of the vertical line may be negative. For example, an angle less than about –3 degrees (i.e., more negative) may indicate a forward lunge swing characteristic. An angle between about –3 degrees and about 0 degrees may indicate a potential forward lunge swing characteristic. An angle of greater than about 0 degrees (i.e., about 0 degrees or a positive angle) may indicate no forward lunge swing characteristic. It should be appreciated that there are other methods as would be obvious to a person of ordinary skill in the art to implement the swing characteristic to identify a forward lunge swing characteristic. For example, other methods or techniques may be used to compare the swing points of interest to each other to indicate a forward lunge swing characteristic.

Continuing to use the swing points of FIG. 27 as reference, a hanging back swing characteristic may be identified, detected, determined, generated, or otherwise returned based on analysis of at least the swing points on the leg regions, hip region, trunk region, and/or arm regions as a function of position and/or time. At least at address from a face on perspective, a line may be drawn or otherwise tracked from a swing point near a lead ankle joint of the lead leg region vertically upward. At least at or near a top of the backswing from a face on perspective, a line may be drawn or otherwise tracked from a swing point near a lead ankle joint of the lead leg region to a swing point near a lead shoulder joint on the lead arm region. An angle between these lines may be measured at least during the top of the backswing or near the top of the backswing to impact, and this angle during a downswing near impact may be used to indicate a hanging back swing characteristic. An angle counter-clockwise of the vertical line may be negative, and an angle clockwise of the vertical line may be positive. For example, an angle of less than about –5 degrees (i.e., about 0 degrees or more negative) during a downswing near impact may indicate a hanging back swing characteristic. An angle between about –5 degrees and about 0 degrees may indicate a potential hanging back swing characteristic. An angle of greater than about 0 degrees (i.e., about 0 degrees or a positive angle) may indicate no hanging back swing characteristic. As another example, changes to the angle during a downswing to impact may be used to indicate a hanging back swing characteristic. An angle counter-clockwise of the vertical line may be positive, and an angle clockwise of the vertical line may be negative. For example, a change of less than about 0 degrees (i.e., about 0 degrees or more negative) during the downswing near impact may indicate a hanging back swing characteristic. A change of between about 0 degrees and about 5 degrees during the downswing near impact may indicate a potential hanging back swing characteristic. A change of greater than about 5 degrees may indicate no hanging back swing characteristic. It should be appreciated that there are other methods as would be obvious to a person of ordinary skill in the art to implement the swing characteristic to identify a hanging back swing characteristic. For example, other methods or techniques may be used to compare the swing points of interest to each other to indicate a hanging back swing characteristic.

Continuing to use the swing points of FIGS. 27 and 28 as reference, a casting swing characteristic may be identified, detected, determined, generated, or otherwise returned based on analysis of at least the swing points on the arm regions and/or golf club head as a function of position and/or time. At least at or near a top of the backswing from a face on perspective, a line may be drawn or otherwise tracked from a swing point near a shoulder joint of the lead arm region to a swing point on a lead hand of the lead arm region, and a line along the shaft axis. These lines may be tracked to at least a middle of the downswing. An angle between these lines may be measured at least during the top of the backswing to at least a middle of the downswing, and this angle may be used to indicate a casting swing characteristic. An angle counter-clockwise of the starting angle at or near the top of the backswing may be negative, and an angle clockwise of the starting angle may be positive. For example, a change in angle of less than about –5 degrees (i.e., about 0 degrees or more negative) to at least the middle of the downswing may indicate a casting swing characteristic. A change in angle between about –5 degrees and about 0 degrees may indicate a potential casting swing characteristic. A change in angle of greater than about 0 degrees (i.e., about 0 degrees or a positive angle) may indicate no casting swing characteristic. It should be appreciated that there are other methods as would be obvious to a person of ordinary skill in the art to implement the swing characteristic to identify a hanging back swing characteristic. For example, other methods or techniques may be used to compare the swing points of interest to each other to indicate a hanging back swing characteristic.

Continuing to use the swing points of FIGS. 27 and 28 as reference, a scooping swing characteristic may be identified, detected, determined, generated, or otherwise returned based on analysis of at least the swing points on the arm regions, and/or golf club head as a function of position and/or time. At least at or near impact from a face on perspective, a line may be drawn or otherwise tracked along a shaft axis, and a vertical line may extend from the bottom of the first line. An angle between these lines may be measured at least at or near impact, and this angle may be used to indicate a scooping swing characteristic. An angle counter-clockwise of the starting angle at or near the top of the backswing may be negative, and an angle clockwise of the starting angle may be positive. For example, an angle of less than about –2 degrees (i.e., more negative) may indicate a scooping swing characteristic. An angle between about –2 degrees and about 0 degrees may indicate a potential scooping swing characteristic. A change in angle of greater than about 0 degrees (i.e., about 0 degrees or a positive angle) may indicate no scooping swing characteristic. As another example, at or near impact from a face on perspective, a line may be drawn or otherwise tracked from a swing point on a lead elbow joint of a lead arm region to a swing point on a lead wrist joint of a lead arm region, and another line may extend from the swing point on the lead wrist joint of the lead arm region to a swing point on a knuckle joint of the lead arm region. An angle between these lines may be measured at least at or near impact, and this angle may be used to indicate a scooping swing characteristic. An angle of less than about 155 degrees may indicate a scooping swing characteristic. An angle between about 155 degrees and about 180 degrees may indicate a potential scooping swing characteristic. An angle greater than about 180 degrees may indicate no scooping swing characteristic. It should be appreciated that there are other methods as would be obvious to a person of ordinary skill in the art to implement the swing characteristic to identify a hanging back swing characteristic. For example, other methods or techniques may be used to compare the swing points of interest to each other to indicate a hanging back swing characteristic.

Continuing to use the swing points of FIGS. 27 and 28 as reference, a chicken winging swing characteristic may be identified, detected, determined, generated, or otherwise returned based on analysis of at least the swing points on the arm regions and/or golf club head as a function of position and/or time. At least near impact and/or after impact from a face on perspective, at least one angle may be measured. A line may be drawn or otherwise tracked through the shaft axis. A second angle may be from a line starting at a swing point on the lead wrist joint on the lead arm region to a swing point on the lead elbow joint on the lead arm region, and another line from the swing point on the lead elbow joint on the lead arm region to the swing point on the lead shoulder joint on the lead arm region. At least near impact and/or after impact, the angle may be measured, and differences between the first line, at about 180 degrees and the second angle may be used to indicate a chicken winging swing characteristic. Based on over a 5 degree difference in the angles, a chicken winging swing characteristic may be detected. Differences between about 0 degrees and about 5 degrees of the one or more angles may indicate a potential chicken winging swing characteristic. Differences less than about 0 degrees may indicate no chicken winging swing characteristic. As another example, the angle may be measured alone. An angle less than 155 degrees, a chicken winging swing characteristic may be detected. An angle between about 155 degrees and about 175 degrees may indicate a potential chicken winging swing characteristic. An angle greater than about 175 degrees may indicate no chicken winging swing characteristic. As another example, at least after impact from a down the line perspective, at least one angle may be measured. An angle may be from a line starting at a swing point on the lead wrist joint on the lead arm region to a swing point on the lead elbow joint on the lead arm region, and another line extending vertically downward from the swing point on the lead elbow joint on the lead arm region. At least after impact, the angle may be measured, and the angles may be used to indicate a chicken winging swing characteristic. An absolute angle (i.e., either clockwise or counter-clockwise from the vertical line) less than about 60 degrees may indicate a chicken winging swing characteristic. An absolute angle between about 60 degrees and about 80 degrees may indicate a potential chicken winging swing characteristic. An absolute angle greater than about 80 degrees may indicate no chicken winging swing characteristic. In some embodiments, the angle may be measured to an end of a release or part of a finish (e.g., P8 and P9 poses). It should be appreciated that there are other methods as would be obvious to a person of ordinary skill in the art to implement the swing characteristic to identify a chicken winging swing characteristic. For example, other methods or techniques may be used to compare the swing points of interest to each other to indicate a chicken winging swing characteristic.

It should be appreciated that the above methods/techniques are merely exemplary, and that there may be other methods as would be obvious to a person of ordinary skill in the art to implement the swing characteristic to identify one or more of swing characteristics discussed herein. For example, other methods or techniques may be used to compare the swing points of interest to each other to indicate a given swing characteristic. As an example, angles between one or more swing points may be tracked, distances and/or positions between swing points may be tracked, and the angles, distances, and/or positions may be tracked as a function of position and/or time. In embodiments, the conditioned swing characteristic model and/or the swing characteristic model may attribute the identified swing characteristic to the swing point(s), the object of interest, the time of interest, and/or other elements. In some embodiments, no swing characteristics may be determined, identified, generated, or otherwise returned for a set of swing point data. While a down the line or face on perspective are discussed herein, it should be appreciated that other perspectives may be used without departing from the spirit and scope of the presently disclosed technology.

Referring back to FIG. 1C, in some embodiments, swing characteristic model component 108C may be configured to generate or obtain a conditioned swing characteristic model. The conditioned swing characteristic model may be generated by training the initial swing characteristic model using training swing point data and training swing characteristic data. In embodiments, the conditioned swing characteristic model is "conditioned," indicating the conditioned swing characteristic model may have been trained to optimize performance and/or improve accuracy of the initial swing characteristic model, as discussed herein. For example, the conditioned swing characteristic model may more accurately output swing characteristic data based on swing point data and/or other input. In embodiments, the conditioned swing characteristic model may have generated a set of swing characteristic relationships between the swing point data and the swing characteristic data. In some embodiments, the conditioned swing characteristic model may have been stored and swing characteristic model component 108C may retrieve or obtain the conditioned swing characteristic model from storage.

Training the initial swing characteristic model may include applying the training swing point data and/or other input to the initial swing characteristic model based on an initial set of swing characteristic relationships between the swing point data and the swing characteristic data to generate a first iteration of swing characteristic data. The initial swing characteristic model may be adjusted to more accurately generate the swing characteristic data based on differences between the first iteration of the swing characteristic data and the ground truth input that corresponds to the initial training swing point data and/or other input. As an example, the ground truth input may be pre-identified, pre-labeled, or otherwise pre-annotated to identify or correspond to one or more swing characteristics during the swing represented by the swing points. This tuning, training, and validation cycle may be repeated numerous times until the initial swing characteristic model is "conditioned," as discussed herein. In some embodiments, the conditioned swing characteristic model may find a swing characteristic relationship or swing characteristic pattern that a specific position and/or movement of the swing points as a function of time throughout different parts of the swing indicate which of the one or more swing characteristics correspond to the swing point data. Validation of this swing characteristic relationship may further strengthen the swing characteristic relationship.

In some embodiments, swing characteristic model component 108C may be configured to store the conditioned swing characteristic model. It can be stored the same as, or substantially similar to, how the conditioned swing characteristic model is stored.

Swing point component 110C may be configured to obtain training swing point data. Swing point component 110C may be the same as, or substantially similar to, swing point component 112B. The training swing point data may be used to train an initial swing characteristic model, as discussed herein. The training swing point data may be generated, extracted, converted, derived, or otherwise processed from the annotated swing images as discussed herein and/or the training swing point data may be generated by system 100B as discussed herein. The swing points may be in a structured data format or visually presented, as discussed herein. The training swing point data may be stored as discussed herein.

In embodiments, the training swing point data may correspond to the training swing characteristic data. In some embodiments, the training swing characteristic data may be derived, converted, extracted, or otherwise processed from the training swing point data using existing swing characteristic relationships between swing point data and swing characteristic data, such as, for example, swing image properties, poses, pre-labeled images, pre-annotated images, expert review and/or analysis, and/or other models/information.

In some embodiments, swing point component 110C may be configured to obtain target swing point data. The target swing point data may be used to generate target swing characteristic data by applying the conditioned swing characteristic model and/or the swing characteristic model to the target swing point data. The target swing point data may be swing point data derived, converted, extracted, or otherwise processed from a target swing image set as discussed herein. A set of swing points may correspond to a frame from the target swing image set. The set of swing points may be organized temporally. The target swing point data may be the same as, or substantially similar to, the target swing point data discussed herein with respect to system 100B.

Swing characteristic component 112C may be configured to obtain training swing characteristic data. Training swing characteristic data and/or target swing characteristic data may be used interchangeably with training golf swing characteristic data and/or target golf swing characteristic data, respectively, herein. The training swing characteristic data may be used to train an initial swing characteristic model, as discussed herein. In some embodiments, a portion of the training swing characteristic data may be set aside and used to validate a conditioned swing characteristic model and/or the swing characteristic model. The training swing characteristic data may be generated by deriving, extracting, converting, or otherwise processing swing characteristics from the training swing point data. The swing characteristic data may be put into a structured data format with swing point data, swing point positions, time, object data, and/or other metadata or used visually in a virtual space. The object data may include which object and/or corresponding swing points the swing characteristic corresponds to, where the object is located in the image, metadata on the object, and/or other annotations as discussed herein. The training swing characteristic data may correspond to the training swing point data. The training swing characteristic data may be stored as discussed herein.

Swing characteristic component 112C may be configured to generate target swing characteristic data. The target swing characteristic data may be generated by applying the conditioned swing characteristic model and/or the swing characteristic model to the target swing point data. As discussed herein, the conditioned swing characteristic model can accurately estimate and/or generate the target swing characteristic data using the target swing point data as input because the conditioned swing characteristic model has been "trained" or "conditioned." As an example, the target swing characteristic data may include one or more swing characteristics with swing point data, swing point positions, time, object data, and/or other metadata, as discussed herein. The target swing characteristic data may correspond to the target swing point data.

Swing characteristic representation component 114C may be configured to generate a swing characteristic representation of the swing point data using visual effects to depict at least a portion of the swing point data, as discussed herein. Swing characteristic representation may be used interchangeably with golf swing characteristic representation herein. Swing characteristic representation component 114C may be the same as, or substantially similar to, swing point representation component 114B with respect to the swing point data.

Swing characteristic representation component 114C may be configured to generate a swing characteristic representation of the swing characteristic data using visual effects to depict at least a portion of the swing characteristic data. This may be accomplished by the one or more physical computer processors. The swing characteristic representation of the swing characteristic data may be used by one or more physical computer processors in a computer vision process. In some embodiments, a visual effect may include one or more visual transformations of the swing characteristic representation. In some embodiments, one or more swing characteristics, swing points, lines, angles, positions, distances, and/or other information/data discussed herein with respect to system 100C may be visualized. In embodiments, the one or more swing characteristics, swing points, lines, angles, positions, distances, and/or other information/data discussed herein may be overlaid on top of a swing image on a relevant frame by frame basis. Such data may be stored and/or displayed. In some embodiments, the one or more swing characteristics may be presented on a separate page or screen and/or presented with the relevant swing image.

Swing characteristic representation component 114C may be configured to display the swing characteristic representation. The swing characteristic representation may be displayed on a graphical user interface and/or other displays, as discussed herein. System 100C may include one or more output devices such as a display, speakers, printer, haptic feedback, and so on.

In some embodiments, server 102C, client computing platform 104C, and/or external resources 128C may be operatively linked via an electronic communication link. For example, the electronic communication link may be established, at least in part, via a network such as, the internet and/or other networks. It should be appreciated that server 102C, client computing platform 104C, and/or external resources 128C may be operatively linked via other communication media.

Client computing platform 104C may include a processor to execute computer program components as discussed herein. The computer program components may enable a user corresponding to client computing platform 104C to interface with system 100C and/or external resources 128C and/or provide other functionality attributed herein to client computing platform 104C. For example, client computing platform 104C may include a mobile device, smartphone, desktop computer, laptop computer, handheld computer, tablet computing platform, netbook, gaming console, smart device, wearable, another input device, and/or other computing platforms.

External resources 128C may include information sources outside of system 100C, external entities interacting with system 100C, and/or other resources. In some embodiments, some or all of the functionality attributed herein to external resources 128C may be provided by resources included in system 100C.

Server 102C may include electronic storage 130C, processor 132C, and/or other components. Server 102C may include communication lines or ports to enable exchange of information within a network, with a network, and/or other computing platforms. It should be appreciated that the illustration of server 102C in FIG. 1C is not intended to be limiting. For example, server 102C may be implemented by a cloud of computing platforms operating together as server 102C.

Electronic storage 130C may include storage media that electronically store information, such as, for example, data and/or other digital information. The electronic storage media of electronic storage 130C may include system storage that is provided integrally (i.e., substantially non-removable) with server 102C and/or removable storage that is removably connectable to server 102C via, for example, a port (e.g., a USB port, a firewire port, digital port, and/or other ports) or a drive (e.g., a disk drive, thumb drive, and/or other drives). Electronic storage 130C may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130C may include a virtual storage resource (e.g., cloud storage, a virtual private network, and/or other virtual storage resources). Electronic storage 130C may store software algorithms, information determined, generated, and/or otherwise processed by processor 132C, information received from server 102C, information received from client computing platform 104C, and/or other information that enables server 102C to function as described herein. It should be appreciated that the information may be stored in its natural and/or raw format (e.g., data lakes).

Processor 132C may provide information processing capabilities in server 102C. For example, processor 132C may include a physical computer processor, a digital processor, an analog processor, a digital circuit designed to process information, an analog circuit designed to process information, a state machine, and/or other mechanisms for electronically processing information. Although processor 132C is shown in FIG. 1C as a single entity, this is for illustrative purposes only. In some embodiments, processor 132C may include a plurality of processing units. These processing units may be physically or geographically located or packaged within the same device, or processor 132C may represent processing functionality of a plurality of devices operating in coordination. Processor 132C may execute components 108C, 110C, 112C, 114C, and/or other components by software, hardware, firmware, and/or other mechanisms for configuring processing capabilities on processor 132C. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 108C, 110C, 112C, and 114C are illustrated in FIG. 1C as being implemented within a single processing unit, in embodiments, for example, in which processor 132C includes multiple processing units, one or more of components 108C, 110C, 112C, and/or 114C may be implemented remotely from other components. The description of the functionality provided by the different components 108C, 110C, 112C, and/or 114C described herein is for illustrative purposes, and is not intended to be limiting, as any of components 108C, 110C, 112C, and/or 114C may provide more or less functionality than is described. For example, one or more of components 108C, 110C, 112C, and/or 114C may be eliminated, and some or all of its functionality may be provided by other ones of components 108C, 110C, 112C, and/or 114C. For example, processor 132C may execute an additional component that may perform some or all of the functionality attributed herein to components 108C, 110C, 112C, and/or 114C.

Figure 1D:
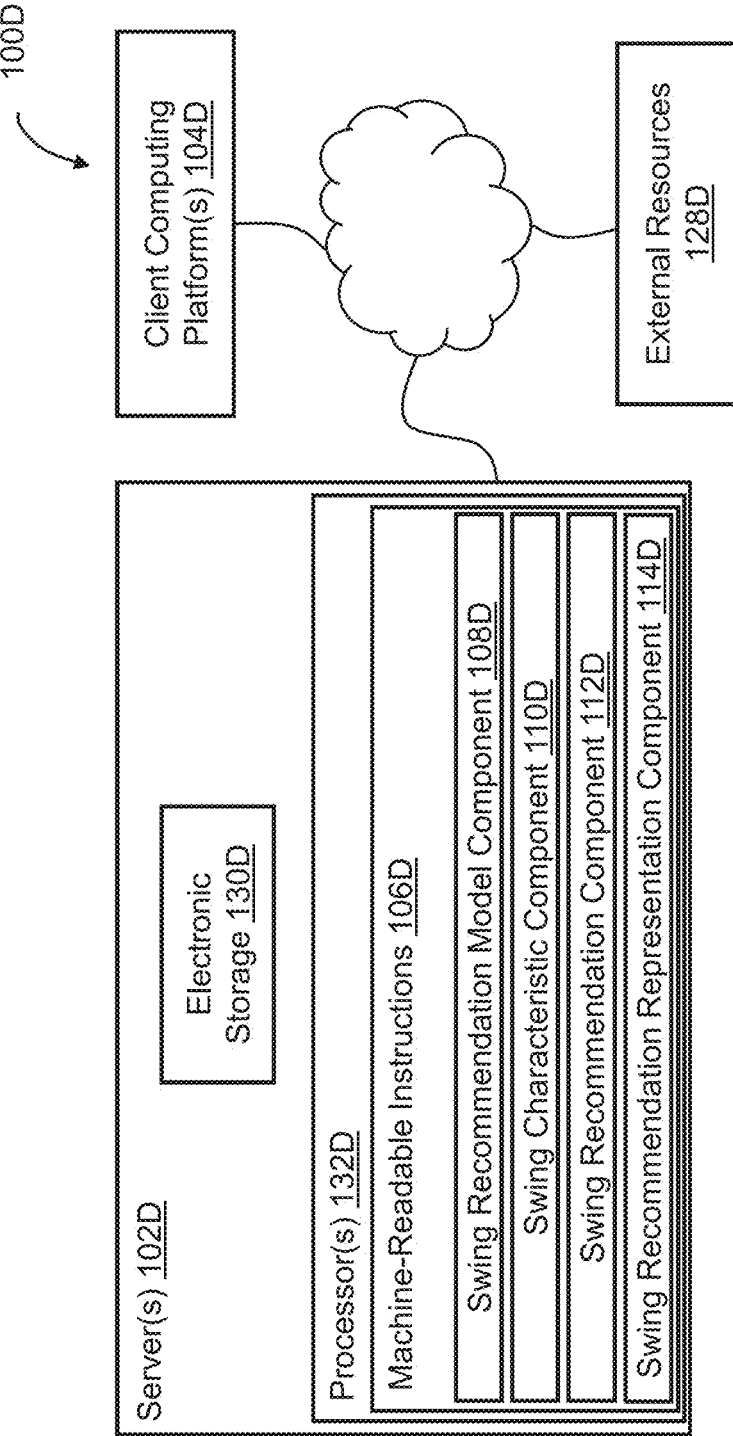
FIG. 1D illustrates a system for generating swing recommendation data in accordance with one or more embodiments of the presently disclosed technology.

FIG. 1D illustrates a system for generating swing recommendation data in accordance with one or more embodiments of the presently disclosed technology. In some embodiments, system 100D may include server 102D. Server 102D may be configured to communicate with client computing platform 104D according to an architecture, including, for example, a client/server architecture and/or other architectures. Client computing platform 104D may be configured to communicate with other client computing platforms via server 102D, peer-to-peer architecture, and/or other architectures. Users may access system 100D via client computing platform 104D.

Server 102D may be configured by machine readable instructions 106D. Machine readable instructions 106D may include an instruction component (not shown). The instruction component may include computer program component(s). For example, the instruction component may include swing recommendation model component 108D, swing characteristic component 110D, swing recommendation component 112D, swing recommendation representation component 114D, and/or other instruction components.

Swing recommendation model component 108D may be configured to obtain an initial swing recommendation model. Initial swing recommendation model, conditioned swing recommendation model, and/or swing recommendation model may be used interchangeably with initial golf swing recommendation model, conditioned golf swing recommendation model, and/or golf swing recommendation model, respectively, herein. The initial swing recommendation model may be based on machine-learning techniques, as discussed herein, to map at least one variable to another variable. For example, the initial swing recommendation model may receive swing characteristic data and/or other input and output swing recommendation data. In some embodiments, the initial swing recommendation model may include a large language model (LLM) or other generative machine-learning technology that understands and/or generates language to identify and generate relevant exercises, drills, equipment, swing change, other prescriptions, and/or why a prescription was given. The initial swing recommendation model may be "untrained" or "unconditioned," as discussed herein. The swing characteristic data may specify swing characteristics as a function of time, objects, and/or poses.

Swing recommendations may be one or more recommendations for a player. Swing recommendations may be used interchangeably with golf swing recommendations herein. The swing recommendations may be based on one or more identified or detected swing characteristics. The swing recommendations may include exercises, drills, equipment, swing changes, other prescriptions, and/or why a prescription was recommended. For example, exercises may include strength training (e.g., barbell exercises, dumbbell exercises, kettlebell exercises, weight machines, resistance bands, resistance training, bodyweight exercises, and so on), cardio (e.g., biking, running, swimming, rowing, jumping rope, cardio machines, jumping jacks, and so on), low impact training (e.g., yoga, pilates, and so on), high impact interval training (i.e., workout method that alternates between short bursts of intense exercises with brief recovery periods), and/or other exercises. For example, the exercises may include cats and dogs, supine pelvic tilts, pelvic tilts in golf stance, torso backswing neutral pelvis, spine foam rolling, crocodile breath press ups, assisted reachbacks, two arm cross body lat stretch, windmills, lunge stance one arm incline row, open book rib cage, lumbar lock (IR) reachbacks, lunge stance one arm incline rows, lunge stance one arm decline chest press, supine pillow presses, lumbar lock (IR) reachbacks, box presses, search and destroy with calf stretch, disassociation planks, half-kneeling bounce pass, brettzel, stork turns supported, starfish pattern 1, hip drops, helicopter turns, resisted half-kneeling lift no rotation to rotation, horizontal chops—wide to narrow base, split stance lunge turn, open clam shells, open clam shell hip extended, half kneeling narrow base med-ball bounce pass, single leg bridge, bird dog hip extension with internal rotation, pivot and post, lunge stance bounce pass, dead bugs opposite arm and leg, bird dog diagonals with pattern assistance, half kneeling med-ball lifts, cariocas, side step up, med-ball discus throws, flow row perpendicular foot, side wall press, pivot and post, half-kneeling bounce pass, starfish rolling pattern 1, palm presses, side step up open hip, squat to press to turns, supine egyptian presses, and so on. Drills may be movements directed to improve one or more golf poses of a golf swing. For example, hip bar hinges, pubic bone to rib cage, w-turn backswings, sweep the dust, loss of posture, lead hip high lead shoulder low, lead arm supported swings, get closer, picket fence, control right knee flex, low hip, plumb bob, belt loop at ball, lead hand trail pocket, lift lead foot, trail leg only swings, corner of door way, two shafts show pivot, step change, side arm throw, barriers, change of direction, lead leg only swings, push ball drill, reach over the fence, impact fix drill, lead leg only swings, step into the pitch, pelvic punch, forehand topspin drill, pizza dumbbell, two hand forehand topspin, forehand topspin drill, lead arm only swings, motorcycle, and so on. It should be appreciated that other exercises and/or drills may be included without departing from the spirit and scope of the presently disclosed technology. Equipment may include golf clubs, golf balls, golf bags, clothes, shoes, range finder, tees, ball markers, golf glove, and so on. Swing changes may refer to changes to a player's swing. In some embodiments, swing changes may include swing thoughts, posture changes, and so on to affect the golf swing. Why a prescription was given may include explaining that drills relating to loss of posture are provided because a loss of posture swing characteristic was detected. In embodiments, user input (e.g., static input, dynamic input, and so on) may be used to affect what is recommended to a player. For example, a user may have manually entered, selected, or otherwise indicated a preference for low impact training. As a result, recommendations may favorably weight, prioritize, add a preference for, or only present low impact training swing recommendations. In some embodiments, static input may be characteristics that do not change during a golf swing or shot, such as characteristics of the golf equipment used or of the golfer. Static input may include golfer characteristics, golf-equipment characteristics, and/or other input. Golfer characteristics may include at least one of gender, height, weight, age, handicap, handedness, arm length, or hand size. The golf-equipment characteristics may include at least one of club head model, club head lie, club head loft, club head adjustable settings, club head grind, club head bounce, shaft flex, shaft length, shaft torque, grip size, golf ball model, golf ball compression, golf ball cover material, or golf ball number of layers. Dynamic input may be captured or generated from one or more performance tracking devices. Dynamic input may include golf club swing characteristics. The golf club swing characteristics may include at least one of swing data of the golf club, ball-flight data, force data, motion-capture data, or electromyography data. It should be appreciated that golf club swing characteristic may be differentiated from swing characteristics discussed herein. In embodiments, swing recommendations may be personalized based on prior golf shots, injury data (i.e., previous or current injuries affecting a swing), equipment data (e.g., prior golf equipment, current golf equipment and so on), other static input, and/or other dynamic input. Static input and dynamic input may be manually entered by a user, automatically detected, or otherwise entered.

In some embodiments, swing recommendation model component 108D may be configured to obtain a swing recommendation model. The swing recommendation model may receive or obtain swing characteristic data and process the swing characteristic data into swing recommendation data. The swing recommendation model may recommend, generate, identify, or otherwise provide swing recommendation data based on a detected swing characteristic. For example, the swing recommendation model may recommend one or more swing exercises and drills based on a detected early extension swing characteristic. It should be appreciated that there may be overlap between one or more swing recommendations based on a given swing characteristic. For example, one or more swing recommendations based on detecting a late buckle swing characteristic may also be recommended based on detecting a hanging back swing characteristic. The swing recommendation model may use swing recommendation relationships, discussed herein, between the input and the validated output. Swing recommendation relationships may be used interchangeably with golf swing recommendation relationships herein. For example, a swing recommendation relationship may determine that a cats and dogs exercise should be recommended for a detected S-posture swing characteristic.

Figure 30:
FIG. 30 illustrates example exercises and drill in accordance with one or more embodiments of the presently disclosed technology.

As examples of swing recommendations, based on detecting an S-posture swing characteristic, a cats and dogs, supine pelvic tilts, pelvic tilts in golf stance, and/or torso backswing neutral pelvis exercises may be recommended. In some embodiments, hip bar hinges and/or pubic bone to rib cage drills may be recommended based on detecting an S-posture swing characteristic. For example, referring to FIG. 30, an exemplary frame of one or more exercises and/or drills may be illustrated. It should be appreciated that the one or more exercises and/or drills may be known by a person of ordinary skill in the art. For example, a hip bar hinges drill may refer to putting a golf club across a front of hips pushing the golf club backward and bending the knees to get into a proper address golf pose. A pubic bone to rib cage drill may refer to standing up tall, putting a lead hand near the pubic bone and putting a trailing hand at a bottom of the ribs and keeping that distance between hands while tilting into address golf pose. As an example, system 100D may output a recommendation (e.g., displayed text, provide audio output, and the like) that one or more of these exercises and/or drills are recommended based on detecting an S-posture.

Figure 31:
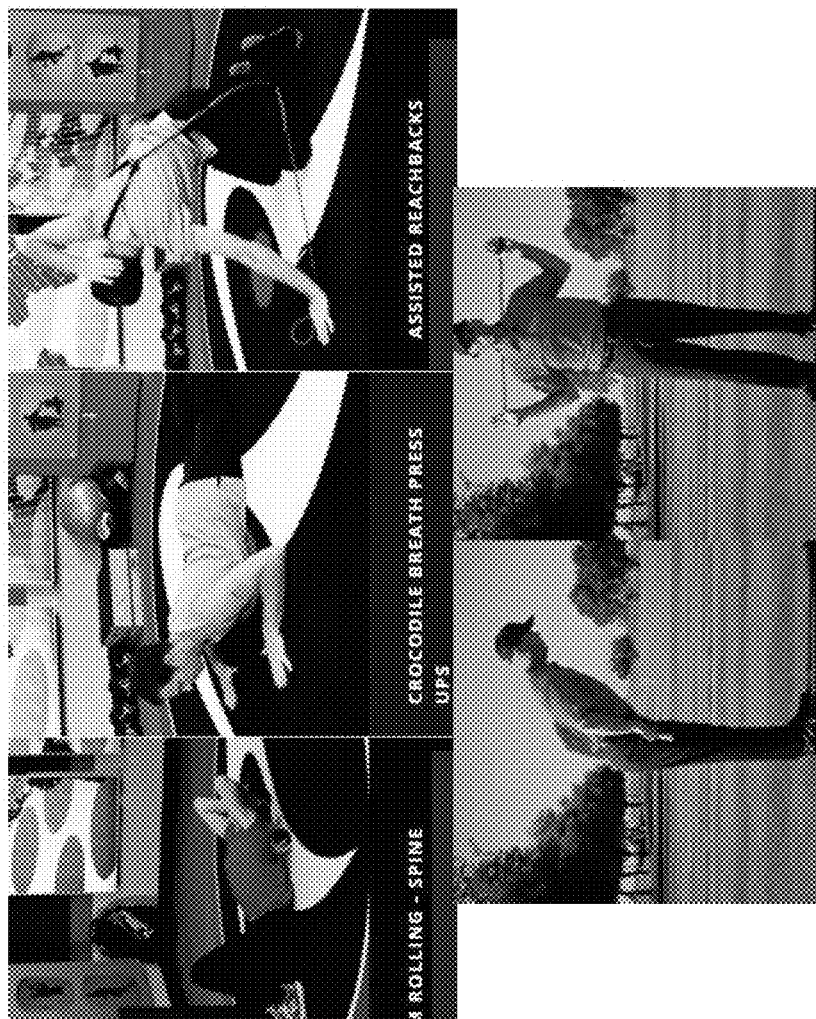
FIG. 31 illustrates example exercises and drill in accordance with one or more embodiments of the presently disclosed technology.

Based on detecting a C-posture swing characteristic, a spine foam rolling, crocodile breath press ups, assisted reachbacks, and/or other exercises may be recommended. In some embodiments, hip bar hinges, w-turn backswings, and/or other drills may be recommended based on detecting a C-posture swing characteristic. For example, referring to FIG. 31, an exemplary frame of one or more exercises and/or drills may be illustrated. For example, a W-turns drill may refer to putting a golf club behind the shoulders so that the arms and body make a "W." Tilting into an address golf pose, the arms and shoulder should want to stay back. For example, one or more of the exercises and/or drills in FIG. 31 may be presented to the user. A user may select one or more of the exercises and/or drills to get more information about a given exercise or given drill. The additional information may be a video, audio, visuals, and/or text describing how to perform the exercise and/or drill. The additional information may include why one or more of the exercises and/or drills was presented. In embodiments, the additional information may be overlaid on a swing image, swing points, and/or other data discussed herein, presented next to the swing image, swing points, and/or other data, or presented on a different page or screen than the swing image, swing points, and/or other data. Such data may be stored and/or displayed.

Figure 32:
FIG. 32 illustrates example exercises and drill in accordance with one or more embodiments of the presently disclosed technology.

Based on detecting a loss of posture swing characteristic, a two arm cross body lat stretch, windmills, lunge stance one arm incline row, and/or other exercises may be recommended. In some embodiments, sweep the dust, loss of posture drills, and/or other drills may be recommended based on detecting a loss of posture swing characteristic. For example, referring to FIG. 32, an exemplary frame of one or more exercises and/or drills may be illustrated. For example, a sweep the dust drill may refer to using a broom or golf club with the golf club head toward the target at address, and keeping the club head as low to the ground as possible during a backswing. A loss of posture drill may refer to keeping a flex in a trailing leg during the backswing. As an example, a user may have indicated a preference for strength training. The conditioned swing recommendation model may have found one or more strength training exercises that strengthen the core. As such, russian twists, dumbbell marches, palloff presses, or other strength-training-type exercises may be presented. Selecting one or more of these exercises may provide additional information about these exercises as discussed herein. For example, the audio, visual, or text indicating one or more of these exercises may be hyperlinked to the additional information. System 100D may indicate that one of these exercises was presented because a user indicated a preference for strength training and/or a loss of posture swing characteristic was detected. In some embodiments, system 100D may indicate that these exercises focus on strengthening the core, which should help minimize the loss of posture swing characteristic, such that the loss of posture swing characteristic will no longer be detected based on continued training and focus on the swing recommendations.

Figure 33:
FIG. 33 illustrates example exercises and drill in accordance with one or more embodiments of the presently disclosed technology.

Based on detecting a flat shoulder plane swing characteristic, an open book rib cage, lumbar lock (IR) reachbacks, lunge stance one arm incline rows, lunge stance one arm decline chest press, and/or other exercises may be recommended. In some embodiments, sweep the dust, lead hip high lead shoulder low, and/or other drills may be recommended based on detecting a flat shoulder plane swing characteristic. For example, referring to FIG. 33, an exemplary frame of one or more exercises and/or drills may be illustrated. For example, a lead hip high lead shoulder low drill may refer to being in address and adding lateral tilt so that a lead hip is higher than a trailing hip, and having a lead shoulder higher than a trailing shoulder. During the backswing keep the lead hip high, and the lead shoulder low. As an example, a user may have indicated a preference for yoga. As such, the swing recommendations presented may include boat poses, dolphin poses, and/or side plank poses, and/or other yoga-type exercises. In some embodiments, alternative swing recommendations may be viewable. The alternative swing recommendations may include those identified above in this paragraph, the strength training exercises discussed above, and/or other swing recommendations. System 100D may indicate that these are alternate swing recommendations because a user indicated a preference for yoga and/or a flat shoulder plane swing characteristic was detected. In some embodiments, system 100D may indicate that these exercises focus on strengthening the core, which should help minimize the flat shoulder plane swing characteristic, such that the flat shoulder plane swing characteristic will no longer be detected based on continued training and focus on the swing recommendations.

Based on detecting a flying elbow swing characteristic, a supine pillow presses, lumbar lock (IR) reachbacks, box presses, and/or other exercises may be recommended. In some embodiments, lead arm supported swings and/or other drills may be recommended based on detecting a flying elbow swing characteristic. For example, referring to FIG. 34, an exemplary frame of one or more exercises and/or drills may be illustrated. For example, a lead arm supported swings drill may refer to being at address and taking a lead arm and tucking the lead arm behind the trailing arm above the trailing elbow. During the backswing and downswing, keep the lead arm in front of the body.

Figure 35:
FIG. 35 illustrates example exercises and drill in accordance with one or more embodiments of the presently disclosed technology.

Based on detecting an early extension swing characteristic, a search and destroy with calf stretch, disassociation planks, half-kneeling bounce pass, and/or other exercises may be recommended. In some embodiments, a get closer, picket fence, and/or other drills may be recommended based on detecting an early extension swing characteristic. For example, referring to FIG. 35, an exemplary frame of one or more exercises and/or drills may be illustrated. For example, a get closer drill may refer to getting into an address golf pose and taking a step toward the golf ball by about a one-golf-ball distance to force the hips back on a downswing. A picket fence drill may refer to imagining a picket fence in front of the player. Hinge and reach over the fence to get into an address golf pose. During the backswing and downswing, no part of the body should contact the fence and should stay behind the fence. As an example, system 100D may recommend, as discussed herein, moving closer to the ball based on detecting an early extension swing characteristic. As an example, a lighter shaft, or shaft that is less stiff may be recommended.

Based on detecting a hiking swing characteristic, squat, and/or other exercises may be recommended. In some embodiments, control right knee flex, low hip, plumb bob, belt loop at ball, lead hand trail pocket, and/or other drills may be recommended based on detecting a hiking swing characteristic. As an example, a control right knee flex may refer to keeping the trailing leg flexed throughout the swing. A low hip drill may refer to taking a golf club and putting the shaft across a belt area and feel that the golf club is working down and around, as opposed to up and in front of the player. A plumb bob drill may refer to letting a golf club hang from a center of where a belt buckle would be, and loading a body behind that original center. A belt loop at ball drill may refer to imagining a belt loop between the trail hip and the front moving up and back on the backswing and down and around on the downswing. A lead hand trail pocket drill may refer to taking a lead hand and grabbing a trail pocket and push it back on the backswing and keep the pocket down to impact.

Based on detecting a reverse pivot swing characteristic, squat, hip rotations, and/or other exercises may be recommended. In some embodiments, lift lead foot, trail leg only swings, corner of door way, two shafts show pivot, and/or other drills may be recommended based on detecting a reverse pivot swing characteristic. As an example, a lift lead foot drill may refer to lifting a heel of a lead foot during the backswing, and putting the heel back down during the downswing. A trail leg only swings drill may refer to lifting a lead leg and lightly resting the lead toes on the ground and swing. A corner of door way drill may refer to imagining a door frame is in front of a player, and during the backswing trying to get hands in the top trail corner of the door frame. A two shafts show pivot drill may refer to taking two golf clubs and placing them on the inside of each leg, pivot around where the trail golf club contacts the player during the backswing, and shift pressure to where the lead golf club contacts the player during the downswing.

Figure 36:
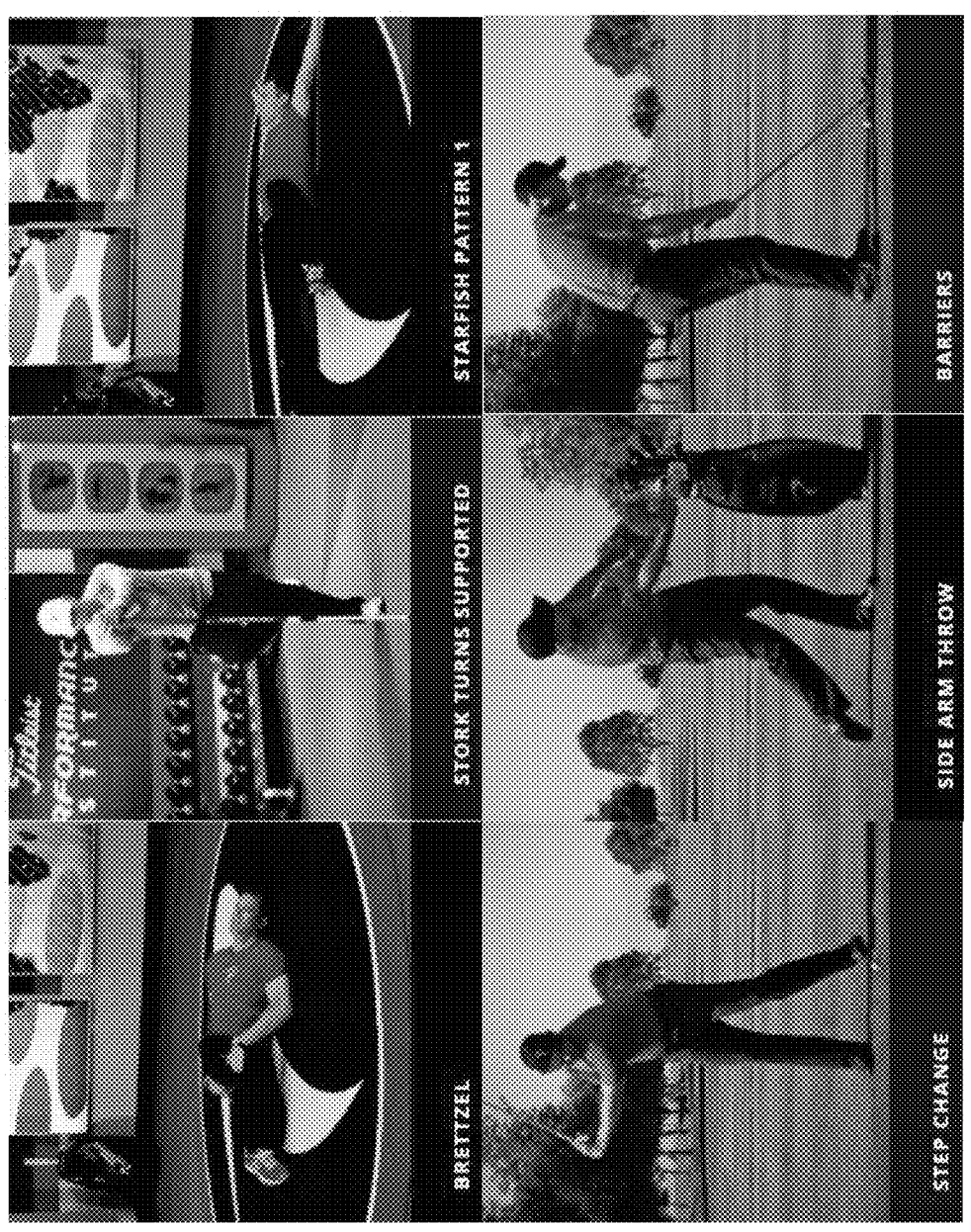
FIG. 36 illustrates example exercises and drill in accordance with one or more embodiments of the presently disclosed technology.

Based on detecting an over the top swing characteristic, a brettzel, stork turns supported, starfish pattern 1, and/or other exercises may be recommended. In some embodiments, step change, side arm throw, barriers, and/or other drills may be recommended based on detecting an over the top swing characteristic. For example, referring to FIG. 36, an exemplary frame of one or more exercises and/or drills may be illustrated. For example, a step change drill may refer to getting into an address golf pose, moving the lead leg back to the trailing leg, and during the downswing as the golf club passes the legs, step the lead leg back into the address golf pose and hit the golf ball. Side arm throw drill may refer to stepping with the lead leg toward the target, pretending to throw something along the side, as if skipping stones, and leading with the trail elbow to imitate the side throw. A barriers drill may refer to getting into address with two balls around the target ball. A ball in front of the target ball may be slightly behind the target ball. A ball behind the target ball may be slightly in front of the target ball. As an example, the swing recommendation model component 108D may recommend a shorter golf club, or a more or less lofted golf club.

Based on detecting a sway swing characteristic, hip drops, helicopter turns, resisted half-kneeling lift no rotation to rotation, horizontal chops—wide to narrow base, and/or other exercises may be recommended. In some embodiments, change of direction and/or other drills may be recommended based on detecting a sway swing characteristic. For example, referring to FIG. 37, an exemplary frame of one or more exercises and/or drills may be illustrated. For example, a change of direction drill may refer to changing direction, or starting the downswing, as soon as a lead forearm is parallel to the ground.

Based on detecting a slide swing characteristic, a split stance lunge turn, open clam shells, open clam shell hip extended, half kneeling narrow base med-ball bounce pass, and/or other exercises may be recommended. In some embodiments, lead leg only swings and/or other drills may be recommended based on detecting a slide swing characteristic. For example, referring to FIG. 38, an exemplary frame of one or more exercises and/or drills may be illustrated. For example, a lead leg only swings drill may refer to lifting a trailing leg and lightly resting the trailing toes on the ground and swing.

Based on detecting a late buckle swing characteristic, a single leg bridge, bird dog hip extension with internal rotation, pivot and post, lunge stance bounce pass, and/or other exercises may be recommended. In some embodiments, push ball drill and/or other drills may be recommended based on detecting a late buckle swing characteristic. For example, referring to FIG. 39, an exemplary frame of one or more exercises and/or drills may be illustrated. For example, a push ball drill may refer to getting into an address golf pose with a foam ball or light soccer-ball-sized ball and extend into a finish golf pose by pushing the ball toward the target. As one example, a different golf ball may be recommended for the player.

Based on detecting a reverse spine angle swing characteristic, dead bugs opposite arm and leg, bird dog diagonals with pattern assistance, half kneeling med-ball lifts, and/or other exercises may be recommended. In some embodiments, reach over the fence, pubic bone to rib cage, and/or other drills may be recommended based on detecting a reverse spine angle swing characteristic. For example, referring to FIG. 40, an exemplary frame of one or more exercises and/or drills may be illustrated. For example, a reach over the fence drill may refer to getting into an address golf pose, imagining a fence near a trailing side of the body, pretending to pick something up over the fence, and move through to a finish golf pose.

Based on detecting a forward lunge swing characteristic, cariocas, side step up, med-ball discus throws, and/or other exercises may be recommended. In some embodiments, step change, and/or other drills may be recommended based on detecting a forward lunge swing characteristic. For example, referring to FIG. 41, an exemplary frame of one or more exercises and/or drills may be illustrated.

Based on detecting a hanging back swing characteristic, flow row perpendicular foot, side wall press, pivot and post, half-kneeling bounce pass, and/or other exercises may be recommended. In some embodiments, impact fix drill, lead leg only swings, and/or other drills may be recommended based on detecting a hanging back swing characteristic. For example, referring to FIG. 42, an exemplary frame of one or more exercises and/or drills may be illustrated. For example, an impact fix drill may refer to getting into an address golf pose and switching to an impact golf pose. Then take a backswing and try and return to the impact golf pose.

Figure 43:
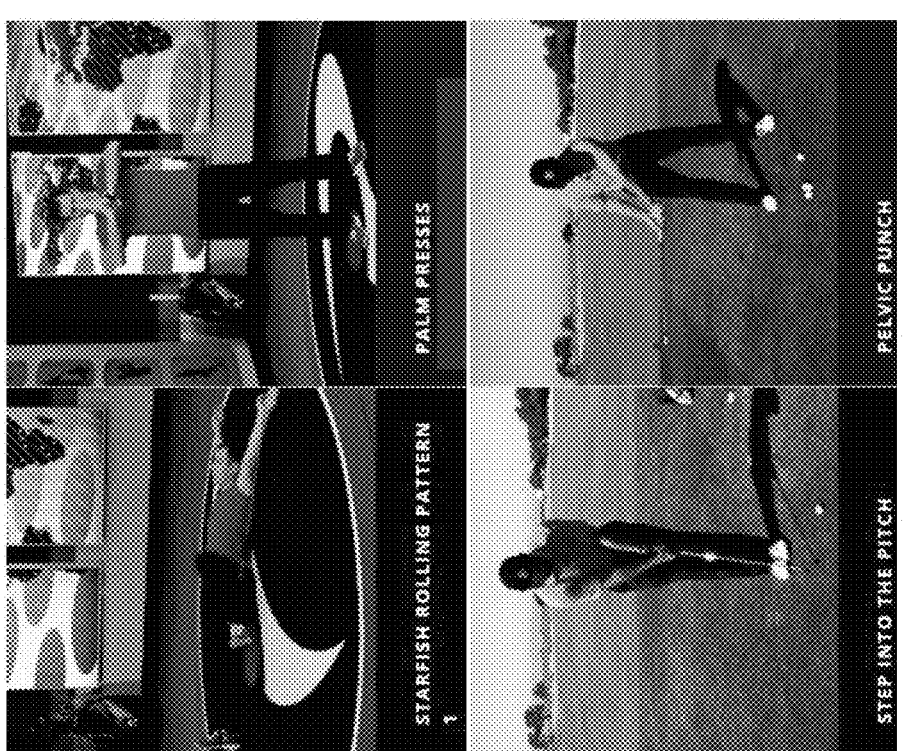
FIG. 43 illustrates example exercises and drill in accordance with one or more embodiments of the presently disclosed technology.

Based on detecting a casting swing characteristic, starfish rolling pattern 1, palm presses, and/or other exercises may be recommended. In some embodiments, step into the pitch, pelvic punch, and/or other drills may be recommended based on detecting a casting swing characteristic. For example, referring to FIG. 43, an exemplary frame of one or more exercises and/or drills may be illustrated. For example, step into the pitch drill may refer to getting into an address golf pose, moving the lead leg back to the trailing leg, and during the backswing, step the lead leg back into the address golf pose and hit the golf ball. Pelvic punch drill may refer to taking the golf club back until the golf club shaft is parallel with the ground, and swinging through from there.

Figure 44:
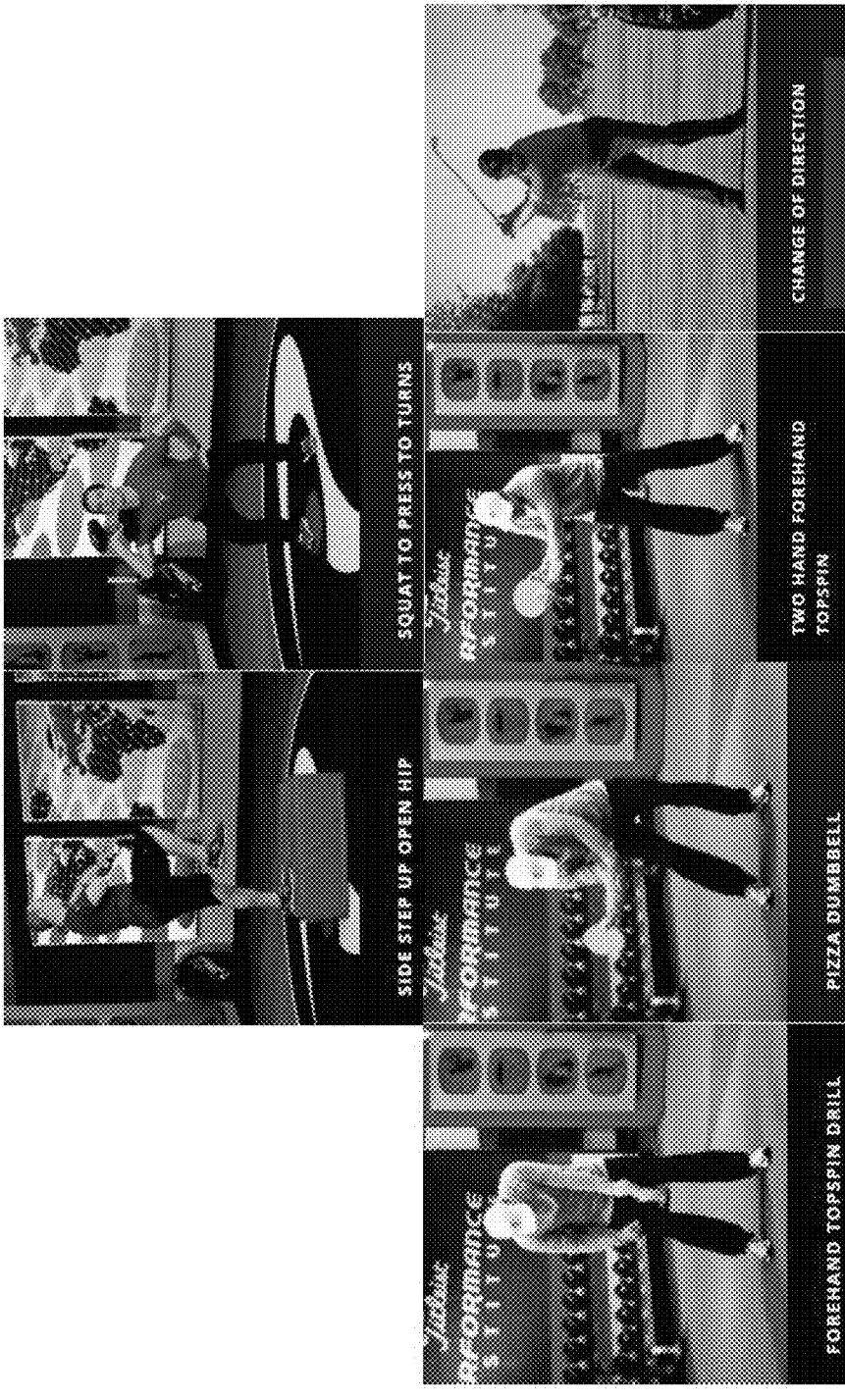
FIG. 44 illustrates example exercises and drill in accordance with one or more embodiments of the presently disclosed technology.

Based on detecting a scooping swing characteristic, side step up open hip, squat to press to turns, and/or other exercises may be recommended. In some embodiments, forehand topspin drill, pizza dumbbell, two hand forehand topspin, change of direction, and/or other drills may be recommended based on detecting a scooping swing characteristic. For example, referring to FIG. 44, an exemplary frame of one or more exercises and/or drills may be illustrated. For example, forehand topspin drill may refer to grabbing an object, like a paddle, at the end of the "backswing," a face of the paddle is facing in front of the player, a hand is rotated so that the face is perpendicular to the ground, and at the end of the swing the face is facing behind the player. Pizza dumbbell drill may refer to holding an object like a waiter may hold a tray or a pizza, and keeping the angle of the arm until at impact. Two hand forehand topspin drill may refer to holding an object, like a paddle, with both hands halfway through a backswing so that a face of the paddle is facing in front of the player, moving through impact the face of the paddle is facing the target, and finishing with the face facing behind the player.

Figure 45:
FIG. 45 illustrates example exercises and drill in accordance with one or more embodiments of the presently disclosed technology.

Based on detecting a chicken winging swing characteristic, supine egyptian presses, and/or other exercises may be recommended. In some embodiments, forehand topspin drill, lead arm only swings, motorcycle, and/or other drills may be recommended based on detecting a chicken winging swing characteristic. For example, referring to FIG. 45, an exemplary frame of one or more exercises and/or drills may be illustrated. For example, lead arm only swings drill may refer to using only the lead arm to make some swings and having the elbow down and arm folded. The motorcycle drill may refer to getting into a top of a backswing, pretend a lead hand is on a grip of a motorcycle, and turning the knuckles on the lead hand and/or the lead hand clockwise through the downswing.

In some embodiments, two or more swing characteristics may be detected, as discussed herein. As discussed herein, swing characteristics may be presented based on a priority of the swing characteristics. In embodiments, swing recommendations may be provided even though a corresponding swing characteristic was not detected. For example, even though no S-posture swing characteristic was detected and a hanging back swing characteristic was detected, supine pelvic tilts, which may not normally be recommended based on detecting an S-posture swing characteristic or a hanging back swing characteristic, may be recommended for the player.

In some embodiments, no swing characteristic may be detected. As such, no swing recommendation may be given. In some embodiments, swing recommendations may be provided based on static inputs or dynamic inputs. In some embodiments, a number of swing recommendations may be recommended on a per day basis. For example, up to 3 specific exercises and 2 specific drills may be recommended per day. In some embodiments, the number of swing recommendations may be per week, per month, and so on. In embodiments, after a set number of performed swing recommendations or after a specified time period, a re-screen may be suggested, different types of swing recommendations may be suggested, or other changes to the swing recommendations. Changes to the swing recommendations may consider previous swing recommendations, swing characteristics, static input, dynamic input, and so on.

Referring back to FIG. 1D, in some embodiments, swing recommendation model component 108D may be configured to generate or obtain a conditioned swing recommendation model. The conditioned swing recommendation model may be generated by training the initial swing recommendation model using training swing characteristic data and training swing recommendation data. In embodiments, the conditioned swing recommendation model is "conditioned," indicating the conditioned swing recommendation model may have been trained to optimize performance and/or improve accuracy of the initial swing recommendation model, as discussed herein. For example, the conditioned swing recommendation model may more accurately output swing recommendation data based on swing characteristic data and/or other input. In embodiments, the conditioned swing recommendation model may have generated a set of swing recommendation relationships between the swing characteristic data and the swing recommendation data. The swing recommendation relationships may be generated by determining a pattern or connection between the input and the validated output. For example, a swing recommendation relationship may determine that a swing characteristic could be improved by a set of swing recommendations. This may come from collecting expert opinions on the swing characteristics, related art, and so on. Validation of this swing recommendation relationship may further strengthen the swing recommendation relationship. In some embodiments, the conditioned swing recommendation model may have been stored and swing recommendation model component 108D may retrieve or obtain the conditioned swing recommendation model from storage.

Training the initial swing recommendation model may include applying the training swing characteristic data and/or other input to the initial swing recommendation model based on an initial set of swing recommendation relationships between the swing characteristic data and the swing recommendation data to generate a first iteration of swing recommendation data. The initial swing recommendation model may be adjusted to more accurately generate the swing recommendation data based on differences between the first iteration of the swing recommendation data and the ground truth input that corresponds to the initial training swing characteristic data and/or other input. As an example, the ground truth input may be pre-identified, pre-labeled, or otherwise pre-annotated to identify or correspond to one or more swing recommendations for a given swing characteristic. This tuning, training, and validation cycle may be repeated numerous times until the initial swing recommendation model is "conditioned," as discussed herein. In some embodiments, the conditioned swing recommendation model may find a set of swing recommendation relationships or swing recommendation patterns connecting the one or more swing characteristics to the one or more swing recommendations.

In some embodiments, swing recommendation model component 108D may be configured to store the conditioned swing recommendation model. It can be stored the same as, or substantially similar to, how the conditioned swing image model is stored.

Swing characteristic component 110D may be configured to obtain training swing characteristic data. Swing characteristic component 110D may be the same as, or substantially similar to, swing characteristic component 112C. The training swing characteristic data may be used to train an initial swing recommendation model, as discussed herein. In some embodiments, the training swing characteristic data may be used to validate a conditioned swing recommendation model and/or swing recommendation model. The training swing characteristic data may be generated by deriving, extracting, converting, or otherwise processing swing characteristics from the training swing point data as discussed herein and/or the training swing point data may be generated by system 100C as discussed herein. The swing characteristic data may be put into a structured data format with swing point data, swing point positions, time, object data, and/or other metadata. For example, swing characteristic data may specify swing point data as a function of position and time and corresponding objects the swing point data is attributed to. As an example, for an S-posture, swing characteristic data may specify positions of one or more swing points tracked for S-posture at an address pose at the beginning of the data, and the swing points of interest may be attributed to the player. The object data may include which object and/or corresponding swing points the swing characteristic corresponds to, where the object is located in the image, metadata on the object, and/or other annotations as discussed herein. The training swing characteristic data may be stored as discussed herein.

In embodiments, the training swing characteristic data may correspond to the training swing recommendation data. In some embodiments, the training swing recommendation data may be derived, converted, extracted, or otherwise processed from the training swing characteristic data using existing swing recommendation relationships between swing characteristic data and swing recommendation data, such as, for example, poses, pre-labeled images, pre-annotated images, expert review and/or analysis, and/or other models/information.

In some embodiments, swing characteristic component 110D may be configured to obtain target swing characteristic data. The target swing characteristic data may be used to generate target swing recommendation data by applying the conditioned swing recommendation model and/or swing recommendation model to the target swing characteristic data. The target swing characteristic data may be swing characteristic data derived, converted, extracted, or otherwise processed from target swing point data as discussed herein. A detected swing characteristic may correspond to one or more frames of the swing point data. While frames are used here though no image is no longer at issue, it should be appreciated that the use of frames may refer to the original frame from the image or video the frame was generated from. The swing characteristics may be organized temporally, based on recommended exercises, golf poses, positions, and/or otherwise organized. The target swing characteristic data may be the same as, or substantially similar to, the target swing characteristic data discussed herein with respect to system 100C.

Swing recommendation component 112D may be configured to obtain training swing recommendation data. Training swing recommendation data and/or target swing recommendation data may be used interchangeably with training golf swing recommendation data and/or target golf swing recommendation data, respectively, herein. The training swing recommendation data may be used to train an initial swing recommendation model, as discussed herein. In some embodiments, a portion of the training swing recommendation data may be set aside and used to validate a conditioned swing recommendation model and/or swing recommendation model. The training swing recommendation data may be generated by deriving, extracting, converting, or otherwise processing swing recommendation data from the training swing characteristic data. The swing recommendation data may be put into a structured data format with swing characteristic data, swing point data, swing point positions, time, object data, and/or other metadata. The training swing recommendation data may correspond to the training swing characteristic data. The training swing recommendation data may be stored as discussed herein.

Swing recommendation component 112D may be configured to generate target swing recommendation data. The target swing recommendation data may be generated by applying the conditioned swing recommendation model and/or the swing recommendation model to the target swing characteristic data. As discussed herein, the conditioned swing recommendation model can accurately estimate and/or generate the target swing recommendation data using the target swing characteristic data as input because the conditioned swing recommendation model has been "trained" or "conditioned." As an example, the target swing recommendation data may include one or more swing recommendations with swing characteristic data, swing point data, swing point positions, time, object data, and/or other metadata, as discussed herein. The target swing recommendation data may correspond to the target swing characteristic data.

Swing recommendation representation component 114D may be configured to generate a swing recommendation representation of the swing characteristic data using visual effects to depict at least a portion of the swing characteristic data, as discussed herein. Swing recommendation representation may be used interchangeably with golf swing recommendation representation herein. Swing recommendation representation component 114D may be the same as, or substantially similar to, swing characteristic representation component 114C with respect to the swing characteristic data.

Swing recommendation representation component 114D may be configured to generate a swing recommendation representation of the swing recommendation data using visual effects to depict at least a portion of the swing recommendation data. This may be accomplished by the one or more physical computer processors. In some embodiments, a visual effect may include one or more visual transformations of the swing recommendation representation. In some embodiments, one or more swing recommendations, swing characteristics, swing points, lines, angles, positions, distances, and/or other information/data discussed herein with respect to system 100D may be visualized. In embodiments, the one or more swing recommendations, swing characteristics, swing points, lines, angles, positions, distances, and/or other information/data discussed herein may be overlaid on top of a swing image on a relevant frame by frame basis or otherwise presented with the swing image. Such data may be stored and/or displayed.

Swing recommendation representation component 114D may be configured to display the swing recommendation representation. The swing recommendation representation may be displayed on a graphical user interface and/or other displays, as discussed herein. System 100D may include one or more output devices such as a display, speakers, printer, haptic feedback, and so on.

In some embodiments, server 102D, client computing platform 104D, and/or external resources 128D may be operatively linked via an electronic communication link. For example, the electronic communication link may be established, at least in part, via a network such as, the internet and/or other networks. It should be appreciated that server 102D, client computing platform 104D, and/or external resources 128D may be operatively linked via other communication media.

Client computing platform 104D may include a processor to execute computer program components as discussed herein. The computer program components may enable a user corresponding to client computing platform 104D to interface with system 100D and/or external resources 128D and/or provide other functionality attributed herein to client computing platform 104D. For example, client computing platform 104D may include a mobile device, smartphone, desktop computer, laptop computer, handheld computer, tablet computing platform, netbook, gaming console, smart device, wearable, another input device, and/or other computing platforms.

External resources 128D may include information sources outside of system 100D, external entities interacting with system 100D, and/or other resources. In some embodiments, some or all of the functionality attributed herein to external resources 128D may be provided by resources included in system 100D.

Server 102D may include electronic storage 130D, processor 132D, and/or other components. Server 102D may include communication lines or ports to enable exchange of information within a network, with a network, and/or other computing platforms. It should be appreciated that the illustration of server 102D in FIG. 1D is not intended to be limiting. For example, server 102D may be implemented by a cloud of computing platforms operating together as server 102D.

Electronic storage 130D may include storage media that electronically store information, such as, for example, data and/or other digital information. The electronic storage media of electronic storage 130D may include system storage that is provided integrally (i.e., substantially non-removable) with server 102D and/or removable storage that is removably connectable to server 102D via, for example, a port (e.g., a USB port, a firewire port, digital port, and/or other ports) or a drive (e.g., a disk drive, thumb drive, and/or other drives). Electronic storage 130D may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130D may include a virtual storage resource (e.g., cloud storage, a virtual private network, and/or other virtual storage resources). Electronic storage 130D may store software algorithms, information determined, generated, and/or otherwise processed by processor 132D, information received from server 102D, information received from client computing platform 104D, and/or other information that enables server 102D to function as described herein. It should be appreciated that the information may be stored in its natural and/or raw format (e.g., data lakes).

Processor 132D may provide information processing capabilities in server 102D. For example, processor 132D may include a physical computer processor, a digital processor, an analog processor, a digital circuit designed to process information, an analog circuit designed to process information, a state machine, and/or other mechanisms for electronically processing information. Although processor 132D is shown in FIG. 1D as a single entity, this is for illustrative purposes only. In some embodiments, processor 132D may include a plurality of processing units. These processing units may be physically or geographically located or packaged within the same device, or processor 132D may represent processing functionality of a plurality of devices operating in coordination. Processor 132D may execute components 108D, 110D, 112D, 114D, and/or other components by software, hardware, firmware, and/or other mechanisms for configuring processing capabilities on processor 132D. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 108D, 110D, 112D, and 114D are illustrated in FIG. 1D as being implemented within a single processing unit, in embodiments, for example, in which processor 132D includes multiple processing units, one or more of components 108D, 110D, 112D, and/or 114D may be implemented remotely from other components. The description of the functionality provided by the different components 108D, 110D, 112D, and/or 114D described herein is for illustrative purposes, and is not intended to be limiting, as any of components 108D, 110D, 112D, and/or 114D may provide more or less functionality than is described. For example, one or more of components 108D, 110D, 112D, and/or 114D may be eliminated, and some or all of its functionality may be provided by other ones of components 108D, 110D, 112D, and/or 114D. For example, processor 132D may execute an additional component that may perform some or all of the functionality attributed herein to components 108D, 110D, 112D, and/or 114D.

Figure 2:
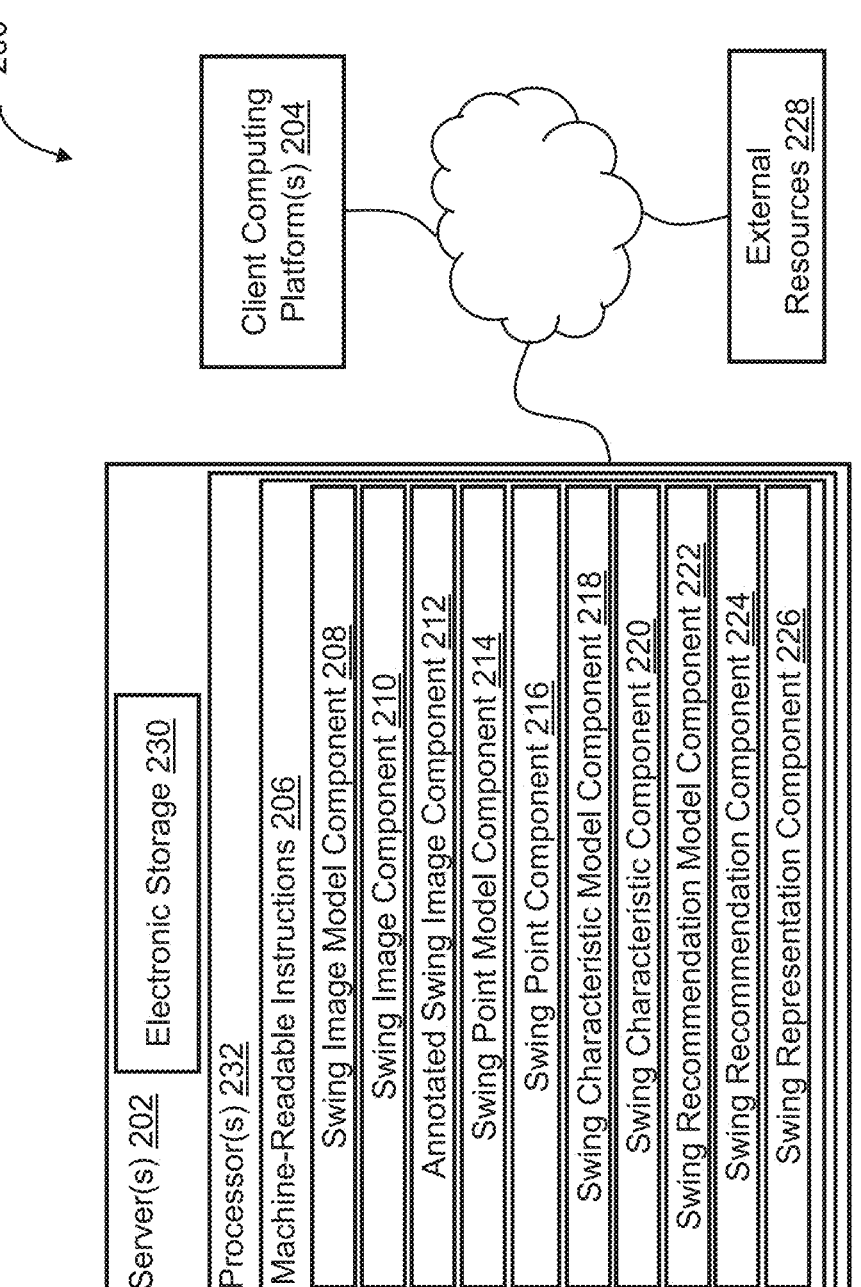
FIG. 2 illustrates a system for generating annotated swing images, swing point data, swing characteristic data, and/or swing recommendation data in accordance with one or more embodiments of the presently disclosed technology.

FIG. 2 illustrates a system for generating annotated swing images, swing point data, swing characteristic data, and/or swing recommendation data in accordance with one or more embodiments of the presently disclosed technology. In some embodiments, system 200 may include server 202. Server 202 may be configured to communicate with client computing platform 204 according to an architecture, including, for example, a client/server architecture and/or other architectures. Client computing platform 204 may be configured to communicate with other client computing platforms via server 202, peer-to-peer architecture, and/or other architectures. Users may access system 200 via client computing platform 204.

Server 202 may be configured by machine readable instructions 206. Machine readable instructions 206 may include an instruction component (not shown). The instruction component may include computer program component(s). For example, the instruction component may include swing image model component 208, swing image component 210, annotated swing image component 212, swing point model component 214, swing point component 216, swing characteristic model component 218, swing characteristic component 220, swing recommendation model component 222, swing recommendation component 224, swing representation component 226, and/or other instruction components.

Swing image model component 208 may be configured to obtain an initial swing image model as discussed herein. Swing image model component 208 may be the same as, or substantially similar to, swing image model component 108A. In some embodiments, swing image model component 208 may be configured to obtain a swing image model as discussed herein. In embodiments, swing image model component 208 may be configured to generate a conditioned swing image model. In some embodiments, swing image model component 208 may be configured to store the conditioned swing image model. In embodiments, swing image model component 208 may be configured to store the swing image model.

Swing image component 210 may be configured to obtain a training swing image set, as discussed herein. Swing image component 210 may be the same as, or substantially similar to, swing image component 110A and/or swing image component 110B. In some embodiments, swing image component 210 may be configured to obtain a target swing image set.

Annotated swing image component 212 may be configured to obtain a training annotated swing image set. Annotated swing image component 212 may be the same as, or substantially similar to, annotated swing image component 112A and/or swing image component 110B. In some embodiments, annotated swing image component 212 may be configured to generate or obtain a target annotated swing image set. For example, the target annotated swing image set generated by annotated swing image component 212 may be stored, as discussed herein, and retrieved or obtained to train an initial swing point model. In embodiments, annotated swing image component 212 may be configured to store the target annotated swing image set.

Swing point model component 214 may be configured to obtain an initial swing point model as discussed herein. Swing point model component 214 may be the same as, or substantially similar to, swing point model component 108B. In some embodiments, swing point model component 214 may be configured to generate or obtain a conditioned swing point model. In some embodiments, swing point model component 214 may be configured to store the conditioned swing point model.

Swing point component 216 may be configured to obtain training swing point data. Swing point component 216 may be the same as, or substantially similar to, swing point component 112B and/or swing point component 110C. In some embodiments, swing point component 216 may be configured to generate or obtain target swing point data. For example, the target swing point data generated by swing point component 216 may be stored, as discussed herein, and retrieved or obtained to train an initial swing characteristic model. In embodiments, swing point component 216 may be configured to store the target swing point data.

Swing characteristic model component 218 may be configured to obtain an initial swing characteristic model as discussed herein. Swing characteristic model component 218 may be the same as, or substantially similar to, swing characteristic model component 108C. In some embodiments, swing characteristic model component 218 may be configured to obtain a swing characteristic model. In embodiments, swing characteristic model component 218 may be configured to generate or obtain a conditioned swing characteristic model. In some embodiments, swing characteristic model component 218 may be configured to store the conditioned swing characteristic model.

Swing characteristic component 220 may be configured to obtain training swing characteristic data. Swing characteristic component 220 may be the same as, or substantially similar to, swing characteristic component 112C and/or swing characteristic component 110D. In some embodiments, swing characteristic component 220 may be configured to generate or obtain target swing characteristic data. For example, the target swing characteristic data generated by swing characteristic component 220 may be stored, as discussed herein, and retrieved or obtained to train an initial swing recommendation model. In embodiments, swing characteristic component 220 may be configured to store the target swing characteristic data.

Swing recommendation model component 222 may be configured to obtain an initial swing recommendation model as discussed herein. Swing recommendation model component 222 may be the same as, or substantially similar to, swing recommendation model component 108D. In some embodiments, swing recommendation model component 222 may be configured to obtain a swing recommendation model. In embodiments, swing recommendation model component 222 may be configured to generate or obtain a conditioned swing recommendation model. In some embodiments, swing recommendation model component 222 may be configured to store the conditioned swing recommendation model.

Swing recommendation component 224 may be configured to obtain training swing recommendation data. Swing recommendation component 224 may be the same as, or substantially similar to, swing recommendation component 112D. In some embodiments, swing recommendation component 224 may be configured to generate target swing recommendation data.

Swing representation component 226 may be configured to generate a swing image representation of the swing image set using visual effect to depict at least a portion of the swing image set. Swing representation component 226 may be the same as, or substantially similar to, swing image representation component 114A, swing point representation component 114B, swing characteristic representation component 114C, and/or swing recommendation representation component 114D. In some embodiments, swing representation component 226 may be configured to generate a swing image representation of the annotated swing image set using visual effects to depict at least a portion of the annotated swing image set. In embodiments, swing representation component 226 may be configured to display the swing image representation. In some embodiments, swing representation component 226 may be configured to generate a swing point representation of the swing image set using visual effects to depict at least a portion of the swing image set. In embodiments, swing representation component 226 may be configured to generate a swing point representation of the swing point data using visual effects to depict at least a portion of the swing point data. In some embodiments, swing representation component 226 may be configured to display the swing point representation. In embodiments, swing representation component 226 may be configured to generate a swing characteristic representation of the swing point data using visual effects to depict at least a portion of the swing point data. In some embodiments, swing representation component 226 may be configured to generate a swing characteristic representation of the swing characteristic data using visual effects to depict at least a portion of the swing characteristic data. In embodiments, swing representation component 226 may be configured to display the swing characteristic representation. In some embodiments, swing representation component 226 may be configured to generate a swing recommendation representation of the swing characteristic data using visual effects to depict at least a portion of the swing characteristic data. In embodiments, swing representation component 226 may be configured to generate a swing recommendation representation of the swing recommendation data using visual effects to depict at least a portion of the swing recommendation data. In some embodiments, swing representation component 226 may be configured to display the swing recommendation representation. System 200 may include one or more output devices such as a display, speakers, printer, haptic feedback, and so on.

System 200 may be a pipeline of systems 100A, 100B, 100C, and/or 100D. For example, swing image model component 208 may be used to generate data for swing point model component 214, which in turn is used to generate data for swing characteristic model component 218, which in turn is used to generate data for swing recommendation model component 222. Some or all of the data used or generated for these components may have a corresponding representation generated and/or displayed, as discussed herein. As an example of the whole pipeline, a user may record themselves or a player performing a golf swing. The capture system may take a capture from a down the line perspective, a face on perspective, and/or other perspectives appropriate for the given capture system. System 200 may have conditioned models to process the capture. As an example, a video may be taken on a phone. The video may include a target swing image set, or a video of a player's golf swing from down the line. The phone may have system 200 or be operatively linked to system 200 and its one or more components. The video may be used as input for a conditioned swing point model to generate target swing point data based on the target swing image set. For example, one or more swing points on the head region, the trunk region, the hip region, the leg regions, and/or the arm regions may be generated. In some embodiments, the original video may be edited by trimming or cutting the whole video to the relevant frames corresponding to the golf swing. For example, one or more of the models may be trained to identify a beginning of an address pose. The earlier images and/or video may be trimmed. Similarly, one or more of the models may be trained to identify an end of a finish pose. The images and/or video afterward may be trimmed. In embodiments, one or more objects in the video may be identified or segmented to further limit the processing to the relevant objects. Such segmentation may be understood by a person of ordinary skill in the art and implemented into one or more models. In embodiments, such pre-processing may occur as part of the one or more models or systems, or may be pre-processed by another model system as would be understood by a person of ordinary skill in the art. In some embodiments, pre-processing may include feature engineering, denoising, and/or other preprocessing techniques. In some embodiments, the relevant objects may be the player, the golf club, the golf ball, and/or other relevant objects. The target swing point data may be used as input for a conditioned swing characteristic model and/or swing characteristic model to generate target swing characteristic data. For example, the conditioned swing characteristic model and/or swing characteristic model may detect a loss of posture swing characteristic. As an example of feature engineering, a set of swing points on the head region, trunk region, hip region, leg region, and/or arm regions moving in a specific way from address through the swing may be identified as having the greatest impact and these swing points may be weighted more heavily than other swing points. The swing characteristic data may be used as input for a conditioned swing recommendation model and/or swing recommendation model to generate target swing recommendation data. For example, based on detecting a loss of posture swing characteristic, a body lat stretch exercise, windmills exercise, sweep the dust drill, and russian twists exercise may be recommended. Selecting the sweep the dust drill may provide a video on how to perform the sweep the dust drill. In some embodiments, each of the recommended exercises and drills may have an explanation explaining that these were recommended because a user indicated a preference for strength training and/or a loss of posture swing characteristic was detected. In some embodiments, a general explanation may be provided for all of the exercises and/or drills indicating that the exercises and/or drills are recommended because a loss of posture swing characteristic was detected. After logging performance of the swing recommendations for 3 months, a re-screen of the swing may be recommended. Instead of detecting a loss of posture swing characteristic, a potential loss of posture swing characteristic may be detected. Another set of swing recommendations may be provided that account for previous swing recommendations, the change to a potential loss of posture swing characteristic, static input, dynamic input, and/or other information. In some embodiments, the another set of swing recommendations may be more difficult or advanced. In embodiments, the another set of swing recommendations may take into account user preference of previous swing recommendations. This process may be repeated until the detected swing characteristic is no longer detected. In contrast, systems 100A, 100B, 100C, and/or 100D may operate separately and independently without necessarily needing to be linked with each other.

In one example, the capture system and systems 100A, 100B, 100C, 100D, and/or 200 may be part of an apparatus for generating swing points, swing characteristics, and/or swing recommendations. The capture system may capture a target swing image set. The target swing image set may include one or more images of at least part of a golf swing. The image may be sequential. Systems 100A, 100B, 100C, 100D, and/or 200 may be operatively linked to the capture system as discussed herein. Systems 100A, 100B, 100C, 100D, and/or 200 may obtain a conditioned swing point model, trained as discussed herein, and obtain a target swing image set captured by the capture system. Target swing point data may be generated by applying the conditioned swing point model to the target swing image set. The target swing point data may specify swing points on the target swing image set. In some embodiments, the pipeline may continue, and a swing characteristic model and/or a conditioned swing characteristic model may be obtained, which may be trained as discussed herein, to generate target swing characteristic data by applying the swing characteristic model and/or the conditioned swing characteristic model to the target swing point data. In embodiments, the pipeline may continue, and a swing recommendation model and/or a conditioned swing recommendation model may be obtained to generate target swing recommendation data by applying the swing recommendation model and/or the conditioned swing recommendation model to the target swing characteristic data. A representation of the target swing image set, target swing point data, target swing characteristic data, and/or target swing recommendation data may be generated using visual effects to depict at least some of the image set and/or data. The representation(s) may be displayed.

In some embodiments, server 202, client computing platform 204, and/or external resources 228 may be operatively linked via an electronic communication link. For example, the electronic communication link may be established, at least in part, via a network such as, the internet and/or other networks. It should be appreciated that server 202, client computing platform 204, and/or external resources 228 may be operatively linked via other communication media.

Client computing platform 204 may include a processor to execute computer program components as discussed herein. The computer program components may enable a user corresponding to client computing platform 204 to interface with system 200 and/or external resources 228 and/or provide other functionality attributed herein to client computing platform 204. For example, client computing platform 204 may include a mobile device, smartphone, desktop computer, laptop computer, handheld computer, tablet computing platform, netbook, gaming console, smart device, wearable, another input device, and/or other computing platforms.

External resources 228 may include information sources outside of system 200, external entities interacting with system 200, and/or other resources. In some embodiments, some or all of the functionality attributed herein to external resources 228 may be provided by resources included in system 200.

Server 202 may include electronic storage 230, processor 232, and/or other components. Server 202 may include communication lines or ports to enable exchange of information within a network, with a network, and/or other computing platforms. It should be appreciated that the illustration of server 202 in FIG. 1D is not intended to be limiting. For example, server 202 may be implemented by a cloud of computing platforms operating together as server 202.

Electronic storage 230 may include storage media that electronically store information, such as, for example, data and/or other digital information. The electronic storage media of electronic storage 230 may include system storage that is provided integrally (i.e., substantially non-removable) with server 202 and/or removable storage that is removably connectable to server 202 via, for example, a port (e.g., a USB port, a firewire port, digital port, and/or other ports) or a drive (e.g., a disk drive, thumb drive, and/or other drives). Electronic storage 230 may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 230 may include a virtual storage resource (e.g., cloud storage, a virtual private network, and/or other virtual storage resources). Electronic storage 230 may store software algorithms, information determined, generated, and/or otherwise processed by processor 232, information received from server 202, information received from client computing platform 204, and/or other information that enables server 202 to function as described herein. It should be appreciated that the information may be stored in its natural and/or raw format (e.g., data lakes).

Processor 232 may provide information processing capabilities in server 202. For example, processor 232 may include a physical computer processor, a digital processor, an analog processor, a digital circuit designed to process information, an analog circuit designed to process information, a state machine, and/or other mechanisms for electronically processing information. Although processor 232 is shown in FIG. 2 as a single entity, this is for illustrative purposes only. In some embodiments, processor 232 may include a plurality of processing units. These processing units may be physically or geographically located or packaged within the same device, or processor 232 may represent processing functionality of a plurality of devices operating in coordination. Processor 232 may execute components 208, 210, 212, 214, 216, 218, 220, 222, 224, 226, and/or other components by software, hardware, firmware, and/or other mechanisms for configuring processing capabilities on processor 232. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 208, 210, 212, 214, 216, 218, 220, 222, 224, and 226 are illustrated in FIG. 2 as being implemented within a single processing unit, in embodiments, for example, in which processor 232 includes multiple processing units, one or more of components 208, 210, 212, 214, 216, 218, 220, 222, 224, and/or 226 may be implemented remotely from other components. For example, system 200 may include multiple systems (e.g., system 100A, system 100B, system 100C, and/or system 100D) and corresponding components and/or sub-components, as discussed herein. The description of the functionality provided by the different components 208, 210, 212, 214, 216, 218, 220, 222, 224, and/or 226 described herein is for illustrative purposes, and is not intended to be limiting, as any of components 208, 210, 212, 214, 216, 218, 220, 222, 224, and/or 226 may provide more or less functionality than is described. For example, one or more of components 208, 210, 212, 214, 216, 218, 220, 222, 224, and/or 226 may be eliminated, and some or all of its functionality may be provided by other ones of components 208, 210, 212, 214, 216, 218, 220, 222, 224, and/or 226. For example, processor 232 may execute an additional component that may perform some or all of the functionality attributed herein to components 208, 210, 212, 214, 216, 218, 220, 222, 224, and/or 226.

Figure 3A:
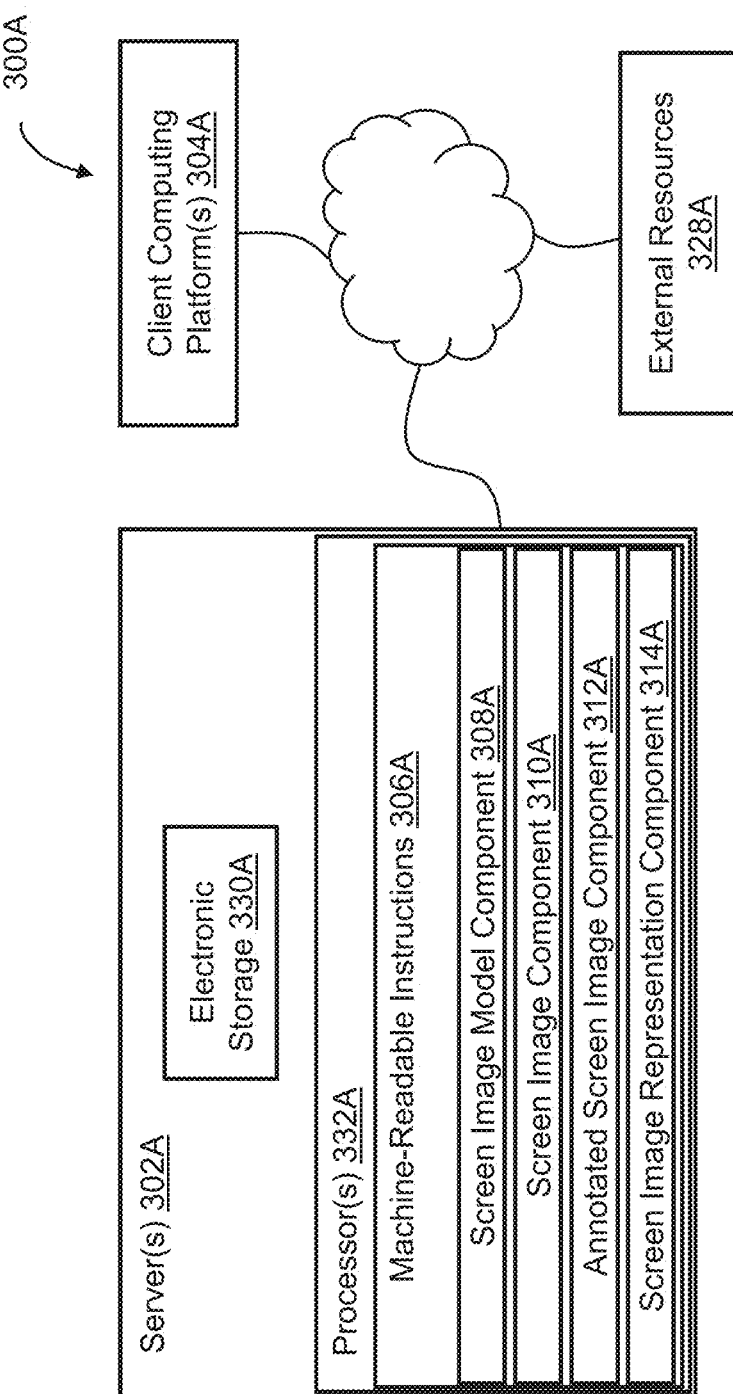
FIG. 3A illustrates a system for generating annotated screen images in accordance with one or more embodiments of the presently disclosed technology.

FIG. 3A illustrates a system for generating annotated screen images in accordance with one or more embodiments of the presently disclosed technology. In some embodiments, system 300A may include server 302A. Server 302A may be configured to communicate with client computing platform 304A according to an architecture, including, for example, a client/server architecture and/or other architectures. Client computing platform 304A may be configured to communicate with other client computing platforms via server 302A, peer-to-peer architecture, and/or other architectures. Users may access system 300A via client computing platform 304A.

Server 302A may be configured by machine readable instructions 306A. Machine readable instructions 306A may include an instruction component (not shown). The instruction component may include computer program component(s). For example, the instruction component may include screen image model component 308A, screen image component 310A, annotated screen image component 312A, screen image representation component 314A, and/or other instruction components.

Screen image model component 308A may be configured to obtain an initial screen image model. Initial screen image model, conditioned screen image model, and/or screen image model may be used interchangeably with initial golf screen image model, conditioned golf screen image model, and/or golf swing screen model, respectively, herein. The initial screen image model may be based on machine-learning techniques to map at least one variable to another variable. For example, the initial screen image model may receive images, virtual body models, text, screen image properties, and/or other input and output annotated screen images. The initial screen image model may be "untrained" or "unconditioned," indicating it may not estimate or generate an output based on the input as accurately as a "trained" or "conditioned" model.

Images may include two-dimensional images or three-dimensional images. Images may be of people in various poses. A pose may be a position of a person. The position of a person may include different positions and orientations of any part of the body. For example, a pose may include a screen pose. The screen pose may include one or more poses of a physical screen (which may be used interchangeably with golf screen herein), screen movement, a standing pose, a seated pose, a leaning pose, and/or other anatomically possible poses for a person. The one or more poses of a screen may include multi-segmental rotation poses, seated windshield wipers poses, 90/90 golf posture poses, wrist flexion and extension poses, wrist forearm supination and pronation poses, wide base deep squat poses, toe touch poses, standing shoulder flexion poses, and/or other poses. In some embodiments, images may be a variety of single images of one or more people, a sequence of connected images (e.g., consecutive, or sequential, frames of a video), and/or other images. The image may be unannotated, as will be discussed herein.

Virtual body models may be computer-generated humanoid bodies, as discussed herein. The virtual body models may be a template to add or otherwise attribute one or more features or screen image properties to.

Text may include descriptions of people in poses, including, for example, screen poses (e.g., "90/90 golf posture"), surrounding environments (e.g., "in a gym"), as well as other text.

Screen image properties may be properties of one or more objects in each of the screen images as discussed herein, including for example, a person, accessory, environment and/or other objects. Screen image properties may be used interchangeably with golf screen image properties herein. Screen image properties may specify screen image property values of the one or more objects in each of the screen images. Screen image property values may include a quantitative and/or qualitative value corresponding to the screen image property.

As an example of a screen image property of a person, the screen image property may include a pose, a height, a body type, a weight, a skin tone, a hair, a hair color, a size and shape of one or more body parts, a position of the person in the environment, and so on as would be understood by a person of ordinary skill in the art. Continuing this example, a screen image property value of the height may be about 5 foot 10 inches or a multi-segmental rotation pose, and so on. In one example of a screen image property of an accessory, such as a shirt, the screen image property may include a style, a size, a shape, a color, a position of the shirt in the environment, and so on as would be understood by a person of ordinary skill in the art for this and other accessories. Continuing this example, the screen image property value of the style may be a t-shirt or located on the person's body as if wearing the shirt. In an example of a screen image property of an environment, such as a gym, the screen image property may include a distance from a perceived, virtual, or actual camera, a position and orientation of lighting from the light sources, a number of exercise machines and/or free weights, and so on as would be understood by a person of ordinary skill in the art for this and other environments. Continuing this example, a screen image property value of the distance from a perceived, virtual, or actual camera may be about 20 feet from the person, lighting may be only from fluorescent lights, and there may be a treadmill and dumbbells at different distances from the camera origin.

Annotated screen images may include computer-generated images of a player or person in a pose. Annotated screen images and/or screen images may be used interchangeably with annotated golf screen images and/or golf screen images, respectively, herein. The pose may include a screen pose as discussed herein. The annotated screen images may include one or more screen image properties specifying screen image property values. The annotated screen images may be generated using the initial screen image model, the conditioned screen image model, and/or the screen image model discussed herein. The annotated screen images may include screen points and/or other annotations. Annotations may refer to metadata attributed to the annotated screen images, which may be included in screen image properties and corresponding screen image property values. For example, labeled or otherwise attributed screen image properties and corresponding screen image property values of the one or more objects in an annotated screen image may be annotations of the annotated screen image. In some embodiments, the person, accessories, and environments may be annotated with screen points.

The screen points may be one or more position-specific areas on a given object in a given annotated screen image. Screen points may be used interchangeably with golf screen points herein. The screen points may be identifiable, convertible, extractable, or otherwise processed to generate screen point data. The screen point data may specify a position and time. The position may be in a two-dimensional or three-dimensional space. The screen point data may include metadata attributing the position and time to a given object in a screen image. In some embodiments, one or more screen points may be extrapolated or interpolated from other screen points. For example, referring to FIG. 46, screen points 4602 may be on various parts of screen image model 4600. As illustrated, there may be ten screen points 4602 on a head region, five screen points 4602 on a trunk region, eight screen points 4602 on each arm region down to the hand region, seven screen points 4602 on a hip region, and five screen points 4602 on each leg region down to the foot region for a total of forty-eight screen points 4602 on screen image model 4600. It should be appreciated that there may be fewer or more screen points 4602 than illustrated for various situations. For example, there may be additional screen points 4602 near the leg region and the foot region to analyze foot movement and less screen points 4602 around the head region. The positions of screen points 4602 may be used to determine changes in movement of the given object, an orientation of the given object, screen characteristics, as will be discussed herein, and/or other characteristics. As an example of interpolation, a screen point may be on a left part of the head and a screen point may be on a right part of the head. A screen point in the middle of the head may be interpolated by taking a middle point between the screen point on the left part of the head and the screen point on the right part of the head. In embodiments, the screen point in the middle of the head may be otherwise generated, identified, converted, or otherwise extracted.

Referring back to FIG. 3A, the machine-learning models discussed herein may include, for example, more generally, supervised or unsupervised machine-learning models, as well as, more specifically, convolutional neural networks, reinforcement learning, transfer learning, other neural networks, support vector machines, regressions, Bayesian networks, and/or other machine-learning technologies. The machine-learning models may include a model design, one or more model components, a machine-learning technology, a set of parameters, and/or other features as discussed herein.

In some embodiments, screen image model component 308A may be configured to obtain a screen image model. The screen image model may be a graphical representation of a person. The screen image model may be a two-dimensional or three dimensional model of the person. The screen image model may be similar to the virtual body models discussed herein. The screen image model may generate annotated screen images by attributing the one or more screen image properties to the screen image model or otherwise annotating the screen image model. For example, each of the possible screen image properties may be randomly assigned a corresponding screen image property value (e.g., height of 6 feet, man, weight of 150 pounds, sitting, and so on) and these screen image property values are attributed to the screen image model to form a person in an annotated screen image. Other objects and corresponding screen image properties and screen image property values may be attributed to the annotated screen image (e.g., the person is wearing a t-shirt, with black workout shorts, at a gym with dumbbells, and so on). This may be repeated until a sufficient number of annotated screen images are generated. The screen image model may use annotated screen image relationships to connect the input to the output. Annotated screen image relationships may be used interchangeably with golf annotated screen image relationships herein. For example, an annotated screen image relationship may identify how to attribute annotations and/or screen image properties to the screen image model. Existing methods may rely on pre-existing images to train a machine-learning model or other model. However, not enough data may be available, or even if there is enough data, that data is exhaustible. With the presently disclosed technology, an infinite number of images and data are capable of being generated at scale to supply a machine-learning model or other model to generate sufficient training data.

In some embodiments, screen image model component 308A may be configured to generate or obtain a conditioned screen image model. The conditioned screen image model may be generated by training the initial screen image model using a training screen image set and a training annotated screen image set, including screen image property data, which may include screen image properties and corresponding screen image property values. In embodiments, the conditioned screen image model is "conditioned," indicating the conditioned screen image model may have been trained to optimize performance and/or improve accuracy of the initial screen image model. For example, the conditioned screen image model may more accurately output annotated screen images based on images, virtual body models, text, screen image properties, and/or other input. In embodiments, the conditioned screen image model may have generated a set of annotated screen image relationships between the input and the annotated screen images. The annotated screen image relationships may be generated by determining a pattern or connection between the input and the validated output. For example, an annotated screen image relationship may identify a group of one or more pixels and determine it is an object of interest, a screen point of interest, and so on. Validation of this annotated screen image relationship may further strengthen the annotated screen image relationship. In some embodiments, the conditioned screen image model may have been stored and screen image model component 308A may retrieve or obtain the conditioned screen image model from storage.

Training the initial screen image model may include applying the training screen image set and/or other input to the initial screen image model based on an initial set of annotated screen image relationships to generate a first iteration of annotated screen images. The initial screen image model may be adjusted to more accurately generate the annotated screen images based on differences between the first iteration of the annotated screen images and the ground truth input that correspond to the initial training screen image set and/or other input (i.e., training annotated screen images). This may be understood to a person of ordinary skill in the art as tuning, training, and/or validation. As an example, the ground truth input may have pre-annotated screen images corresponding to the input. In some embodiments, a training annotated screen image set may be processed to remove annotations to form the training screen image set. This tuning, training, and validation cycle may be repeated numerous times until the initial screen image model is "conditioned," i.e., it is able to output annotated screen images that are consistently within a threshold of the ground truth input. The tuning may include adjustments to one or more of the structure parameters, hyperparameters, functions, thresholds, running time, model design, weighting of one or more screen image properties, other feature engineering, and/or other features. In some embodiments, the conditioned screen image model may find an annotated screen image relationship or annotated screen image pattern that an image and/or a set of pixels in an image indicate one or more annotations.

In some embodiments, the threshold may depend on the speed of the conditioned screen image model, resources used by the conditioned screen image model, and/or other optimization metrics. This threshold may be based on an average of values, a maximum number of values, and/or other parameters. Other metrics may be applied to determine that the conditioned screen image model is "conditioned." As an example, the threshold may be with 5% of the accuracy value, efficiency value, or other value, though it should be appreciated that the threshold may be 10%, 15%, 25%, and so on.

In some embodiments, screen image model component 308A may be configured to store the conditioned screen image model. For example, the conditioned screen image model can be stored in a non-transitory storage medium, electronic storage 330A, non-transient computer readable mediums, optical storage, and/or other storage. It should be appreciated that these are merely examples and that the conditioned screen image model can be stored in other storage as well (e.g., structured storage, unstructured storage, and/or virtual storage).

In some embodiments, screen image model component 308A may be configured to store the screen image model. It can be stored the same as, or substantially similar to, how the conditioned screen image model is stored.

Screen image component 310A may be configured to obtain a training screen image set. Training screen image set, target screen image set, training annotated screen image set, and/or target annotated screen image set may be used interchangeably with training golf screen image set, target golf screen image set, training annotated golf screen image set, and/or target annotated golf screen image set, respectively, herein. The training screen image set may be used to train an initial screen image model, as discussed herein. The training screen image set may be collected by taking pictures or videos of people in various situations, including screen poses. As an example, an image from the training screen image set may be of a specific person in a normal portrait. There may be another image of the same person in a screen pose that is annotated to identify objects in the image and any relevant screen points. As another example, provided text may correspond to an annotated screen image. As another example, a list of screen image properties and corresponding property values may correspond to an annotated screen image. The training screen image set may be collected physically (e.g., through cameras) and/or virtually (e.g., generated through computer models), as discussed herein. The training screen image set may be stored as discussed herein.

In embodiments, the training screen image set may correspond to a training annotated screen image set. In some embodiments, the training screen image set may be derived, processed, or extracted from the training annotated screen image set using existing annotated screen image relationships between screen images and annotated screen images, such as, for example, screen image properties, anatomical limits, poses, and/or other models/information.

In some embodiments, screen image component 310A may be configured to obtain a target screen image set. The target screen image set may be used to generate a target annotated screen image set by applying the conditioned screen image model and/or the screen image model to the target screen image set. The target screen image set may be a set of images captured from an optical sensor, camera, or another capture system. In some embodiments, the capture system may be 60 frames per second (fps), 120 fps, 240 fps, and so on. In embodiments, there may be motion blur, such as, for examples, with captures systems with lower fps. The conditioned screen image model may be trained using images and/or video with motion blur and/or other artifacts. In some embodiments, a best frame may be selected per second as discussed herein. The conditioned screen image model may select the best frame based on the training data. The set of images may be consecutive, sequential, or otherwise temporal. For example, the target screen image set may include one or more screen poses, and/or other poses. In some embodiments, the target screen image set may be a set of computer-generated images.

Annotated screen image component 312A may be configured to obtain a training annotated screen image set. The training annotated screen image set may be used to train an initial screen image model, as discussed herein. In some embodiments, a portion of the training annotated screen image set may be set aside and used to validate the conditioned screen image model and/or the screen image model. The training annotated screen image set may be generated by annotating screen images, as discussed herein, or from pre-annotated screen images. The training annotated screen image set may include one or more screen image properties. The one or more screen image properties may correspond to the training screen image set. The training annotated screen image set may be stored as discussed herein.

Annotated screen image component 312A may be configured to generate a target annotated screen image set. The target annotated screen image set may be generated by applying the conditioned screen image model and/or the screen image model to the target screen image set. As discussed herein, the conditioned screen image model and/or the screen image model can accurately estimate, attribute, and/or generate the target annotated screen image set using the target screen image set as input because the conditioned screen image model has been "trained" or "conditioned." As an example, the target annotated screen image set may include one or more objects and one or more screen properties and corresponding screen property values. The one or more screen image properties may correspond to the target screen image set.

Screen image representation component 314A may be configured to generate a screen image representation of the screen image set using visual effects to depict at least a portion of the screen image set. Screen image representation may be used interchangeably with golf screen image representation herein. This may be accomplished by the one or more physical computer processors. The screen image representation of the screen image set may be used by one or more physical computer processors in a computer vision process. In some embodiments, a visual effect may include one or more visual transformations of the screen image representation.

In some embodiments, the screen image representation may be a video.

Screen image representation component 314A may be configured to generate a screen image representation of the annotated screen image set using visual effects to depict at least a portion of the annotated screen image set. This may be accomplished by the one or more physical computer processors. The screen image representation may be used by one or more physical computer processors in a computer vision process. In some embodiments, a visual effect may include one or more visual transformations of the screen image representation. Each of the one or more objects may be identified or labeled and corresponding screen image properties and screen image property values may be attributed to the one or more objects.

Screen image representation component 314A may be configured to display the screen image representation. The screen image representation may be displayed on a graphical user interface and/or other displays. The graphical user interface may include a user interface based on graphics, audio, and/or text. The graphical user interface may be configured to receive voice input, gestures, haptic input, keyboard, mouse, pen, touch input and/or other input. System 300A may include one or more output devices such as a display, speakers, printer, haptic feedback, and so on.

In some embodiments, server 302A, client computing platform 304A, and/or external resources 328A may be operatively linked via an electronic communication link. For example, the electronic communication link may be established, at least in part, via a network such as, the internet and/or other networks. It should be appreciated that server 302A, client computing platform 304A, and/or external resources 328A may be operatively linked via other communication media.

Client computing platform 304A may include a processor to execute computer program components as discussed herein. The computer program components may enable a user corresponding to client computing platform 304A to interface with system 300A and/or external resources 328A and/or provide other functionality attributed herein to client computing platform 304A. For example, client computing platform 304A may include a mobile device, smartphone, desktop computer, laptop computer, handheld computer, tablet computing platform, netbook, gaming console, smart device, wearable, another input device, and/or other computing platforms.

External resources 328A may include information sources outside of system 300A, external entities interacting with system 300A, and/or other resources. In some embodiments, some or all of the functionality attributed herein to external resources 328A may be provided by resources included in system 300A.

Server 302A may include electronic storage 330A, processor 332A, and/or other components. Server 302A may include communication lines or ports to enable exchange of information within a network, with a network, and/or other computing platforms. It should be appreciated that the illustration of server 302A in FIG. 3A is not intended to be limiting. For example, server 302A may be implemented by a cloud of computing platforms operating together as server 302A.

Electronic storage 330A may include storage media that electronically store information, such as, for example, data and/or other digital information. The electronic storage media of electronic storage 330A may include system storage that is provided integrally (i.e., substantially non-removable) with server 302A and/or removable storage that is removably connectable to server 302A via, for example, a port (e.g., a USB port, a firewire port, digital port, and/or other ports) or a drive (e.g., a disk drive, thumb drive, and/or other drives). Electronic storage 330A may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 330A may include a virtual storage resource (e.g., cloud storage, a virtual private network, and/or other virtual storage resources). Electronic storage 330A may store software algorithms, information determined, generated, and/or otherwise processed by processor 332A, information received from server 302A, information received from client computing platform 304A, and/or other information that enables server 302A to function as described herein. It should be appreciated that the information may be stored in its natural and/or raw format (e.g., data lakes).

Processor 332A may provide information processing capabilities in server 302A. For example, processor 332A may include a physical computer processor, a digital processor, an analog processor, a digital circuit designed to process information, an analog circuit designed to process information, a state machine, and/or other mechanisms for electronically processing information. Although processor 332A is shown in FIG. 3A as a single entity, this is for illustrative purposes only. In some embodiments, processor 332A may include a plurality of processing units. These processing units may be physically or geographically located or packaged within the same device, or processor 332A may represent processing functionality of a plurality of devices operating in coordination. Processor 332A may execute components 308A, 310A, 312A, 314A, and/or other components by software, hardware, firmware, and/or other mechanisms for configuring processing capabilities on processor 332A. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 308A, 310A, 312A, and 314A are illustrated in FIG. 3A as being implemented within a single processing unit, in embodiments, for example, in which processor 332A includes multiple processing units, one or more of components 308A, 310A, 312A, and/or 314A may be implemented remotely from other components. The description of the functionality provided by the different components 308A, 310A, 312A, and/or 314A described herein is for illustrative purposes, and is not intended to be limiting, as any of components 308A, 310A, 312A, and/or 314A may provide more or less functionality than is described. For example, one or more of components 308A, 310A, 312A, and/or 314A may be eliminated, and some or all of its functionality may be provided by other ones of components 308A, 310A, 312A, and/or 314A. For example, processor 332A may execute an additional component that may perform some or all of the functionality attributed herein to components 308A, 310A, 312A, and/or 314A.

Figure 3B:
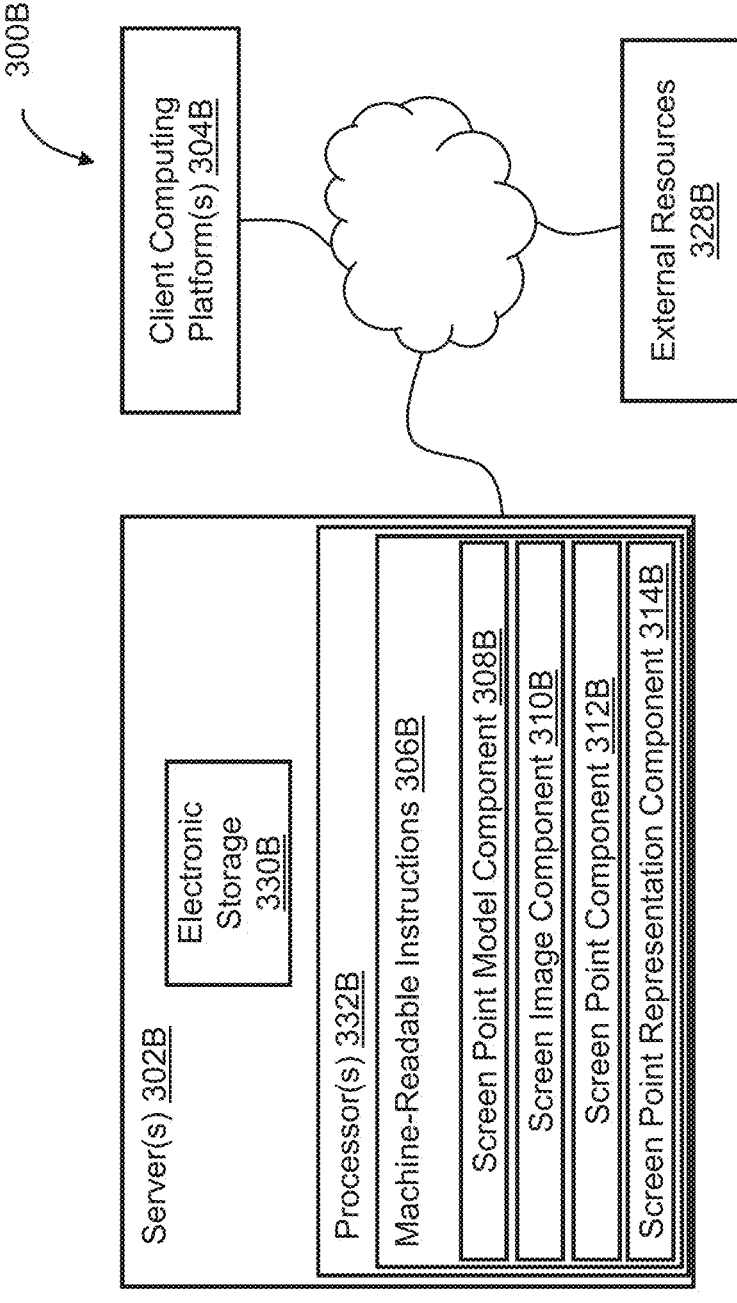
FIG. 3B illustrates a system for generating screen point data in accordance with one or more embodiments of the presently disclosed technology.

FIG. 3B illustrates a system for generating screen point data in accordance with one or more embodiments of the presently disclosed technology. In some embodiments, system 300B may include server 302B. Server 302B may be configured to communicate with client computing platform 304B according to an architecture, including, for example, a client/server architecture and/or other architectures. Client computing platform 304B may be configured to communicate with other client computing platforms via server 302B, peer-to-peer architecture, and/or other architectures. Users may access system 300B via client computing platform 304B.

Server 302B may be configured by machine readable instructions 306B. Machine readable instructions 306B may include an instruction component (not shown). The instruction component may include computer program component (s). For example, the instruction component may include screen point model component 308B, screen image component 310B, screen point component 312B, screen point representation component 314B, and/or other instruction components.

Screen point model component 308B may be configured to obtain an initial screen point model. Initial screen point model and/or conditioned screen point model may be used interchangeably with initial golf screen point model and/or conditioned golf screen point model, respectively, herein. The initial screen point model may be based on machine-learning techniques, as discussed herein, to map at least one variable to another variable. For example, the initial screen point model may receive screen images and/or other input and output screen points. The initial screen point model may be "untrained" or "unconditioned," as discussed herein. It should be appreciated that the screen points may be extracted or converted from an annotated screen image as discussed herein.

In some embodiments, screen point model component 308B may be configured to generate or obtain a conditioned screen point model. The conditioned screen point model may be generated by training the initial screen point model using a training screen image set and training screen point data. In embodiments, the conditioned screen point model is "conditioned," indicating the conditioned screen point model may have been trained to optimize performance and/or improve accuracy of the initial screen point model. For example, the conditioned screen point model may more accurately output screen points based on screen images and/or other input. In embodiments, the conditioned screen point model may have generated a set of screen point relationships between the images and the screen point data. The screen point relationships may be generated by determining a pattern or connection between the input and the validated output. Screen point relationships may be used interchangeably with golf screen point relationships herein. For example, a screen point relationship may identify a group of one or more pixels and determine where on each object of interest there are screen points of interest. Validation of this screen point relationship may further strengthen the screen point relationship. In some embodiments, the conditioned screen point model may have been stored and screen point model component 308B may retrieve or obtain the conditioned screen point model from storage.

Training the initial screen point model may include applying the training screen image set and/or other input to the initial screen point model based on an initial set of screen point relationships between the screen image set and the screen point data to generate a first iteration of screen point data. The initial screen point model may be adjusted to more accurately generate the screen point data based on differences between the first iteration of the screen point data and the ground truth input that corresponds to the initial training screen image set and/or other input. As an example, the ground truth input may be screen points extracted from an annotated screen image that has been processed to separate the screen points and/or other annotations from the screen image. This tuning, training, and validation cycle may be repeated numerous times until the initial screen point model is "conditioned," as discussed herein. In some embodiments, the conditioned screen point model may find a screen point relationship or screen point pattern that one or more screen images and/or sets of pixels indicates positions of one or more screen points.

In some embodiments, screen point model component 308B may be configured to store the conditioned screen point model. It can be stored the same as, or substantially similar to, how the conditioned screen image model is stored.

Screen image component 310B may be configured to obtain a training screen image set. Screen image component 310B may be the same as, or substantially similar to, screen image component 310A and/or annotated screen image component 312A. The training screen image set may be used to train an initial screen point model, as discussed herein. The training screen image set may be generated by annotating screen images, as discussed herein, or from pre-annotated screen images and processing the annotated screen images to remove screen points and/or other annotations, and/or the training screen image set may be collected by taking real photos or videos of people performing a physical screen. A physical screen may refer to repeatable movements to assess a player's movement capabilities. As an example, system 300A may be used to generate annotated screen images as discussed herein. The annotated screen images may be processed such that the screen points and/or other annotations are extracted or otherwise removed. The training screen image set may be stored as discussed herein. In some embodiments, the training screen image set may be trained such that system 300B does not have access to annotations as part of the input to the initial screen point model. In embodiments, the training screen image set may be the same as, or substantially similar to, the training screen image set discussed herein with respect to system 300A.

In embodiments, the training screen image set may correspond to training screen point data. In some embodiments, the training screen point data may be derived, processed, converted, or otherwise extracted from the training screen image set using existing screen point relationships between screen images and screen point data, such as, for example, marker-based and markerless motion capture systems, anatomical structures, screen image properties, poses, and/or other models/information.

In some embodiments, screen image component 310B may be configured to obtain a target screen image set. The target screen image set may be used to generate target screen point data by applying the conditioned screen point model to the target screen image set. The target screen image set may be a set of images captured from an optical sensor, camera, or another capture system, as discussed herein. The set of images may be consecutive, sequential, or otherwise temporal. For example, the target screen image set may include a physical screen, one or more screen poses, and/or other poses, as discussed herein. The target screen image set may be the same as, or substantially similar to, the target screen image set discussed herein with respect to system 300A.

Screen point component 312B may be configured to obtain training screen point data. Training screen point data and/or target screen point data may be used interchangeably with training golf screen point data and/or target golf screen point data, respectively, herein. The training screen point data may be used to train an initial screen point model, as discussed herein. In some embodiments, a portion of the training screen point data may be set aside and used to validate the conditioned screen point model. The training screen point data may be generated by deriving, processing, converting, or otherwise extracting screen points from the training screen image set. The screen point may be put into a structured data format with position, time, object data, and/or other metadata or used visually in a virtual space. The object data may include which object the screen point corresponds to, where the object is located in the image, metadata on the object, and/or other annotations as discussed herein. The training screen point data may correspond to the training screen image set. The training screen point data may be stored as discussed herein.

Screen point component 312B may be configured to generate target screen point data. The target screen point data may be generated by applying the conditioned screen point model to the target screen image set. As discussed herein, the conditioned screen point model can accurately estimate and/or generate the target screen point data using the target screen image set as input because the conditioned screen point model has been "trained" or "conditioned." As an example, the target screen point data may include one or more screen points with position, time, and/or object data, as discussed herein. In some embodiments, one or more screen points, at least compared to the screen points in FIG. 46, may not be generatable because there is no corresponding region visible in the target screen image. In embodiments, the one or more screen points that may not have a corresponding region that is visible in the target screen image may be interpolated, extrapolated, or otherwise estimated/predicted. The target screen point data may correspond to the target screen image set.

Screen point representation component 314B may be configured to generate a screen point representation of the screen image set using visual effects to depict at least a portion of the screen image set, as discussed herein. Screen point representation may be used interchangeably with golf screen point representation herein. Screen point representation component 314B may be the same as, or substantially similar to, screen image representation component 314A with respect to the screen image set.

Screen point representation component 314B may be configured to generate a screen point representation of the screen point data using visual effects to depict at least a portion of the screen point data. This may be accomplished by the one or more physical computer processors. The screen point representation of the screen point data may be used by one or more physical computer processors in a computer vision process. In some embodiments, a visual effect may include one or more visual transformations of the screen point representation.

Screen point representation component 314B may be configured to display the screen point representation. The screen point representation may be displayed on a graphical user interface and/or other displays, as discussed herein. System 300B may include one or more output devices such as a display, speakers, printer, haptic feedback, and so on. System 300B may include one or more output devices such as a display, speakers, printer, haptic feedback, and so on.

In some embodiments, server 302B, client computing platform 304B, and/or external resources 328B may be operatively linked via an electronic communication link. For example, the electronic communication link may be established, at least in part, via a network such as, the internet and/or other networks. It should be appreciated that server 302B, client computing platform 304B, and/or external resources 328B may be operatively linked via other communication media.

Client computing platform 304B may include a processor to execute computer program components as discussed herein. The computer program components may enable a user corresponding to client computing platform 304B to interface with system 300B and/or external resources 328B and/or provide other functionality attributed herein to client computing platform 304B. For example, client computing platform 304B may include a mobile device, smartphone, desktop computer, laptop computer, handheld computer, tablet computing platform, netbook, gaming console, smart device, wearable, another input device, and/or other computing platforms.

External resources 328B may include information sources outside of system 300B, external entities interacting with system 300B, and/or other resources. In some embodiments, some or all of the functionality attributed herein to external resources 328B may be provided by resources included in system 300B.

Server 302B may include electronic storage 330B, processor 332B, and/or other components. Server 302B may include communication lines or ports to enable exchange of information within a network, with a network, and/or other computing platforms. It should be appreciated that the illustration of server 302B in FIG. 3B is not intended to be limiting. For example, server 302B may be implemented by a cloud of computing platforms operating together as server 302B.

Electronic storage 330B may include storage media that electronically store information, such as, for example, data and/or other digital information. The electronic storage media of electronic storage 330B may include system storage that is provided integrally (i.e., substantially non-removable) with server 302B and/or removable storage that is removably connectable to server 302B via, for example, a port (e.g., a USB port, a firewire port, digital port, and/or other ports) or a drive (e.g., a disk drive, thumb drive, and/or other drives). Electronic storage 330B may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 330B may include a virtual storage resource (e.g., cloud storage, a virtual private network, and/or other virtual storage resources). Electronic storage 330B may store software algorithms, information determined, generated, and/or otherwise processed by processor 332B, information received from server 302B, information received from client computing platform 304B, and/or other information that enables server 302B to function as described herein. It should be appreciated that the information may be stored in its natural and/or raw format (e.g., data lakes).

Processor 332B may provide information processing capabilities in server 302B. For example, processor 332B may include a physical computer processor, a digital processor, an analog processor, a digital circuit designed to process information, an analog circuit designed to process information, a state machine, and/or other mechanisms for electronically processing information. Although processor 332B is shown in FIG. 3B as a single entity, this is for illustrative purposes only. In some embodiments, processor 332B may include a plurality of processing units. These processing units may be physically or geographically located or packaged within the same device, or processor 332B may represent processing functionality of a plurality of devices operating in coordination. Processor 332B may execute components 308B, 310B, 312B, 314B, and/or other components by software, hardware, firmware, and/or other mechanisms for configuring processing capabilities on processor 332B. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 308B, 310B, 312B, and 314B are illustrated in FIG. 3B as being implemented within a single processing unit, in embodiments, for example, in which processor 332B includes multiple processing units, one or more of components 308B, 310B, 312B, and/or 314B may be implemented remotely from other components. The description of the functionality provided by the different components 308B, 310B, 312B, and/or 314B described herein is for illustrative purposes, and is not intended to be limiting, as any of components 308B, 310B, 312B, and/or 314B may provide more or less functionality than is described. For example, one or more of components 308B, 310B, 312B, and/or 314B may be eliminated, and some or all of its functionality may be provided by other ones of components 308B, 310B, 312B, and/or 314B. For example, processor 332B may execute an additional component that may perform some or all of the functionality attributed herein to components 308B, 310B, 312B, and/or 314B.

Figure 3C:
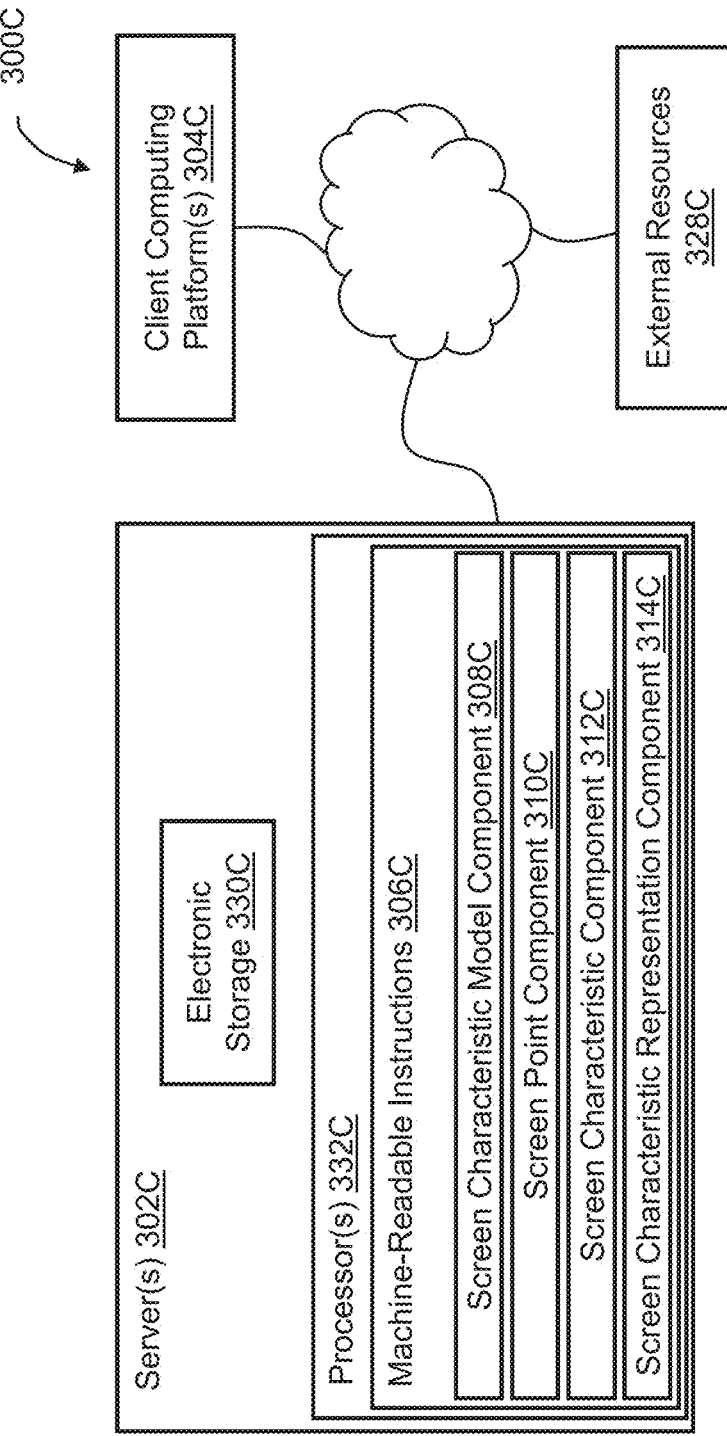
FIG. 3C illustrates a system for generating screen characteristic data in accordance with one or more embodiments of the presently disclosed technology.

FIG. 3C illustrates a system for generating screen characteristic data in accordance with one or more embodiments of the presently disclosed technology. In some embodiments, system 300C may include server 302C. Server 302C may be configured to communicate with client computing platform 304C according to an architecture, including, for example, a client/server architecture and/or other architectures. Client computing platform 304C may be configured to communicate with other client computing platforms via server 302C, peer-to-peer architecture, and/or other architectures. Users may access system 300C via client computing platform 304C.

Server 302C may be configured by machine readable instructions 306C. Machine readable instructions 306C may include an instruction component (not shown). The instruction component may include computer program component(s). For example, the instruction component may include screen characteristic model component 308C, screen point component 310C, screen characteristic component 312C, screen characteristic representation component 314C, and/or other instruction components.

Screen characteristic model component 308C may be configured to obtain an initial screen characteristic model. Initial screen characteristic model, conditioned screen characteristic model, and/or screen characteristic model may be used interchangeably with initial golf screen characteristic model, conditioned golf screen characteristic model, and/or golf screen characteristic model, respectively, herein. The initial screen characteristic model may be based on machine-learning techniques, as discussed herein, to map at least one variable to another variable. For example, the initial screen characteristic model may receive screen point data and/or other input and output screen characteristic data. The initial screen characteristic model may be "untrained" or "unconditioned," as discussed herein. The screen point data may specify positions of screen points of one or more objects as a function of time.

Screen characteristics may be one or more traits at different screen poses in a physical screen. Screen characteristics may be used interchangeably with golf screen characteristics herein. For example, screen characteristics may include a limited multi-segmental rotation, limited seated windshield wipers, limited 90/90 golf posture, limited wrist flexion and extension, limited wrist forearm supination and pronation, limited wide base deep squat, limited toe touch, limited standing shoulder flexion, and/or other screen characteristics. A limited multi-segmental rotation screen characteristic may refer to failing a multi-segmental rotation screen. The multi-segmental rotation screen may refer to a face on perspective of a player and having the player turn their shoulders left and right. For example, the player may rotate clockwise (i.e., rotating left shoulder forward) and counter-clockwise (i.e., rotating right shoulder forward) as much as possible. During rotating clockwise, a right shoulder should rotate more than about 90 degrees clockwise, such that at least a back of the right shoulder should be visible. During rotating counter-clockwise, a left shoulder should rotate more than about 90 degrees counter-clockwise, such that at least a back of the left shoulder should be visible. In some embodiments, during rotating clockwise, a reverse spine angle (i.e., spine axis tilting in front of the player) may be detected. In embodiments, during rotating, the reverse spine angle may be detected. A limited seated windshield wipers screen characteristic may refer to failing a seated windshield wipers screen. The seated windshield wipers screen may refer to a face on perspective of a seated player raising their legs and rotating their feet outward as much as possible (e.g., a left foot rotates leftward and a right foot rotates rightward). During a right foot rotating outward, the right foot should rotate at least about 30 degrees. During a left foot rotating outward, the left foot should rotated at least about 30 degrees. A limited 90/90 golf posture screen characteristic may refer to failing a 90/90 golf posture screen. The 90/90 golf posture screen may refer to a down the line perspective of a player on a right side and a left side in a golf posture, having their arms 90 degrees from their side, and 90 degrees at the elbow, and rotating the player's forearms forward and upward. During a right hand rotating forward and upward, the right hand should rotate at least 5 degrees past a spine axis. During a left hand rotating forward and upward, the left hand should rotate at least 5 degrees past the spine axis. The limited wrist flexion and extension screen characteristic may refer to failing a wrist flexion and extension screen. The wrist flexion and extension screen may refer to a down the line perspective with hands in front of a player extended horizontally with fists flexed (i.e., rotated downward) and extended (i.e., rotated upward) the wrists as much as possible. During flexing the right wrist, the right wrist should rotate at least 55 degrees from straight forward. During extending the right wrist, the right wrist should rotate at least 55 degrees from straight forward. During flexing the left wrist, the left wrist should rotate at least 55 degrees from straight forward. During extending the left wrist, the left wrist should rotate at least 55 degrees from straight forward. The limited wrist forearm supination and pronation screen characteristic may refer to failing a wrist forearm supination and pronation screen. The wrist forearm supination and pronation screen may refer to a face on perspective with elbows at a side of a player, forearms in front of the player parallel to the ground so that the arms are at about 90 degrees, put hands in a thumbs up position and turn palms up and down as much as possible. During supination (i.e., turning palms up) of the left wrist, the left wrist should rotate at least about 75 degrees. During pronation (i.e., turning palms down) of the left wrist, the left wrist should rotate at least about 75 degrees. During supination of the right wrist, the right wrist should rotate at least about 75 degrees. During pronation of the right wrist, the right wrist should rotate at least about 75 degrees. The limited wide base deep squat screen characteristic may refer to failing a wide base deep squat screen. The wide base deep squat screen may refer to a face on perspective with a player's legs wider than shoulder width, toes facing in front of the player, arms upward above the feet, and squat as low as possible while keeping heels on the ground, knees and feet in place, and keeping the arms above the feet. During the squat, a center of pelvis should be below a center of knee. In some embodiments, during the squat, the center of pelvis should stay centered (e.g., not excessively right or excessively left). The limited toe touch screen characteristic may refer to failing a toe touch screen. The toe touch screen may refer to, from a down the line perspective, having a player touch their toes without bending their knees. During the touch, the center of head should be below the center of the pelvis and the toes should be touched. The limited standing shoulder flexion screen characteristic may refer to failing a limited standing shoulder flexion screen. The limited standing shoulder flexion screen may refer to, from a down the line perspective, having a player stand up straight, elbows locked in front of the player, and rotate the arms up as much as possible. From a left arm down the line perspective during the rotation, the left arm should cover the ear. From a right arm down the line perspective during the rotation, the right arm should cover the ear. It should be appreciated that there may be variations to detect these screen characteristics. For example, the standing shoulder flexion screen may be a seated shoulder flexion screen. The wide base deep squat may be a shoulder width deep squat. Some of the screen characteristics may be described with a right and left side of the body to identify a unilateral issue pertaining to one side of the body, or a bilateral issue pertaining to both sides of the body. Whether a screen characteristic is unilateral or bilateral may affect screen recommendations, as will be discussed herein.

Referring back to FIG. 3C, in some embodiments, screen characteristic model component 308C may be configured to obtain a screen characteristic model. The screen characteristic model may receive or obtain screen point data and process the screen point data into screen characteristic data. The screen characteristic model may track position and/or movement of screen points as a function of position and/or time. The screen characteristic model may use data analysis to quantitatively analyze screen point data or computer vision to visually track screen point data. For example, the screen characteristic model may identify one or more screen characteristics for a 90/90 golf posture screen. The screen characteristic model may use screen characteristic relationships, discussed herein, between the input and the validated output. Screen characteristic relationships may be used interchangeably with golf screen characteristic relationships herein. For example, a screen characteristic relationship may determine that a change of position over time of a group of screen points indicate a limited standing shoulder flexion screen characteristic.

Figure 46:
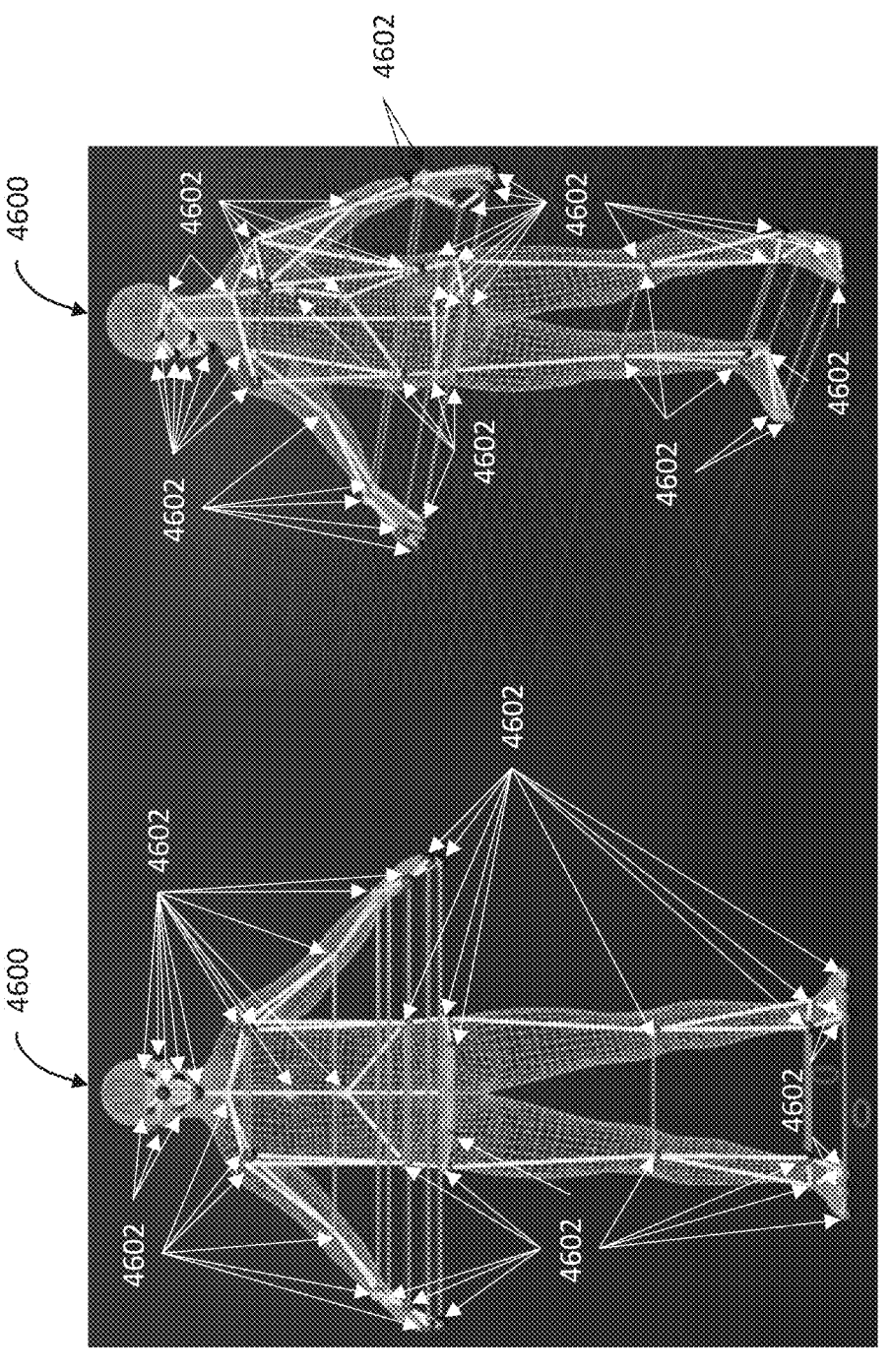
FIG. 46 illustrates a swing image model in accordance with one or more embodiments of the presently disclosed technology.

Using the screen points illustrated in FIG. 46, as an example, a limited multi-segmental rotation, may be identified, detected, determined, generated, or otherwise returned based on analysis of at least the screen points on a trunk region and/or arm regions. From a face on perspective, during a clockwise rotation, a screen point near a right shoulder may be tracked. The screen point may be compared to a screen point near a center of body region. Based on the comparison, the conditioned screen characteristic model and/or the screen characteristic model may indicate there is a limited multi-segmental rotation screen characteristic. For example, the screen point near the right shoulder being in front of a plane of the center of the body may indicate a limited multi-segmental rotation screen characteristic. The screen point near the right shoulder being further right of the plane of the center of the body or not trackable because it is rightward of the trunk may indicate a potential limited multi-segmental rotation screen characteristic. The screen point near the right shoulder being behind the screen point near the center of the body region may indicate no limited multi-segmental rotation screen characteristic. During a counter-clockwise rotation, a screen point near a left shoulder may be tracked. The screen point may be compared to a screen point near a center of body region. Based on the comparison, the conditioned screen characteristic model and/or the screen characteristic model may indicate there is a limited multi-segmental rotation screen characteristic. For example, the screen point near the left shoulder being in front of a plane of the center of the body may indicate a limited multi-segmental rotation screen characteristic. The screen point near the left shoulder being further left of the plane of the center of the body or not trackable because it is leftward of the trunk may indicate a potential limited multi-segmental rotation screen characteristic. The screen point near the left shoulder being behind the screen point near the center of the body region may indicate no limited multi-segmental rotation screen characteristic. It should be appreciated that whether a limited multi-segmental rotation screen characteristic, a potential limited multi-segmental rotation screen characteristic, or no limited multi-segmental rotation screen characteristic is detected may vary up to about 15 degrees without departing from the spirit and scope of the presently disclosed technology. It should be appreciated that there are other methods as would be obvious to a person of ordinary skill in the art to implement the screen characteristic to identify a limited multi-segmental rotation screen characteristic. For example, other methods or techniques may be used to compare the screen points of interest to each other to indicate a limited multi-segmental rotation screen characteristic. While the above screen characteristic and others herein may be discussed as taking a physical screen from both sides, it should be appreciated that the presently disclosed technology may be able to detect both sides at the same time from a single perspective.

Using the screen points illustrated in FIG. 46, as an example, a limited seated windshield wipers, may be identified, detected, determined, generated, or otherwise returned based on analysis of at least the screen points on a hip region and/or leg regions. From a face on perspective, during a right foot rotating outward, an angle may be tracked or otherwise measured between a first line drawn from a screen point near a right ankle joint to a screen point near a right knee joint and another line extending vertically upward from the right ankle joint. Based on the angle, the conditioned screen characteristic model and/or the screen characteristic model may indicate there is a limited seated windshield wipers screen characteristic. An angle counterclockwise of the vertical line may be negative, and an angle clockwise of the vertical line may be positive. For example, an angle less than about 15 degrees may indicate a limited seated windshield wipers screen characteristic. An angle between about 15 degrees and about 30 degrees may indicate a potential limited seated windshield wipers screen characteristic. An angle greater than about 30 degrees may indicate no limited seated windshield wipers screen characteristic. During a left foot rotating outward, an angle may be tracked or otherwise measured between a first line drawn from a screen point near a left ankle joint to a screen point near a left knee joint and another line extending vertically upward from the left ankle joint. Based the angle, the conditioned screen characteristic model and/or the screen characteristic model may indicate there is a limited seated windshield wipers screen characteristic. An angle counterclockwise of the vertical line may be negative, and an angle clockwise of the vertical line may be positive. For example, an angle less than about 15 degrees may indicate a limited seated windshield wipers screen characteristic. An angle between about 15 degrees and about 30 degrees may indicate a potential limited seated windshield wipers screen characteristic. An angle greater than about 30 degrees may indicate no limited seated windshield wipers screen characteristic. It should be appreciated that these values and others discussed below with respect to screen characteristics may vary up to about 30 degrees for any angles without departing from the spirit and scope of the presently disclosed technology. It should be appreciated that there are other methods as would be obvious to a person of ordinary skill in the art to implement the screen characteristic to identify a limited seated windshield wipers screen characteristic. For example, other methods or techniques may be used to compare the screen points of interest to each other to indicate a limited seated windshield wipers screen characteristic. It should be appreciated that any lines or angles drawn, measured, or tracked, may be a part of screen point data, screen characteristic data, and/or screen recommendation data. For example, the lines or angles may become part of the screen points.

Using the screen points illustrated in FIG. 46, as an example, a limited 90/90 golf posture, may be identified, detected, determined, generated, or otherwise returned based on analysis of at least the screen points on a trunk region, arm regions, and/or head region. From a down the line perspective on the right side, during a right hand rotating forward and upward, an angle may be tracked or otherwise measured between a line drawn along a spine axis, and another line extending from a screen point near a right elbow joint to the right wrist joint. Based on the angle, the conditioned screen characteristic model and/or the screen characteristic model may indicate there is a limited 90/90 golf posture screen characteristic. An angle counter-clockwise of the spine axis may be positive, and an angle clockwise of the spine axis may be negative. For example, an angle less than about 3 degrees may indicate a limited 90/90 golf posture screen characteristic. An angle between about 3 degrees and about 7 degrees may indicate a potential limited 90/90 golf posture screen characteristic. An angle greater than about 7 degrees may indicate no limited 90/90 golf posture screen characteristic. From a down the line perspective on the left side, during a left hand rotating forward and upward, an angle may be tracked or otherwise measured between a line drawn along a spine axis, and another line extending from a screen point near a left elbow joint to the left wrist joint. Based on the angle, the conditioned screen characteristic model and/or the screen characteristic model may indicate there is a limited 90/90 golf posture screen characteristic. An angle counter-clockwise of the spine axis may be positive, and an angle clockwise of the spine axis may be negative. For example, an angle less than about 3 degrees may indicate a limited 90/90 golf posture screen characteristic. An angle between about 3 degrees and about 7 degrees may indicate a potential limited 90/90 golf posture screen characteristic. An angle greater than about 7 degrees may indicate no limited 90/90 golf posture screen characteristic. In some embodiments, each of the two lines discussed herein may be compared to a horizontal line. The two angles may be compared to indicate a limited 90/90 golf posture screen characteristic. It should be appreciated that there are other methods as would be obvious to a person of ordinary skill in the art to implement the screen characteristic to identify a limited 90/90 golf posture screen characteristic. For example, other methods or techniques may be used to compare the screen points of interest to each other to indicate a limited 90/90 golf posture screen characteristic.

Using the screen points illustrated in FIG. 46, as an example, a limited wrist flexion and extension, may be identified, detected, determined, generated, or otherwise returned based on analysis of at least the screen points on arm regions. From a down the line perspective on the right side with a player seated, during a right hand flexing, an angle may be tracked or otherwise measured between a line drawn from a screen point near a right wrist to a screen point near a right fingertip, and another line extending from the screen point near the right wrist along the right forearm axis. Based on the angle, the conditioned screen characteristic model and/or the screen characteristic model may indicate there is a limited wrist flexion and extension screen characteristic. An angle counter-clockwise of the right forearm axis may be negative, and an angle clockwise of the right forearm axis may be positive. For example, an angle less than about 45 degrees may indicate a limited wrist flexion and extension screen characteristic. An angle between about 45 degrees and about 55 degrees may indicate a potential limited wrist flexion and extension screen characteristic. An angle greater than about 55 degrees may indicate no limited wrist flexion and extension screen characteristic. During a right hand extending, the same angle may be tracked or otherwise measured. Based on the angle, the conditioned screen characteristic model and/or the screen characteristic model may indicate there is a limited wrist flexion and extension screen characteristic. An angle counter-clockwise of the right forearm axis may be positive, and an angle clockwise of the right forearm axis may be negative. For example, an angle less than about 45 degrees may indicate a limited wrist flexion and extension screen characteristic. An angle between about 45 degrees and about 55 degrees may indicate a potential limited wrist flexion and extension screen characteristic. An angle greater than about 55 degrees may indicate no limited wrist flexion and extension screen characteristic. From a down the line perspective on the left side, during a left hand flexing, an angle may be tracked or otherwise measured between a line drawn from a screen point near a left wrist to a screen point near a left fingertip, and another line extending from the screen point near the left wrist along the left forearm axis. Based on the angle, the conditioned screen characteristic model and/or the screen characteristic model may indicate there is a limited wrist flexion and extension screen characteristic. An angle counter-clockwise of the left forearm axis may be negative, and an angle clockwise of the left forearm axis may be positive. For example, an angle less than about 45 degrees may indicate a limited wrist flexion and extension screen characteristic. An angle between about 45 degrees and about 55 degrees may indicate a potential limited wrist flexion and extension screen characteristic. An angle greater than about 55 degrees may indicate no limited wrist flexion and extension screen characteristic. During a left hand extending, the same angle may be tracked or otherwise measured. Based on the angle, the conditioned screen characteristic model and/or the screen characteristic model may indicate there is a limited wrist flexion and extension screen characteristic. An angle counter-clockwise of the left forearm axis may be positive, and an angle clockwise of the left forearm axis may be negative. For example, an angle less than about 45 degrees may indicate a limited wrist flexion and extension screen characteristic. An angle between about 45 degrees and about 55 degrees may indicate a potential limited wrist flexion and extension screen characteristic. An angle greater than about 55 degrees may indicate no limited wrist flexion and extension screen characteristic. It should be appreciated that there are other methods as would be obvious to a person of ordinary skill in the art to implement the screen characteristic to identify a limited wrist flexion and extension screen characteristic. For example, other methods or techniques may be used to compare the screen points of interest to each other to indicate a limited wrist flexion and extension screen characteristic.

Using the screen points illustrated in FIG. 46, as an example, a limited wrist forearm supination and pronation, may be identified, detected, determined, generated, or otherwise returned based on analysis of at least the screen points on arm regions. From a face on perspective, during supination or pronation of a right hand, an angle may be tracked or otherwise measured between a line drawn at a starting position from a screen point near a right thumb upward, and the same line during the supination and/or pronation. Based on the angle, the conditioned screen characteristic model and/or the screen characteristic model may indicate there is a limited wrist forearm supination and pronation screen characteristic. For supination, an angle counter-clockwise of the starting line may be positive, and an angle clockwise of the starting line may be negative. For example, an angle less than about 65 degrees may indicate a limited wrist forearm supination and pronation screen characteristic. An angle between about 65 degrees and about 75 degrees may indicate a potential limited wrist forearm supination and pronation screen characteristic. An angle greater than about 75 degrees may indicate no limited wrist forearm supination and pronation screen characteristic. For pronation, an angle counter-clockwise of the starting line may be negative, and an angle clockwise of the starting line may be positive. For example, an angle less than about 65 degrees may indicate a limited wrist forearm supination and pronation screen characteristic. An angle between about 65 degrees and about 75 degrees may indicate a potential limited wrist forearm supination and pronation screen characteristic. An angle greater than about 75 degrees may indicate no limited wrist forearm supination and pronation screen characteristic. From a face on perspective, during supination or pronation of a left hand, an angle may be tracked or otherwise measured between a line drawn at a starting position from a screen point near a left thumb upward, and the same line during the supination and/or pronation. Based on the angle, the conditioned screen characteristic model and/or the screen characteristic model may indicate there is a limited wrist forearm supination and pronation screen characteristic. For supination, an angle counter-clockwise of the starting line may be negative, and an angle clockwise of the starting line may be positive. For example, an angle less than about 65 degrees may indicate a limited wrist forearm supination and pronation screen characteristic. An angle between about 65 degrees and about 75 degrees may indicate a potential limited wrist forearm supination and pronation screen characteristic. An angle greater than about 75 degrees may indicate no limited wrist forearm supination and pronation screen characteristic. For pronation, an angle counter-clockwise of the starting line may be positive, and an angle clockwise of the starting line may be negative. For example, an angle less than about 65 degrees may indicate a limited wrist forearm supination and pronation screen characteristic. An angle between about 65 degrees and about 75 degrees may indicate a potential limited wrist forearm supination and pronation screen characteristic. An angle greater than about 75 degrees may indicate no limited wrist forearm supination and pronation screen characteristic. It should be appreciated that there are other methods as would be obvious to a person of ordinary skill in the art to implement the screen characteristic to identify a limited wrist forearm supination and pronation screen characteristic. For example, other methods or techniques may be used to compare the screen points of interest to each other to indicate a limited wrist forearm supination and pronation screen characteristic.

Using the screen points illustrated in FIG. 46, as an example, a limited wide base deep squat, may be identified, detected, determined, generated, or otherwise returned based on analysis of at least the screen points on hip regions and/or leg regions. From a face on perspective, during the squat, a screen point near a center of the hip region may be tracked or otherwise measured and compared to a screen point near a center of either or both knee joints. In some embodiments, a horizontal line may be drawn across either or both knee joints. Based on comparing the screen point near the center of the hip region during the squat to a screen point near a center of either or both knee joints or the horizontal line, the conditioned screen characteristic model and/or the screen characteristic model may indicate there is a limited wide base deep squat screen characteristic. For example, the screen point near a center of the hip region being above the screen point near a center of either or both knee joints or the horizontal line may indicate a limited wide base deep squat screen characteristic. In some embodiments, the screen point near a center of the hip region being greater than about 3 inches above the screen point near a center of either or both knee joints or the horizontal line may indicate a limited wide base deep squat screen characteristic. The screen point near a center of the hip region being at the screen point near a center of either or both knee joints or the horizontal line may indicate a potential limited wide base deep squat screen characteristic. In some embodiments, the center of the hip region may no longer be visible and the lack of a screen point may indicate a potential limited wide base deep squat screen characteristic. In embodiments, the screen point near a center of the hip region being within 3 inches (i.e., above or below) of the screen point near a center of either or both knee joints or the horizontal line may indicate a potential limited wide base deep squat screen characteristic. The screen point near a center of the hip region being below the screen point near a center of either or both knee joints or the horizontal line may indicate no limited wide base deep squat screen characteristic. In some embodiments, the screen point near a center of the hip region being less than about 3 inches below the screen point near a center of either or both knee joints or the horizontal line may indicate no limited wide base deep squat screen characteristic. From a face on perspective, during the squat, the screen point near a center of the hip region may be tracked or otherwise measured and compared to a screen point near a center of either or both knee joints. In some embodiments, a vertical line may be drawn across either or both knee joints. Based on comparing the screen point near the center of the hip region during the squat to a screen point near a center of either or both knee joints or the vertical line, the conditioned screen characteristic model and/or the screen characteristic model may indicate there is a limited wide base deep squat screen characteristic. For example, the screen point near a center of the hip region being outside of the center of either or both knee joints or the vertical line may indicate a limited wide base deep squat screen characteristic. In some embodiments, the screen point near a center of the hip region being greater than about 0 inches away from the screen point near a center of either or both knee joints or the vertical line may indicate a limited wide base deep squat screen characteristic. The screen point near a center of the hip region being within about 0 inches and about 3 inches inside of the screen point near a center of either or both knee joints or the vertical line may indicate a potential limited wide base deep squat screen characteristic. The screen point near a center of the hip region being greater than about 3 inches inside the screen point near a center of either or both knee joints or the vertical line may indicate no limited wide base deep squat screen characteristic. In some embodiments, the screen point near a center of the hip region being less than about 3 inches below the screen point near a center of either or both knee joints or the vertical line may indicate no limited wide base deep squat screen characteristic. In some embodiments, both screen points near a center of the hip region being below the screen point near a center of either or both knee joints or the horizontal line may indicate no limited wide base deep squat screen characteristic and its variations and the screen point near a center of the hip region being less than about 3 inches below the screen point near a center of either or both knee joints or the vertical line may indicate no limited wide base deep squat screen characteristic and its variations may need to be met to indicate no limited wide base deep squat screen characteristic. It should be appreciated that these values and others discussed below with respect to screen characteristics may vary up to about 3 inches for any values measured in inches without departing from the spirit and scope of the presently disclosed technology. It should be appreciated that these values and others discussed below with respect to screen characteristics may vary up to about 3 inches for any values measured in inches without departing from the spirit and scope of the presently disclosed technology. It should be appreciated that there are other methods as would be obvious to a person of ordinary skill in the art to implement the screen characteristic to identify a limited wide base deep squat screen characteristic. For example, other methods or techniques may be used to compare the screen points of interest to each other to indicate a limited wide base deep squat screen characteristic.

Using the screen points illustrated in FIG. 46, as an example, a limited toe touch, may be identified, detected, determined, generated, or otherwise returned based on analysis of at least the screen points on leg regions, hip region, arm regions, and/or head region. From a down the line perspective, during the toe touch, a screen point near a center of the head region may be tracked or otherwise measured and compared to a screen point near a center of the hip region. In embodiments, an angle may be measured based on a line extending from a screen point near an ankle joint to a corresponding knee joint, and another line from the knee joint to a corresponding hip joint to ensure knees are not bent. In some embodiments, a screen point near a fingertip may be compared to a screen point between the feet toward the toes. Based on comparing the screen point near the center of the head region to the screen point near the center of the head region, the angle along the knees, and/or the screen point near a fingertip to a screen point between the feet toward the toes, the conditioned screen characteristic model and/or the screen characteristic model may indicate there is a limited toe touch screen characteristic. For example, an angle less than 175 degrees may indicate a limited toe touch screen characteristic. An angle between about 175 degrees and about 180 degrees may indicate a potential limited toe touch screen characteristic. In some embodiments, the screen point near a center of the head region being above the screen point near a center of the hip region may indicate a limited toe touch screen characteristic. In some embodiments, the screen point near a center of the head region being greater than about 3 inches above the screen point near a center of the hip region may indicate a limited toe touch screen characteristic. In embodiments, the screen point near a center of the head region being near the screen point near a center of the hip region may indicate a potential limited toe touch screen characteristic. In some embodiments, the screen point near a center of the head region being between about 0 inches and about 3 inches above the screen point near a center of the hip region may indicate a potential limited toe touch screen characteristic. In some embodiments, the screen point near a center of the head region being less than about 0 inches above the screen point near a center of the hip region may indicate a potential limited toe touch screen characteristic. In embodiments, the screen point near a fingertip being above the screen point between the feet toward the toes may indicate a limited toe touch screen characteristic. In embodiments, the screen point near a fingertip being about 3 inches above the screen point between the feet toward the toes may indicate a limited toe touch screen characteristic. In some embodiments, the screen point near a fingertip being between 0 inches and about 3 inches above the screen point between the feet toward the toes may indicate a potential limited toe touch screen characteristic. In embodiments, the screen point near a fingertip being less than about 0 inches above the screen point between the feet toward the toes may indicate a potential limited toe touch screen characteristic. In some embodiments, the angle equal to or greater than about 180 degrees may indicate, the screen point near a center of the head region below the screen point near a center of the hip region, and the screen point near a fingertip being at or below the screen point between the feet toward the toes may indicate no limited toe touch screen characteristic. In embodiments, the angle equal to or greater than about 180 degrees may indicate, the screen point near a center of the head region less than about 0 inches above the screen point near a center of the hip region, and the screen point near a fingertip being less than about 0 inches the screen point between the feet toward the toes may indicate no limited toe touch screen characteristic. It should be appreciated that these values and others discussed below with respect to screen characteristics may vary up to about 3 inches for any values measured in inches without departing from the spirit and scope of the presently disclosed technology. It should be appreciated that there are other methods as would be obvious to a person of ordinary skill in the art to implement the screen characteristic to identify a limited toe touch screen characteristic. For example, other methods or techniques may be used to compare the screen points of interest to each other to indicate a limited toe touch screen characteristic.

Using the screen points illustrated in FIG. 46, as an example, a limited standing shoulder flexion, may be identified, detected, determined, generated, or otherwise returned based on analysis of at least the screen points on arm regions and/or head regions. From a down the line perspective on the right, during rotation of a right hand, a line may be tracked from a screen point near a right shoulder joint to a screen point near a right elbow joint and compared to one or more screen point on the head region, including a screen point near a nose and/or right ear. In some embodiments, another line may be tracked that extends horizontally from the right elbow joint. An angle may be measured between the line and the horizontal line. Based on comparing the line and screen points of interest and/or the angle, the conditioned screen characteristic model and/or the screen characteristic model may indicate there is a limited standing shoulder flexion screen characteristic. For rotation of the right hand, an angle counter-clockwise of the horizontal line may be positive, and an angle clockwise of the horizontal line may be negative. For example, the line being at or below a screen point near the nose may indicate a limited standing shoulder flexion screen characteristic. The line being between a screen point near the nose and the screen point near the right ear may indicate a potential limited standing shoulder flexion screen characteristic. The line being above the screen point near the ear may indicate no limited standing shoulder flexion screen characteristic. In some embodiments, an angle less than about 65 degrees may indicate a limited standing shoulder flexion screen characteristic. An angle between about 65 degrees and about 80 degrees may indicate a potential limited standing shoulder flexion screen characteristic. An angle greater than about 80 degrees may indicate no standing shoulder flexion screen characteristic. From a down the line perspective on the left, during rotation of a left hand, a line may be tracked from a screen point near a left shoulder joint to a screen point near a left elbow joint and compared to one or more screen point on the head region, including a screen point near a nose and/or left ear. In some embodiments, another line may be tracked that extends horizontally from the left elbow joint. An angle may be measured between the line and the horizontal line. Based on comparing the line and screen points of interest and/or the angle, the conditioned screen characteristic model and/or the screen characteristic model may indicate there is a limited standing shoulder flexion screen characteristic. For rotation of the left hand, an angle counterclockwise of the horizontal line may be positive, and an angle clockwise of the horizontal line may be negative. For example, the line being at or below a screen point near the nose may indicate a limited standing shoulder flexion screen characteristic. The line being between a screen point near the nose and the screen point near the left ear may indicate a potential limited standing shoulder flexion screen characteristic. The line being above the screen point near the ear may indicate no limited standing shoulder flexion screen characteristic. In some embodiments, an angle less than about 65 degrees may indicate a limited standing shoulder flexion screen characteristic. An angle between about 65 degrees and about 80 degrees may indicate a potential limited standing shoulder flexion screen characteristic. An angle greater than about 80 degrees may indicate no standing shoulder flexion screen characteristic.

It should be appreciated that the above methods/techniques are merely exemplary, and that there may be other methods as would be obvious to a person of ordinary skill in the art to implement the screen characteristics to identify one or more of screen characteristics discussed herein. For example, other methods or techniques may be used to compare the screen points of interest to each other to indicate a given screen characteristic. As an example, angles between one or more screen points may be tracked, distances and/or positions between screen points may be tracked, the angles, distances, and/or positions may be tracked as a function of position and/or time. In embodiments, the conditioned screen characteristic model and/or the screen characteristic model may attribute the identified screen characteristic to the screen point(s), the object, the time, and/or other elements. In some embodiments, no screen characteristics may be determined, identified, generated, or otherwise returned for a set of screen point data. It should be appreciated that other camera perspectives may be used without departing from the spirit and scope of the presently disclosed technology.

In some embodiments, two or more screen characteristics may be detected. In embodiments, all of the detected screen characteristics may be identified to the user. In some embodiments, a subset of the detected screen characteristics may be identified to the user. In embodiments, the subset of the detected screen characteristics may be presented based on a priority of the screen characteristics. For example, the priority may be based on affecting the greatest change in a player's screen, such that improving a prioritized detected screen characteristic improves a player's screen more than improving any other detected screen characteristic. In some embodiments, the priority may be based on how easy it is perceived to be to improve a screen characteristic of the detected screen characteristics.

Referring back to FIG. 3C, in some embodiments, screen characteristic model component 308C may be configured to generate or obtain a conditioned screen characteristic model. The conditioned screen characteristic model may be generated by training the initial screen characteristic model using training screen point data and training screen characteristic data. In embodiments, the conditioned screen characteristic model is "conditioned," indicating the conditioned screen characteristic model may have been trained to optimize performance and/or improve accuracy of the initial screen characteristic model, as discussed herein. For example, the conditioned screen characteristic model may more accurately output screen characteristic data based on screen point data and/or other input. In embodiments, the conditioned screen characteristic model may have generated a set of screen characteristic relationships between the screen point data and the screen characteristic data. In some embodiments, the conditioned screen characteristic model may have been stored and screen characteristic model component 308C may retrieve or obtain the conditioned screen characteristic model from storage.

Training the initial screen characteristic model may include applying the training screen point data and/or other input to the initial screen characteristic model based on an initial set of screen characteristic relationships between the screen point data and the screen characteristic data to generate a first iteration of screen characteristic data. The initial screen characteristic model may be adjusted to more accurately generate the screen characteristic data based on differences between the first iteration of the screen characteristic data and the ground truth input that corresponds to the initial training screen point data and/or other input. As an example, the ground truth input may be pre-identified, pre-labeled, or otherwise pre-annotated to identify or correspond to one or more screen characteristics during the screen represented by the screen points. This tuning, training, and validation cycle may be repeated numerous times until the initial screen characteristic model is "conditioned," as discussed herein. In some embodiments, the conditioned screen characteristic model may find a screen characteristic relationship or screen characteristic pattern that a specific movement of the screen points as a function of time throughout different parts of the physical screens indicate which of the one or more screen characteristics correspond to the screen point data. For example, as discussed herein, during training, the initial screen characteristic model may determine that movement of screen points on the arm regions as a function of time indicate a limited standing shoulder flexion screen characteristic.

In some embodiments, screen characteristic model component 308C may be configured to store the conditioned screen characteristic model. It can be stored the same as, or substantially similar to, how the conditioned screen characteristic model is stored.

Screen point component 310C may be configured to obtain training screen point data. Screen point component 310C may be the same as, or substantially similar to, screen point component 312B. The training screen point data may be used to train an initial screen characteristic model, as discussed herein. The training screen point data may be generated, extracted, converted, derived, or otherwise processed from the annotated screen images as discussed herein and/or the training screen point data may be generated by system 300B as discussed herein. The screen points may be in a structured data format or visually presented, as discussed herein. The target screen characteristic data may correspond to the target screen point data. The training screen point data may be stored as discussed herein.

In embodiments, the training screen point data may correspond to the training screen characteristic data. In some embodiments, the training screen characteristic data may be derived, converted, extracted, or otherwise processed from the training screen point data using existing screen characteristic relationships between screen point data and screen characteristic data, such as, for example, screen image properties, poses, pre-labeled images, pre-annotated images, expert review and/or analysis, and/or other models/information.

In some embodiments, screen point component 310C may be configured to obtain target screen point data. The target screen point data may be used to generate target screen characteristic data by applying the conditioned screen characteristic model and/or the screen characteristic model to the target screen point data. The target screen point data may be screen point data derived, converted, extracted, or otherwise processed from a target screen image set as discussed herein. A set of screen points may correspond to a frame from the target screen image set. The set of screen points may be organized temporally. The target screen point data may be the same as, or substantially similar to, the target screen point data discussed herein with respect to system 300B.

Screen characteristic component 312C may be configured to obtain training screen characteristic data. Training screen characteristic data and/or target screen characteristic data may be used interchangeably with training golf screen characteristic data and/or target golf screen characteristic data, respectively, herein. The training screen characteristic data may be used to train an initial screen characteristic model, as discussed herein. In some embodiments, a portion of the training screen characteristic data may be set aside and used to validate a conditioned screen characteristic model and/or the screen characteristic model. The training screen characteristic data may be generated by deriving, extracting, converting, or otherwise processing screen characteristics from the training screen point data. The screen characteristic data may be put into a structured data format with screen point data, screen point positions, time, object data, and/or other metadata or used visually in a virtual space. The object data may include which object and/or corresponding screen points the screen characteristic corresponds to, where the object is located in the image, metadata on the object, and/or other annotations as discussed herein. The training screen characteristic data may correspond to the training screen point data. The training screen characteristic data may be stored as discussed herein.

Screen characteristic component 312C may be configured to generate target screen characteristic data. The target screen characteristic data may be generated by applying the conditioned screen characteristic model and/or the screen characteristic model to the target screen point data. As discussed herein, the conditioned screen characteristic model can accurately estimate and/or generate the target screen characteristic data using the target screen point data as input because the conditioned screen characteristic model has been "trained" or "conditioned." As an example, the target screen characteristic data may include one or more screen characteristics with screen point data, screen point positions, time, object data, and/or other metadata, as discussed herein. The target screen characteristic data may correspond to the target screen point data.

Screen characteristic representation component 314C may be configured to generate a screen characteristic representation of the screen point data using visual effects to depict at least a portion of the screen point data, as discussed herein. Screen characteristic representation may be used interchangeably with golf screen characteristic representation herein. Screen characteristic representation component 314C may be the same as, or substantially similar to, screen point representation component 314B with respect to the screen image set.

Screen characteristic representation component 314C may be configured to generate a screen characteristic representation of the screen characteristic data using visual effects to depict at least a portion of the screen characteristic data. This may be accomplished by the one or more physical computer processors. The screen characteristic representation of the screen characteristic data may be used by one or more physical computer processors in a computer vision process. In some embodiments, a visual effect may include one or more visual transformations of the screen characteristic representation. In some embodiments, one or more screen characteristics, screen points, lines, angles, positions, distances, and/or other information/data discussed herein with respect to system 300C may be visualized. In embodiments, the one or more screen characteristics, screen points, lines, angles, positions, distances, and/or other information/data discussed herein may be overlaid on top of a screen image on a relevant frame by frame basis. In some embodiments, the one or more screen characteristics may be presented on a separate page or screen and/or presented with the relevant screen image. Such data may be stored and/or displayed.

Screen characteristic representation component 314C may be configured to display the screen characteristic representation. The screen characteristic representation may be displayed on a graphical user interface and/or other displays, as discussed herein. System 300C may include one or more output devices such as a display, speakers, printer, haptic feedback, and so on. System 300C may include one or more output devices such as a display, speakers, printer, haptic feedback, and so on.

In some embodiments, server 302C, client computing platform 304C, and/or external resources 328C may be operatively linked via an electronic communication link. For example, the electronic communication link may be established, at least in part, via a network such as, the internet and/or other networks. It should be appreciated that server 302C, client computing platform 304C, and/or external resources 328C may be operatively linked via other communication media.

Client computing platform 304C may include a processor to execute computer program components as discussed herein. The computer program components may enable a user corresponding to client computing platform 304C to interface with system 300C and/or external resources 328C and/or provide other functionality attributed herein to client computing platform 304C. For example, client computing platform 304C may include a mobile device, smartphone, desktop computer, laptop computer, handheld computer, tablet computing platform, netbook, gaming console, smart device, wearable, another input device, and/or other computing platforms.

External resources 328C may include information sources outside of system 300C, external entities interacting with system 300C, and/or other resources. In some embodiments, some or all of the functionality attributed herein to external resources 328C may be provided by resources included in system 300C.

Server 302C may include electronic storage 330C, processor 332C, and/or other components. Server 302C may include communication lines or ports to enable exchange of information within a network, with a network, and/or other computing platforms. It should be appreciated that the illustration of server 302C in FIG. 3C is not intended to be limiting. For example, server 302C may be implemented by a cloud of computing platforms operating together as server 302C.

Electronic storage 330C may include storage media that electronically store information, such as, for example, data and/or other digital information. The electronic storage media of electronic storage 330C may include system storage that is provided integrally (i.e., substantially non-removable) with server 302C and/or removable storage that is removably connectable to server 302C via, for example, a port (e.g., a USB port, a firewire port, digital port, and/or other ports) or a drive (e.g., a disk drive, thumb drive, and/or other drives). Electronic storage 330C may include non-transitory storage media, non-transient electronic storage, optically readable storage media (e.g., optical disks and/or other optically readable storage media), magnetically read-able storage media (e.g., magnetic tape, magnetic hard drive, floppy drive, and/or other magnetically readable storage media), electrical charge-based storage media (e.g., EEPROM, RAM, and/or other electrical charge-based stor-age media), solid-state storage media (e.g., flash drive and/or other solid-state storage media), and/or other electronically readable storage media. Electronic storage 330C may include a virtual storage resource (e.g., cloud storage, a virtual private network, and/or other virtual storage resources). Electronic storage 330C may store software algorithms, information determined, generated, and/or oth-erwise processed by processor 332C, information received from server 302C, information received from client com-puting platform 304C, and/or other information that enables server 302C to function as described herein. It should be appreciated that the information may be stored in its natural and/or raw format (e.g., data lakes).

Processor 332C may provide information processing capabilities in server 302C. For example, processor 332C may include a physical computer processor, a digital pro-cessor, an analog processor, a digital circuit designed to process information, an analog circuit designed to process information, a state machine, and/or other mechanisms for electronically processing information. Although processor 332C is shown in FIG. 3C as a single entity, this is for illustrative purposes only. In some embodiments, processor 332C may include a plurality of processing units. These processing units may be physically or geographically located or packaged within the same device, or processor 332C may represent processing functionality of a plurality of devices operating in coordination. Processor 332C may execute components 308C, 310C, 312C, 314C, and/or other components by software, hardware, firmware, and/or other mechanisms for configuring processing capabilities on pro-cessor 332C. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 308C, 310C, 312C, and 314C are illustrated in FIG. 3C as being implemented within a single processing unit, in embodi-ments, for example, in which processor 332C includes multiple processing units, one or more of components 308C, 310C, 312C, and/or 314C may be implemented remotely from other components. The description of the functionality provided by the different components 308C, 310C, 312C, and/or 314C described herein is for illustrative purposes, and is not intended to be limiting, as any of components 308C, 310C, 312C, and/or 314C may provide more or less functionality than is described. For example, one or more of components 308C, 310C, 312C, and/or 314C may be elimi-nated, and some or all of its functionality may be provided by other ones of components 308C, 310C, 312C, and/or 314C. For example, processor 332C may execute an addi-tional component that may perform some or all of the functionality attributed herein to components 308C, 310C, 312C, and/or 314C.

Figure 3D:
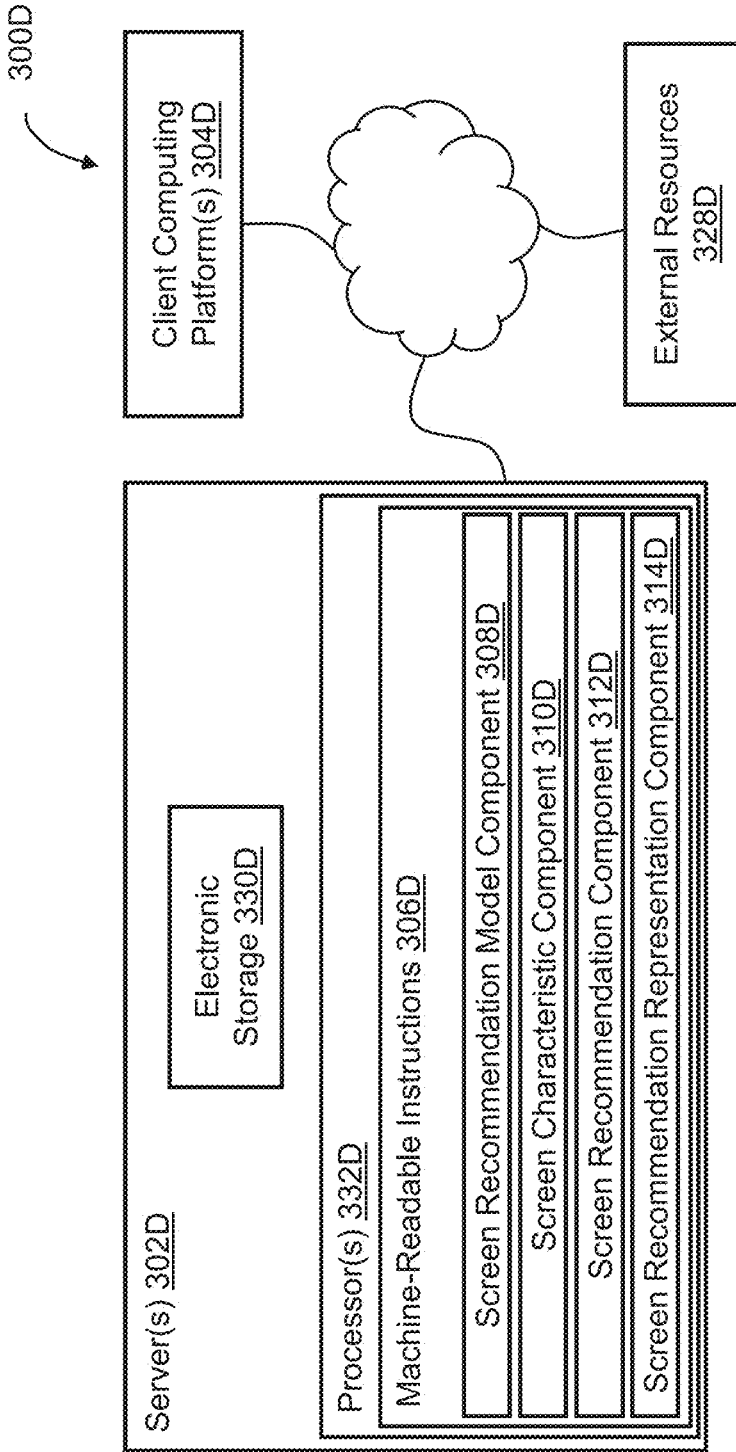
FIG. 3D illustrates a system for generating screen recommendation data in accordance with one or more embodiments of the presently disclosed technology.

FIG. 3D illustrates a system for generating screen recom-mendation data in accordance with one or more embodiments of the presently disclosed technology. In some embodiments, system 300D may include server 302D. Server 302D may be configured to communicate with client computing platform 304D according to an architecture, including, for example, a client/server architecture and/or other architectures. Client computing platform 304D may be configured to communicate with other client computing platforms via server 302D, peer-to-peer architecture, and/or other architectures. Users may access system 300D via client computing platform 304D.

Server 302D may be configured by machine readable instructions 306D. Machine readable instructions 306D may include an instruction component (not shown). The instruc-tion component may include computer program component (s). For example, the instruction component may include screen recommendation model component 308D, screen characteristic component 310D, screen recommendation component 312D, screen recommendation representation component 314D, and/or other instruction components.

Screen recommendation model component 308D may be configured to obtain an initial screen recommendation model. Initial screen recommendation model, conditioned screen recommendation model, and/or screen recommenda-tion model may be used interchangeably with initial golf screen recommendation model, conditioned golf screen rec-ommendation model, and/or golf screen recommendation model, respectively, herein. The initial screen recommenda-tion model may be based on machine-learning techniques, as discussed herein, to map at least one variable to another variable. For example, the initial screen recommendation model may receive screen characteristic data and/or other input and output screen recommendation data. The initial screen recommendation model may be "untrained" or "unconditioned," as discussed herein. The screen character-istic data may specify screen characteristics as a function of time, objects, and/or poses.

Screen recommendations may be one or more recommen-dations for a player. Screen recommendations may be used interchangeably with golf screen recommendations herein. The screen recommendations may be based on one or more identified or detected screen characteristics. The screen recommendations may include exercises, drills, equipment, other prescriptions, and/or why a prescription was given. For example, exercises may include strength training (e.g., bar-bell exercises, dumbbell exercises, kettlebell exercises, weight machines, resistance bands, resistance training, bodyweight exercises, and so on), cardio (e.g., biking, running, swimming, rowing, jumping rope, cardio machines, jumping jacks, and so on), low impact training (e.g., yoga, pilates, and so on), high impact interval training (i.e., workout method that alternates between short bursts of intense exercises with brief recovery periods), and/or other exercises. For example, the exercises may include squats, hip rotations, 360 jumps, 4×4 matrix, 90/90/90 oblique stretches, assisted lateral tibia rotation, cariocas, bird dogs, assisted medial tibial rotation, clam shells, cross body hip hinge, hip drops, hip hikers, active leg lowering, side lying straight leg raise, foam roller, front leg swings, glute stretch prone, inchworms, jackknife situps, A-frame stretch, criss cross crunch, disassociation planks, flow row, reverse lunges, supermans, bell-up get-up, arm circles, box presses, butt presses, chops, dumbbell windmills, flex t presses, kettle bell-up holds, kettlebell bell-up walks, wrist flexion stretches, fish tails, j-turn, wrist extension stretch, dumbbell shoulder taps, half kneeling trunk curls, reverse curl-ups, neutral pelvis hip drops, ankle rocking, supine arm reaches, saws palms up, quadruped hip circles, press-up holds, single leg standing hip stretch, open books, saws palms down, and so on. Drills may include water drill, trail foot rotary chair drill, lead foot rotary chair drill, arms not body, windmill turns and swing, palm up club lifts, and so on. It should be appreciated that other exercises and/or drills may be included without departing from the spirit and scope of the presently disclosed technology. Equipment may include golf clubs, golf balls, golf bags, clothes, shoes, range finder, tees, ball markers, golf glove, and so on. Why a prescription was given may include explaining that drills relating to a limited wide base deep squat are provided because a limited wide base deep squat screen characteristic was detected. In embodiments, user input (e.g., static input, dynamic input, and so on) may be used to affect what is recommended to a player. For example, a user may have manually entered, selected, or otherwise indicated a preference for low impact training. As a result, screen recommendations may favorably weight, prioritize, add a preference for, or only present low impact training screen recommendations. In some embodiments, static input may be characteristics that do not change during a physical screen, golf swing or shot, such as characteristics of the golf equipment used or of the golfer. Static input may include golfer characteristics, golf-equipment characteristics, and/or other input. Golfer characteristics may include at least one of gender, height, weight, age, handicap, handedness, arm length, or hand size. The golf-equipment characteristics may include at least one of club head model, club head lie, club head loft, club head adjustable settings, club head grind, club head bounce, shaft flex, shaft length, shaft torque, grip size, golf ball model, golf ball compression, golf ball cover material, or golf ball number of layers. Dynamic input may be captured or generated from one or more performance tracking devices. Dynamic input may include golf club swing characteristics. The golf club swing characteristics may include at least one of swing data of the golf club, ball-flight data, force data, motion-capture data, or electromyography data. It should be appreciated that golf club swing characteristic may be differentiated from screen characteristics discussed herein. In embodiments, screen recommendations may be personalized based on prior golf shots, injury data (i.e., previous or current injuries affecting a screen), equipment data (e.g., prior golf equipment, current golf equipment and so on), other static input, and/or other dynamic input. Static input and dynamic input may be manually entered by a user, automatically detected, or otherwise entered.

In some embodiments, screen recommendation model component 308D may be configured to obtain a screen recommendation model. The screen recommendation model may receive or obtain screen characteristic data and process the screen characteristic data into screen recommendation data. The screen recommendation model may generate, identify, or otherwise provide screen recommendation data based on a given screen characteristic that is detected. For example, the screen recommendation model may recommend one or more screen exercises and drills based on a detected limited multi-segmental rotation screen characteristic. It should be appreciated that there may be overlap between one or more screen recommendations based on a given screen characteristic. For example, one or more screen recommendations based on detecting a limited seated windshield wipers screen characteristic may also be recommended based on detecting a limited toe touch screen characteristic. The screen recommendation model may use screen recommendation relationships, discussed herein, between the input and the validated output. Screen recommendation relationships may be used interchangeably with golf screen recommendation relationships herein. For example, a screen recommendation relationship may determine that a core exercise should be recommended for a detected limited wide base deep squat screen characteristic.

As examples of screen recommendations, based on detecting a limited multi-segmental rotation screen characteristic, 360 jumps, 4×4 matrix, 90/90/90 oblique stretches, assisted lateral tibia rotation, cariocas, fish tails, bird dogs, assisted medial tibial rotation, clam shells, cross body hip hinge, hip drops, hip hikers, and/or other exercises may be recommended. In some embodiments, a trail foot rotary chair drill and/or other drills may be recommended based on detecting a limited multi-segmental rotation screen characteristic. It should be appreciated that the one or more exercises and/or drills may be known by a person of ordinary skill in the art. For example, a trail foot rotary chair drill may refer to sitting on a rotary stool with a trail foot on the ground and a lead foot elevated. Begin by pushing the chair laterally toward the lead side using the inside heel of the trail foot. Try to make the chair move laterally and slightly forward as fast as possible. In some embodiments, a 90 degree counterclockwise turn (for a right-handed player) may be added. In embodiments, a full 180 degree turn in the same direction may be added. As an example, system 100D may output a recommendation (e.g., displayed text, provide audio output, and the like) that one or more of these exercises and/or drills are recommended based on detecting a limited multi-segmental rotation screen characteristic.

Based on detecting a limited seated windshield wipers screen characteristic, neutral pelvis hip drops, bell-up get-up, cariocas, and/or other exercises may be recommended. In some embodiments, lead foot rotary chair drill, trail foot rotary chair drill, and/or other drills may be recommended based on detecting a limited seated windshield wipers screen characteristic. For example, a lead foot rotary chair drill may refer to sitting on a rotary stool with a lead foot on the ground and a trail foot elevated off the ground. Begin by pushing the chair straight backwards using the ball of the lead foot. In some embodiments, a 180 degree counterclockwise turn (for a right-handed player) may be added as the chair is pushed backwards. In embodiments, a full 360 degree turn may be added in the same direction. As an example, one or more of the exercises and/or drills may be presented to the user. A user may select one or more of the exercises and/or drills to get more information about a given exercise or given drill. The additional information may be a video, audio, visuals, and/or text describing how to perform the exercise and/or drill. The additional information may include why one or more of the exercises and/or drills was presented. In embodiments, the additional information may be overlaid on a screen image, screen points, and/or other data discussed herein, presented next to the screen image, screen points, and/or other data, or presented on a different page or screen than the screen image, screen points, and/or other data. Such data may be stored and/or displayed.

Based on detecting a limited 90/90 golf posture screen characteristic, a 4×4 matrix, A-frame stretch, arm circles, box presses, butt presses, chops, dumbbell windmills, flex t presses, and/or other exercises may be recommended. In some embodiments, one or more drills may be recommended based on detecting a limited 90/90 golf posture screen characteristic. As an example, a user may have indicated a preference for strength training. The conditioned screen recommendation model and/or screen recommendation model may have found one or more strength training exercises that strengthen the shoulder. As such, single arm landmine presses, or other strength-training-type exercises may be presented. Selecting one or more of these exercises may provide additional information about these exercises as discussed herein. For example, the audio, visual, or text indicating one or more of these exercises may be hyperlinked to the additional information. System 300D may indicate that one of these exercises was presented because a user indicated a preference for strength training and/or a limited 90/90 golf posture screen characteristic was detected. In some embodiments, system 300D may indicate that these exercises focus on improving the shoulder mobility, which should help minimize the limited 90/90 golf posture screen characteristic, such that the limited 90/90 golf posture screen characteristic will no longer be detected based on continued training and focus on the screen recommendations.

Based on detecting a limited wrist flexion and extension screen characteristic, a kettle bell bell-up holds, kettlebell bell-up walks, wrist flexion stretches, wrist extension stretches, and/or other exercises may be recommended. In some embodiments, forehand topspin drill and/or other drills may be recommended based on detecting a limited wrist flexion and extension screen characteristic. As an example, a user may have indicated a preference for yoga. As such, the screen recommendations presented may include downward facing dog, cat cow poses, table top pose, crane pose, crow pose, and/or other yoga-type exercises. In some embodiments, alternative screen recommendations may be viewable. The alternative screen recommendations may include the exercises discussed herein, and/or other screen recommendations. System 300D may indicate that these are alternate screen recommendations because a user indicated a preference for yoga and/or a limited wrist flexion and extension screen characteristic was detected. In some embodiments, system 300D may indicate that these exercises focus on improving the wrist flexion and extension, which should help minimize the limited wrist flexion and extension screen characteristic, such that the limited wrist flexion and extension screen characteristic will no longer be detected based on continued training and focus on the screen recommendations.

Based on detecting a limited wrist forearm supination and pronation screen characteristic, dumbbell shoulder taps, dumbbell windmills, kettlebell bell-up holds, and/or other exercises may be recommended. In some embodiments, forehand topspin drill and/or other drills may be recommended based on detecting a limited wrist forearm supination and pronation screen characteristic.

Based on detecting a limited wide base deep squat screen characteristic, 4×4 matrix, A-frame stretch, assisted lateral tibia rotation, bird dogs, assisted medial tibial rotation, and/or other exercises may be recommended. In some embodiments, a palm up club lifts and/or other drills may be recommended based on detecting a limited wide base deep squat screen characteristic. For example, a palm up club lifts drill may refer to grabbing a 5-iron about shoulder width apart and holding it in front with the palms facing up. Press the club out in front of the body and slowly raise the club up above your head. As an example, system 300D may recommend, as discussed herein, moving closer to the ball based on detecting a limited wide base deep squat screen characteristic. As an example, a lighter shaft, or shaft that is less stiff may be recommended.

Based on detecting a limited toe touch screen characteristic, 4×4 matrix, active leg lowering, side lying straight leg raise, foam roller, front leg swings, glute stretch prone, inchworms, jackknife situps, and/or other exercises may be recommended. In some embodiments, one or more drills may be recommended based on detecting a limited toe touch screen characteristic.

Based on detecting a limited standing shoulder flexion screen characteristic, A-frame stretch, bird dogs, bell-up get-up, chops, flex t presses, supermans, and/or other exercises may be recommended. In some embodiments, one or more drills may be recommended based on detecting a limited standing shoulder flexion screen characteristic.

In some embodiments, two or more screen characteristics may be detected, as discussed herein. In embodiments, all of the detected screen characteristics may be identified to the user. In some embodiments, a subset of the detected screen characteristics may be identified to the user. As discussed herein, screen characteristics may be presented based on a priority of the screen characteristics. In embodiments, screen recommendations may be provided even though a corresponding screen characteristic was not detected. For example, even though no limited multi-segmental rotation screen characteristic was detected, an exercise may be recommended that is not normally identified for the given screen characteristic. In some embodiments, no screen characteristic may be detected. As such, no screen recommendation may be given. In some embodiments, screen recommendations may be provided based on static inputs or dynamic inputs. In embodiments, a unilateral issue may be detected as discussed herein. As such, screen recommendations may only be directed to mobility of a left hip, as an example, as opposed to both hips. In some embodiments, even though a unilateral issue is detected, a bilateral recommendation may be provided.

Referring back to FIG. 3D, in some embodiments, screen recommendation model component 308D may be configured to generate or obtain a conditioned screen recommendation model. The conditioned screen recommendation model may be generated by training the initial screen recommendation model using training screen characteristic data and training screen recommendation data. In embodiments, the conditioned screen recommendation model is "conditioned," indicating the conditioned screen recommendation model may have been trained to optimize performance and/or improve accuracy of the initial screen recommendation model, as discussed herein. For example, the conditioned screen recommendation model may more accurately output screen recommendation data based on screen characteristic data and/or other input. In embodiments, the conditioned screen recommendation model may have generated a set of screen recommendation relationships between the screen characteristic data and the screen recommendation data. The screen recommendation relationships may be generated by determining a pattern or connection between the input and the validated output. For example, a screen recommendation relationship may determine that a screen characteristic should be improved by a set of screen recommendations. This may come from collecting expert opinions on the swing characteristics, related art, and so on or training on a collection of exercises, drills, and/or other prescriptions and explanations. Validation of this swing recommendation relationship may further strengthen the swing recommendation relationship. In some embodiments, the conditioned screen recommendation model may have been stored and screen recommendation model component 308D may retrieve or obtain the conditioned screen recommendation model from storage.

Training the initial screen recommendation model may include applying the training screen characteristic data and/or other input to the initial screen recommendation model based on an initial set of screen recommendation relationships between the screen characteristic data and the screen recommendation data to generate a first iteration of screen recommendation data. The initial screen recommendation model may be adjusted to more accurately generate the screen recommendation data based on differences between the first iteration of the screen recommendation data and the ground truth input that corresponds to the initial training screen characteristic data and/or other input. As an example, the ground truth input may be pre-identified, pre-labeled, or otherwise pre-annotated to identify or correspond to one or more screen recommendations for a given screen characteristic. This tuning, training, and validation cycle may be repeated numerous times until the initial screen recommendation model is "conditioned," as discussed herein. In some embodiments, the conditioned screen recommendation model may find a set of screen recommendation relationships or screen recommendation patterns connecting the one or more screen characteristics to the one or more screen recommendations.

In some embodiments, screen recommendation model component 308D may be configured to store the conditioned screen recommendation model. It can be stored the same as, or substantially similar to, how the conditioned screen image model is stored.

Screen characteristic component 310D may be configured to obtain training screen characteristic data. Screen characteristic component 310D may be the same as, or substantially similar to, screen characteristic component 312C. The training screen characteristic data may be used to train an initial screen recommendation model, as discussed herein. In some embodiments, the training screen characteristic data may be used to validate a conditioned screen recommendation model and/or screen recommendation model. The training screen characteristic data may be generated by deriving, extracting, converting, or otherwise processing screen characteristics from the training screen point data as discussed herein and/or the training screen point data may be generated by system 300C as discussed herein. The screen characteristic data may be put into a structured data format with screen point data, screen point positions, time, object data, and/or other metadata. The object data may include which object and/or corresponding screen points the screen characteristic corresponds to, where the object is located in the image, metadata on the object, and/or other annotations as discussed herein. The training screen characteristic data may be stored as discussed herein.

In embodiments, the training screen characteristic data may correspond to the training screen recommendation data. In some embodiments, the training screen recommendation data may be derived, converted, extracted, or otherwise processed from the training screen characteristic data using existing screen recommendation relationships between screen characteristic data and screen recommendation data, such as, for example, poses, pre-labeled images, pre-annotated images, expert review and/or analysis, and/or other models/information.

In some embodiments, screen characteristic component 310D may be configured to obtain target screen characteristic data. The target screen characteristic data may be used to generate target screen recommendation data by applying the conditioned screen recommendation model and/or screen recommendation model to the target screen characteristic data. The target screen characteristic data may be screen characteristic data derived, converted, extracted, or otherwise processed from target screen point data as discussed herein. A detected screen characteristic may correspond to one or more frames of the screen point data. The screen characteristics may be organized temporally, based on recommended exercises, screen poses, positions, and/or otherwise organized. The target screen characteristic data may be the same as, or substantially similar to, the target screen characteristic data discussed herein with respect to system 300C.

Screen recommendation component 312D may be configured to obtain training screen recommendation data. Training screen recommendation data and/or target screen recommendation data may be used interchangeably with training golf screen recommendation data and/or target golf screen recommendation data, respectively, herein. The training screen recommendation data may be used to train an initial screen recommendation model, as discussed herein. In some embodiments, a portion of the training screen recommendation data may be set aside and used to validate a conditioned screen recommendation model and/or screen recommendation model. The training screen recommendation data may be generated by deriving, extracting, converting, or otherwise processing screen recommendation data from the training screen characteristic data. The screen recommendation data may be put into a structured data format with screen characteristic data, screen point data, screen point positions, time, object data, and/or other metadata. The training screen recommendation data may correspond to the training screen characteristic data. The training screen recommendation data may be stored as discussed herein.

Screen recommendation component 312D may be configured to generate target screen recommendation data. The target screen recommendation data may be generated by applying the conditioned screen recommendation model and/or the screen recommendation model to the target screen characteristic data. As discussed herein, the conditioned screen recommendation model can accurately estimate and/or generate the target screen recommendation data using the target screen characteristic data as input because the conditioned screen recommendation model has been "trained" or "conditioned." As an example, the target screen recommendation data may include one or more screen recommendations with screen characteristic data, screen point data, screen point positions, time, object data, and/or other metadata, as discussed herein. The target screen recommendation data may correspond to the target screen characteristic data.

Screen recommendation representation component 314D may be configured to generate a screen recommendation representation of the screen characteristic data using visual effects to depict at least a portion of the screen characteristic data, as discussed herein. Screen recommendation representation may be used interchangeably with golf screen recommendation representation herein. Screen recommendation representation component 314D may be the same as, or substantially similar to, screen characteristic representation component 314C with respect to the screen characteristic data.

Screen recommendation representation component 314D may be configured to generate a screen recommendation representation of the screen recommendation data using visual effects to depict at least a portion of the screen recommendation data. This may be accomplished by the one or more physical computer processors. In some embodiments, a visual effect may include one or more visual transformations of the screen recommendation representation. In some embodiments, one or more screen recommendations, screen characteristics, screen points, lines, angles, positions, distances, and/or other information/data discussed herein with respect to system 300D may be visualized. In embodiments, the one or more screen recommendations, screen characteristics, screen points, lines, angles, positions, distances, and/or other information/data discussed herein may be overlaid on top of a screen image on a relevant frame by frame basis or otherwise presented with the screen image. Such data may be stored and/or displayed.

Screen recommendation representation component 314D may be configured to display the screen recommendation representation. The screen recommendation representation may be displayed on a graphical user interface and/or other displays, as discussed herein. System 300D may include one or more output devices such as a display, speakers, printer, haptic feedback, and so on.

In some embodiments, server 302D, client computing platform 304D, and/or external resources 328D may be operatively linked via an electronic communication link. For example, the electronic communication link may be established, at least in part, via a network such as, the internet and/or other networks. It should be appreciated that server 302D, client computing platform 304D, and/or external resources 328D may be operatively linked via other communication media.

Client computing platform 304D may include a processor to execute computer program components as discussed herein. The computer program components may enable a user corresponding to client computing platform 304D to interface with system 300D and/or external resources 328D and/or provide other functionality attributed herein to client computing platform 304D. For example, client computing platform 304D may include a mobile device, smartphone, desktop computer, laptop computer, handheld computer, tablet computing platform, netbook, gaming console, smart device, wearable, another input device, and/or other computing platforms.

External resources 328D may include information sources outside of system 300D, external entities interacting with system 300D, and/or other resources. In some embodiments, some or all of the functionality attributed herein to external resources 328D may be provided by resources included in system 300D.

Server 302D may include electronic storage 330D, processor 332D, and/or other components. Server 302D may include communication lines or ports to enable exchange of information within a network, with a network, and/or other computing platforms. It should be appreciated that the illustration of server 302D in FIG. 3D is not intended to be limiting. For example, server 302D may be implemented by a cloud of computing platforms operating together as server 302D.

Electronic storage 330D may include storage media that electronically store information, such as, for example, data and/or other digital information. The electronic storage media of electronic storage 330D may include system storage that is provided integrally (i.e., substantially non-removable) with server 302D and/or removable storage that is removably connectable to server 302D via, for example, a port (e.g., a USB port, a firewire port, digital port, and/or other ports) or a drive (e.g., a disk drive, thumb drive, and/or other drives). Electronic storage 330D may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 330D may include a virtual storage resource (e.g., cloud storage, a virtual private network, and/or other virtual storage resources). Electronic storage 330D may store software algorithms, information determined, generated, and/or otherwise processed by processor 332D, information received from server 302D, information received from client computing platform 304D, and/or other information that enables server 302D to function as described herein. It should be appreciated that the information may be stored in its natural and/or raw format (e.g., data lakes).

Processor 332D may provide information processing capabilities in server 302D. For example, processor 332D may include a physical computer processor, a digital processor, an analog processor, a digital circuit designed to process information, an analog circuit designed to process information, a state machine, and/or other mechanisms for electronically processing information. Although processor 332D is shown in FIG. 3D as a single entity, this is for illustrative purposes only. In some embodiments, processor 332D may include a plurality of processing units. These processing units may be physically or geographically located or packaged within the same device, or processor 332D may represent processing functionality of a plurality of devices operating in coordination. Processor 332D may execute components 308D, 310D, 312D, 314D, and/or other components by software, hardware, firmware, and/or other mechanisms for configuring processing capabilities on processor 332D. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 308D, 310D, 312D, and 314D are illustrated in FIG. 3D as being implemented within a single processing unit, in embodiments, for example, in which processor 332D includes multiple processing units, one or more of components 308D, 310D, 312D, and/or 314D may be implemented remotely from other components. The description of the functionality provided by the different components 308D, 310D, 312D, and/or 314D described herein is for illustrative purposes, and is not intended to be limiting, as any of components 308D, 310D, 312D, and/or 314D may provide more or less functionality than is described. For example, one or more of components 308D, 310D, 312D, and/or 314D may be eliminated, and some or all of its functionality may be provided by other ones of components 308D, 310D, 312D, and/or 314D. For example, processor 332D may execute an additional component that may perform some or all of the functionality attributed herein to components 308D, 310D, 312D, and/or 314D.

FIG. 4 illustrates a system for generating annotated screen images, screen point data, screen characteristic data, and/or screen recommendation data in accordance with one or more embodiments of the presently disclosed technology. In some embodiments, system 400 may include server 402. Server 402 may be configured to communicate with client computing platform 404 according to an architecture, including, for example, a client/server architecture and/or other architectures. Client computing platform 404 may be configured to communicate with other client computing platforms via server 402, peer-to-peer architecture, and/or other architectures. Users may access system 400 via client computing platform 404.

Server 402 may be configured by machine readable instructions 406. Machine readable instructions 406 may include an instruction component (not shown). The instruction component may include computer program component (s). For example, the instruction component may include screen image model component 408, screen image component 410, annotated screen image component 412, screen point model component 414, screen point component 416, screen characteristic model component 418, screen characteristic component 420, screen recommendation model component 422, screen recommendation component 424, screen representation component 426, and/or other instruction components.

Screen image model component 408 may be configured to obtain an initial screen image model as discussed herein. Screen image model component 408 may be the same as, or substantially similar to, screen image model component 308A. In some embodiments, screen image model component 408 may be configured to obtain a screen image model as discussed herein. In embodiments, screen image model component 408 may be configured to generate a conditioned screen image model. In some embodiments, screen image model component 408 may be configured to store the conditioned screen image model. In embodiments, screen image model component 408 may be configured to store the screen image model.

Screen image component 410 may be configured to obtain a training screen image set. Screen image component 410 may be the same as, or substantially similar to, screen image component 310A and/or screen image component 310B. In some embodiments, screen image component 410 may be configured to obtain a target screen image set.

Annotated screen image component 412 may be configured to obtain a training annotated screen image set. Annotated screen image component 412 may be the same as, or substantially similar to, annotated screen image component 312A and/or screen image component 310B. In some embodiments, annotated screen image component 412 may be configured to generate or obtain a target annotated screen image set. For example, the target annotated screen image set generated by annotated screen image component 412 may be stored, as discussed herein, and retrieved or obtained to train an initial screen point model. In embodiments, annotated screen image component 412 may be configured to store the target annotated screen image set.

Screen point model component 414 may be configured to obtain an initial screen point model as discussed herein. Screen point model component 414 may be the same as, or substantially similar to, screen point model component 308B. In some embodiments, screen point model component 414 may be configured to generate or obtain a conditioned screen image model. In some embodiments, screen point model component 414 may be configured to store the conditioned screen image model.

Screen point component 416 may be configured to obtain training screen point data. Screen point component 416 may be the same as, or substantially similar to, screen point component 312B and/or screen point component 310C. In some embodiments, screen point component 416 may be configured to generate or obtain target screen point data. For example, the target screen point data generated by screen point component 416 may be stored, as discussed herein, and retrieved or obtained to train an initial screen characteristic model. In embodiments, screen point component 416 may be configured to store the target screen point data.

Screen characteristic model component 418 may be configured to obtain an initial screen characteristic model as discussed herein. Screen characteristic model component 418 may be the same as, or substantially similar to, screen characteristic model component 308C. In some embodiments, screen characteristic model component 418 may be configured to obtain a screen characteristic model. In embodiments, screen characteristic model component 418 may be configured to generate or obtain a conditioned screen characteristic model. In some embodiments, screen characteristic model component 418 may be configured to store the conditioned screen characteristic model.

Screen characteristic component 420 may be configured to obtain training screen characteristic data. Screen characteristic component 420 may be the same as, or substantially similar to, screen characteristic component 312C and/or screen characteristic component 310D. In some embodiments, screen characteristic component 420 may be configured to generate or obtain target screen characteristic data. For example, the target screen characteristic data generated by screen characteristic component 420 may be stored, as discussed herein, and retrieved or obtained to train an initial screen recommendation model. In embodiments, screen characteristic component 420 may be configured to store the target screen characteristic data.

Screen recommendation model component 422 may be configured to obtain an initial screen recommendation model as discussed herein. Screen recommendation model component 422 may be the same as, or substantially similar to, screen recommendation model component 308D. In some embodiments, screen recommendation model component 422 may be configured to obtain a screen recommendation model. In embodiments, screen recommendation model component 422 may be configured to generate or obtain a conditioned screen recommendation model. In some embodiments, screen recommendation model component 422 may be configured to store the conditioned screen recommendation model.

Screen recommendation component 424 may be configured to obtain training screen recommendation data. Screen recommendation component 424 may be the same as, or substantially similar to, screen recommendation component 312D. In some embodiments, screen recommendation component 424 may be configured to generate target screen recommendation data.

Screen representation component 426 may be configured to generate a screen image representation of the screen image set using visual effect to depict at least a portion of the screen image set. Screen representation component 426 may be the same as, or substantially similar to, screen image representation component 314A, screen point representation component 314B, screen characteristic representation component 314C, and/or screen recommendation representation component 314D. In some embodiments, screen representation component 426 may be configured to generate a screen image representation of the annotated screen image set using visual effects to depict at least a portion of the annotated screen image set. In embodiments, screen representation component 426 may be configured to display the screen image representation. In some embodiments, screen representation component 426 may be configured to generate a screen point representation of the screen image set using visual effects to depict at least a portion of the screen image set. In embodiments, screen representation component 426 may be configured to generate a screen point representation of the screen point data using visual effects to depict at least a portion of the screen point data. In some embodiments, screen representation component 426 may be configured to display the screen point representation. In embodiments, screen representation component 426 may be configured to generate a screen characteristic representation of the screen point data using visual effects to depict at least a portion of the screen point data. In some embodiments, screen representation component 426 may be configured to generate a screen characteristic representation of the screen characteristic data using visual effects to depict at least a portion of the screen characteristic data. In embodiments, screen representation component 426 may be configured to display the screen characteristic representation. In some embodiments, screen representation component 426 may be configured to generate a screen recommendation representation of the screen characteristic data using visual effects to depict at least a portion of the screen characteristic data. In embodiments, screen representation component 426 may be configured to generate a screen recommendation representation of the screen recommendation data using visual effects to depict at least a portion of the screen recommendation data. In some embodiments, screen representation component 426 may be configured to display the screen recommendation representation. System 400 may include one or more output devices such as a display, speakers, printer, haptic feedback, and so on.

System 400 may be a pipeline of systems 300A, 300B, 300C, and/or 300D. For example, screen image model component 408 may be used to generate data for screen point model component 414, which in turn is used to generate data for screen characteristic model component 418, which in turn is used to generate data for screen recommendation model component 422. Some or all of the data used or generated for these components may have a corresponding representation generated and/or displayed, as discussed herein. As an example of the whole pipeline, a user may record themselves or a player performing a physical screen. The capture system may take a capture from an appropriate perspective for the given capture system. System 400 may have conditioned models to process the capture. As an example, a video may be taken on a phone. The video may include a target screen image set. The phone may have system 400 or be operatively linked to system 400 and its one or more components. The video may be used as input for a conditioned screen point model to generate target screen point data based on the target screen image set. For example, one or more screen points on the head region, the trunk region, the hip region, the leg regions, and/or the arm regions may be generated. In some embodiments, the original video may be edited, or otherwise pre-processed as discussed herein. The target screen point data may be used as input for a conditioned screen characteristic model and/or screen characteristic model to generate target screen characteristic data. For example, the conditioned screen characteristic model and/or screen characteristic model may detect a limited toe touch screen characteristic. The screen characteristic data may be used as input for a conditioned screen recommendation model and/or screen recommendation model to generate target screen recommendation data. For example, based on detecting a limited toe touch screen characteristic, a set of exercises may be recommended. Selecting an exercise may provide text and an image on how to perform the exercise. In some embodiments, each of the recommended exercises and drills may have an explanation explaining that these were recommended because a user indicated a preference for low impact training and/or a limited toe touch screen characteristic was detected. In some embodiments, a general explanation may be provided for all of the exercises and/or drills indicating that the exercises and/or drills are recommended because a limited toe touch screen characteristic was detected. After logging daily performance of the screen recommendations for 1 month, a re-screen may be recommended, though it should be appreciated that a longer or shorter time frame may be used to re-screen. Instead of detecting a limited toe touch screen characteristic, no toe touch screen characteristic may be detected. Another set of screen recommendations may be provided that account for previous screen recommendations, the change to no detected limited toe touch screen characteristic, static input, dynamic input, and/or other information. In some embodiments, the another set of screen recommendations may be more difficult or advanced. This may occur if the screen characteristic is still detected. In embodiments, the another set of screen recommendations may take into account user preference of previous screen recommendations. This process may be repeated until the detected screen characteristic is no longer detected. In some embodiments, screen recommendations may still be repeated even though a screen characteristic is no longer detected to continue to lengthen and strengthen muscles and keep mobile joints mobile and stable joints stable. In contrast, systems 300A, 300B, 300C, and/or 300D may operate separately and independently without necessarily needing to be linked with each other.

In one example, the capture system and systems 300A, 300B, 300C, 300D, and/or 400 may be part of an apparatus for generating screen points, screen characteristics, and/or screen recommendations. The capture system may capture a target screen image set. The target screen image set may include one or more images of at least part of a physical screen. The image may be sequential. Systems 300A, 300B, 300C, 300D, and/or 400 may be operatively linked to the capture system as discussed herein. Systems 300A, 300B, 300C, 300D, and/or 400 may obtain a conditioned screen point model, trained as discussed herein, and obtain a target screen image set captured by the capture system. Target screen point data may be generated by applying the conditioned screen point model to the target screen image set. The target screen point data may specify screen points corresponding to the target screen image set. In some embodiments, the pipeline may continue, and a screen characteristic model and/or a conditioned screen characteristic model may be obtained, which may be trained as discussed herein, to generate target screen characteristic data by applying the screen characteristic model and/or the conditioned screen characteristic model to the target screen point data. In embodiments, the pipeline may continue, and a screen recommendation model and/or a conditioned screen recommendation model may be obtained to generate target screen recommendation data by applying the screen recommendation model and/or the conditioned screen recommendation model to the target screen characteristic data. A representation of the target screen image set, target screen point data, target screen characteristic data, and/or target screen recommendation data may be generated using visual effects to depict at least some of the image set and/or data. The representation(s) may be displayed.

In some embodiments, server 402, client computing platform 404, and/or external resources 428 may be operatively linked via an electronic communication link. For example, the electronic communication link may be established, at least in part, via a network such as, the internet and/or other networks. It should be appreciated that server 402, client computing platform 404, and/or external resources 428 may be operatively linked via other communication media.

Client computing platform 404 may include a processor to execute computer program components as discussed herein. The computer program components may enable a user corresponding to client computing platform 404 to interface with system 400 and/or external resources 428 and/or provide other functionality attributed herein to client computing platform 404. For example, client computing platform 404 may include a mobile device, smartphone, desktop computer, laptop computer, handheld computer, tablet computing platform, netbook, gaming console, smart device, wearable, another input device, and/or other computing platforms.

External resources 428 may include information sources outside of system 400, external entities interacting with system 400, and/or other resources. In some embodiments, some or all of the functionality attributed herein to external resources 428 may be provided by resources included in system 400.

Server 402 may include electronic storage 430, processor 432, and/or other components. Server 402 may include communication lines or ports to enable exchange of information within a network, with a network, and/or other computing platforms. It should be appreciated that the illustration of server 402 in FIG. 4 is not intended to be limiting. For example, server 402 may be implemented by a cloud of computing platforms operating together as server 402.

Electronic storage 430 may include storage media that electronically store information, such as, for example, data and/or other digital information. The electronic storage media of electronic storage 430 may include system storage that is provided integrally (i.e., substantially non-removable) with server 402 and/or removable storage that is removably connectable to server 402 via, for example, a port (e.g., a USB port, a firewire port, digital port, and/or other ports) or a drive (e.g., a disk drive, thumb drive, and/or other drives). Electronic storage 430 may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 430 may include a virtual storage resource (e.g., cloud storage, a virtual private network, and/or other virtual storage resources). Electronic storage 430 may store software algorithms, information determined, generated, and/or otherwise processed by processor 432, information received from server 402, information received from client computing platform 404, and/or other information that enables server 402 to function as described herein. It should be appreciated that the information may be stored in its natural and/or raw format (e.g., data lakes).

Processor 432 may provide information processing capabilities in server 402. For example, processor 432 may include a physical computer processor, a digital processor, an analog processor, a digital circuit designed to process information, an analog circuit designed to process information, a state machine, and/or other mechanisms for electronically processing information. Although processor 432 is shown in FIG. 4 as a single entity, this is for illustrative purposes only. In some embodiments, processor 432 may include a plurality of processing units. These processing units may be physically or geographically located or packaged within the same device, or processor 432 may represent processing functionality of a plurality of devices operating in coordination. Processor 432 may execute components 408, 410, 412, 414, 416, 418, 420, 422, 424, 426, and/or other components by software, hardware, firmware, and/or other mechanisms for configuring processing capabilities on processor 432. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 408, 410, 412, 414, 416, 418, 420, 422, 424, and 426 are illustrated in FIG. 4 as being implemented within a single processing unit, in embodiments, for example, in which processor 432 includes multiple processing units, one or more of components 408, 410, 412, 414, 416, 418, 420, 422, 424, and/or 426 may be implemented remotely from other components. The description of the functionality provided by the different components 408, 410, 412, 414, 416, 418, 420, 422, 424, and/or 426 described herein is for illustrative purposes, and is not intended to be limiting, as any of components 408, 410, 412, 414, 416, 418, 420, 422, 424, and/or 426 may provide more or less functionality than is described. For example, one or more of components 408, 410, 412, 414, 416, 418, 420, 422, 424, and/or 426 may be eliminated, and some or all of its functionality may be provided by other ones of components 408, 410, 412, 414, 416, 418, 420, 422, 424, and/or 426. For example, processor 432 may execute an additional component that may perform some or all of the functionality attributed herein to components 408, 410, 412, 414, 416, 418, 420, 422, 424, and/or 426.

Figure 5:
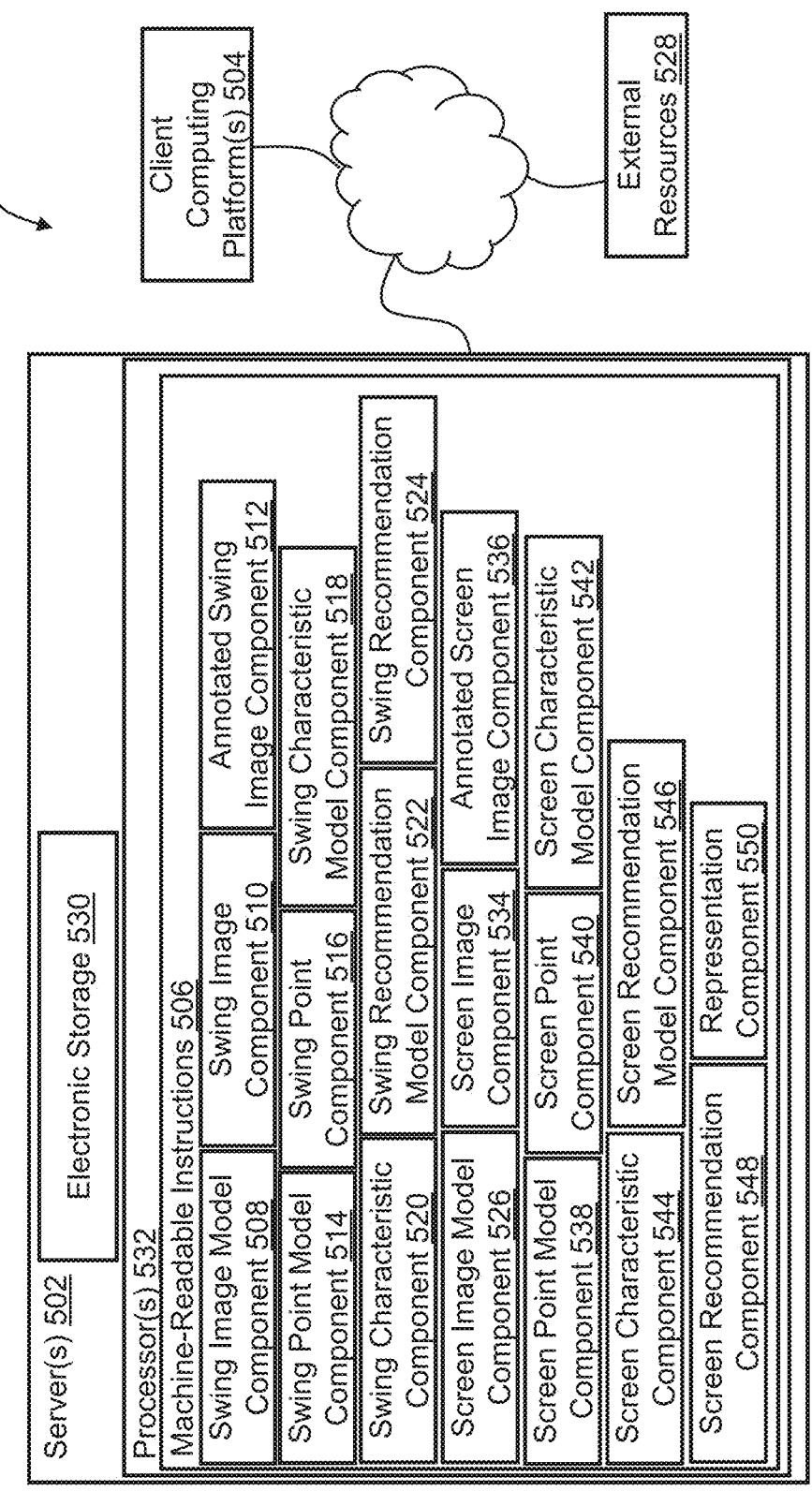
FIG. 5 illustrates a system for generating annotated swing images, swing point data, swing characteristic data, swing recommendation data, annotated screen images, screen point data, screen characteristic data, and/or screen recommendation data in accordance with one or more embodiments of the presently disclosed technology.

FIG. 5 illustrates a system for generating annotated swing images, swing point data, swing characteristic data, swing recommendation data, annotated screen images, screen point data, screen characteristic data, and/or screen recommendation data in accordance with one or more embodiments of the presently disclosed technology. In some embodiments, system 500 may include server 502. Server 502 may be configured to communicate with client computing platform 504 according to an architecture, including, for example, a client/server architecture and/or other architectures. Client computing platform 504 may be configured to communicate with other client computing platforms via server 502, peer-to-peer architecture, and/or other architectures. Users may access system 500 via client computing platform 504.

Server 502 may be configured by machine readable instructions 506. Machine readable instructions 506 may include an instruction component (not shown). The instruction component may include computer program component(s). For example, the instruction component may include swing image model component 508, swing image component 510, annotated swing image component 512, swing point model component 514, swing point component 516, swing characteristic model component 518, swing characteristic component 520, swing recommendation model component 522, swing recommendation component 524, screen image model component 526, screen image component 534, annotated screen image component 536, screen point model component 538, screen point component 540, screen characteristic model component 542, screen characteristic component 544, screen recommendation model component 546, screen recommendation component 548, representation component 550 and/or other instruction components.

Swing image model component 508 may be configured to obtain an initial swing image model as discussed herein. Swing image model component 508 may be the same as, or substantially similar to, swing image model component 108A and/or swing image model component 208. In some embodiments, swing image model component 508 may be configured to obtain a swing image model as discussed herein. In embodiments, swing image model component 508 may be configured to generate a conditioned swing image model. In some embodiments, swing image model component 508 may be configured to store the conditioned swing image model. In embodiments, swing image model component 508 may be configured to store the swing image model.

Swing image component 510 may be configured to obtain a training swing image set. Swing image component 510 may be the same as, or substantially similar to, swing image component 110A, swing image component 110B, and/or swing image component 210. In some embodiments, swing image component 510 may be configured to obtain a target swing image set.

Annotated swing image component 512 may be configured to obtain a training annotated swing image set. Annotated swing image component 512 may be the same as, or substantially similar to, annotated swing image component 112A, swing image component 110B, and/or annotated swing image component 212. In some embodiments, annotated swing image component 512 may be configured to generate or obtain a target annotated swing image set. For example, the target annotated swing image set generated by annotated swing image component 512 may be stored, as discussed herein, and retrieved or obtained to train an initial swing point model. In embodiments, annotated swing image component 512 may be configured to store the target annotated swing image set.

Swing point model component 514 may be configured to obtain an initial swing point model as discussed herein. Swing point model component 514 may be the same as, or substantially similar to, swing point model component 108B and/or swing point model component 214. In some embodiments, swing point model component 514 may be configured to generate or obtain a conditioned swing point model. In some embodiments, swing point model component 514 may be configured to store the conditioned swing point model.

Swing point component 516 may be configured to obtain training swing point data. Swing point component 516 may be the same as, or substantially similar to, swing point component 112B, swing point component 110C, and/or swing point component 216. In some embodiments, swing point component 516 may be configured to generate or obtain target swing point data. For example, the target swing point data generated by swing point component 516 may be stored, as discussed herein, and retrieved or obtained to train an initial swing characteristic model. In embodiments, swing point component 516 may be configured to store the target swing point data.

Swing characteristic model component 518 may be configured to obtain an initial swing characteristic model as discussed herein. Swing characteristic model component 518 may be the same as, or substantially similar to, swing characteristic model component 108C and/or swing characteristic model component 218. In some embodiments, swing characteristic model component 518 may be configured to obtain a swing characteristic model. In embodiments, swing characteristic model component 518 may be configured to generate or obtain a conditioned swing characteristic model. In some embodiments, swing characteristic model component 518 may be configured to store the conditioned swing characteristic model.

Swing characteristic component 520 may be configured to obtain training swing characteristic data. Swing characteristic component 520 may be the same as, or substantially similar to, swing characteristic component 112C, swing characteristic component 110D, and/or swing characteristic component 220. In some embodiments, swing characteristic component 520 may be configured to generate or obtain target swing characteristic data. For example, the target swing characteristic data generated by swing characteristic component 520 may be stored, as discussed herein, and retrieved or obtained to train an initial swing recommendation model. In embodiments, swing characteristic component 520 may be configured to store the target swing characteristic data.

Swing recommendation model component 522 may be configured to obtain an initial swing recommendation model as discussed herein. Swing recommendation model component 522 may be the same as, or substantially similar to, swing recommendation model component 108D and/or swing recommendation model component 222. In some embodiments, swing recommendation model component 522 may be configured to obtain a swing recommendation model. In embodiments, swing recommendation model component 522 may be configured to generate or obtain a conditioned swing recommendation model. In some embodiments, swing recommendation model component 522 may be configured to store the conditioned swing recommendation model.

Swing recommendation component 524 may be configured to obtain training swing recommendation data. Swing recommendation component 524 may be the same as, or substantially similar to, swing recommendation component 112D and/or swing recommendation component 224. In some embodiments, swing recommendation component 524 may be configured to generate target swing recommendation data.

Screen image model component 526 may be configured to obtain an initial screen image model as discussed herein. Screen image model component 526 may be the same as, or substantially similar to, screen image model component 308A and/or screen image model component 408. In some embodiments, screen image model component 526 may be configured to obtain a screen image model as discussed herein. In embodiments, screen image model component 526 may be configured to generate a conditioned screen image model. In some embodiments, screen image model component 526 may be configured to store the conditioned screen image model. In embodiments, screen image model component 526 may be configured to store the screen image model.

Screen image component 534 may be configured to obtain a training screen image set. Screen image component 534 may be the same as, or substantially similar to, screen image component 310A, screen image component 310B, and/or screen image component 410. In some embodiments, screen image component 534 may be configured to obtain a target screen image set.

Annotated screen image component 536 may be configured to obtain a training annotated screen image set. Annotated screen image component 536 may be the same as, or substantially similar to, annotated screen image component 312A, screen image component 310B, and/or annotated screen image component 412. In some embodiments, annotated screen image component 536 may be configured to generate or obtain a target annotated screen image set. For example, the target annotated screen image set generated by annotated screen image component 536 may be stored, as discussed herein, and retrieved or obtained to train an initial screen point model. In embodiments, annotated screen image component 536 may be configured to store the target annotated screen image set.

Screen point model component 538 may be configured to obtain an initial screen point model as discussed herein. Screen point model component 538 may be the same as, or substantially similar to, screen point model component 308B and/or screen point model component 414. In some embodiments, screen point model component 538 may be configured to generate or obtain a conditioned screen image model. In some embodiments, screen point model component 538 may be configured to store the conditioned screen image model.

Screen point component 540 may be configured to obtain training screen point data. Screen point component 540 may be the same as, or substantially similar to, screen point component 312B, screen point component 310C, and/or screen point component 416. In some embodiments, screen point component 540 may be configured to generate or obtain target screen point data. For example, the target screen point data generated by screen point component 540 may be stored, as discussed herein, and retrieved or obtained to train an initial screen characteristic model. In embodiments, screen point component 540 may be configured to store the target screen point data.

Screen characteristic model component 542 may be configured to obtain an initial screen characteristic model as discussed herein. Screen characteristic model component 542 may be the same as, or substantially similar to, screen characteristic model component 308C and/or screen characteristic model component 418. In some embodiments, screen characteristic model component 542 may be configured to obtain a screen characteristic model. In embodiments, screen characteristic model component 542 may be configured to generate or obtain a conditioned screen characteristic model. In some embodiments, screen characteristic model component 542 may be configured to store the conditioned screen characteristic model.

Screen characteristic component 544 may be configured to obtain training screen characteristic data. Screen characteristic component 544 may be the same as, or substantially similar to, screen characteristic component 312C, screen characteristic component 310D, and/or screen characteristic component 420. In some embodiments, screen characteristic component 544 may be configured to generate or obtain target screen characteristic data. For example, the target screen characteristic data generated by screen characteristic component 544 may be stored, as discussed herein, and retrieved or obtained to train an initial screen recommendation model. In embodiments, screen characteristic component 544 may be configured to store the target screen characteristic data.

Screen recommendation model component 546 may be configured to obtain an initial screen recommendation model as discussed herein. Screen recommendation model component 546 may be the same as, or substantially similar to, screen recommendation model component 308D and/or screen recommendation model component 422. In some embodiments, screen recommendation model component 546 may be configured to obtain a screen recommendation model. In embodiments, screen recommendation model component 546 may be configured to generate or obtain a conditioned screen recommendation model. In some embodiments, screen recommendation model component 546 may be configured to store the conditioned screen recommendation model.

Screen recommendation component 548 may be configured to obtain training screen recommendation data. Screen recommendation component 548 may be the same as, or substantially similar to, screen recommendation component 312D and/or screen recommendation component 424. In some embodiments, screen recommendation component 548 may be configured to generate target screen recommendation data.

Representation component 550 may be configured to generate a swing image representation of the swing image set using visual effect to depict at least a portion of the swing image set. Representation component 550 may be the same as, or substantially similar to, swing image representation component 114A, swing point representation component 114B, swing characteristic representation component 114C, swing recommendation representation component 114D, swing representation component 226, screen image representation component 314A, screen point representation component 314B, screen characteristic representation component 314C, and/or screen recommendation representation component 314D and/or screen representation component 426. In some embodiments, representation component 550 may be configured to generate a swing image representation of the annotated swing image set using visual effects to depict at least a portion of the annotated swing image set. In embodiments, representation component 550 may be configured to display the swing image representation. In some embodiments, representation component 550 may be configured to generate a swing point representation of the swing image set using visual effects to depict at least a portion of the swing image set. In embodiments, representation component 550 may be configured to generate a swing point representation of the swing point data using visual effects to depict at least a portion of the swing point data. In some embodiments, representation component 550 may be configured to display the swing point representation. In embodiments, representation component 550 may be configured to generate a swing characteristic representation of the swing point data using visual effects to depict at least a portion of the swing point data. In some embodiments, representation component 550 may be configured to generate a swing characteristic representation of the swing characteristic data using visual effects to depict at least a portion of the swing characteristic data. In embodiments, representation component 550 may be configured to display the swing characteristic representation. In some embodiments, representation component 550 may be configured to generate a swing recommendation representation of the swing characteristic data using visual effects to depict at least a portion of the swing characteristic data. In embodiments, representation component 550 may be configured to generate a swing recommendation representation of the swing recommendation data using visual effects to depict at least a portion of the swing recommendation data. In some embodiments, representation component 550 may be configured to display the swing recommendation representation. Representation component 550 may be configured to generate a screen image representation of the screen image set using visual effect to depict at least a portion of the screen image set. In some embodiments, representation component 550 may be configured to generate a screen image representation of the annotated screen image set using visual effects to depict at least a portion of the annotated screen image set. In embodiments, representation component 550 may be configured to display the screen image representation. In some embodiments, representation component 550 may be configured to generate a screen point representation of the screen image set using visual effects to depict at least a portion of the screen image set. In embodiments, representation component 550 may be configured to generate a screen point representation of the screen point data using visual effects to depict at least a portion of the screen point data. In some embodiments, representation component 550 may be configured to display the screen point representation. In embodiments, representation component 550 may be configured to generate a screen characteristic representation of the screen point data using visual effects to depict at least a portion of the screen point data. In some embodiments, representation component 550 may be configured to generate a screen characteristic representation of the screen characteristic data using visual effects to depict at least a portion of the screen characteristic data. In embodiments, representation component 550 may be configured to display the screen characteristic representation. In some embodiments, representation component 550 may be configured to generate a screen recommendation representation of the screen characteristic data using visual effects to depict at least a portion of the screen characteristic data. In embodiments, representation component 550 may be configured to generate a screen recommendation representation of the screen recommendation data using visual effects to depict at least a portion of the screen recommendation data. In some embodiments, representation component 550 may be configured to display the screen recommendation representation. System 500 may include one or more output devices such as a display, speakers, printer, haptic feedback, and so on.

System 500 may be a pipeline of systems 100A, 100B, 100C, 100D, 200, 300A, 300B, 300C, 300D, and/or 400. In some embodiments, system 500 may be a pipeline of systems 200 and 400. For example, swing image model component 508 may be used to generate data for swing point model component 514, which in turn is used to generate data for swing characteristic model component 518, which in turn is used to generate data for swing recommendation model component 522, as discussed herein. Some or all of the data used or generated for these components may have a corresponding representation generated and/or displayed, as discussed herein. As an example of the whole pipeline, a user may record themselves or a player performing a golf swing. The capture system may take a capture from a down the line perspective, a face on perspective, and/or other perspectives appropriate for the given capture system. System 500 may have models, conditioned models, or are training the models to process the capture. As an example, a video of a golf swing may be taken on a phone at 240 fps. The video may include a target swing image set. The target swing image set may be a set of swing images for a complete golf swing (i.e., from address to an end of swing). The phone may have system 500 or one or more of its components or be operatively linked to system 500 and its one or more components. The video may be used as input for a conditioned swing point model to generate target swing point data based on the target swing image set. For example, one or more swing points on the head region, the trunk region, the hip region, the leg regions, and/or the arm regions may be generated. In an example, all of the swing points illustrated in FIGS. 27 and 28 may be generated at some point during the target swing image set. In some embodiments, the original video may be edited or otherwise pre-processed, as discussed herein. The target swing point data may be used as input for a conditioned swing characteristic model and/or swing characteristic model to generate target swing characteristic data. For example, the conditioned swing characteristic model and/or swing characteristic model may detect a C-posture swing characteristic. The swing characteristic data may be used as input for a conditioned swing recommendation model and/or swing recommendation model to generate target swing recommendation data. For example, based on detecting a C-posture swing characteristic, spine foam rolling and assisted reachbacks exercises may be recommended. Selecting the assisted reachbacks exercise may provide a video on how to perform the assisted reachbacks exercise. In some embodiments, each of the recommended exercises and drills may have an explanation explaining that these were recommended because a user did not indicate a preference for a type of training and/or a C-posture swing characteristic was detected. In some embodiments, a general explanation may be provided for all of the exercises and/or drills indicating that the exercises and/or drills are recommended because a C-posture swing characteristic was detected. As another example, screen image model component 526 may be used to generate data for screen point model component 538, which in turn is used to generate data for screen characteristic model component 542, which in turn is used to generate data for screen recommendation model component 546. Some or all of the data used or generated for these components may have a corresponding representation generated and/or displayed, as discussed herein. In some embodiments, input and/or output from components 508-524 and 550 may affect input and/or output from components 526 and 534-550, or vice versa. As an example of the whole pipeline, a user may record themselves or a player performing a physical screen. The capture system may take a capture from an appropriate perspective for the given capture system. System 500 may have models, conditioned models, or are training the models to process the capture. As an example, a video may be taken on a phone. The video may include a target screen image set corresponding to a multi-segmental rotation screen. The phone may have system 500 or one or more of its components or be operatively linked to system 500 and its one or more components. The video may be used as input for a conditioned screen point model to generate target screen point data based on the target screen image set. For example, one or more screen points on the head region, the trunk region, the hip region, the leg regions, and/or the arm regions may be generated. In some embodiments, the original video may be edited or otherwise pre-processed as discussed herein. The target screen point data may be used as input for a conditioned screen characteristic model and/or screen characteristic model to generate target screen characteristic data. For example, the conditioned screen characteristic model and/or screen characteristic model may detect a limited multi-segmental rotation screen characteristic. In some embodiments, there may be weighting or another indication to the conditioned swing characteristic model and/or swing characteristic model indicating that detecting a limited multi-segmental rotation is more likely with a detection of an S-posture swing characteristic, a C-posture swing characteristic, or a loss of posture swing characteristic. As a C-posture swing characteristic has been detected already in this pipeline, this may further validate system 500. In some embodiments, a screen recommendation may be modified or affected based on the input/output from the swing models, or based on a physical screen being performed before a swing, swing recommendations may be modified or affected based on the input/output from one of the screen models. The screen characteristic data may be used as input for a conditioned screen recommendation model and/or screen recommendation model to generate target screen recommendation data. In embodiments, the swing recommendation model may account for input and/or output from the swing models discussed herein. For example, based on detecting the limited multi-segmental rotation screen characteristic, spinal, shoulder, or core exercises, drills, and/or other prescriptions may be recommended. Selecting one of these screen recommendations may provide a video on how to perform the selected screen recommendation. In some embodiments, each of the recommended exercises and drills may have an explanation explaining that these were recommended because a user indicated a preference for low impact training and/or a limited multi-segmental rotation screen characteristic was detected. In some embodiments, a general explanation may be provided for all of the exercises and/or drills indicating that the exercises and/or drills are recommended because a limited multi-segmental rotation screen characteristic was detected. In contrast, systems 100A, 100B, 100C, 100D, 200, 300A, 300B, 300C, 300D, and/or 400 may operate separately and independently without necessarily needing to be linked with each other.

In some embodiments, components 508-524 and 550 may operate in parallel with components 526 and 534-550. In embodiments, a swing may be performed first and components 508-524 and 550 may be processed first, and a physical screen may be performed second and components 526 and 534-550 may be processed second. In some embodiments, a physical screen may be performed first and components 526 and 534-550 may be processed first, and a swing may be performed second and components 508-524 and 550 may be processed second. In such embodiments, continuing the example above where these two sets of components take into account the others inputs and/or outputs, (e.g., input and/or output from components 508-524 and 550 may affect input and/or output from components 526 and 534-550, or vice versa), detecting a limited 90/90 golf posture screen characteristic may indicate, among other things, there is a strong likelihood of a flying elbow swing characteristic. This may be due to shoulder instability or reduced mobility of the shoulder joint. As such, system 500 may incorporate this into components 508-524 and 550. This may validate finding a flying elbow swing characteristic. For example, a limited 90/90 golf posture screen characteristic may be detected while only a potential flying elbow swing characteristic is detected. System 500 may detect that it is likely to be a flying elbow swing characteristic instead of a potential flying elbow swing characteristic. In some embodiments, system 500 may not change the detection, but provide recommendations as if a flying elbow swing characteristic was detected. In some embodiments, detecting both a flying elbow swing characteristic and a limited 90/90 golf posture screen characteristic may prioritize shoulder mobility exercises over other exercises, such as, for example, core exercises, that could also be recommended for both a flying elbow swing characteristic or a limited 90/90 golf posture screen characteristic. As discussed herein, other input from a user, such as static input relating to a previous injury, may also affect the swing/screen characteristics detected and/or swing/screen recommendations recommended. In embodiments, an effectiveness of a swing recommendation may be implemented as feedback back into system 500. For example, box presses may be shown to help the most number of players reduce a flying elbow swing characteristic and/or a limited 90/90 golf posture screen characteristic. Accordingly, for new users, box presses may be prioritized, such that it is more likely to be presented to a user with a flying elbow swing characteristic and/or a limited 90/90 golf posture screen characteristic. In some embodiments, for existing users, the next progression of exercises may still include box presses or newly include box presses if not previously recommended, based on detecting a flying elbow swing characteristic and/or a limited 90/90 golf posture screen characteristic. It should be appreciated that there may be other instances of output becoming part of a feedback loop for system 500. In embodiments, the opposite may be true. For example, users presented with flex t-presses may be less likely to reduce detection of a limited 90/90 golf posture screen characteristic, while users presented with arm circles are more likely to reduce detection of a limited 90/90 golf posture screen characteristic. As such, arm circles may be prioritized or positively weighted and flex t-presses may be de-prioritized or negatively weighted for future recommendations. It should be appreciated that in some embodiments, such feedback may be unique to each user as opposed to all future users.

As discussed herein, the capture system and systems 100A, 100B, 100C, 100D, 200, 300A, 300B, 300C, 300D, and/or 400 may be part of an apparatus for generating swing points, swing characteristics, swing recommendations, screen points, screen characteristics, and/or screen recommendations.

In some embodiments, server 502, client computing platform 504, and/or external resources 528 may be operatively linked via an electronic communication link. For example, the electronic communication link may be established, at least in part, via a network such as, the internet and/or other networks. It should be appreciated that server 502, client computing platform 504, and/or external resources 528 may be operatively linked via other communication media.

Client computing platform 504 may include a processor to execute computer program components as discussed herein. The computer program components may enable a user corresponding to client computing platform 504 to interface with system 500 and/or external resources 528 and/or provide other functionality attributed herein to client computing platform 504. For example, client computing platform 504 may include a mobile device, smartphone, desktop computer, laptop computer, handheld computer, tablet computing platform, netbook, gaming console, smart device, wearable, another input device, and/or other computing platforms.

External resources 528 may include information sources outside of system 500, external entities interacting with system 500, and/or other resources. In some embodiments, some or all of the functionality attributed herein to external resources 528 may be provided by resources included in system 500.

Server 502 may include electronic storage 530, processor 532, and/or other components. Server 502 may include communication lines or ports to enable exchange of information within a network, with a network, and/or other computing platforms. It should be appreciated that the illustration of server 502 in FIG. 5 is not intended to be limiting. For example, server 502 may be implemented by a cloud of computing platforms operating together as server 502.

Electronic storage 530 may include storage media that electronically store information, such as, for example, data and/or other digital information. The electronic storage media of electronic storage 530 may include system storage that is provided integrally (i.e., substantially non-removable) with server 502 and/or removable storage that is removably connectable to server 502 via, for example, a port (e.g., a USB port, a firewire port, digital port, and/or other ports) or a drive (e.g., a disk drive, thumb drive, and/or other drives). Electronic storage 530 may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 530 may include a virtual storage resource (e.g., cloud storage, a virtual private network, and/or other virtual storage resources). Electronic storage 530 may store software algorithms, information determined, generated, and/or otherwise processed by processor 532, information received from server 502, information received from client computing platform 504, and/or other information that enables server 502 to function as described herein. It should be appreciated that the information may be stored in its natural and/or raw format (e.g., data lakes).

Processor 532 may provide information processing capabilities in server 502. For example, processor 532 may include a physical computer processor, a digital processor, an analog processor, a digital circuit designed to process information, an analog circuit designed to process information, a state machine, and/or other mechanisms for electronically processing information. Although processor 532 is shown in FIG. 5 as a single entity, this is for illustrative purposes only. In some embodiments, processor 532 may include a plurality of processing units. These processing units may be physically or geographically located or packaged within the same device, or processor 532 may represent processing functionality of a plurality of devices operating in coordination. Processor 532 may execute components 508, 510, 512, 514, 516, 518, 520, 522, 524, 526, 534, 536, 538, 540, 542, 544, 546, 548, 550, and/or other components by software, hardware, firmware, and/or other mechanisms for configuring processing capabilities on processor 532. As used herein, the term "component" may refer to any component(s) that perform the functionality attributed to the "component." This may include a physical computer processor during execution of processor readable instruction, the processor readable the processor readable instructions, circuitry, hardware, storage media, and/or any other components.

It should be appreciated that although components 508, 510, 512, 514, 516, 518, 520, 522, 524, 526, 534, 536, 538, 540, 542, 544, 546, 548, and 550 are illustrated in FIG. 5 as being implemented within a single processing unit, in embodiments, for example, in which processor 532 includes multiple processing units, one or more of components 508, 510, 512, 514, 516, 518, 520, 522, 524, 526, 534, 536, 538, 540, 542, 544, 546, 548, and/or 550 may be implemented remotely from other components. The description of the functionality provided by the different components 508, 510, 512, 514, 516, 518, 520, 522, 524, 526, 534, 536, 538, 540, 542, 544, 546, 548, and/or 550 described herein is for illustrative purposes, and is not intended to be limiting, as any of components 508, 510, 512, 514, 516, 518, 520, 522, 524, 526, 534, 536, 538, 540, 542, 544, 546, 548, and/or 550 may provide more or less functionality than is described. For example, one or more of components 508, 510, 512, 514, 516, 518, 520, 522, 524, 526, 534, 536, 538, 540, 542, 544, 546, 548, and/or 550 may be eliminated, and some or all of its functionality may be provided by other ones of components 508, 510, 512, 514, 516, 518, 520, 522, 524, 526, 534, 536, 538, 540, 542, 544, 546, 548, and/or 550. For example, processor 532 may execute an additional component that may perform some or all of the functionality attributed herein to components 508, 510, 512, 514, 516, 518, 520, 522, 524, 526, 534, 536, 538, 540, 542, 544, 546, 548, and/or 550.

Figure 6A:
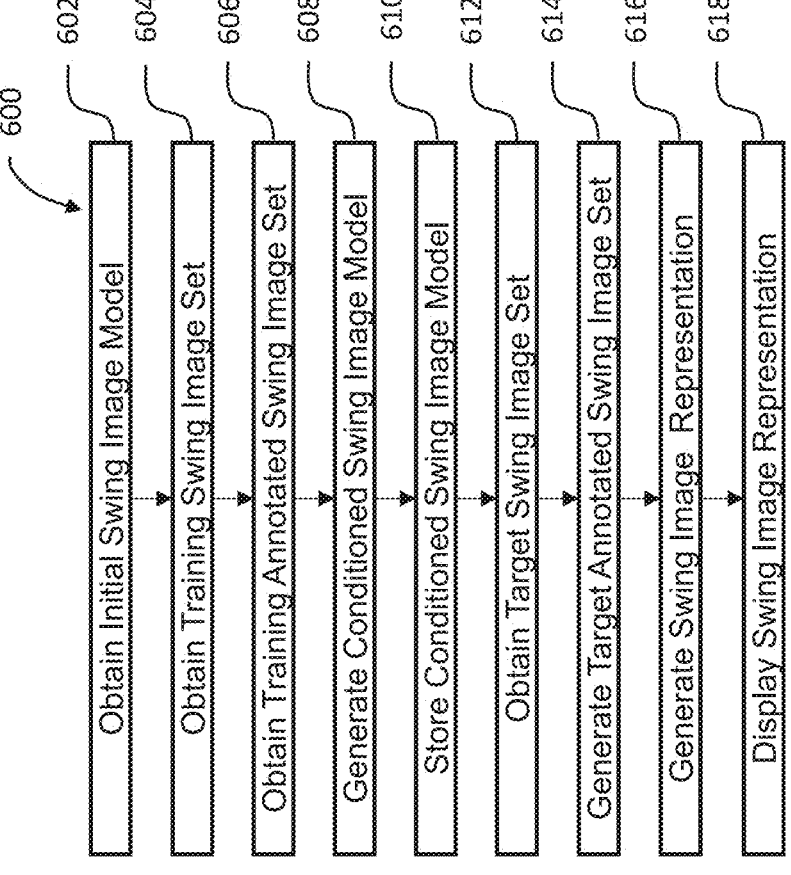
FIG. 6A illustrates an example operational flow diagram for training an initial swing image model to generate annotated swing images in accordance with one or more embodiments of the presently disclosed technology.

FIG. 6A illustrates example operational flow diagram 600 for training an initial swing image model to generate annotated swing images in accordance with one or more embodiments of the presently disclosed technology. The operations of 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500 presented below are intended to be illustrative. In some embodiments, 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500 may be accomplished with additional operations not discussed or without one or more of the operations discussed. Additionally, the order in which the operations of 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500 are illustrated in FIGS. 6A, 6B, 7, 8A, 8B, 9A, 9B, 10, 11A, 11B, 12, 13A, 13B, 14, 15A, 15B, 16, 17A, 17B, 18A, 18B, 19, 20A, 20B, 21, 22A, 22B, 23, 24A, 24B, 24C, 24D, 25A, and 25B are described below is not intended to be limiting.

In some embodiments, methods 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500 may be implemented in a processing device (e.g., a physical computer processor, a digital processor, an analog processor, a digital circuit designed to process information, an analog circuit designed to process information, a state machine, and/or other mechanisms for electronically processing information). The processing device may include a device executing some or all of the operations of 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500 in response to instructions stored electronically on an electronic storage medium. The processing device may include a device configured through hardware, firmware, and/or software to be specifically designed for execution of operations of 600, 650, 700, 800, 850, 900, 950, 1000, 1100, 1150, 1200, 1300, 1365, 1400, 1500, 1550, 1600, 1700, 1750, 1800, 1850, 1900, 2000, 2050, 2100, 2200, 2265, 2300, 2400, 2460, and 2500.

602 may include obtaining an initial swing image model. As discussed herein, the initial swing image model may be based on machine-learning techniques and may be "untrained." The initial swing image model may receive swing images and/or other input as input and output annotated swing images. 602 may be performed by a physical computer processor configured by machine-readable instructions including a component that is the same as or similar to swing image model component 108A, swing image model component 208, and/or swing image model component 508, in accordance with one or more embodiments.

604 may include obtaining a training swing image set. As discussed herein, the training swing image set may include one or more objects. The one or more objects may include one or more of a person, an accessory, or an environment. The accessory may be an accessory for the person. The environment may be an area surrounding the person and the accessory. The training swing image set may be used to train the initial swing image model. The training swing image set may correspond to the training annotated swing image set. 604 may be performed by a physical computer processor configured by machine-readable instructions including a component that is the same as or similar to swing image component 110A, swing image component 210, and/or swing image component 510, in accordance with one or more embodiments.

606 may include obtaining a training annotated swing image set. As discussed herein, the training swing image set may include one or more swing image properties specifying swing image property values of the one or more objects. The one or more swing image properties may include swing points and annotations. The swing points may be one or more position-specific areas on one of the one or more objects. The training annotated swing image set may be used to train the initial swing image model. The training annotated swing image set may correspond to the training swing image set. 606 may be performed by a physical computer processor configured by machine-readable instructions including a component that is the same as or similar to annotated swing image component 112A, annotated swing image component 212, and/or annotated swing image component 512, in accordance with one or more embodiments.

608 may include generating a conditioned swing image model. As discussed herein, the conditioned swing image model may be generated by training the initial swing image model using the training swing image set and the training annotated swing image set to generate a set of annotated swing image relationships between swing images and the annotated swing images. The conditioned swing image model may be an optimized swing image model in comparison to the initial swing image model, as discussed herein. The conditioned swing image model may receive swing images as input and output annotated swing images. 608 may be performed by a physical computer processor configured by machine-readable instructions including a component that is the same as or similar to swing image model component 108A, swing image model component 208, and/or swing image model component 508, in accordance with one or more embodiments.

610 may include storing the conditioned swing image model. 610 may be performed by a physical computer processor configured by machine-readable instructions including a component that is the same as or similar to swing image model component 108A, swing image model component 208, and/or swing image model component 508, in accordance with one or more embodiments.

612 may include obtaining a target swing image set. As discussed herein, the target swing image set may include one or more objects. 612 may be performed by a physical computer processor configured by machine-readable instructions including a component that is the same as or similar to swing image component 110A, swing image component 210, and/or swing image component 510, in accordance with one or more embodiments.

614 may include generating a target annotated swing image set. The target annotated swing image set may be generated by applying the conditioned swing image model to the target swing image set, as discussed herein. Each target swing image of the target annotated swing image set may include the one or more swing image properties. The one or more swing image properties may correspond to the target swing image set. 614 may be performed by a physical computer processor configured by machine-readable instructions including a component that is the same as or similar to annotated swing image component 112A, annotated swing image component 212, and/or annotated swing image component 512, in accordance with one or more embodiments.

616 may include generating a swing image representation of the target annotated swing image set. The swing image representation may be generated using visual effects to depict at least some of the target annotated swing image set, as discussed herein. 616 may be performed by a physical computer processor configured by machine-readable instructions including a component that is the same as or similar to swing image representation component 114A, swing representation component 226, and/or representation component 550, in accordance with one or more embodiments.

618 may include displaying the swing image representation. 618 may be performed by a physical computer processor configured by machine-readable instructions including a component that is the same as or similar to swing image representation component 114A, swing representation component 226, and/or representation component 550, in accordance with one or more embodiments.

Figure 6B:
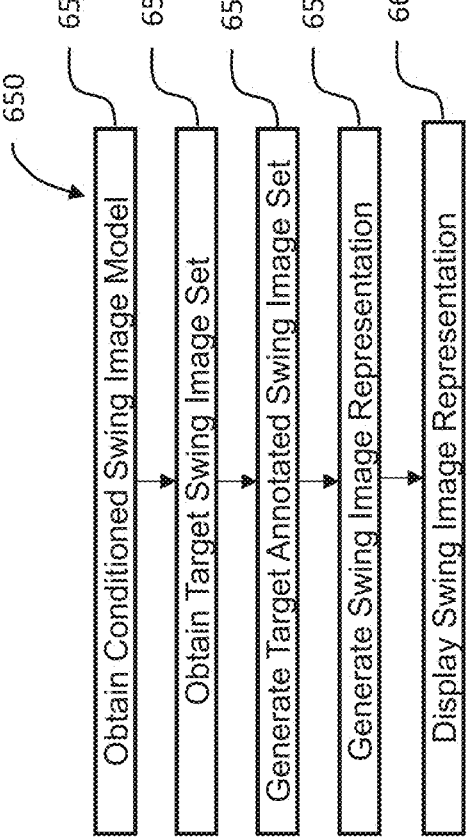
FIG. 6B illustrates an example operational flow diagram for generating annotated swing images in accordance with one or more embodiments of the presently disclosed technology.

FIG. 6B illustrates example operational flow diagram 650 for generating annotated swing images in accordance with one or more embodiments of the presently disclosed technology. 652 may include obtaining a conditioned swing image model. As discussed herein, the conditioned swing image model may be generated by training the initial swing image model using the training swing image set and the training annotated swing image set to generate a set of annotated swing image relationships between swing images and the annotated swing images. The conditioned swing image model may be an optimized swing image model in comparison to the initial swing image model, as discussed herein. The conditioned swing image model may receive swing images as input and output annotated swing images. 652 may be performed by a physical computer processor configured by machine-readable instructions including a component that is the same as or similar to swing image model component 108A, swing image model component 208, and/or swing image model component 508, in accordance with one or more embodiments.

654 may include obtaining a target swing image set. As discussed herein, the target swing image set may include one or more objects. 654 may be performed by a physical computer processor configured by machine-readable instructions including a component that is the same as or similar to swing image component 110A, swing image component 210, and/or swing image component 510, in accordance with one or more embodiments.

656 may include generating a target annotated swing image set. The target annotated swing image set may be generated by applying the conditioned swing image model to the target swing image set, as discussed herein. Each target swing image of the target annotated swing image set may include the one or more swing image properties. The one or more swing image properties may correspond to the target swing image set. 656 may be performed by a physical computer processor configured by machine-readable instructions including a component that is the same as or similar to annotated swing image component 112A, annotated swing image component 212, and/or annotated swing image component 512, in accordance with one or more embodiments.

658 may include generating a swing image representation of the target annotated swing image set. The swing image representation may be generated using visual effects to depict at least some of the target annotated swing image set, as discussed herein. 658 may be performed by a physical computer processor configured by machine-readable instructions including a component that is the same as or similar to swing image representation component 114A, swing representation component 226, and/or representation component 550, in accordance with one or more embodiments.

660 may include displaying the swing image representation. 660 may be performed by a physical computer processor configured by machine-readable instructions including a component that is the same as or similar to swing image representation component 114A, swing representation component 226, and/or representation component 550, in accordance with one or more embodiments.

Figure 7:
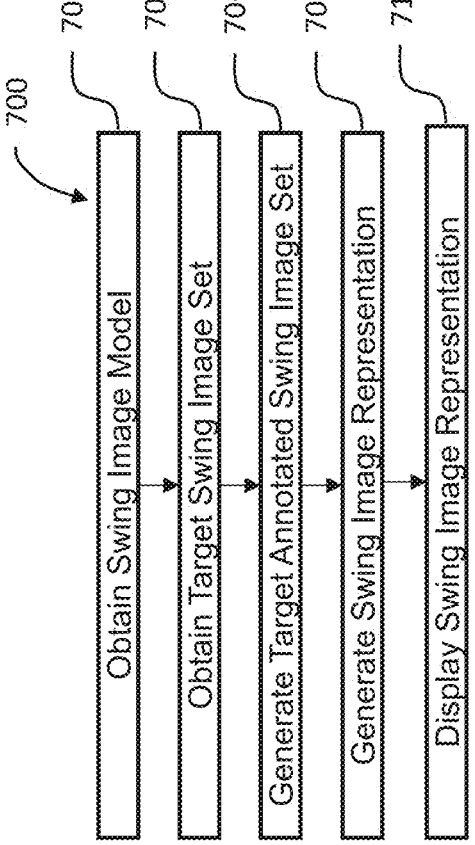
FIG. 7 illustrates an example operational flow diagram for generating annotated swing images in accordance with one or more embodiments of the presently disclosed technology.

FIG. 7 illustrates example operational flow diagram 700 for generating annotated swing images in accordance with one or more embodiments of the presently disclosed technology. 702 may include obtaining a swing image model. As discussed herein, the swing image model may be a graphical representation of a person. In some embodiments, the swing image model may include graphical representations of other objects, as discussed herein. The swing image model may generate annotated swing images by attributing the one or more swing image properties to the swing image model or otherwise annotating the swing image model. The swing image model may receive swing images as input and output annotated swing images. 702 may be performed by a physical computer processor configured by machine-readable instructions including a component that is the same as or similar to swing image model component 108A, swing image model component 208, and/or swing image model component 508, in accordance with one or more embodiments.

704 may include obtaining a target swing image set. As discussed herein, the target swing image set may include one or more objects. 704 may be performed by a physical computer processor configured by machine-readable instructions including a component that is the same as or similar to swing image component 110A, swing image component 210, and/or swing image component 510, in accordance with one or more embodiments.

706 may include generating a target annotated swing image set. The target annotated swing image set may be generated by applying the swing image model to the target swing image set, as discussed herein. Each target swing image of the target annotated swing image set may include the one or more swing image properties. The one or more swing image properties may correspond to the target swing image set. 706 may be performed by a physical computer processor configured by machine-readable instructions including a component that is the same as or similar to annotated swing image component 112A, annotated swing image component 212, and/or annotated swing image component 512, in accordance with one or more embodiments.

708 may include generating a swing image representation of the target annotated swing image set. The swing image representation may be generated using visual effects to depict at least some of the target annotated swing image set, as discussed herein. 708 may be performed by a physical computer processor configured by machine-readable instructions including a component that is the same as or similar to swing image representation component 114A, swing representation component 226, and/or representation component 550, in accordance with one or more embodiments.

710 may include displaying the swing image representation. 710 may be performed by a physical computer processor configured by machine-readable instructions including a component that is the same as or similar to swing image representation component 114A, swing representation component 226, and/or representation component 550, in accordance with one or more embodiments.

Figure 8A:
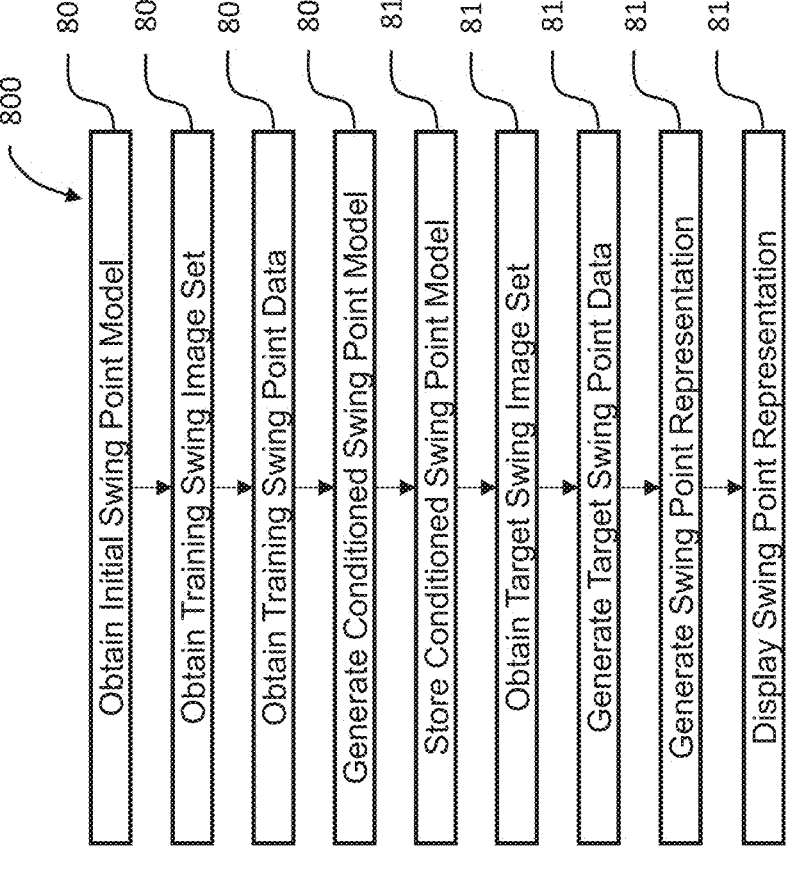
FIG. 8A illustrates an example operational flow diagram for training an initial swing point model to generate swing point data in accordance with one or more embodiments of the presently disclosed technology.

FIG. 8A illustrates example operational flow diagram 800 for training an initial swing point model to generate swing point data in accordance with one or more embodiments of the presently disclosed technology. 802 may include obtaining an initial swing point model. As discussed herein, the initial swing point model may be based on machine-learning techniques and may be "untrained." The initial swing point model may receive swing images and/or other input as input and output swing points. 802 may be performed by a physical computer processor configured by machine-readable instructions including a component that is the same as or similar to swing point model component 108B, swing point model component 214, and/or swing point model component 514, in accordance with one or more embodiments.

804 may include obtaining a training swing image set. As discussed herein, the training swing image set may include one or more objects. The one or more objects may include one or more of a person, an accessory, or an environment. The accessory may be an accessory for the person. The environment may be an area surrounding the person and the accessory. The training swing image set may be used to train the initial swing image model. The training swing image set may correspond to the training annotated swing image set. 804 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

806 may include obtaining training swing point data. As discussed herein, the training swing point data may include swing point data specifying swing points of the one or more objects as a function of position and time. The one or more objects may include one or more of a person, accessory, and environment. The accessory may be an accessory for the person. The environment may be an area surrounding the person and the accessory. The swing points may change position as a function of time. The swing points may be one or more position-specific areas on one of the one or more objects. The training swing point data may be used to train the initial swing point model. The training swing point data may correspond to the training swing image set. 806 may be performed by a physical computer processor configured by machine-readable instructions including a component that is the same as or similar to swing point component 112B, swing point component 110C, swing point component 216, and/or swing point component 516, in accordance with one or more embodiments.

808 may include generating a conditioned swing point model. As discussed herein, the conditioned swing point model may be generated by training the initial swing point model using the training swing image set and the training swing point data to generate a set of swing point relationships between swing images and the swing point data. The conditioned swing point model may be an optimized swing point model in comparison to the initial swing point model, as discussed herein. The conditioned swing point model may receive swing images as input and output swing point data. 808 may be performed by a physical computer processor configured by machine-readable instructions including a component that is the same as or similar to swing point model component 108B, swing point model component 214, and/or swing point model component 514, in accordance with one or more embodiments.

810 may include storing the conditioned swing point model. 810 may be performed by a physical computer processor configured by machine-readable instructions including a component that is the same as or similar to swing point model component 108B, swing point model component 214, and/or swing point model component 514, in accordance with one or more embodiments.

812 may include obtaining a target swing image set. As discussed herein, the target swing image set may include one or more objects. The target swing image set may include swing image properties. The swing image properties may include swing points and annotations. 812 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

814 may include generating target swing point data. The target swing point data may be generated by applying the conditioned swing point model to the target swing image set, as discussed herein. The target swing point data may include swing points corresponding to the target swing image set. 814 may be performed by a physical computer processor configured by machine-readable instructions including a component that is the same as or similar to swing point component 112B, swing point component 110C, swing point component 216, and/or swing point component 516, in accordance with one or more embodiments.

816 may include generating a swing point representation of the target swing point data. The swing point representation may be generated using visual effects to depict at least some of the target swing point data, as discussed herein. 816 may be performed by a physical computer processor configured by machine-readable instructions including a component that is the same as or similar to swing point representation component 114B, swing representation component 226, and/or representation component 550, in accordance with one or more embodiments.

818 may include displaying the swing point representation. 818 may be performed by a physical computer processor configured by machine-readable instructions including a component that is the same as or similar to swing point representation component 114B, swing representation component 226, and/or representation component 550, in accordance with one or more embodiments.

Figure 8B:
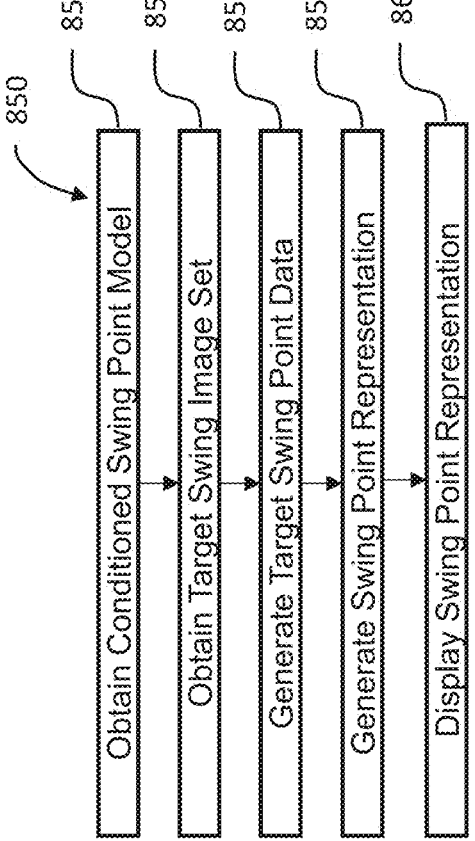
FIG. 8B illustrates an example operational flow diagram for generating swing point data in accordance with one or more embodiments of the presently disclosed technology.

FIG. 8B illustrates example operational flow diagram 850 for generating swing point data in accordance with one or more embodiments of the presently disclosed technology.

852 may include obtaining a conditioned swing point model. As discussed herein, the conditioned swing point model may be generated by training the initial swing point model using the training swing image set and the training swing point data to generate a set of swing point relationships between swing images and the swing point data. The conditioned swing point model may be an optimized swing point model in comparison to the initial swing point model, as discussed herein. The conditioned swing point model may receive swing images as input and output swing point data. 852 may be performed by a physical computer processor configured by machine-readable instructions including a component that is the same as or similar to swing point model component 108B, swing point model component 214, and/or swing point model component 514, in accordance with one or more embodiments.

854 may include obtaining a target swing image set. As discussed herein, the target swing image set may include one or more objects. The target swing image set may include swing image properties. The swing image properties may include swing points and annotations. 854 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

856 may include generating target swing point data. The target swing point data may be generated by applying the conditioned swing point model to the target swing image set, as discussed herein. The target swing point data may include swing points corresponding to the target swing image set. 856 may be performed by a physical computer processor configured by machine-readable instructions including a component that is the same as or similar to swing point component 112B, swing point component 110C, swing point component 216, and/or swing point component 516, in accordance with one or more embodiments.

858 may include generating a swing point representation of the target swing point data. The swing point representation may be generated using visual effects to depict at least some of the target swing point data, as discussed herein. 858 may be performed by a physical computer processor configured by machine-readable instructions including a component that is the same as or similar to swing point representation component 114B, swing representation component 226, and/or representation component 550, in accordance with one or more embodiments.

860 may include displaying the swing point representation. 860 may be performed by a physical computer processor configured by machine-readable instructions including a component that is the same as or similar to swing point representation component 114B, swing representation component 226, and/or representation component 550, in accordance with one or more embodiments.

Figure 9A:
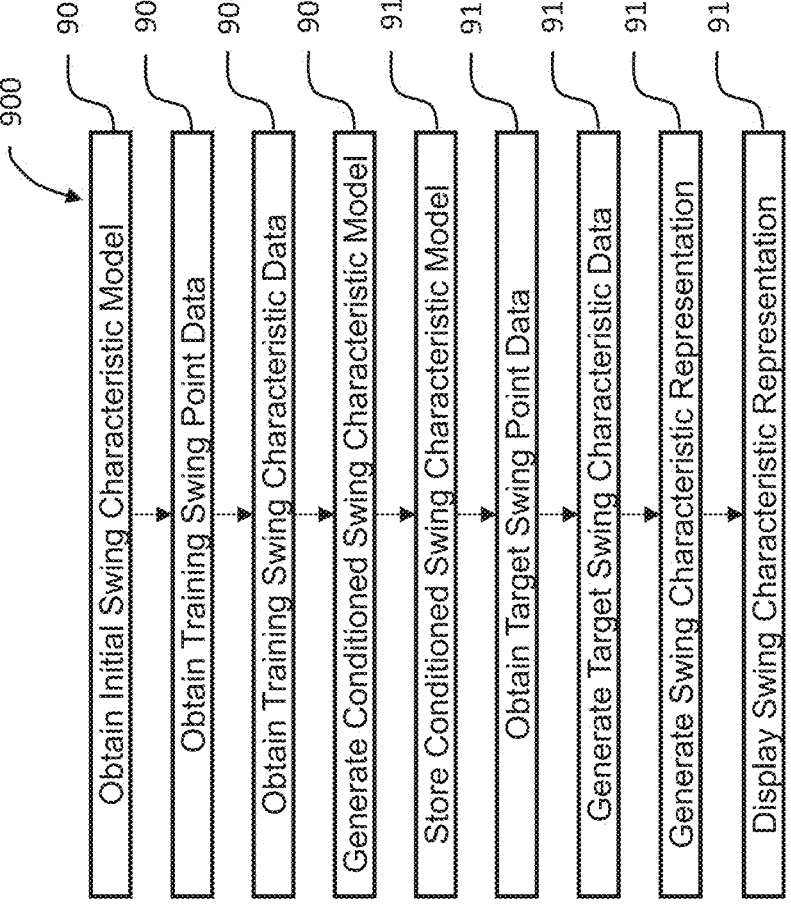
FIG. 9A illustrates an example operational flow diagram for training an initial swing characteristic model to generate swing characteristic data in accordance with one or more embodiments of the presently disclosed technology.

FIG. 9A illustrates example operational flow diagram 900 for training an initial swing characteristic model to generate swing characteristic data in accordance with one or more embodiments of the presently disclosed technology. 902 may include obtaining an initial swing characteristic model. As discussed herein, the initial swing characteristic model may be based on machine-learning techniques and may be "untrained." The initial swing characteristic model may receive swing point data and/or other input as input and output swing characteristics. 902 may be performed by a physical computer processor configured by machine-readable instructions including a component that is the same as or similar to swing characteristic model component 108C, swing characteristic model component 218, and/or swing characteristic model component 518, in accordance with one or more embodiments.

904 may include obtaining training swing point data. As discussed herein, the training swing point data may include swing point data specifying swing points of the one or more objects as a function of position and time. The one or more objects may include one or more of a person, accessory, and environment. The accessory may be an accessory for the person. The environment may be an area surrounding the person and the accessory. The swing points may change position as a function of time. The swing points may be one or more position-specific areas on one of the one or more objects. The training swing point data may be used to train the initial swing characteristic model. The training swing point data may correspond to the training swing characteristic data. 904 may be performed by a physical computer processor configured by machine-readable instructions including a component that is the same as or similar to swing point component 112B, swing point component 110C, swing point component 216, and/or swing point component 516, in accordance with one or more embodiments.

906 may include obtaining training swing characteristic data. As discussed herein, the training swing characteristic data may include swing characteristic data including the swing characteristics specifying swing characteristic values. The swing characteristics may be one or more traits corresponding to one or more golf poses in a golf swing. The one or more golf poses may include one or more of address, takeaway, halfway back, top of backswing, transition, early downswing, pre-impact, impact, release, finish, or end of swing. The swing characteristics may include one or more of a S-posture swing characteristic, C-posture swing characteristic, loss of posture swing characteristic, flat shoulder plane swing characteristic, flying elbow swing characteristic, early extension swing characteristic, hiking swing characteristic, reverse pivot swing characteristic, over the top swing characteristic, sway swing characteristic, slide swing characteristic, late buckle swing characteristic, reverse spine angle swing characteristic, forward lunge swing characteristic, hanging back swing characteristic, casting swing characteristic, scooping swing characteristic, or chicken winging swing characteristic. The swing characteristic values include one of detecting a given swing characteristic, detecting a potential given swing characteristic, or detecting no given swing characteristic. The training swing characteristic data may be used to train the initial swing characteristic model. The training swing characteristic data may correspond to the training swing point data. 906 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

908 may include generating a conditioned swing characteristic model. As discussed herein, the conditioned swing characteristic model may be generated by training the initial swing characteristic model using the training swing point data and the training swing characteristic data to generate a set of swing characteristic relationships between swing point data and the swing characteristic data. The conditioned swing characteristic model may be an optimized swing characteristic model in comparison to the initial swing characteristic model, as discussed herein. The conditioned swing characteristic model may receive swing point data as input and output swing characteristic data. 908 may be performed by a physical computer processor configured by machine-readable instructions including a component that is the same as or similar to swing characteristic model component 108C, swing characteristic model component 218, and/or swing characteristic model component 518, in accordance with one or more embodiments.

910 may include storing the conditioned swing characteristic model. 910 may be performed by a physical computer processor configured by machine-readable instructions including a component that is the same as or similar to swing characteristic model component 108C, swing characteristic model component 218, and/or swing characteristic model component 518, in accordance with one or more embodiments.

912 may include obtaining target swing point data. As discussed herein, the target swing point data may specify swing points of one or more objects as a function of position and time. 912 may be performed by a physical computer processor configured by machine-readable instructions including a component that is the same as or similar to swing point component 112B, swing point component 110C, swing point component 216, and/or swing point component 516, in accordance with one or more embodiments.

914 may include generating target swing characteristic data. The target swing characteristic data may be generated by applying the conditioned swing characteristic model to the target swing point data, as discussed herein. The target swing characteristic data may include swing characteristics specifying swing characteristic values corresponding to the target swing point data. 914 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

916 may include generating a swing characteristic representation of the target swing characteristic data. The swing characteristic representation may be generated using visual effects to depict at least some of the target swing characteristic data, as discussed herein. 916 may be performed by a physical computer processor configured by machine-readable instructions including a component that is the same as or similar to swing characteristic representation component 114C, swing representation component 226, and/or representation component 550, in accordance with one or more embodiments.

918 may include displaying the swing characteristic representation. 918 may be performed by a physical computer processor configured by machine-readable instructions including a component that is the same as or similar to swing characteristic representation component 114C, swing representation component 226, and/or representation component 550, in accordance with one or more embodiments.

Figure 9B:
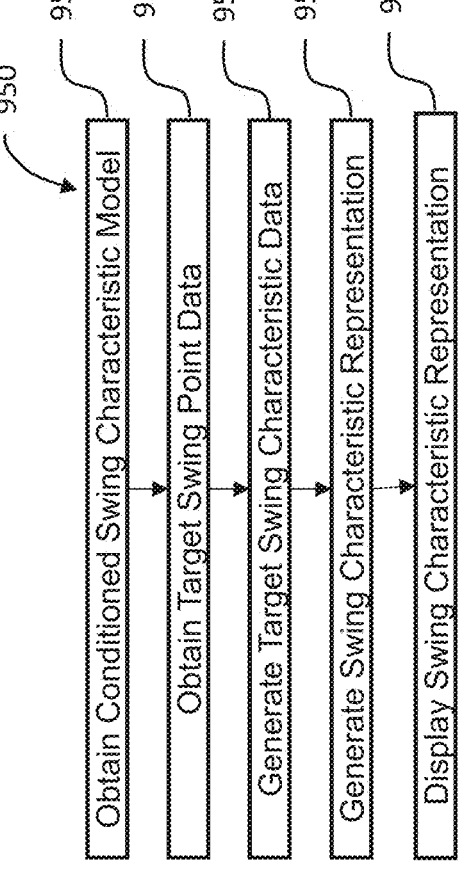
FIG. 9B illustrates an example operational flow diagram for generating swing characteristic data in accordance with one or more embodiments of the presently disclosed technology.

FIG. 9B illustrates example operational flow diagram 950 for generating swing characteristic data in accordance with one or more embodiments of the presently disclosed technology. 952 may include obtaining a conditioned swing characteristic model. As discussed herein, the conditioned swing characteristic model may be generated by training the initial swing characteristic model using the training swing point data and the training swing characteristic data to generate a set of swing characteristic relationships between swing point data and the swing characteristic data. The conditioned swing characteristic model may be an optimized swing characteristic model in comparison to the initial swing characteristic model, as discussed herein. The conditioned swing characteristic model may receive swing point data as input and output swing characteristic data. 952 may be performed by a physical computer processor configured by machine-readable instructions including a component that is the same as or similar to swing characteristic model component 108C, swing characteristic model component 218, and/or swing characteristic model component 518, in accordance with one or more embodiments.

954 may include obtaining target swing point data. As discussed herein, the target swing point data may specify swing points of one or more objects as a function of position and time. 954 may be performed by a physical computer processor configured by machine-readable instructions including a component that is the same as or similar to swing point component 112B, swing point component 110C, swing point component 216, and/or swing point component 516, in accordance with one or more embodiments.

956 may include generating target swing characteristic data. The target swing characteristic data may be generated by applying the conditioned swing characteristic model to the target swing point data, as discussed herein. The target swing characteristic data may include swing characteristics specifying swing characteristic values corresponding to the target swing point data. 956 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

958 may include generating a swing characteristic representation of the target swing characteristic data. The swing characteristic representation may be generated using visual effects to depict at least some of the target swing characteristic data, as discussed herein. 958 may be performed by a physical computer processor configured by machine-readable instructions including a component that is the same as or similar to swing characteristic representation component 114C, swing representation component 226, and/or representation component 550, in accordance with one or more embodiments.

960 may include displaying the swing characteristic representation. 960 may be performed by a physical computer processor configured by machine-readable instructions including a component that is the same as or similar to swing characteristic representation component 114C, swing representation component 226, and/or representation component 550, in accordance with one or more embodiments.

Figure 10:
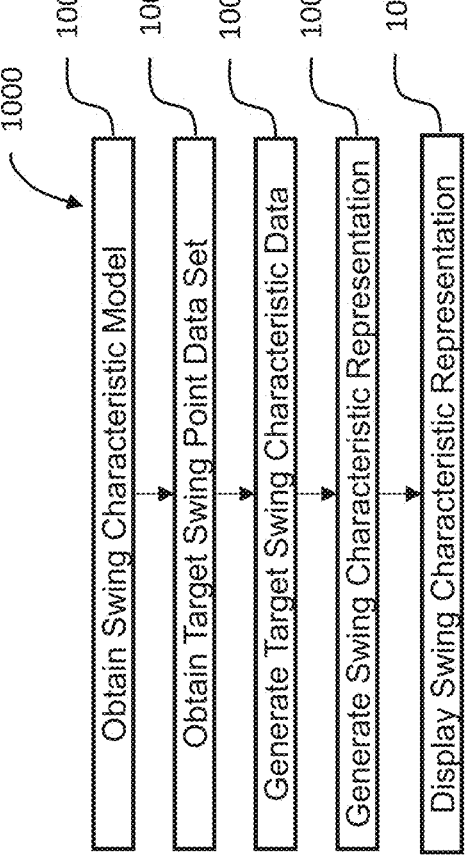
FIG. 10 illustrates an example operational flow diagram for generating swing characteristic data in accordance with one or more embodiments of the presently disclosed technology.

FIG. 10 illustrates example operational flow diagram 1000 for generating swing characteristic data in accordance with one or more embodiments of the presently disclosed technology. 1002 may include obtaining a swing characteristic model. As discussed herein, the swing characteristic model may receive or obtain swing point data and process the swing point data into swing characteristic data. The swing characteristic model may track position and/or movement of swing points as a function of position and/or time. The swing characteristic model may identify or detect one or more swing characteristics. The swing characteristic model may include a set of swing characteristic relationships between the swing point data and the swing characteristic data. The swing characteristic model may generate swing characteristic data by applying the swing characteristic model to the swing point data. The swing characteristic model may receive swing point data as input and output swing characteristic data. 1002 may be performed by a physical computer processor configured by machine-readable instructions including a component that is the same as or similar to swing characteristic model component 108C, swing characteristic model component 218, and/or swing characteristic model component 518, in accordance with one or more embodiments.

1004 may include obtaining target swing point data. As discussed herein, the target swing point data may specify swing points of one or more objects as a function of position and time. 1004 may be performed by a physical computer processor configured by machine-readable instructions including a component that is the same as or similar to swing point component 112B, swing point component 110C, swing point component 216, and/or swing point component 516, in accordance with one or more embodiments.

1006 may include generating target swing characteristic data. The target swing characteristic data may be generated by applying the swing characteristic model to the target swing point data, as discussed herein. The target swing characteristic data may include swing characteristics specifying swing characteristic values corresponding to the target swing point data. 1006 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1008 may include generating a swing characteristic representation of the target swing characteristic data. The swing characteristic representation may be generated using visual effects to depict at least some of the target swing characteristic data, as discussed herein. 1008 may be performed by a physical computer processor configured by machine-readable instructions including a component that is the same as or similar to swing characteristic representation component 114C, swing representation component 226, and/or representation component 550, in accordance with one or more embodiments.

1010 may include displaying the swing characteristic representation. 1010 may be performed by a physical computer processor configured by machine-readable instructions including a component that is the same as or similar to swing characteristic representation component 114C, swing representation component 226, and/or representation component 550, in accordance with one or more embodiments.

FIG. 11A illustrates example operational flow diagram 1100 for training an initial swing recommendation model to generate swing recommendation data in accordance with one or more embodiments of the presently disclosed technology. 1102 may include obtaining an initial swing recommendation model. As discussed herein, the initial swing recommendation model may be based on machine-learning techniques and may be "untrained." The initial swing recommendation model may receive swing characteristic data and/or other input as input and output swing recommendation data. 1102 may be performed by a physical computer processor configured by machine-readable instructions including a component that is the same as or similar to swing recommendation model component 108D, swing recommendation model component 222, and/or swing recommendation model component 522, in accordance with one or more embodiments.

1104 may include obtaining training swing characteristic data. As discussed herein, the training swing characteristic data may include swing characteristic data including the swing characteristics specifying swing characteristic values. The swing characteristics may be one or more traits corresponding to one or more golf poses in a golf swing, as discussed herein. The training swing characteristic data may be used to train the initial swing characteristic model. The training swing characteristic data may correspond to the training swing recommendation data. 1104 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1106 may include obtaining training swing recommendation data. As discussed herein, the training swing recommendation data may include swing recommendation data including the swing recommendations specifying swing recommendation values. The swing recommendation may be one or more recommendations for a player. The swing recommendations may be based on one or more identified or detected swing characteristics, as discussed herein. The swing recommendations may include exercises, drills, equipment, swing changes, other prescriptions, and/or why a prescription was recommended, as discussed herein. The training swing recommendation data may be used to train the initial swing recommendation model. The training swing recommendation data may correspond to the training swing characteristic data. 1106 may be performed by a physical computer processor configured by machine-readable instructions including a component that is the same as or similar to swing recommendation component 112D, swing recommendation component 224, and/or swing recommendation component 524, in accordance with one or more embodiments.

1108 may include generating a conditioned swing recommendation model. As discussed herein, the conditioned swing recommendation model may be generated by training the initial swing recommendation model using the training swing characteristic data and the training swing recommendation data to generate a set of swing recommendation relationships between swing characteristic data and the swing recommendation data. The conditioned swing recommendation model may be an optimized swing recommendation model in comparison to the initial swing recommendation model, as discussed herein. The conditioned swing recommendation model may receive swing characteristic data as input and output swing recommendation data. 1108 may be performed by a physical computer processor configured by machine-readable instructions including a component that is the same as or similar to swing recommendation model component 108D, swing recommendation model component 222, and/or swing recommendation model component 522, in accordance with one or more embodiments.

1110 may include storing the conditioned swing recommendation model. 1110 may be performed by a physical computer processor configured by machine-readable instructions including a component that is the same as or similar to swing recommendation model component 108D, swing recommendation model component 222, and/or swing recommendation model component 522, in accordance with one or more embodiments.

1112 may include obtaining target swing characteristic data. As discussed herein, the target swing characteristic data may include swing characteristics specifying swing characteristic values. 1112 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1114 may include generating target swing recommendation data. The target swing recommendation data may be generated by applying the conditioned swing recommendation model to the target swing characteristic data, as discussed herein. The target swing recommendation data may include the swing recommendations specifying swing recommendation values corresponding to the target swing characteristic data. 1114 may be performed by a physical computer processor configured by machine-readable instructions including a component that is the same as or similar to swing recommendation component 112D, swing recommendation component 224, and/or swing recommendation component 524, in accordance with one or more embodiments.

1116 may include generating a swing recommendation representation of the target swing recommendation data. The swing recommendation representation may be generated using visual effects to depict at least some of the target swing recommendation data, as discussed herein. 1116 may be performed by a physical computer processor configured by machine-readable instructions including a component that is the same as or similar to swing recommendation representation component 114D, swing representation component 226, and/or representation component 550, in accordance with one or more embodiments.

1118 may include displaying the swing recommendation representation. 1118 may be performed by a physical computer processor configured by machine-readable instructions including a component that is the same as or similar to swing recommendation representation component 114D, swing representation component 226, and/or representation component 550, in accordance with one or more embodiments.

Figure 11B:
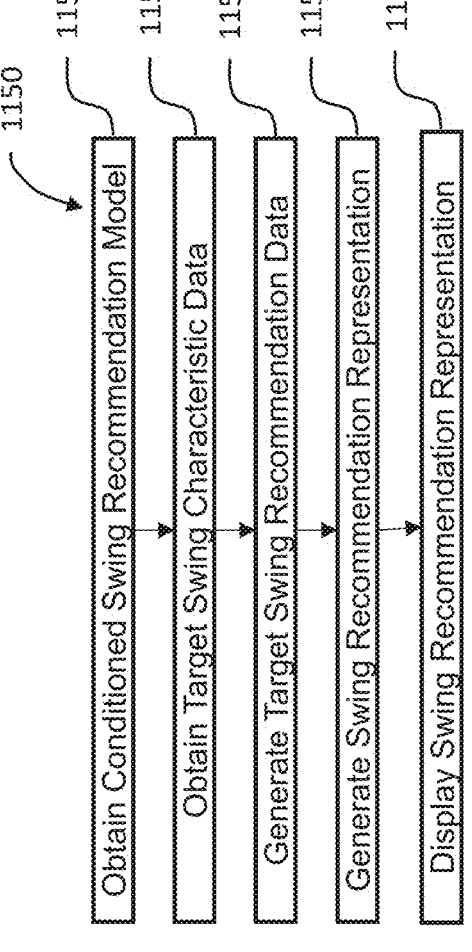
FIG. 11B illustrates an example operational flow diagram for generating swing recommendation data in accordance with one or more embodiments of the presently disclosed technology.

FIG. 11B illustrates example operational flow diagram 1150 for generating swing recommendation data in accordance with one or more embodiments of the presently disclosed technology. 1152 may include obtaining a conditioned swing recommendation model. As discussed herein, the conditioned swing recommendation model may be generated by training the initial swing recommendation model using the training swing characteristic data and the training swing recommendation data to generate a set of swing recommendation relationships between swing characteristic data and the swing recommendation data. The conditioned swing recommendation model may be an optimized swing recommendation model in comparison to the initial swing recommendation model, as discussed herein. The conditioned swing recommendation model may receive swing characteristic data as input and output swing recommendation data. 1152 may be performed by a physical computer processor configured by machine-readable instructions including a component that is the same as or similar to swing recommendation model component 108D, swing recommendation model component 222, and/or swing recommendation model component 522, in accordance with one or more embodiments.

1154 may include target swing characteristic data. As discussed herein, the target swing characteristic data may include swing characteristics specifying swing characteristic values. 1154 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments

1156 may include generating target swing recommendation data. The target swing recommendation data may be generated by applying the conditioned swing recommendation model to the target swing characteristic data, as discussed herein. The target swing recommendation data may include the swing recommendations specifying swing recommendation values corresponding to the target swing characteristic data. 1156 may be performed by a physical computer processor configured by machine-readable instructions including a component that is the same as or similar to swing recommendation component 112D, swing recommendation component 224, and/or swing recommendation component 524, in accordance with one or more embodiments.

1158 may include generating a swing recommendation representation of the target swing recommendation data. The swing recommendation representation may be generated using visual effects to depict at least some of the target swing recommendation data, as discussed herein. 1158 may be performed by a physical computer processor configured by machine-readable instructions including a component that is the same as or similar to swing recommendation representation component 114D, swing representation component 226, and/or representation component 550, in accordance with one or more embodiments.

1160 may include displaying the swing recommendation representation. 1160 may be performed by a physical computer processor configured by machine-readable instructions including a component that is the same as or similar to swing recommendation representation component 114D, swing representation component 226, and/or representation component 550, in accordance with one or more embodiments.

Figure 12:
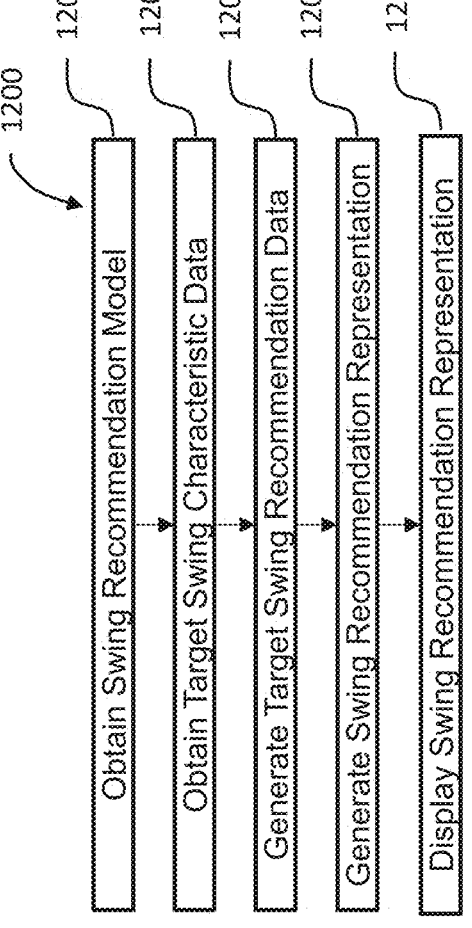
FIG. 12 illustrates an example operational flow diagram for generating swing recommendation data in accordance with one or more embodiments of the presently disclosed technology.

FIG. 12 illustrates example operational flow diagram 1200 for generating swing recommendation data in accordance with one or more embodiments of the presently disclosed technology. 1202 may include obtaining a swing recommendation model. As discussed herein, the swing recommendation model may receive or obtain swing characteristic data and process the swing characteristic data into swing recommendation data. The swing recommendation model may recommend, generate, identify, or otherwise provide swing recommendations based on a detected swing characteristic. The swing recommendation model may include a set of swing recommendation relationships between the swing characteristic data and the swing recommendation data. The swing recommendation model may generate swing recommendation data by applying the swing recommendation model to the swing characteristic data. The swing recommendation model may receive swing characteristic data as input and output swing recommendation data. 1202 may be performed by a physical computer processor configured by machine-readable instructions including a component that is the same as or similar to swing recommendation model component 108D, swing recommendation model component 222, and/or swing recommendation model component 522, in accordance with one or more embodiments.

1204 may include target swing characteristic data. As discussed herein, the target swing characteristic data may include swing characteristics specifying swing characteristic values. 1204 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments

1206 may include generating target swing recommendation data. The target swing recommendation data may be generated by applying the conditioned swing recommendation model to the target swing characteristic data, as discussed herein. The target swing recommendation data may include the swing recommendations specifying swing recommendation values corresponding to the target swing characteristic data. 1206 may be performed by a physical computer processor configured by machine-readable instructions including a component that is the same as or similar to swing recommendation component 112D, swing recommendation component 224, and/or swing recommendation component 524, in accordance with one or more embodiments.

1208 may include generating a swing recommendation representation of the target swing recommendation data. The swing recommendation representation may be generated using visual effects to depict at least some of the target swing recommendation data, as discussed herein. 1208 may be performed by a physical computer processor configured by machine-readable instructions including a component that is the same as or similar to swing recommendation representation component 114D, swing representation component 226, and/or representation component 550, in accordance with one or more embodiments.

1210 may include displaying the swing recommendation representation. 1210 may be performed by a physical computer processor configured by machine-readable instructions including a component that is the same as or similar to swing recommendation representation component 114D, swing representation component 226, and/or representation component 550, in accordance with one or more embodiments.

Figure 13A:
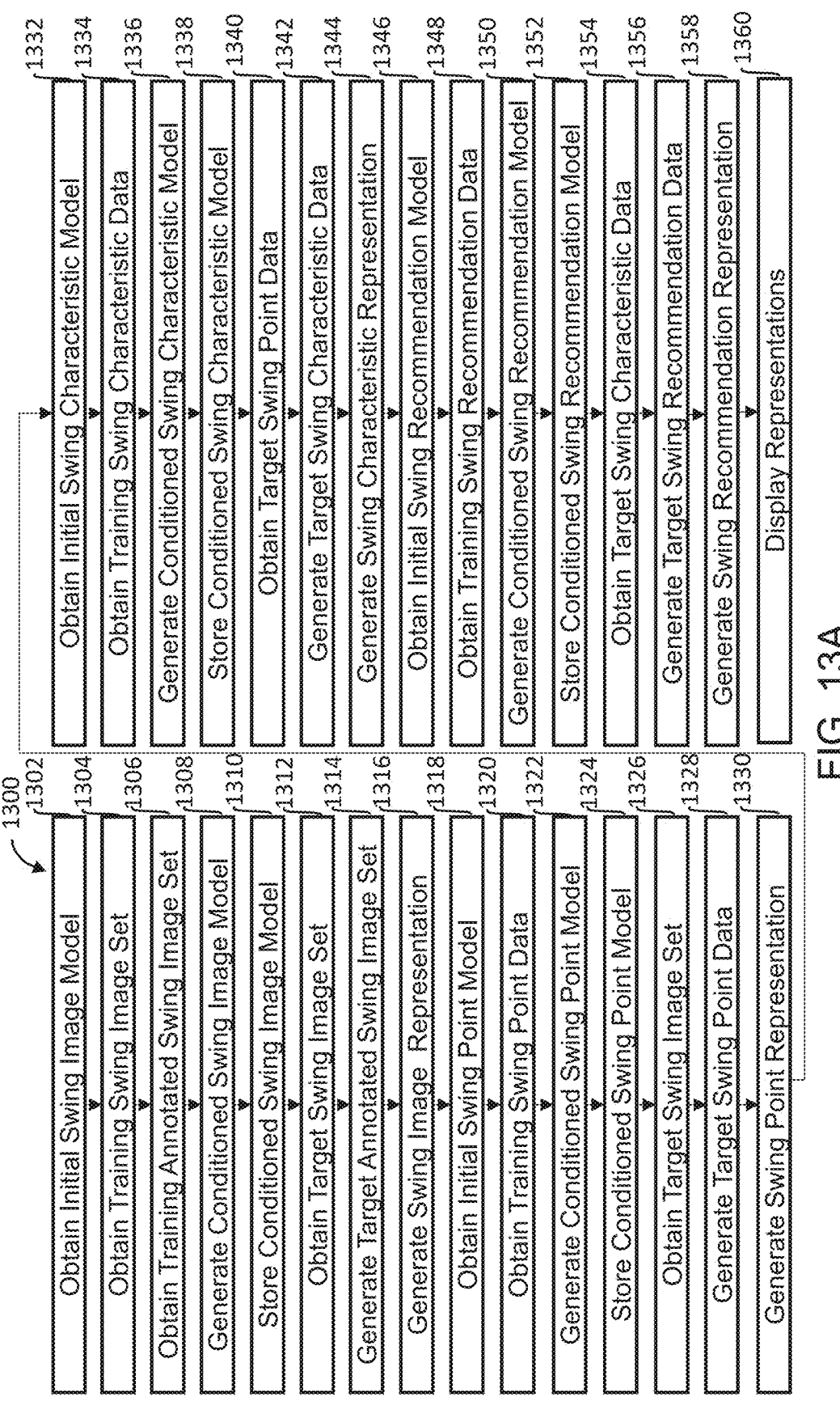
FIG. 13A illustrates an example operational flow diagram for training an initial swing image model to generate annotated swing images, training an initial swing point model to generate swing point data, training an initial swing characteristic model to generate swing characteristic data, and/or training an initial swing recommendation model to generate swing recommendation data in accordance with one or more embodiments of the presently disclosed technology.

FIG. 13A illustrates example operational flow diagram 1300 for training an initial swing image model to generate annotated swing images, training an initial swing point model to generate swing point data, training an initial swing characteristic model to generate swing characteristic data, and/or training an initial swing recommendation model to generate swing recommendations in accordance with one or more embodiments of the presently disclosed technology. 1302 may include obtaining an initial swing image model, as discussed herein. 1302 may be performed by a physical computer processor configured by machine-readable instructions including a component that is the same as or similar to swing image model component 108A, swing image model component 208, and/or swing image model component 508, in accordance with one or more embodiments.

1304 may include obtaining a training swing image set, as discussed herein. 1304 may be performed by a physical computer processor configured by machine-readable instructions including a component that is the same as or similar to swing image component 110A, swing image component 210, and/or swing image component 510, in accordance with one or more embodiments.

1306 may include obtaining a training annotated swing image set, as discussed herein. 1306 may be performed by a physical computer processor configured by machine-readable instructions including a component that is the same as or similar to annotated swing image component 112A, annotated swing image component 212, and/or annotated swing image component 512, in accordance with one or more embodiments.

1308 may include generating a conditioned swing image model, as discussed herein. 1308 may be performed by a physical computer processor configured by machine-readable instructions including a component that is the same as or similar to swing image model component 108A, swing image model component 208, and/or swing image model component 508, in accordance with one or more embodiments.

1310 may include storing the conditioned swing image model. 1310 may be performed by a physical computer processor configured by machine-readable instructions including a component that is the same as or similar to swing image model component 108A, swing image model component 208, and/or swing image model component 508, in accordance with one or more embodiments.

1312 may include obtaining a target swing image set, as discussed herein. 1312 may be performed by a physical computer processor configured by machine-readable instructions including a component that is the same as or similar to swing image component 110A, swing image component 210, and/or swing image component 510, in accordance with one or more embodiments.

1314 may include generating a target annotated swing image set, as discussed herein. 1314 may be performed by a physical computer processor configured by machine-readable instructions including a component that is the same as or similar to annotated swing image component 112A, annotated swing image component 212, and/or annotated swing image component 512, in accordance with one or more embodiments.

1316 may include generating a swing image representation of the target annotated swing image set, as discussed herein. 1316 may be performed by a physical computer processor configured by machine-readable instructions including a component that is the same as or similar to swing image representation component 114A, swing representation component 226, and/or representation component 550, in accordance with one or more embodiments.

1318 may include obtaining an initial swing point model, as discussed herein. 1318 may be performed by a physical computer processor configured by machine-readable instructions including a component that is the same as or similar to swing point model component 108B, swing point model component 214, and/or swing point model component 514, in accordance with one or more embodiments.

1320 may include obtaining training swing point data, as discussed herein. 1320 may be performed by a physical computer processor configured by machine-readable instructions including a component that is the same as or similar to swing point component 112B, swing point component 110C, swing point component 216, and/or swing point component 516, in accordance with one or more embodiments.

1322 may include generating a conditioned swing point model, as discussed herein. 1322 may be performed by a physical computer processor configured by machine-readable instructions including a component that is the same as or similar to swing point model component 108B, swing point model component 214, and/or swing point model component 514, in accordance with one or more embodiments.

1324 may include storing the conditioned swing point model. 1324 may be performed by a physical computer processor configured by machine-readable instructions including a component that is the same as or similar to swing point model component 108B, swing point model component 214, and/or swing point model component 514, in accordance with one or more embodiments.

1326 may include obtaining a target swing image set, as discussed herein. 1326 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

1328 may include generating target swing point data, as discussed herein. 1328 may be performed by a physical computer processor configured by machine-readable instructions including a component that is the same as or similar to swing point component 112B, swing point component 110C, swing point component 216, and/or swing point component 516, in accordance with one or more embodiments.

1330 may include generating a swing point representation of the target swing point data, as discussed herein. 1330 may be performed by a physical computer processor configured by machine-readable instructions including a component that is the same as or similar to swing point representation component 114B, swing representation component 226, and/or representation component 550, in accordance with one or more embodiments.

1332 may include obtaining an initial swing characteristic model, as discussed herein. 1332 may be performed by a physical computer processor configured by machine-readable instructions including a component that is the same as or similar to swing characteristic model component 108C, swing characteristic model component 218, and/or swing characteristic model component 518, in accordance with one or more embodiments.

1334 may include obtaining training swing characteristic data, as discussed herein. 1334 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1336 may include generating a conditioned swing characteristic model, as discussed herein. 1336 may be performed by a physical computer processor configured by machine-readable instructions including a component that is the same as or similar to swing characteristic model component 108C, swing characteristic model component 218, and/or swing characteristic model component 518, in accordance with one or more embodiments.

1338 may include storing the conditioned swing characteristic model. 1338 may be performed by a physical computer processor configured by machine-readable instructions including a component that is the same as or similar to swing characteristic model component 108C, swing characteristic model component 218, and/or swing characteristic model component 518, in accordance with one or more embodiments.

1340 may include obtaining target swing point data, as discussed herein. 1340 may be performed by a physical computer processor configured by machine-readable instructions including a component that is the same as or similar to swing point component 112B, swing point component 110C, swing point component 216, and/or swing point component 516, in accordance with one or more embodiments.

1342 may include generating target swing characteristic data, as discussed herein. 1342 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1344 may include generating a swing characteristic representation of the target swing characteristic data, as discussed herein. 1344 may be performed by a physical computer processor configured by machine-readable instructions including a component that is the same as or similar to swing characteristic representation component 114C, swing representation component 226, and/or representation component 550, in accordance with one or more embodiments.

1346 may include obtaining an initial swing recommendation model, as discussed herein. 1346 may be performed by a physical computer processor configured by machine-readable instructions including a component that is the same as or similar to swing recommendation model component 108D, swing recommendation model component 222, and/or swing recommendation model component 522, in accordance with one or more embodiments.

1348 may include obtaining training swing recommendation data, as discussed herein. 1348 may be performed by a physical computer processor configured by machine-readable instructions including a component that is the same as or similar to swing recommendation component 112D, swing recommendation component 224, and/or swing recommendation component 524, in accordance with one or more embodiments.

1350 may include generating a conditioned swing recommendation model, as discussed herein. 1350 may be performed by a physical computer processor configured by machine-readable instructions including a component that is the same as or similar to swing recommendation model component 108D, swing recommendation model component 222, and/or swing recommendation model component 522, in accordance with one or more embodiments.

1352 may include storing the conditioned swing recommendation model. 1352 may be performed by a physical computer processor configured by machine-readable instructions including a component that is the same as or similar to swing recommendation model component 108D, swing recommendation model component 222, and/or swing recommendation model component 522, in accordance with one or more embodiments.

1354 may include obtaining target swing characteristic data, as discussed herein. 1354 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1356 may include generating target swing recommendation data, as discussed herein. 1356 may be performed by a physical computer processor configured by machine-readable instructions including a component that is the same as or similar to swing recommendation component 112D, swing recommendation component 224, and/or swing recommendation component 524, in accordance with one or more embodiments.

1358 may include generating a swing recommendation representation of the target swing recommendation data, as discussed herein. 1358 may be performed by a physical computer processor configured by machine-readable instructions including a component that is the same as or similar to swing recommendation representation component 114D, swing representation component 226, and/or representation component 550, in accordance with one or more embodiments.

1360 may include displaying the swing image representation. In some embodiments, 1360 may include displaying the swing point representation. In embodiments, 1360 may include displaying the swing characteristic representation. 1360 may include displaying the swing recommendation representation. 1360 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, and/or representation component 550, in accordance with one or more embodiments.

Figure 13B:
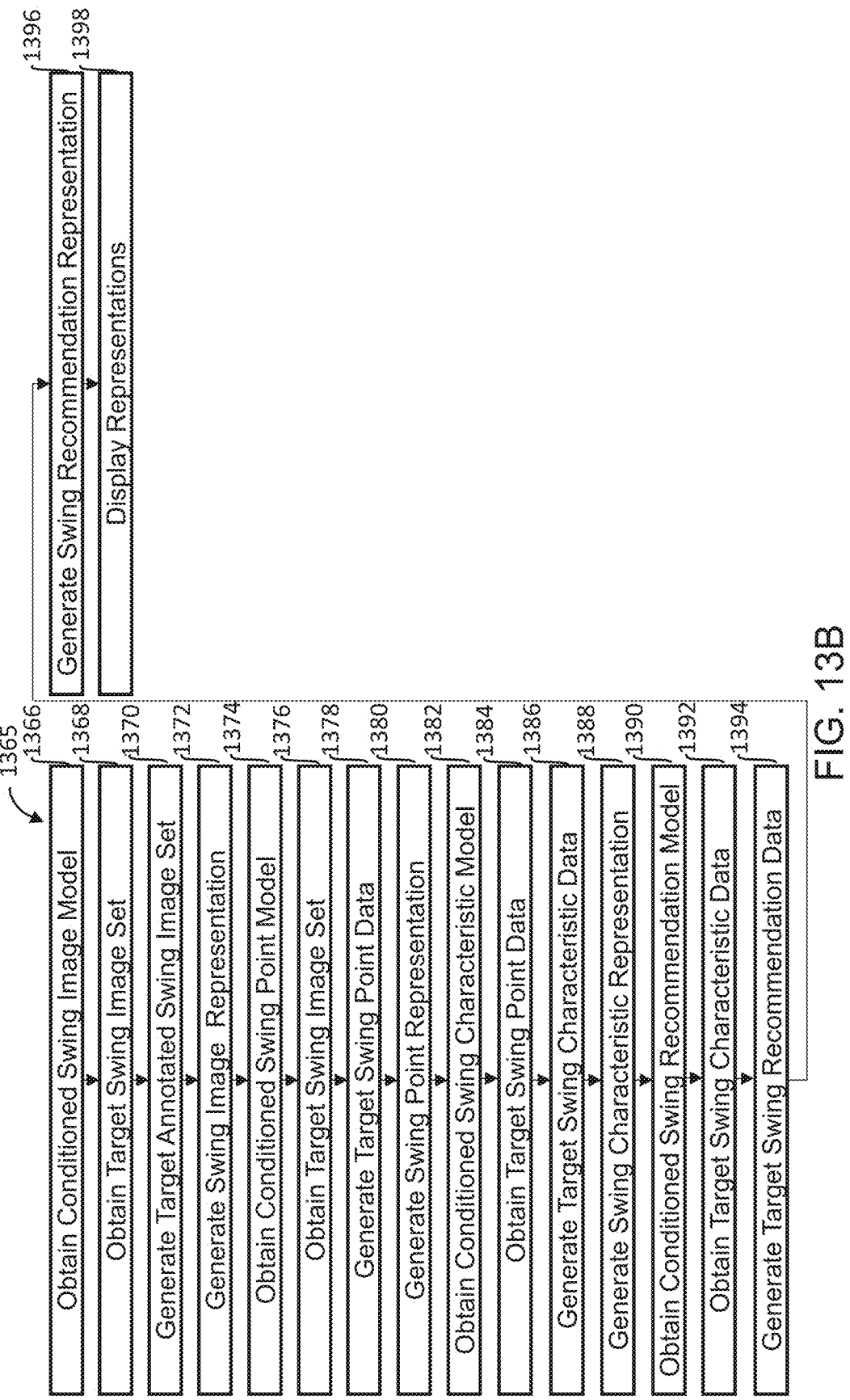
FIG. 13B illustrates an example operational flow diagram for generating annotated swing images, swing point data, swing characteristic data, and/or swing recommendation data in accordance with one or more embodiments of the presently disclosed technology.

FIG. 13B illustrates example operational flow diagram 1365 for generating annotated swing images, swing point data, swing characteristic data, and/or swing recommendation data in accordance with one or more embodiments of the presently disclosed technology. 1366 may include obtaining a conditioned swing image model, as discussed herein. 1366 may be performed by a physical computer processor configured by machine-readable instructions including a component that is the same as or similar to swing image model component 108A, swing image model component 208, and/or swing image model component 508, in accordance with one or more embodiments.

1368 may include obtaining a target swing image set, as discussed herein. As discussed herein, the target swing image set may include one or more objects. 1368 may be performed by a physical computer processor configured by machine-readable instructions including a component that is the same as or similar to swing image component 110A, swing image component 210, and/or swing image component 510, in accordance with one or more embodiments.

1370 may include generating a target annotated swing image set, as discussed herein. 1370 may be performed by a physical computer processor configured by machine-readable instructions including a component that is the same as or similar to annotated swing image component 112A, annotated swing image component 212, and/or annotated swing image component 512, in accordance with one or more embodiments.

1372 may include generating a swing image representation of the target annotated swing image set, as discussed herein. 1372 may be performed by a physical computer processor configured by machine-readable instructions including a component that is the same as or similar to swing image representation component 114A, swing representation component 226, and/or representation component 550, in accordance with one or more embodiments.

1374 may include obtaining a conditioned swing point model, as discussed herein. 1374 may be performed by a physical computer processor configured by machine-readable instructions including a component that is the same as or similar to swing point model component 108B, swing point model component 214, and/or swing point model component 514, in accordance with one or more embodiments.

1376 may include obtaining a target swing image set, as discussed herein. 1376 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

1378 may include generating target swing point data, as discussed herein. 1378 may be performed by a physical computer processor configured by machine-readable instructions including a component that is the same as or similar to swing point component 112B, swing point component 110C, swing point component 216, and/or swing point component 516, in accordance with one or more embodiments.

1380 may include generating a swing point representation of the target swing point data, as discussed herein. 1380 may be performed by a physical computer processor configured by machine-readable instructions including a component that is the same as or similar to swing point representation component 114B, swing representation component 226, and/or representation component 550, in accordance with one or more embodiments.

1382 may include obtaining a conditioned swing characteristic model, as discussed herein. 1382 may be performed by a physical computer processor configured by machine-readable instructions including a component that is the same as or similar to swing characteristic model component 108C, swing characteristic model component 218, and/or swing characteristic model component 518, in accordance with one or more embodiments.

1384 may include obtaining target swing point data, as discussed herein. 1384 may be performed by a physical computer processor configured by machine-readable instructions including a component that is the same as or similar to swing point component 112B, swing point component 110C, swing point component 216, and/or swing point component 516, in accordance with one or more embodiments.

1386 may include generating target swing characteristic data, as discussed herein. 1386 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1388 may include generating a swing characteristic representation of the target swing characteristic data, as discussed herein. 1388 may be performed by a physical computer processor configured by machine-readable instructions including a component that is the same as or similar to swing characteristic representation component 114C, swing representation component 226, and/or representation component 550, in accordance with one or more embodiments.

1390 may include obtaining a conditioned swing recommendation model, as discussed herein. 1390 may be performed by a physical computer processor configured by machine-readable instructions including a component that is the same as or similar to swing recommendation model component 108D, swing recommendation model component 222, and/or swing recommendation model component 522, in accordance with one or more embodiments.

1392 may include target swing characteristic data, as discussed herein. 1392 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments 1394 may include generating target swing recommendation data, as discussed herein. 1394 may be performed by a physical computer processor configured by machine-readable instructions including a component that is the same as or similar to swing recommendation component 112D, swing recommendation component 224, and/or swing recommendation component 524, in accordance with one or more embodiments.

1396 may include generating a swing recommendation representation of the target swing recommendation data, as discussed herein. 1396 may be performed by a physical computer processor configured by machine-readable instructions including a component that is the same as or similar to swing recommendation representation component 114D, swing representation component 226, and/or representation component 550, in accordance with one or more embodiments.

1398 may include displaying the swing image representation. 1398 may include displaying the swing point representation. 1398 may include displaying the swing characteristic representation. 1398 may include displaying the swing recommendation representation. 1398 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, and/or representation component 550, in accordance with one or more embodiments.

FIG. 14 illustrates example operational flow diagram 1400 for generating annotated swing images, swing point data, swing characteristic data, and/or swing recommendation data in accordance with one or more embodiments of the presently disclosed technology. 1402 may include obtaining a swing image model, as discussed herein. 1402 may be performed by a physical computer processor configured by machine-readable instructions including a component that is the same as or similar to swing image model component 108A, swing image model component 208, and/or swing image model component 508, in accordance with one or more embodiments.

1404 may include obtaining a target swing image set, as discussed herein. 1404 may be performed by a physical computer processor configured by machine-readable instructions including a component that is the same as or similar to swing image component 110A, swing image component 210, and/or swing image component 510, in accordance with one or more embodiments.

1406 may include generating a target annotated swing image set, as discussed herein. 1406 may be performed by a physical computer processor configured by machine-readable instructions including a component that is the same as or similar to annotated swing image component 112A, annotated swing image component 212, and/or annotated swing image component 512, in accordance with one or more embodiments.

1408 may include generating a swing image representation of the target annotated swing image set, as discussed herein. 1408 may be performed by a physical computer processor configured by machine-readable instructions including a component that is the same as or similar to swing image representation component 114A, swing representation component 226, and/or representation component 550, in accordance with one or more embodiments.

1410 may include obtaining a conditioned swing point model, as discussed herein. 1410 may be performed by a physical computer processor configured by machine-readable instructions including a component that is the same as or similar to swing point model component 108B, swing point model component 214, and/or swing point model component 514, in accordance with one or more embodiments.

1412 may include obtaining a target swing image set, as discussed herein. 1412 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

1414 may include generating target swing point data, as discussed herein. 1414 may be performed by a physical computer processor configured by machine-readable instructions including a component that is the same as or similar to swing point component 112B, swing point component 110C, swing point component 216, and/or swing point component 516, in accordance with one or more embodiments.

1416 may include generating a swing point representation of the target swing point data, as discussed herein. 1416 may be performed by a physical computer processor configured by machine-readable instructions including a component that is the same as or similar to swing point representation component 114B, swing representation component 226, and/or representation component 550, in accordance with one or more embodiments.

1418 may include obtaining a swing characteristic model, as discussed herein. 1418 may be performed by a physical computer processor configured by machine-readable instructions including a component that is the same as or similar to swing characteristic model component 108C, swing characteristic model component 218, and/or swing characteristic model component 518, in accordance with one or more embodiments.

1420 may include obtaining target swing point data, as discussed herein. 1420 may be performed by a physical computer processor configured by machine-readable instructions including a component that is the same as or similar to swing point component 112B, swing point component 110C, swing point component 216, and/or swing point component 516, in accordance with one or more embodiments.

1422 may include generating target swing characteristic data, as discussed herein. 1422 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

1424 may include generating a swing characteristic representation of the target swing characteristic data, as discussed herein. 1424 may be performed by a physical computer processor configured by machine-readable instructions including a component that is the same as or similar to swing characteristic representation component 114C, swing representation component 226, and/or representation component 550, in accordance with one or more embodiments.

1426 may include obtaining a swing recommendation model, as discussed herein. The swing recommendation model may include a set of swing recommendation relationships between the swing characteristic data and the swing recommendation data. 1426 may be performed by a physical computer processor configured by machine-readable instructions including a component that is the same as or similar to swing recommendation model component 108D, swing recommendation model component 222, and/or swing recommendation model component 522, in accordance with one or more embodiments.

1428 may include target swing characteristic data, as discussed herein. 1428 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments

1430 may include generating target swing recommendation data, as discussed herein. 1430 may be performed by a physical computer processor configured by machine-readable instructions including a component that is the same as or similar to swing recommendation component 112D, swing recommendation component 224, and/or swing recommendation component 524, in accordance with one or more embodiments.

1432 may include generating a swing recommendation representation of the target swing recommendation data, as discussed herein. 1432 may be performed by a physical computer processor configured by machine-readable instructions including a component that is the same as or similar to swing recommendation representation component 114D, swing representation component 226, and/or representation component 550, in accordance with one or more embodiments.

1434 may include displaying the swing image representation. 1434 may include displaying the swing point representation. 1434 may include displaying the swing characteristic representation. 1434 may include displaying the swing recommendation representation. 1434 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, and/or representation component 550, in accordance with one or more embodiments.

Figure 15A:
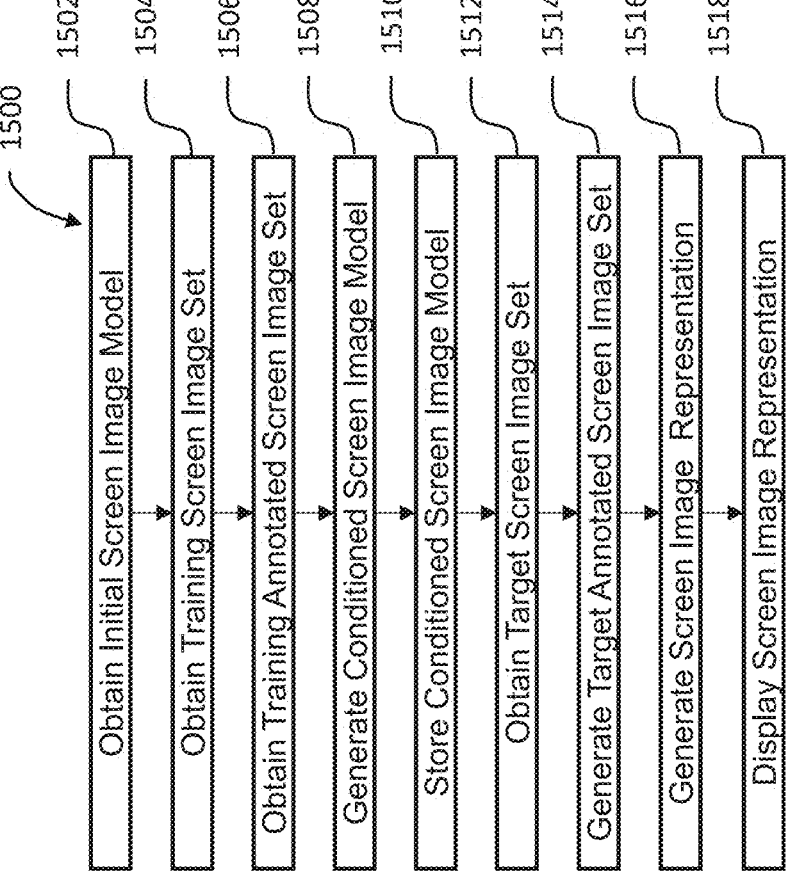
FIG. 15A illustrates an example operational flow diagram for training an initial screen image model to generate annotated screen images in accordance with one or more embodiments of the presently disclosed technology.

FIG. 15A illustrates example operational flow diagram 1500 for training an initial screen image model to generate annotated screen images in accordance with one or more embodiments of the presently disclosed technology. 1502 may include obtaining an initial screen image model. As discussed herein, the initial screen image model may be based on machine-learning techniques and may be "untrained." The initial screen image model may receive screen images and/or other input as input and output annotated screen images. 1502 may be performed by a physical computer processor configured by machine-readable instructions including a component that is the same as or similar to screen image model component 308A, screen image model component 408, and/or screen image model component 526, in accordance with one or more embodiments.

1504 may include obtaining a training screen image set. As discussed herein, the training screen image set may include one or more objects. The one or more objects may include one or more of a person, an accessory, or an environment. The accessory may be an accessory for the person. The environment may be an area surrounding the person and the accessory. The training screen image set may be used to train the initial screen image model. The training screen image set may correspond to the training annotated screen image set. 1504 may be performed by a physical computer processor configured by machine-readable instructions including a component that is the same as or similar to screen image component 310A, screen image component 410, and/or screen image component 534, in accordance with one or more embodiments.

1506 may include obtaining a training annotated screen image set. As discussed herein, the training screen image set may include one or more screen image properties specifying screen image property values of the one or more objects. The one or more screen image properties may include screen points and annotations. The screen points may be one or more position-specific areas on one of the one or more objects. The training annotated screen image set may be used to train the initial screen image model. The training annotated screen image set may correspond to the training screen image set. 1506 may be performed by a physical computer processor configured by machine-readable instructions including a component that is the same as or similar to annotated screen image component 312A, annotated screen image component 412, and/or annotated screen image component 536, in accordance with one or more embodiments.

1508 may include generating a conditioned screen image model. As discussed herein, the conditioned screen image model may be generated by training the initial screen image model using the training screen image set and the training annotated screen image set to generate a set of annotated screen image relationships between screen images and the annotated screen images. The conditioned screen image model may be an optimized screen image model in comparison to the initial screen image model, as discussed herein. The conditioned screen image model may receive screen images as input and output annotated screen images. 1508 may be performed by a physical computer processor configured by machine-readable instructions including a component that is the same as or similar to screen image model component 308A, screen image model component 408, and/or screen image model component 526, in accordance with one or more embodiments.

1510 may include storing the conditioned screen image model. 1510 may be performed by a physical computer processor configured by machine-readable instructions including a component that is the same as or similar to screen image model component 308A, screen image model component 408, and/or screen image model component 526, in accordance with one or more embodiments.

1512 may include obtaining a target screen image set. As discussed herein, the target screen image set may include one or more objects. 1512 may be performed by a physical computer processor configured by machine-readable instructions including a component that is the same as or similar to screen image component 310A, screen image component 410, and/or screen image component 534, in accordance with one or more embodiments.

1514 may include generating a target annotated screen image set. The target annotated screen image set may be generated by applying the conditioned screen image model to the target screen image set, as discussed herein. Each target screen image of the target annotated screen image set may include the one or more screen image properties. The one or more screen image properties may correspond to the target screen image set. 1514 may be performed by a physical computer processor configured by machine-readable instructions including a component that is the same as or similar to annotated screen image component 312A, annotated screen image component 412, and/or annotated screen image component 536, in accordance with one or more embodiments.

1516 may include generating a screen image representation of the target annotated screen image set. The screen image representation may be generated using visual effects to depict at least some of the target annotated screen image set, as discussed herein. 1516 may be performed by a physical computer processor configured by machine-readable instructions including a component that is the same as or similar to screen image representation component 314A, screen representation component 426, and/or representation component 550, in accordance with one or more embodiments.

1518 may include displaying the screen image representation. 1518 may be performed by a physical computer processor configured by machine-readable instructions including a component that is the same as or similar to screen image representation component 314A, screen representation component 426, and/or representation component 550, in accordance with one or more embodiments.

Figure 15B:
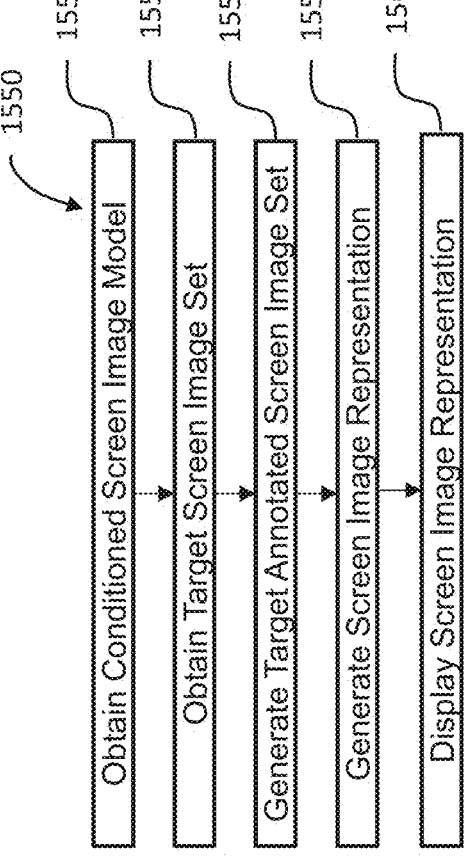
FIG. 15B illustrates an example operational flow diagram for generating annotated screen images in accordance with one or more embodiments of the presently disclosed technology.

FIG. 15B illustrates example operational flow diagram 1550 for generating annotated screen images in accordance with one or more embodiments of the presently disclosed technology. 1552 may include obtaining a conditioned screen image model. As discussed herein, the conditioned screen image model may be generated by training the initial screen image model using the training screen image set and the training annotated screen image set to generate a set of annotated screen image relationships between screen images and the annotated screen images. The conditioned screen image model may be an optimized screen image model in comparison to the initial screen image model, as discussed herein. The conditioned screen image model may receive screen images as input and output annotated screen images. 1552 may be performed by a physical computer processor configured by machine-readable instructions including a component that is the same as or similar to screen image model component 308A, screen image model component 408, and/or screen image model component 526, in accordance with one or more embodiments.

1554 may include obtaining a target screen image set. As discussed herein, the target screen image set may include one or more objects. 1554 may be performed by a physical computer processor configured by machine-readable instructions including a component that is the same as or similar to screen image component 310A, screen image component 410, and/or screen image component 534, in accordance with one or more embodiments.

1556 may include generating a target annotated screen image set. The target annotated screen image set may be generated by applying the conditioned screen image model to the target screen image set, as discussed herein. Each target screen image of the target annotated screen image set may include the one or more screen image properties. The one or more screen image properties may correspond to the target screen image set. 1556 may be performed by a physical computer processor configured by machine-readable instructions including a component that is the same as or similar to annotated screen image component 312A, annotated screen image component 412, and/or annotated screen image component 536, in accordance with one or more embodiments.

1558 may include generating a screen image representation of the target annotated screen image set. The screen image representation may be generated using visual effects to depict at least some of the target annotated screen image set, as discussed herein. 1558 may be performed by a physical computer processor configured by machine-readable instructions including a component that is the same as or similar to screen image representation component 314A, screen representation component 426, and/or representation component 550, in accordance with one or more embodiments.

1560 may include displaying the screen image representation. 1560 may be performed by a physical computer processor configured by machine-readable instructions including a component that is the same as or similar to screen image representation component 314A, screen representation component 426, and/or representation component 550, in accordance with one or more embodiments.

Figure 16:
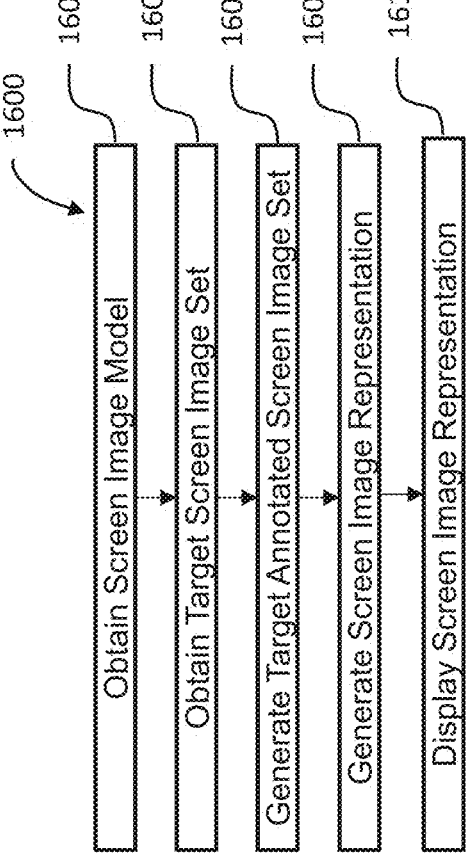
FIG. 16 illustrates an example operational flow diagram for generating annotated screen images in accordance with one or more embodiments of the presently disclosed technology.

FIG. 16 illustrates example operational flow diagram 1600 for generating annotated screen images in accordance with one or more embodiments of the presently disclosed technology. 1602 may include obtaining a screen image model. As discussed herein, the screen image model may be a graphical representation of a person. In some embodiments, the screen image model may include graphical representations of other objects, as discussed herein. The screen image model may generate annotated screen images by attributing the one or more screen image properties to the screen image model or otherwise annotating the screen image model. The screen image model may receive screen images as input and output annotated screen images. 1602 may be performed by a physical computer processor configured by machine-readable instructions including a component that is the same as or similar to screen image model component 308A, screen image model component 408, and/or screen image model component 526, in accordance with one or more embodiments.

1604 may include obtaining a target screen image set. As discussed herein, the target screen image set may include one or more objects. 1604 may be performed by a physical computer processor configured by machine-readable instructions including a component that is the same as or similar to screen image component 310A, screen image component 410, and/or screen image component 534, in accordance with one or more embodiments.

1606 may include generating a target annotated screen image set. The target annotated screen image set may be generated by applying the screen image model to the target screen image set, as discussed herein. Each target screen image of the target annotated screen image set may include the one or more screen image properties. The one or more screen image properties may correspond to the target screen image set. 1606 may be performed by a physical computer processor configured by machine-readable instructions including a component that is the same as or similar to annotated screen image component 312A, annotated screen image component 412, and/or annotated screen image component 536 in accordance with one or more embodiments.

1608 may include generating a screen image representation of the target annotated screen image set. The screen image representation may be generated using visual effects to depict at least some of the target annotated screen image set, as discussed herein. 1608 may be performed by a physical computer processor configured by machine-readable instructions including a component that is the same as or similar to screen image representation component 314A, screen representation component 426, and/or representation component 550, in accordance with one or more embodiments.

1610 may include displaying the screen image representation. 1610 may be performed by a physical computer processor configured by machine-readable instructions including a component that is the same as or similar to screen image representation component 314A, screen representation component 426, and/or representation component 550, in accordance with one or more embodiments.

Figure 17A:
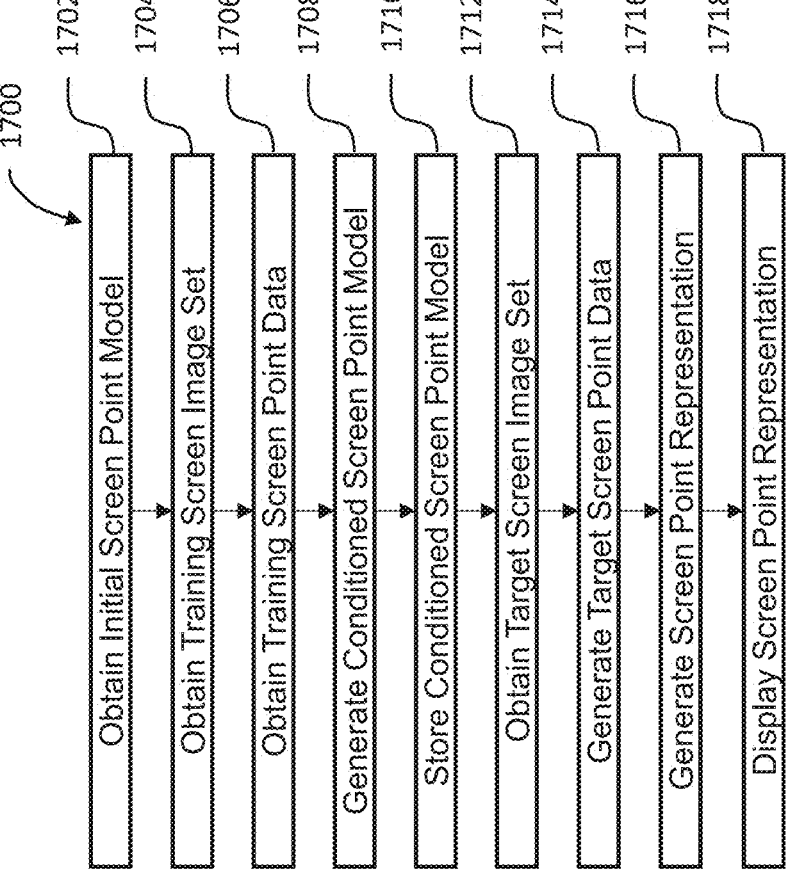
FIG. 17A illustrates an example operational flow diagram for training an initial swing point model to generate screen point data in accordance with one or more embodiments of the presently disclosed technology.

FIG. 17A illustrates example operational flow diagram 1700 for training an initial screen point model to generate screen point data in accordance with one or more embodiments of the presently disclosed technology. 1702 may include obtaining an initial screen point model. As discussed herein, the initial screen point model may be based on machine-learning techniques and may be "untrained." The initial screen point model may receive screen images and/or other input as input and output screen points. 1702 may be performed by a physical computer processor configured by machine-readable instructions including a component that is the same as or similar to screen point model component 308B, screen point model component 414, and/or screen point model component 538, in accordance with one or more embodiments.

1704 may include obtaining a training screen image set. As discussed herein, the training screen image set may include one or more objects. The one or more objects may include one or more of a person, an accessory, or an environment. The accessory may be an accessory for the person. The environment may be an area surrounding the person and the accessory. The training screen image set may be used to train the initial screen image model. The training screen image set may correspond to the training annotated screen image set. 1704 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

1706 may include obtaining training screen point data. As discussed herein, the training screen point data may include screen point data specifying screen points of the one or more objects as a function of position and time. The one or more objects may include one or more of a person, accessory, and environment. The accessory may be an accessory for the person. The environment may be an area surrounding the person and the accessory. The screen points may change position as a function of time. The screen points may be one or more position-specific areas on one of the one or more objects. The training screen point data may be used to train the initial screen point model. The training screen point data may correspond to the training screen image set. 1706 may be performed by a physical computer processor configured by machine-readable instructions including a component that is the same as or similar to screen point component 312B, screen point component 310C, screen point component 416, and/or screen point component 540, in accordance with one or more embodiments.

1708 may include generating a conditioned screen point model. As discussed herein, the conditioned screen point model may be generated by training the initial screen point model using the training screen image set and the training screen point data to generate a set of screen point relationships between screen images and the screen point data. The conditioned screen point model may be an optimized screen point model in comparison to the initial screen point model, as discussed herein. The conditioned screen point model may receive screen images as input and output screen point data. 1708 may be performed by a physical computer processor configured by machine-readable instructions including a component that is the same as or similar to screen point model component 308B, screen point model component 414, and/or screen point model component 538, in accordance with one or more embodiments.

1710 may include storing the conditioned screen point model. 1710 may be performed by a physical computer processor configured by machine-readable instructions including a component that is the same as or similar to screen point model component 308B, screen point model component 414, and/or screen point model component 538, in accordance with one or more embodiments.

1712 may include obtaining a target screen image set. As discussed herein, the target screen image set may include one or more objects. The target screen image set may include screen image properties. The screen image properties may include screen points and annotations. 1712 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

1714 may include generating target screen point data. The target screen point data may be generated by applying the conditioned screen point model to the target screen image set, as discussed herein. The target screen point data may include screen points corresponding to the target screen image set. 1714 may be performed by a physical computer processor configured by machine-readable instructions including a component that is the same as or similar to screen point component 312B, screen point component 310C, screen point component 416, and/or screen point component 540, in accordance with one or more embodiments.

1716 may include generating a screen point representation of the target screen point data. The screen point representation may be generated using visual effects to depict at least some of the target screen point data, as discussed herein. 1716 may be performed by a physical computer processor configured by machine-readable instructions including a component that is the same as or similar to screen point representation component 314B, screen representation component 426, and/or representation component 550, in accordance with one or more embodiments.

1718 may include displaying the screen point representation. 1718 may be performed by a physical computer processor configured by machine-readable instructions including a component that is the same as or similar to screen point representation component 314B, screen representation component 426, and/or representation component 550, in accordance with one or more embodiments.

Figure 17B:
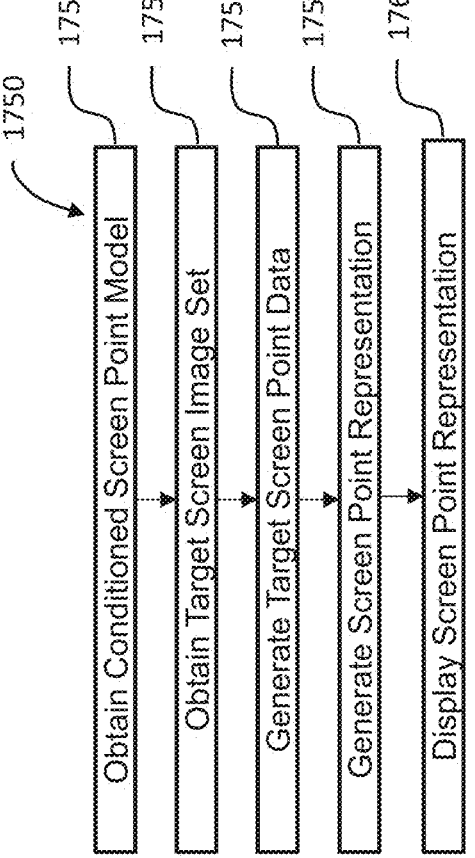
FIG. 17B illustrates an example operational flow diagram for generating screen point data in accordance with one or more embodiments of the presently disclosed technology.

FIG. 17B illustrates example operational flow diagram 1750 for generating screen point data in accordance with one or more embodiments of the presently disclosed technology. 1752 may include obtaining a conditioned screen point model. As discussed herein, the conditioned screen point model may be generated by training the initial screen point model using the training screen image set and the training screen point data to generate a set of screen point relationships between screen images and the screen point data. The conditioned screen point model may be an optimized screen point model in comparison to the initial screen point model, as discussed herein. The conditioned screen point model may receive screen images as input and output screen point data. 1752 may be performed by a physical computer processor configured by machine-readable instructions including a component that is the same as or similar to screen point model component 308B, screen point model component 414, and/or screen point model component 538, in accordance with one or more embodiments.

1754 may include obtaining a target screen image set. As discussed herein, the target screen image set may include one or more objects. The target screen image set may include screen image properties. The screen image properties may include screen points and annotations. 1754 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

1756 may include generating target screen point data. The target screen point data may be generated by applying the conditioned screen point model to the target screen image set, as discussed herein. The target screen point data may include screen points corresponding to the target screen image set. 1756 may be performed by a physical computer processor configured by machine-readable instructions including a component that is the same as or similar to screen point component 312B, screen point component 310C, screen point component 416, and/or screen point component 540, in accordance with one or more embodiments.

1758 may include generating a screen point representation of the target screen point data. The screen point representation may be generated using visual effects to depict at least some of the target screen point data, as discussed herein. 1758 may be performed by a physical computer processor configured by machine-readable instructions including a component that is the same as or similar to screen point representation component 314B, screen representation component 426, and/or representation component 550, in accordance with one or more embodiments.

1760 may include displaying the screen point representation. 1760 may be performed by a physical computer processor configured by machine-readable instructions including a component that is the same as or similar to screen point representation component 314B, screen representation component 426, and/or representation component 550, in accordance with one or more embodiments.

Figure 18A:
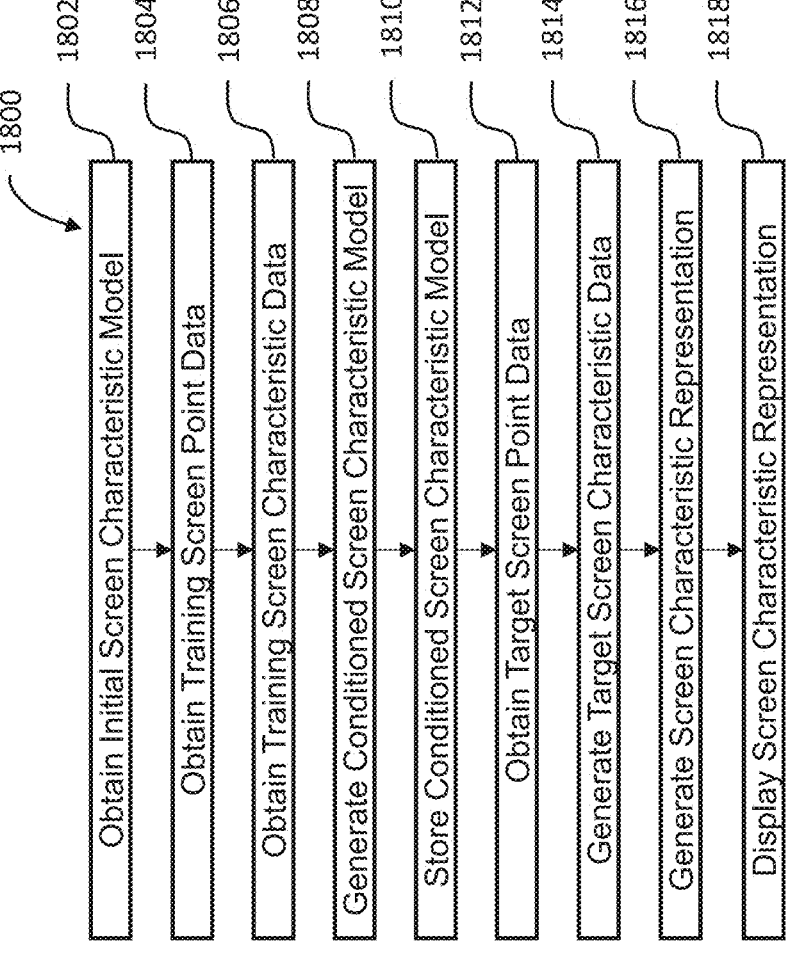
FIG. 18A illustrates an example operational flow diagram for training an initial screen characteristic model to generate screen characteristic data in accordance with one or more embodiments of the presently disclosed technology.

FIG. 18A illustrates example operational flow diagram 1800 for training an initial screen characteristic model to generate screen characteristic data in accordance with one or more embodiments of the presently disclosed technology. 1802 may include obtaining an initial screen characteristic model. As discussed herein, the initial screen characteristic model may be based on machine-learning techniques and may be "untrained." The initial screen characteristic model may receive screen point data and/or other input as input and output screen characteristics. 1802 may be performed by a physical computer processor configured by machine-readable instructions including a component that is the same as or similar to screen characteristic model component 308C, screen characteristic model component 418, and/or screen characteristic model component 542, in accordance with one or more embodiments.

1804 may include obtaining training screen point data. As discussed herein, the training screen point data may include screen point data specifying screen points of the one or more objects as a function of position and time. The one or more objects may include one or more of a person, accessory, and environment, as discussed herein. The training screen point data may be used to train the initial screen characteristic model. The training screen point data may correspond to the training screen characteristic data. 1804 may be performed by a physical computer processor configured by machine-readable instructions including a component that is the same as or similar to screen point component 312B, screen point component 310C, screen point component 416, and/or screen point component 540, in accordance with one or more embodiments.

1806 may include obtaining training screen characteristic data. As discussed herein, the training screen characteristic data may include screen characteristic data including the screen characteristics specifying screen characteristic values. The screen characteristics may be one or more traits corresponding to one or more screen poses in a physical screen, as discussed herein. The training screen characteristic data may be used to train the initial screen characteristic model. The training screen characteristic data may correspond to the training screen point data. 1806 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

1808 may include generating a conditioned screen characteristic model. As discussed herein, the conditioned screen characteristic model may be generated by training the initial screen characteristic model using the training screen point data and the training screen characteristic data to generate a set of screen characteristic relationships between screen point data and the screen characteristic data. The conditioned screen characteristic model may be an optimized screen characteristic model in comparison to the initial screen characteristic model, as discussed herein. The conditioned screen characteristic model may receive screen point data as input and output screen characteristic data. 1808 may be performed by a physical computer processor configured by machine-readable instructions including a component that is the same as or similar to screen characteristic model component 308C, screen characteristic model component 418, and/or screen characteristic model component 542, in accordance with one or more embodiments.

1810 may include storing the conditioned screen characteristic model. 1810 may be performed by a physical computer processor configured by machine-readable instructions including a component that is the same as or similar to screen characteristic model component 308C, screen characteristic model component 418, and/or screen characteristic model component 542, in accordance with one or more embodiments.

1812 may include obtaining target screen point data. As discussed herein, the target screen point data may specify screen points of one or more objects as a function of position and time. 1812 may be performed by a physical computer processor configured by machine-readable instructions including a component that is the same as or similar to screen point component 312B, screen point component 310C, screen point component 416, and/or screen point component 540, in accordance with one or more embodiments.

1814 may include generating target screen characteristic data. The target screen characteristic data may be generated by applying the conditioned screen characteristic model to the target screen point data, as discussed herein. The target screen characteristic data may include screen characteristics specifying screen characteristic values corresponding to the target screen point data. 1814 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

1816 may include generating a screen characteristic representation of the target screen characteristic data. The screen characteristic representation may be generated using visual effects to depict at least some of the target screen characteristic data, as discussed herein. 1816 may be performed by a physical computer processor configured by machine-readable instructions including a component that is the same as or similar to screen characteristic representation component 314C, screen representation component 426, and/or representation component 550, in accordance with one or more embodiments.

1818 may include displaying the screen characteristic representation. 1818 may be performed by a physical computer processor configured by machine-readable instructions including a component that is the same as or similar to screen characteristic representation component 314C, screen representation component 426, and/or representation component 550, in accordance with one or more embodiments.

Figure 18B:
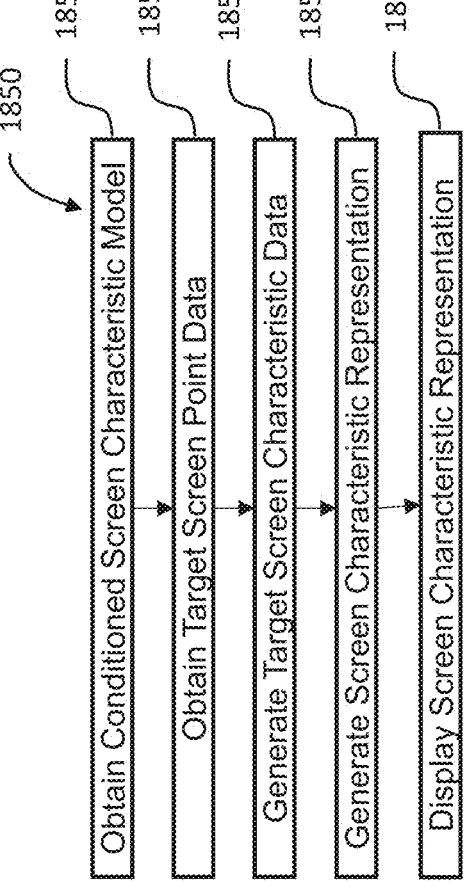
FIG. 18B illustrates an example operational flow diagram for generating screen characteristic data in accordance with one or more embodiments of the presently disclosed technology.

FIG. 18B illustrates example operational flow diagram 1850 for generating screen characteristic data in accordance with one or more embodiments of the presently disclosed technology. 1852 may include obtaining a conditioned screen characteristic model. As discussed herein, the conditioned screen characteristic model may be generated by training the initial screen characteristic model using the training screen point data and the training screen characteristic data to generate a set of screen characteristic relationships between screen point data and the screen characteristic data. The conditioned screen characteristic model may be an optimized screen characteristic model in comparison to the initial screen characteristic model, as discussed herein. The conditioned screen characteristic model may receive screen point data as input and output screen characteristic data. 1852 may be performed by a physical computer processor configured by machine-readable instructions including a component that is the same as or similar to screen characteristic model component 308C, screen characteristic model component 418, and/or screen characteristic model component 542, in accordance with one or more embodiments.

1854 may include obtaining target screen point data. As discussed herein, the target screen point data may specify screen points of one or more objects as a function of position and time. 1854 may be performed by a physical computer processor configured by machine-readable instructions including a component that is the same as or similar to screen point component 312B, screen point component 310C, screen point component 416, and/or screen point component 540, in accordance with one or more embodiments.

1856 may include generating target screen characteristic data. The target screen characteristic data may be generated by applying the conditioned screen characteristic model to the target screen point data, as discussed herein. The target screen characteristic data may include screen characteristics specifying screen characteristic values corresponding to the target screen point data. 1856 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

1858 may include generating a screen characteristic representation of the target screen characteristic data. The screen characteristic representation may be generated using visual effects to depict at least some of the target screen characteristic data, as discussed herein. 1858 may be performed by a physical computer processor configured by machine-readable instructions including a component that is the same as or similar to screen characteristic representation component 314C, screen representation component 426, and/or representation component 550, in accordance with one or more embodiments.

1860 may include displaying the screen characteristic representation. 1860 may be performed by a physical computer processor configured by machine-readable instructions including a component that is the same as or similar to screen characteristic representation component 314C, screen representation component 426, and/or representation component 550, in accordance with one or more embodiments.

Figure 19:
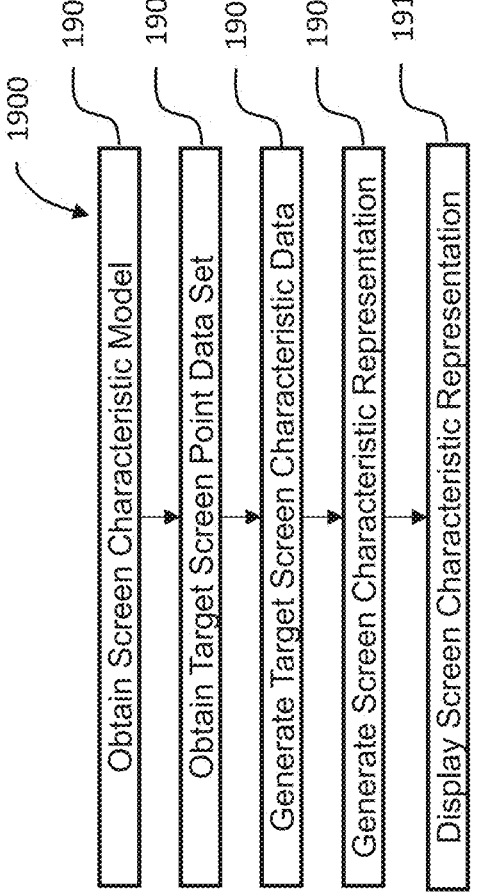
FIG. 19 illustrates an example operational flow diagram for generating screen characteristic data in accordance with one or more embodiments of the presently disclosed technology.

FIG. 19 illustrates example operational flow diagram 1900 for generating screen characteristic data in accordance with one or more embodiments of the presently disclosed technology. 1902 may include obtaining a screen characteristic model. As discussed herein, the screen characteristic model may receive or obtain screen point data and process the screen point data into screen characteristic data. The screen characteristic model may track position and/or movement of screen points as a function of position and/or time. The screen characteristic model may identify or detect one or more screen characteristics. The screen characteristic model may include a set of screen characteristic relationships between the screen point data and the screen characteristic data. The screen characteristic model may generate screen characteristic data by applying the screen characteristic model to the screen point data. The screen point model may receive screen point data as input and output screen characteristic data. 1902 may be performed by a physical computer processor configured by machine-readable instructions including a component that is the same as or similar to screen characteristic model component 308C, screen characteristic model component 418, and/or screen characteristic model component 542, in accordance with one or more embodiments.

1904 may include obtaining target screen point data. As discussed herein, the target screen point data may specify screen points of one or more objects as a function of position and time. 1904 may be performed by a physical computer processor configured by machine-readable instructions including a component that is the same as or similar to screen point component 312B, screen point component

310C, screen point component 416, and/or screen point component 540, in accordance with one or more embodiments.

1906 may include generating target screen characteristic data. The target screen characteristic data may be generated by applying the conditioned screen characteristic model to the target screen point data, as discussed herein. The target screen characteristic data may include screen characteristics specifying screen characteristic values corresponding to the target screen point data. 1906 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

1908 may include generating a screen characteristic representation of the target screen characteristic data. The screen characteristic representation may be generated using visual effects to depict at least some of the target screen characteristic data, as discussed herein. 1908 may be performed by a physical computer processor configured by machine-readable instructions including a component that is the same as or similar to screen characteristic representation component 314C, screen representation component 426, and/or representation component 550, in accordance with one or more embodiments.

1910 may include displaying the screen characteristic representation. 1910 may be performed by a physical computer processor configured by machine-readable instructions including a component that is the same as or similar to screen characteristic representation component 314C, screen representation component 426, and/or representation component 550, in accordance with one or more embodiments.

FIG. 20A illustrates example operational flow diagram 2000 for training an initial screen recommendation model to generate screen recommendation data in accordance with one or more embodiments of the presently disclosed technology. 2002 may include obtaining an initial screen recommendation model. As discussed herein, the initial screen recommendation model may be based on machine-learning techniques and may be "untrained." The initial screen recommendation model may receive screen characteristic data and/or other input as input and output screen recommendation data. 2002 may be performed by a physical computer processor configured by machine-readable instructions including a component that is the same as or similar to screen recommendation model component 308D, screen recommendation model component 422, and/or screen recommendation model component 546, in accordance with one or more embodiments.

2004 may include obtaining training screen characteristic data. As discussed herein, the training screen characteristic data may include screen characteristic data including the screen characteristics specifying screen characteristic values. The screen characteristics may be one or more traits corresponding to one or more screen poses in a physical screen, as discussed herein. The training screen characteristic data may be used to train the initial screen characteristic model. The training screen characteristic data may correspond to the training screen recommendation data. 2004 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2006 may include obtaining training screen recommendation data. As discussed herein, the training screen recommendation data may include screen recommendation data including the screen recommendations specifying screen recommendation values. The screen recommendation may be one or more recommendations for a player. The screen recommendations may be based on one or more identified or detected screen characteristics, as discussed herein. The screen recommendations may include exercises, drills, equipment, other prescriptions, and/or why a prescription was recommended, as discussed herein. The training screen recommendation data may be used to train the initial screen recommendation model. The training screen recommendation data may correspond to the training screen characteristic data. 2006 may be performed by a physical computer processor configured by machine-readable instructions including a component that is the same as or similar to screen recommendation component 312D, screen recommendation component 424, and/or screen recommendation component 548, in accordance with one or more embodiments.

2008 may include generating a conditioned screen recommendation model. As discussed herein, the conditioned screen recommendation model may be generated by training the initial screen recommendation model using the training screen characteristic data and the training screen recommendation data to generate a set of screen recommendation relationships between screen characteristic data and the screen recommendation data. The conditioned screen recommendation model may be an optimized screen recommendation model in comparison to the initial screen recommendation model, as discussed herein. The conditioned screen recommendation model may receive screen characteristic data as input and output screen recommendation data. 2008 may be performed by a physical computer processor configured by machine-readable instructions including a component that is the same as or similar to screen recommendation model component 308D, screen recommendation model component 422, and/or screen recommendation model component 546, in accordance with one or more embodiments.

2010 may include storing the conditioned screen recommendation model. 2010 may be performed by a physical computer processor configured by machine-readable instructions including a component that is the same as or similar to screen recommendation model component 308D, screen recommendation model component 422, and/or screen recommendation model component 546, in accordance with one or more embodiments.

2012 may include obtaining target screen characteristic data. As discussed herein, the target screen characteristic data may include screen characteristics specifying screen characteristic values. 2012 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2014 may include generating target screen recommendation data. The target screen recommendation data may be generated by applying the conditioned screen recommendation model to the target screen characteristic data, as discussed herein. The target screen recommendation data may include the screen recommendations specifying screen recommendation values corresponding to the target screen characteristic data. 2014 may be performed by a physical computer processor configured by machine-readable instructions including a component that is the same as or similar to screen recommendation component 312D, screen recommendation component 424, and/or screen recommendation component 548, in accordance with one or more embodiments.

2016 may include generating a screen recommendation representation of the target screen recommendation data. The screen recommendation representation may be generated using visual effects to depict at least some of the target screen recommendation data, as discussed herein. 2016 may be performed by a physical computer processor configured by machine-readable instructions including a component that is the same as or similar to screen recommendation representation component 314D, screen representation component 426, and/or representation component 550, in accordance with one or more embodiments.

2018 may include displaying the screen recommendation representation. 2018 may be performed by a physical computer processor configured by machine-readable instructions including a component that is the same as or similar to screen recommendation representation component 314D, screen representation component 426, and/or representation component 550, in accordance with one or more embodiments.

Figure 20B:
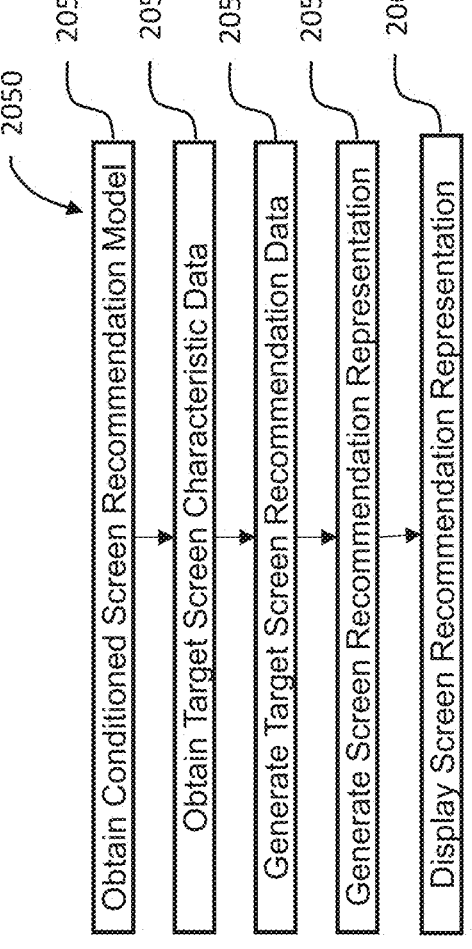
FIG. 20B illustrates an example operational flow diagram for generating screen recommendation data in accordance with one or more embodiments of the presently disclosed technology.

FIG. 20B illustrates example operational flow diagram 2050 for generating screen recommendation data in accordance with one or more embodiments of the presently disclosed technology. 2052 may include obtaining a conditioned screen recommendation model. As discussed herein, the conditioned screen recommendation model may be generated by training the initial screen recommendation model using the training screen characteristic data and the training screen recommendation data to generate a set of screen recommendation relationships between screen characteristic data and the screen recommendation data. The conditioned screen recommendation model may be an optimized screen recommendation model in comparison to the initial screen recommendation model, as discussed herein. The conditioned screen recommendation model may receive screen characteristic data as input and output screen recommendation data. 2052 may be performed by a physical computer processor configured by machine-readable instructions including a component that is the same as or similar to screen recommendation model component 308D, screen recommendation model component 422, and/or screen recommendation model component 546, in accordance with one or more embodiments.

2054 may include target screen characteristic data. As discussed herein, the target screen characteristic data may include screen characteristics specifying screen characteristic values. 2054 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments

2056 may include generating target screen recommendation data. The target screen recommendation data may be generated by applying the conditioned screen recommendation model to the target screen characteristic data, as discussed herein. The target screen recommendation data may include the screen recommendations specifying screen recommendation values corresponding to the target screen characteristic data. 2056 may be performed by a physical computer processor configured by machine-readable instructions including a component that is the same as or similar to screen recommendation component 312D, screen recommendation component 424, and/or screen recommendation component 548, in accordance with one or more embodiments.

2058 may include generating a screen recommendation representation of the target screen recommendation data. The screen recommendation representation may be generated using visual effects to depict at least some of the target screen recommendation data, as discussed herein. 2058 may be performed by a physical computer processor configured by machine-readable instructions including a component that is the same as or similar to screen recommendation representation component 314D, screen representation component 426, and/or representation component 550, in accordance with one or more embodiments.

2060 may include displaying the screen recommendation representation. 2060 may be performed by a physical computer processor configured by machine-readable instructions including a component that is the same as or similar to screen recommendation representation component 314D, screen representation component 426, and/or representation component 550, in accordance with one or more embodiments.

Figure 21:
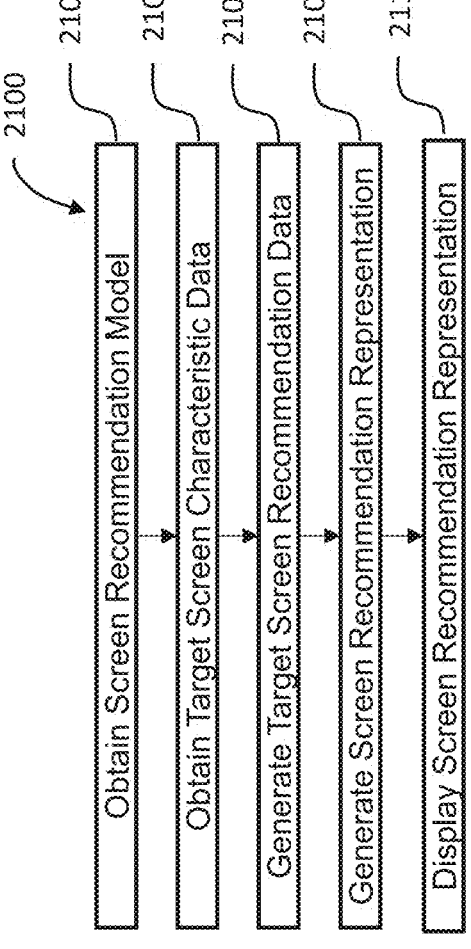
FIG. 21 illustrates an example operational flow diagram for generating screen recommendation data in accordance with one or more embodiments of the presently disclosed technology.

FIG. 21 illustrates example operational flow diagram 2100 for generating screen recommendation data in accordance with one or more embodiments of the presently disclosed technology. 2102 may include obtaining a screen recommendation model. As discussed herein, the screen recommendation model may receive or obtain screen characteristic data and process the screen characteristic data into screen recommendation data. The screen recommendation model may recommend, generate, identify, or otherwise provide screen recommendation data based on a detected screen characteristic. The screen recommendation model may include a set of screen recommendation relationships between the screen characteristic data and the screen recommendation data. The screen recommendation model may generate screen recommendation data by applying the screen recommendation model to the screen characteristic data. The screen recommendation model may receive screen characteristic data as input and output screen recommendation data. 2102 may be performed by a physical computer processor configured by machine-readable instructions including a component that is the same as or similar to screen recommendation model component 308D, screen recommendation model component 422, and/or screen recommendation component 548, in accordance with one or more embodiments.

2104 may include target screen characteristic data. As discussed herein, the target screen characteristic data may include screen characteristics specifying screen characteristic values. 2104 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments 2106 may include generating target screen recommendation data. The target screen recommendation data may be generated by applying the conditioned screen recommendation model to the target screen characteristic data, as discussed herein. The target screen recommendation data may include the screen recommendations specifying screen recommendation values corresponding to the target screen characteristic data. 2106 may be performed by a physical computer processor configured by machine-readable instructions including a component that is the same as or similar to screen recommendation component 312D, screen recommendation component 424, and/or screen recommendation component 548, in accordance with one or more embodiments.

2108 may include generating a screen recommendation representation of the target screen recommendation data. The screen recommendation representation may be generated using visual effects to depict at least some of the target screen recommendation data, as discussed herein. 2108 may be performed by a physical computer processor configured by machine-readable instructions including a component that is the same as or similar to screen recommendation representation component 314D, screen representation component 426, and/or representation component 550, in accordance with one or more embodiments.

2110 may include displaying the screen recommendation representation. 2110 may be performed by a physical computer processor configured by machine-readable instructions including a component that is the same as or similar to screen recommendation representation component 314D, screen representation component 426, and/or representation component 550, in accordance with one or more embodiments.

FIG. 22A illustrates example operational flow diagram 2200 for training an initial screen image model to generate annotated screen images, training an initial screen point model to generate screen point data, training an initial screen characteristic model to generate screen characteristic data, and/or training an initial screen recommendation model to generate screen recommendation data in accordance with one or more embodiments of the presently disclosed technology. 2202 may include obtaining an initial screen image model, as discussed herein. 2202 may be performed by a physical computer processor configured by machine-readable instructions including a component that is the same as or similar to screen image model component 308A, screen image model component 408, and/or screen image model component 526, in accordance with one or more embodiments.

2204 may include obtaining a training screen image set, as discussed herein. 2204 may be performed by a physical computer processor configured by machine-readable instructions including a component that is the same as or similar to screen image component 310A, screen image component 410, and/or screen image component 534, in accordance with one or more embodiments.

2206 may include obtaining a training annotated screen image set, as discussed herein. 2206 may be performed by a physical computer processor configured by machine-readable instructions including a component that is the same as or similar to annotated screen image component 312A, annotated screen image component 412, and/or annotated screen image component 536, in accordance with one or more embodiments.

2208 may include generating a conditioned screen image model, as discussed herein. 2208 may be performed by a physical computer processor configured by machine-readable instructions including a component that is the same as or similar to screen image model component 308A, screen image model component 408, and/or screen image model component 526, in accordance with one or more embodiments.

2210 may include storing the conditioned screen image model. 2210 may be performed by a physical computer processor configured by machine-readable instructions including a component that is the same as or similar to screen image model component 308A, screen image model component 408, and/or screen image model component 526, in accordance with one or more embodiments.

2212 may include obtaining a target screen image set, as discussed herein. 2212 may be performed by a physical computer processor configured by machine-readable instructions including a component that is the same as or similar to screen image component 310A, screen image component 410, and/or screen image component 534, in accordance with one or more embodiments.

2214 may include generating a target annotated screen image set, as discussed herein. 2214 may be performed by a physical computer processor configured by machine-readable instructions including a component that is the same as or similar to annotated screen image component 312A, annotated screen image component 412, and/or annotated screen image component 536, in accordance with one or more embodiments.

2216 may include generating a screen image representation of the target annotated screen image set, as discussed herein. 2216 may be performed by a physical computer processor configured by machine-readable instructions including a component that is the same as or similar to screen image representation component 314A, screen representation component 426, and/or representation component 550, in accordance with one or more embodiments.

2218 may include obtaining an initial screen point model, as discussed herein. 2218 may be performed by a physical computer processor configured by machine-readable instructions including a component that is the same as or similar to screen point model component 308B, screen point model component 414, and/or screen point model component 538, in accordance with one or more embodiments.

2220 may include obtaining training screen point data, as discussed herein. 2220 may be performed by a physical computer processor configured by machine-readable instructions including a component that is the same as or similar to screen point component 312B, screen point component 310C, screen point component 416, and/or screen point component 540, in accordance with one or more embodiments.

2222 may include generating a conditioned screen point model, as discussed herein. 2222 may be performed by a physical computer processor configured by machine-readable instructions including a component that is the same as or similar to screen point model component 308B, screen point model component 414, and/or screen point model component 538, in accordance with one or more embodiments.

2224 may include storing the conditioned screen point model. 2224 may be performed by a physical computer processor configured by machine-readable instructions including a component that is the same as or similar to screen point model component 308B, screen point model component 414, and/or screen point model component 538, in accordance with one or more embodiments.

2226 may include obtaining a target screen image set, as discussed herein. 2226 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2228 may include generating target screen point data, as discussed herein. 2228 may be performed by a physical computer processor configured by machine-readable instructions including a component that is the same as or similar to screen point component 312B, screen point component 310C, screen point component 416, and/or screen point component 540, in accordance with one or more embodiments.

2230 may include generating a screen point representation of the target screen point data, as discussed herein. 2230 may be performed by a physical computer processor configured by machine-readable instructions including a component that is the same as or similar to screen point representation component 314B, screen representation component 426, and/or representation component 550, in accordance with one or more embodiments.

2232 may include obtaining an initial screen characteristic model, as discussed herein. 2232 may be performed by a physical computer processor configured by machine-readable instructions including a component that is the same as or similar to screen characteristic model component 308C, screen characteristic model component 418, and/or screen characteristic model component 542, in accordance with one or more embodiments.

2234 may include obtaining training screen characteristic data, as discussed herein. 2234 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2236 may include generating a conditioned screen characteristic model, as discussed herein. 2236 may be performed by a physical computer processor configured by machine-readable instructions including a component that is the same as or similar to screen characteristic model component 308C, screen characteristic model component 418, and/or screen characteristic model component 542, in accordance with one or more embodiments.

2238 may include storing the conditioned screen characteristic model. 2238 may be performed by a physical computer processor configured by machine-readable instructions including a component that is the same as or similar to screen characteristic model component 308C, screen characteristic model component 418, and/or screen characteristic model component 542, in accordance with one or more embodiments.

2240 may include obtaining target screen point data, as discussed herein. 2240 may be performed by a physical computer processor configured by machine-readable instructions including a component that is the same as or similar to screen point component 312B, screen point component 310C, screen point component 416, and/or screen point component 540, in accordance with one or more embodiments.

2242 may include generating target screen characteristic data, as discussed herein. 2242 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2244 may include generating a screen characteristic representation of the target screen characteristic data, as discussed herein. 2244 may be performed by a physical computer processor configured by machine-readable instructions including a component that is the same as or similar to screen characteristic representation component 314C, screen representation component 426, and/or representation component 550, in accordance with one or more embodiments.

2246 may include obtaining an initial screen recommendation model, as discussed herein. 2246 may be performed by a physical computer processor configured by machine-readable instructions including a component that is the same as or similar to screen recommendation model component 308D, screen recommendation model component 422, and/or screen recommendation model component 546, in accordance with one or more embodiments.

2248 may include obtaining training screen recommendation data, as discussed herein. 2248 may be performed by a physical computer processor configured by machine-readable instructions including a component that is the same as or similar to screen recommendation component 312D, screen recommendation component 424, and/or screen recommendation component 548, in accordance with one or more embodiments.

2250 may include generating a conditioned screen recommendation model, as discussed herein. 2250 may be performed by a physical computer processor configured by machine-readable instructions including a component that is the same as or similar to screen recommendation model component 308D, screen recommendation model component 422, and/or screen recommendation model component 546, in accordance with one or more embodiments.

2252 may include storing the conditioned screen recommendation model. 2252 may be performed by a physical computer processor configured by machine-readable instructions including a component that is the same as or similar to screen recommendation model component 308D, screen recommendation model component 422, and/or screen recommendation model component 546, in accordance with one or more embodiments.

2254 may include obtaining target screen characteristic data, as discussed herein. 2254 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2256 may include generating target screen recommendation data, as discussed herein. 2256 may be performed by a physical computer processor configured by machine-readable instructions including a component that is the same as or similar to screen recommendation component 312D, screen recommendation component 424, and/or screen recommendation component 548, in accordance with one or more embodiments.

2258 may include generating a screen recommendation representation of the target screen recommendation data, as discussed herein. 2258 may be performed by a physical computer processor configured by machine-readable instructions including a component that is the same as or similar to screen recommendation representation component 314D, screen representation component 426, and/or representation component 550, in accordance with one or more embodiments.

2260 may include displaying the screen image representation. In some embodiments, 2260 may include displaying the screen point representation. In embodiments, 2260 may include displaying the screen characteristic representation. 2260 may include displaying the screen recommendation representation. 2260 may be performed by a physical computer processor configured by machine-readable instructions including a component that is the same as or similar to screen image representation component 314A, screen point representation component 314B, screen characteristic representation component 314C, screen recommendation representation component 314D, screen representation component 426, and/or representation component 550, in accordance with one or more embodiments.

Figure 22B:
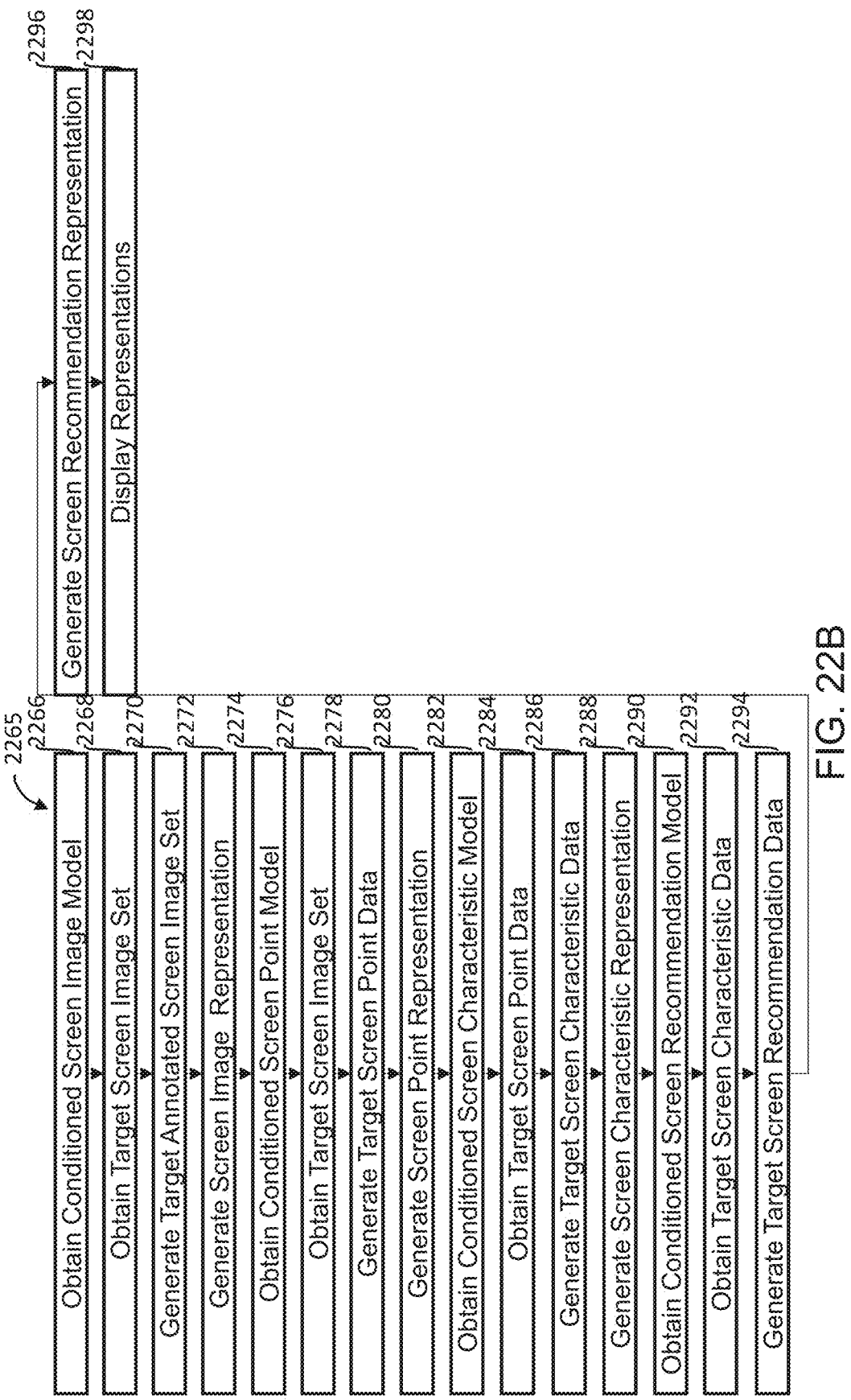
FIG. 22B illustrates an example operational flow diagram for generating annotated screen images, screen point data, screen characteristic data, and/or screen recommendation data in accordance with one or more embodiments of the presently disclosed technology.

FIG. 22B illustrates example operational flow diagram 2265 for generating annotated screen images, screen point data, screen characteristic data, and/or screen recommendation data in accordance with one or more embodiments of the presently disclosed technology. 2266 may include obtaining a conditioned screen image model, as discussed herein. 2266 may be performed by a physical computer processor configured by machine-readable instructions including a component that is the same as or similar to screen image model component 308A, screen image model component 408, and/or screen image model component 526, in accordance with one or more embodiments.

2268 may include obtaining a target screen image set, as discussed herein. 2268 may be performed by a physical computer processor configured by machine-readable instructions including a component that is the same as or similar to screen image component 310A, screen image component 410, and/or screen image component 534, in accordance with one or more embodiments.

2270 may include generating a target annotated screen image set, as discussed herein. 2270 may be performed by a physical computer processor configured by machine-readable instructions including a component that is the same as or similar to annotated screen image component 312A, annotated screen image component 412, and/or annotated screen image component 536, in accordance with one or more embodiments.

2272 may include generating a screen image representation of the target annotated screen image set, as discussed herein. 2272 may be performed by a physical computer processor configured by machine-readable instructions including a component that is the same as or similar to screen image representation component 314A, screen representation component 426, and/or representation component 550, in accordance with one or more embodiments.

2274 may include obtaining a conditioned screen point model, as discussed herein. 2274 may be performed by a physical computer processor configured by machine-readable instructions including a component that is the same as or similar to screen point model component 308B, screen point model component 414, and/or screen point model component 538, in accordance with one or more embodiments.

2276 may include obtaining a target screen image set, as discussed herein. 2276 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2278 may include generating target screen point data, as discussed herein. 2278 may be performed by a physical computer processor configured by machine-readable instructions including a component that is the same as or similar to screen point component 312B, screen point component 310C, screen point component 416, and/or screen point component 540, in accordance with one or more embodiments.

2280 may include generating a screen point representation of the target screen point data, as discussed herein. 2280 may be performed by a physical computer processor configured by machine-readable instructions including a component that is the same as or similar to screen point representation component 314B, screen representation component 426, and/or representation component 550, in accordance with one or more embodiments.

2282 may include obtaining a conditioned screen characteristic model, as discussed herein. 2282 may be performed by a physical computer processor configured by machine-readable instructions including a component that is the same as or similar to screen characteristic model component 308C, screen characteristic model component 418, and/or screen characteristic model component 542, in accordance with one or more embodiments.

2284 may include obtaining target screen point data, as discussed herein. 2284 may be performed by a physical computer processor configured by machine-readable instructions including a component that is the same as or similar to screen point component 312B, screen point component 310C, screen point component 416, and/or screen point component 540, in accordance with one or more embodiments.

2286 may include generating target screen characteristic data, as discussed herein. 2286 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2288 may include generating a screen characteristic representation of the target screen characteristic data, as discussed herein. 2288 may be performed by a physical computer processor configured by machine-readable instructions including a component that is the same as or similar to screen characteristic representation component 314C, screen representation component 426, and/or representation component 550, in accordance with one or more embodiments.

2290 may include obtaining a conditioned screen recommendation model, as discussed herein. 2290 may be performed by a physical computer processor configured by machine-readable instructions including a component that is the same as or similar to screen recommendation model component 308D, screen recommendation model component 422, and/or screen recommendation model component 546, in accordance with one or more embodiments.

2292 may include target screen characteristic data, as discussed herein. 2292 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments

2294 may include generating target screen recommendation data, as discussed herein. 2294 may be performed by a physical computer processor configured by machine-readable instructions including a component that is the same as or similar to screen recommendation component 312D, screen recommendation component 424, and/or screen recommendation component 548, in accordance with one or more embodiments.

2296 may include generating a screen recommendation representation of the target screen recommendation data, as discussed herein. 2296 may be performed by a physical computer processor configured by machine-readable instructions including a component that is the same as or similar to screen recommendation representation component 314D, screen representation component 426, and/or representation component 550, in accordance with one or more embodiments.

2298 may include displaying the screen image representation. 2298 may include displaying the screen point representation. 2298 may include displaying the screen characteristic representation. 2298 may include displaying the screen recommendation representation. 2298 may be performed by a physical computer processor configured by machine-readable instructions including a component that is the same as or similar to screen image representation component 314A, screen point representation component 314B, screen characteristic representation component 314C, screen recommendation representation component 314D, screen representation component 426, and/or representation component 550, in accordance with one or more embodiments.

Figure 23:
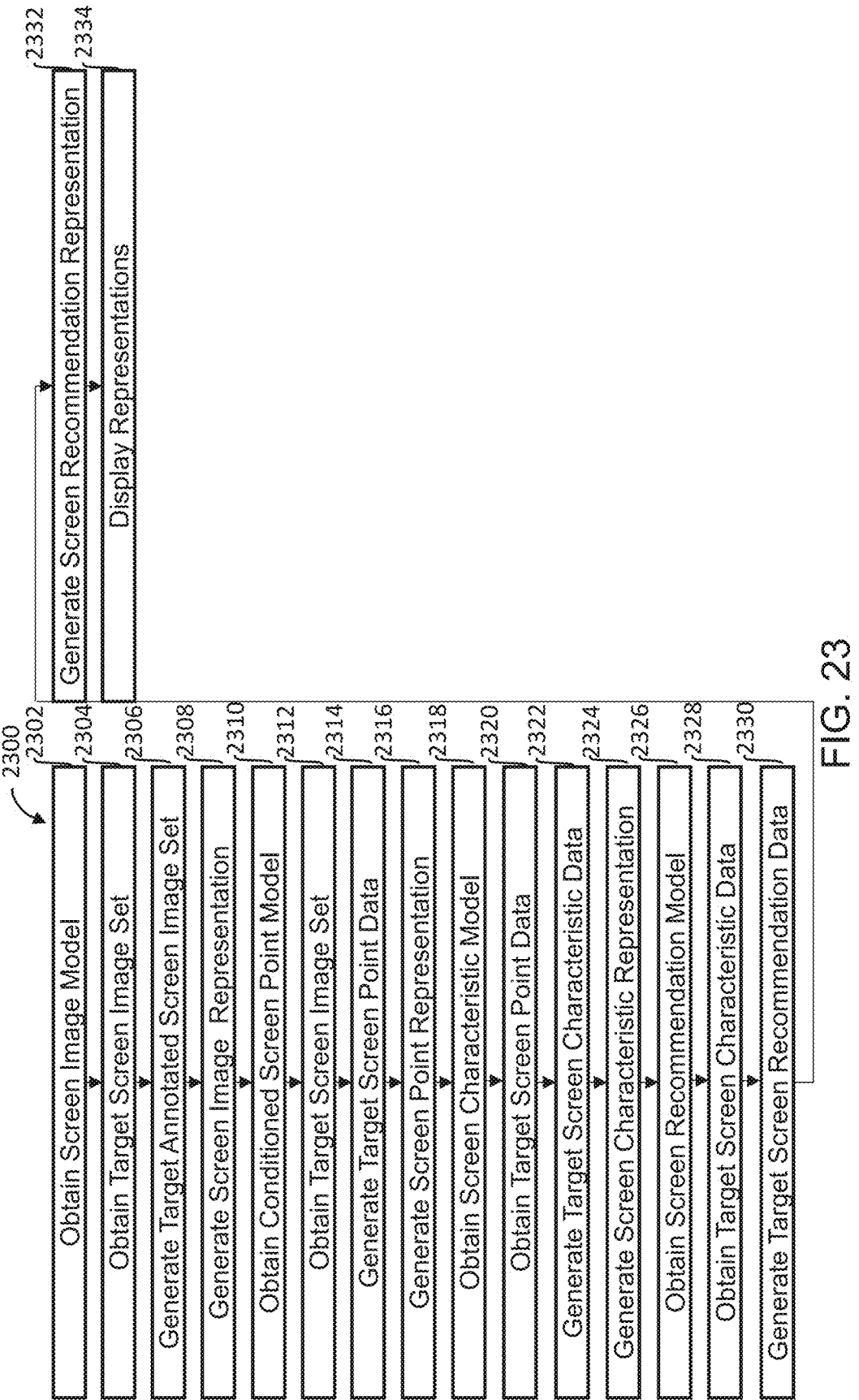
FIG. 23 illustrates an example operational flow diagram for generating annotated screen images, screen point data, screen characteristic data, and/or screen recommendation data in accordance with one or more embodiments of the presently disclosed technology.

FIG. 23 illustrates example operational flow diagram 2300 for generating annotated screen images, screen point data, screen characteristic data, and/or screen recommendation data in accordance with one or more embodiments of the presently disclosed technology. 2302 may include obtaining a screen image model, as discussed herein. 2302 may be performed by a physical computer processor configured by machine-readable instructions including a component that is the same as or similar to screen image model component 308A, screen image model component 408, and/or screen image model component 526, in accordance with one or more embodiments.

2304 may include obtaining a target screen image set, as discussed herein. 2304 may be performed by a physical computer processor configured by machine-readable instructions including a component that is the same as or similar to screen image component 310A, screen image component 410, and/or screen image component 534, in accordance with one or more embodiments.

2306 may include generating a target annotated screen image set, as discussed herein. 2306 may be performed by a physical computer processor configured by machine-readable instructions including a component that is the same as or similar to annotated screen image component 312A, annotated screen image component 412, and/or annotated screen image component 536, in accordance with one or more embodiments.

2308 may include generating a screen image representation of the target annotated screen image set, as discussed herein. 2308 may be performed by a physical computer processor configured by machine-readable instructions including a component that is the same as or similar to screen image representation component 314A, screen representation component 426, and/or representation component 550, in accordance with one or more embodiments.

2310 may include obtaining a conditioned screen point model, as discussed herein. 2310 may be performed by a physical computer processor configured by machine-readable instructions including a component that is the same as or similar to screen point model component 308B, screen point model component 414, and/or screen point model component 538, in accordance with one or more embodiments.

2312 may include obtaining a target screen image set, as discussed herein. 2312 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2314 may include generating target screen point data, as discussed herein. 2314 may be performed by a physical computer processor configured by machine-readable instructions including a component that is the same as or similar to screen point component 312B, screen point component 310C, screen point component 416, and/or screen point component 540, in accordance with one or more embodiments.

2316 may include generating a screen point representation of the target screen point data, as discussed herein. 2316 may be performed by a physical computer processor configured by machine-readable instructions including a component that is the same as or similar to screen point representation component 314B, screen representation component 426, and/or representation component 550, in accordance with one or more embodiments.

2318 may include obtaining a screen characteristic model, as discussed herein. 2318 may be performed by a physical computer processor configured by machine-readable instructions including a component that is the same as or similar to screen characteristic model component 308C, screen characteristic model component 418, and/or screen characteristic model component 542, in accordance with one or more embodiments.

2320 may include obtaining target screen point data, as discussed herein. 2320 may be performed by a physical computer processor configured by machine-readable instructions including a component that is the same as or similar to screen point component 312B, screen point component 310C, screen point component 416, and/or screen point component 540, in accordance with one or more embodiments.

2322 may include generating target screen characteristic data, as discussed herein. 2322 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2324 may include generating a screen characteristic representation of the target screen characteristic data, as discussed herein. 2324 may be performed by a physical computer processor configured by machine-readable instructions including a component that is the same as or similar to screen characteristic representation component 314C, screen representation component 426, and/or representation component 550, in accordance with one or more embodiments.

2326 may include obtaining a screen recommendation model, as discussed herein. 2326 may be performed by a physical computer processor configured by machine-readable instructions including a component that is the same as or similar to screen recommendation model component 308D, screen recommendation model component 422, and/ or screen recommendation model component 546, in accordance with one or more embodiments.

2328 may include target screen characteristic data. As discussed herein, the target screen characteristic data may include screen characteristics specifying screen characteristic values. 2328 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments

2330 may include generating target screen recommendation data, as discussed herein. 2330 may be performed by a physical computer processor configured by machine-readable instructions including a component that is the same as or similar to screen recommendation component 312D, screen recommendation component 424, and/or screen recommendation component 548, in accordance with one or more embodiments.

2332 may include generating a screen recommendation representation of the target screen recommendation data, as discussed herein. 2332 may be performed by a physical computer processor configured by machine-readable instructions including a component that is the same as or similar to screen recommendation representation component 314D, screen representation component 426, and/or representation component 550, in accordance with one or more embodiments.

2334 may include displaying the screen image representation. 2334 may include displaying the screen point representation. 2334 may include displaying the screen characteristic representation. 2334 may include displaying the screen recommendation representation. 2334 may be performed by a physical computer processor configured by machine-readable instructions including a component that is the same as or similar to screen image representation component 314A, screen point representation component 314B, screen characteristic representation component 314C, screen recommendation representation component 314D, screen representation component 426, and/or representation component 550, in accordance with one or more embodiments.

Figure 24B:
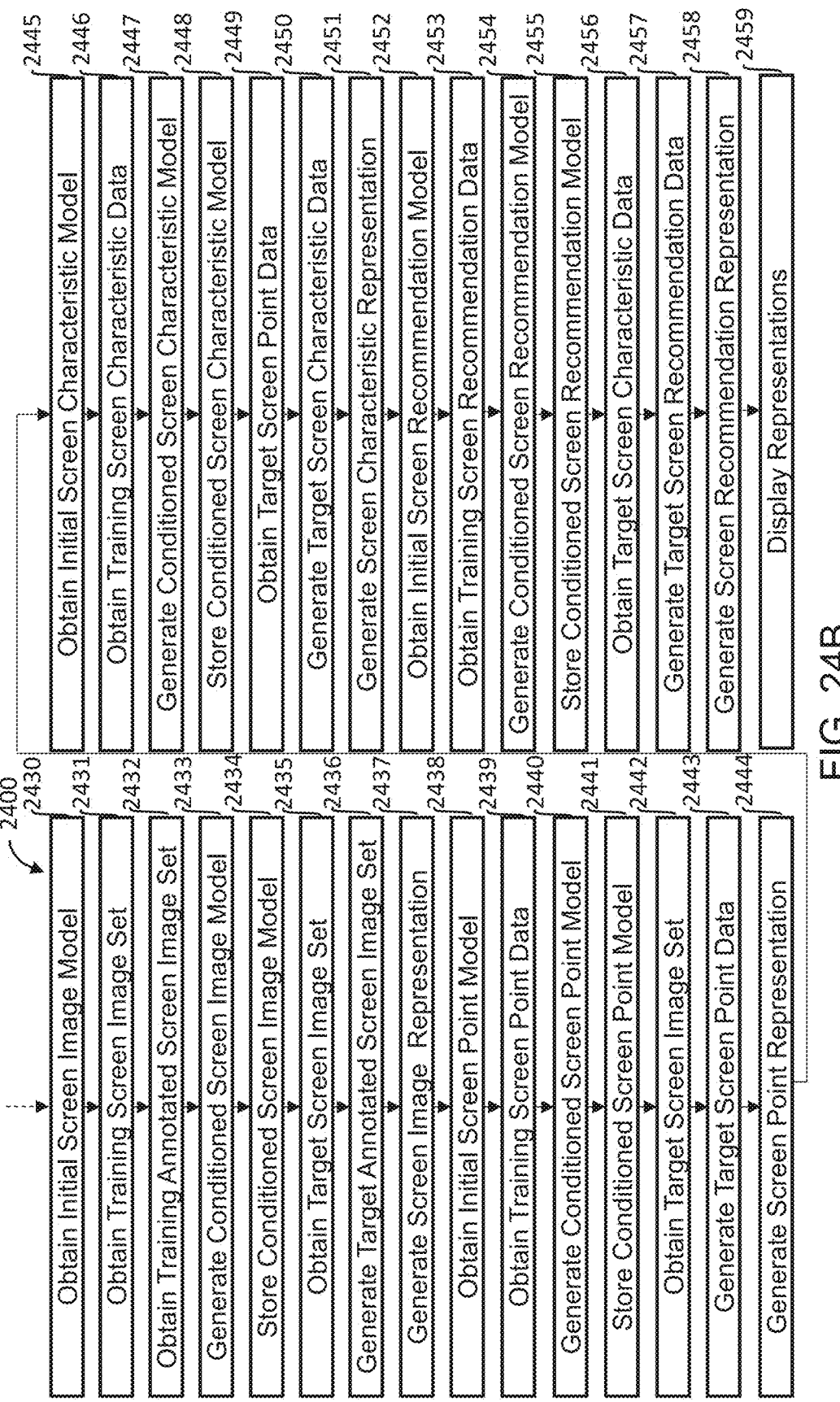
FIG. 24B illustrates an example operational flow diagram for training an initial screen image model to generate annotated screen images, training an initial screen point model to generate screen point data, training an initial screen characteristic model to generate screen characteristic data, and/or training an initial screen recommendation model to generate screen recommendation data in accordance with one or more embodiments of the presently disclosed technology.

FIGS. 24A and 24B illustrate example operational flow diagram 2400 for training an initial swing image model to generate annotated swing images, training an initial swing point model to generate swing point data, training an initial swing characteristic model to generate swing characteristic data, training an initial swing recommendation model to generate swing recommendation data, training an initial screen image model to generate annotated screen images, training an initial screen point model to generate screen point data, training an initial screen characteristic model to generate screen characteristic data, and/or training an initial screen recommendation model to generate screen recommendation data in accordance with one or more embodiments of the presently disclosed technology. 2401 may include obtaining an initial swing image model, as discussed herein. 2401 may be performed by a physical computer processor configured by machine-readable instructions including a component that is the same as or similar to swing image model component 108A, swing image model component 208, and/or swing image model component 508, in accordance with one or more embodiments.

2402 may include obtaining a training swing image set, as discussed herein. The training swing image set may be used to train the initial swing point model. The training swing image set may correspond to the training swing point data.

2402 may be performed by a physical computer processor configured by machine-readable instructions including a component that is the same as or similar to swing image component 110A, swing image component 210, and/or swing image component 510, in accordance with one or more embodiments.

2403 may include obtaining a training annotated swing image set, as discussed herein. 2403 may be performed by a physical computer processor configured by machine-readable instructions including a component that is the same as or similar to annotated swing image component 112A, annotated swing image component 212, and/or annotated swing image component 512, in accordance with one or more embodiments.

2404 may include generating a conditioned swing image model, as discussed herein. 2404 may be performed by a physical computer processor configured by machine-readable instructions including a component that is the same as or similar to swing image model component 108A, swing image model component 208, and/or swing image model component 508, in accordance with one or more embodiments.

2405 may include storing the conditioned swing image model. 2405 may be performed by a physical computer processor configured by machine-readable instructions including a component that is the same as or similar to swing image model component 108A, swing image model component 208, and/or swing image model component 508, in accordance with one or more embodiments.

2406 may include obtaining a target swing image set, as discussed herein. 2406 may be performed by a physical computer processor configured by machine-readable instructions including a component that is the same as or similar to swing image component 110A, swing image component 210, and/or swing image component 510, in accordance with one or more embodiments.

2407 may include generating a target annotated swing image set, as discussed herein. 2407 may be performed by a physical computer processor configured by machine-readable instructions including a component that is the same as or similar to annotated swing image component 112A, annotated swing image component 212, and/or annotated swing image component 512, in accordance with one or more embodiments.

2408 may include generating a swing image representation of the target annotated swing image set, as discussed herein. 2408 may be performed by a physical computer processor configured by machine-readable instructions including a component that is the same as or similar to swing image representation component 114A, swing representation component 226, and/or representation component 550, in accordance with one or more embodiments.

2409 may include obtaining an initial swing point model, as discussed herein. 2409 may be performed by a physical computer processor configured by machine-readable instructions including a component that is the same as or similar to swing point model component 108B, swing point model component 214, and/or swing point model component 514, in accordance with one or more embodiments.

2410 may include obtaining training swing point data, as discussed herein. 2410 may be performed by a physical computer processor configured by machine-readable instructions including a component that is the same as or similar to swing point component 112B, swing point component 110C, swing point component 216, and/or swing point component 516, in accordance with one or more embodiments.

2411 may include generating a conditioned swing point model, as discussed herein. 2411 may be performed by a physical computer processor configured by machine-readable instructions including a component that is the same as or similar to swing point model component 108B, swing point model component 214, and/or swing point model component 514, in accordance with one or more embodiments.

2412 may include storing the conditioned swing point model. 2412 may be performed by a physical computer processor configured by machine-readable instructions including a component that is the same as or similar to swing point model component 108B, swing point model component 214, and/or swing point model component 514, in accordance with one or more embodiments.

2413 may include obtaining a target swing image set, as discussed herein. 2413 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

2414 may include generating target swing point data, as discussed herein. 2414 may be performed by a physical computer processor configured by machine-readable instructions including a component that is the same as or similar to swing point component 112B, swing point component 110C, swing point component 216, and/or swing point component 516, in accordance with one or more embodiments.

2415 may include generating a swing point representation of the target swing point data, as discussed herein. 2415 may be performed by a physical computer processor configured by machine-readable instructions including a component that is the same as or similar to swing point representation component 114B, swing representation component 226, and/or representation component 550, in accordance with one or more embodiments.

2416 may include obtaining an initial swing characteristic model, as discussed herein. 2416 may be performed by a physical computer processor configured by machine-readable instructions including a component that is the same as or similar to swing characteristic model component 108C, swing characteristic model component 218, and/or swing characteristic model component 518, in accordance with one or more embodiments.

2417 may include obtaining training swing characteristic data, as discussed herein. 2417 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

2418 may include generating a conditioned swing characteristic model, as discussed herein. 2418 may be performed by a physical computer processor configured by machine-readable instructions including a component that is the same as or similar to swing characteristic model component 108C, swing characteristic model component 218, and/or swing characteristic model component 518, in accordance with one or more embodiments.

2419 may include storing the conditioned swing characteristic model. 2419 may be performed by a physical computer processor configured by machine-readable instructions including a component that is the same as or similar to swing characteristic model component 108C, swing characteristic model component 218, and/or swing characteristic model component 518, in accordance with one or more embodiments.

2420 may include obtaining target swing point data, as discussed herein. 2420 may be performed by a physical computer processor configured by machine-readable instructions including a component that is the same as or similar to swing point component 112B, swing point component 110C, swing point component 216, and/or swing point component 516, in accordance with one or more embodiments.

2421 may include generating target swing characteristic data, as discussed herein. 2421 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

2422 may include generating a swing characteristic representation of the target swing characteristic data, as discussed herein. 2422 may be performed by a physical computer processor configured by machine-readable instructions including a component that is the same as or similar to swing characteristic representation component 114C, swing representation component 226, and/or representation component 550, in accordance with one or more embodiments.

2423 may include obtaining an initial swing recommendation model, as discussed herein. 2423 may be performed by a physical computer processor configured by machine-readable instructions including a component that is the same as or similar to swing recommendation model component 108D, swing recommendation model component 222, and/or swing recommendation model component 522, in accordance with one or more embodiments.

2424 may include obtaining training swing recommendation data, as discussed herein. 2424 may be performed by a physical computer processor configured by machine-readable instructions including a component that is the same as or similar to swing recommendation component 112D, swing recommendation component 224, and/or swing recommendation component 524, in accordance with one or more embodiments.

2425 may include generating a conditioned swing recommendation model, as discussed herein. 2425 may be performed by a physical computer processor configured by machine-readable instructions including a component that is the same as or similar to swing recommendation model component 108D, swing recommendation model component 222, and/or swing recommendation model component 522, in accordance with one or more embodiments.

2426 may include storing the conditioned swing recommendation model. 2426 may be performed by a physical computer processor configured by machine-readable instructions including a component that is the same as or similar to swing recommendation model component 108D, swing recommendation model component 222, and/or swing recommendation model component 522, in accordance with one or more embodiments.

2427 may include obtaining target swing characteristic data, as discussed herein. 2427 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

2428 may include generating target swing recommendation data, as discussed herein. 2428 may be performed by a physical computer processor configured by machine-readable instructions including a component that is the same as or similar to swing recommendation component 112D, swing recommendation component 224, and/or swing recommendation component 524, in accordance with one or more embodiments.

2429 may include generating a swing recommendation representation of the target swing recommendation data, as discussed herein. 2429 may be performed by a physical computer processor configured by machine-readable instructions including a component that is the same as or similar to swing recommendation representation component 114D, swing representation component 226, and/or representation component 550, in accordance with one or more embodiments.

2430 may include obtaining an initial screen image model, as discussed herein. 2430 may be performed by a physical computer processor configured by machine-readable instructions including a component that is the same as or similar to screen image model component 308A, screen image model component 408, and/or screen image model component 526, in accordance with one or more embodiments.

2431 may include obtaining a training screen image set, as discussed herein. 2431 may be performed by a physical computer processor configured by machine-readable instructions including a component that is the same as or similar to screen image component 310A, screen image component 410, and/or screen image component 534, in accordance with one or more embodiments.

2432 may include obtaining a training annotated screen image set, as discussed herein. 2432 may be performed by a physical computer processor configured by machine-readable instructions including a component that is the same as or similar to annotated screen image component 312A, annotated screen image component 412, and/or annotated screen image component 536, in accordance with one or more embodiments.

2433 may include generating a conditioned screen image model, as discussed herein. 2433 may be performed by a physical computer processor configured by machine-readable instructions including a component that is the same as or similar to screen image model component 308A, screen image model component 408, and/or screen image model component 526, in accordance with one or more embodiments.

2434 may include storing the conditioned screen image model. 2434 may be performed by a physical computer processor configured by machine-readable instructions including a component that is the same as or similar to screen image model component 308A, screen image model component 408, and/or screen image model component 526, in accordance with one or more embodiments.

2435 may include obtaining a target screen image set, as discussed herein. 2435 may be performed by a physical computer processor configured by machine-readable instructions including a component that is the same as or similar to screen image component 310A, screen image component 410, and/or screen image component 534, in accordance with one or more embodiments.

2436 may include generating a target annotated screen image set, as discussed herein. 2436 may be performed by a physical computer processor configured by machine-readable instructions including a component that is the same as or similar to annotated screen image component 312A, annotated screen image component 412, and/or annotated screen image component 536, in accordance with one or more embodiments.

2437 may include generating a screen image representation of the target annotated screen image set, as discussed herein. 2437 may be performed by a physical computer processor configured by machine-readable instructions including a component that is the same as or similar to screen image representation component 314A, screen representation component 426, and/or representation component 550, in accordance with one or more embodiments.

2438 may include obtaining an initial screen point model, as discussed herein. 2438 may be performed by a physical computer processor configured by machine-readable instructions including a component that is the same as or similar to screen point model component 308B, screen point model component 414, and/or screen point model component 538, in accordance with one or more embodiments.

2439 may include obtaining training screen point data, as discussed herein. 2439 may be performed by a physical computer processor configured by machine-readable instructions including a component that is the same as or similar to screen point component 312B, screen point component 310C, screen point component 416, and/or screen point component 540, in accordance with one or more embodiments.

2440 may include generating a conditioned screen point model, as discussed herein. 2440 may be performed by a physical computer processor configured by machine-readable instructions including a component that is the same as or similar to screen point model component 308B, screen point model component 414, and/or screen point model component 538, in accordance with one or more embodiments.

2441 may include storing the conditioned screen point model. 2441 may be performed by a physical computer processor configured by machine-readable instructions including a component that is the same as or similar to screen point model component 308B, screen point model component 414, and/or screen point model component 538, in accordance with one or more embodiments.

2442 may include obtaining a target screen image set, as discussed herein. 2442 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2443 may include generating target screen point data, as discussed herein. 2443 may be performed by a physical computer processor configured by machine-readable instructions including a component that is the same as or similar to screen point component 312B, screen point component 310C, screen point component 416, and/or screen point component 540, in accordance with one or more embodiments.

2444 may include generating a screen point representation of the target screen point data, as discussed herein. 2444 may be performed by a physical computer processor configured by machine-readable instructions including a component that is the same as or similar to screen point representation component 314B, screen representation component 426, and/or representation component 550, in accordance with one or more embodiments.

2445 may include obtaining an initial screen characteristic model, as discussed herein. 2445 may be performed by a physical computer processor configured by machine-readable instructions including a component that is the same as or similar to screen characteristic model component 308C, screen characteristic model component 418, and/or screen characteristic model component 542, in accordance with one or more embodiments.

2446 may include obtaining training screen characteristic data, as discussed herein. 2446 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2447 may include generating a conditioned screen characteristic model, as discussed herein. 2447 may be performed by a physical computer processor configured by machine-readable instructions including a component that is the same as or similar to screen characteristic model component 308C, screen characteristic model component 418, and/or screen characteristic model component 542, in accordance with one or more embodiments.

2448 may include storing the conditioned screen characteristic model. 2448 may be performed by a physical computer processor configured by machine-readable instructions including a component that is the same as or similar to screen characteristic model component 308C, screen characteristic model component 418, and/or screen characteristic model component 542, in accordance with one or more embodiments.

2449 may include obtaining target screen point data, as discussed herein. 2449 may be performed by a physical computer processor configured by machine-readable instructions including a component that is the same as or similar to screen point component 312B, screen point component 310C, screen point component 416, and/or screen point component 540, in accordance with one or more embodiments.

2450 may include generating target screen characteristic data, as discussed herein. 2450 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2451 may include generating a screen characteristic representation of the target screen characteristic data, as discussed herein. 2451 may be performed by a physical computer processor configured by machine-readable instructions including a component that is the same as or similar to screen characteristic representation component 314C, screen representation component 426, and/or representation component 550, in accordance with one or more embodiments.

2452 may include obtaining an initial screen recommendation model, as discussed herein. 2452 may be performed by a physical computer processor configured by machine-readable instructions including a component that is the same as or similar to screen recommendation model component 308D, screen recommendation model component 422, and/or screen recommendation model component 546, in accordance with one or more embodiments.

2453 may include obtaining training screen recommendation data, as discussed herein. 2453 may be performed by a physical computer processor configured by machine-readable instructions including a component that is the same as or similar to screen recommendation component 312D, screen recommendation component 424, and/or screen recommendation component 548, in accordance with one or more embodiments.

2454 may include generating a conditioned screen recommendation model, as discussed herein. 2454 may be performed by a physical computer processor configured by machine-readable instructions including a component that is the same as or similar to screen recommendation model component 308D, screen recommendation model component 422, and/or screen recommendation model component 546, in accordance with one or more embodiments.

2455 may include storing the conditioned screen recommendation model. 2455 may be performed by a physical computer processor configured by machine-readable instructions including a component that is the same as or similar to screen recommendation model component 308D, screen recommendation model component 422, and/or screen recommendation model component 546, in accordance with one or more embodiments.

2456 may include obtaining target screen characteristic data, as discussed herein. 2456 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2457 may include generating target screen recommendation data, as discussed herein. 2457 may be performed by a physical computer processor configured by machine-readable instructions including a component that is the same as or similar to screen recommendation component 312D, screen recommendation component 424, and/or screen recommendation component 548, in accordance with one or more embodiments.

2458 may include generating a screen recommendation representation of the target screen recommendation data, as discussed herein. 2458 may be performed by a physical computer processor configured by machine-readable instructions including a component that is the same as or similar to screen recommendation representation component 314D, screen representation component 426, and/or representation component 550, in accordance with one or more embodiments.

2459 may include displaying the swing image representation. In some embodiments, 2459 may include displaying the swing point representation. In embodiments, 2459 may include displaying the swing characteristic representation. 2459 may include displaying the swing recommendation representation. 2459 may include displaying the screen image representation. In some embodiments, 2459 may include displaying the screen point representation. In embodiments, 2459 may include displaying the screen characteristic representation. 2459 may include displaying the screen recommendation representation. 2459 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, screen image representation component 314A, screen point representation component 314B, screen characteristic representation component 314C, screen recommendation representation component 314D, screen representation component 426, and/or representation component 550, in accordance with one or more embodiments.

Figure 24C:
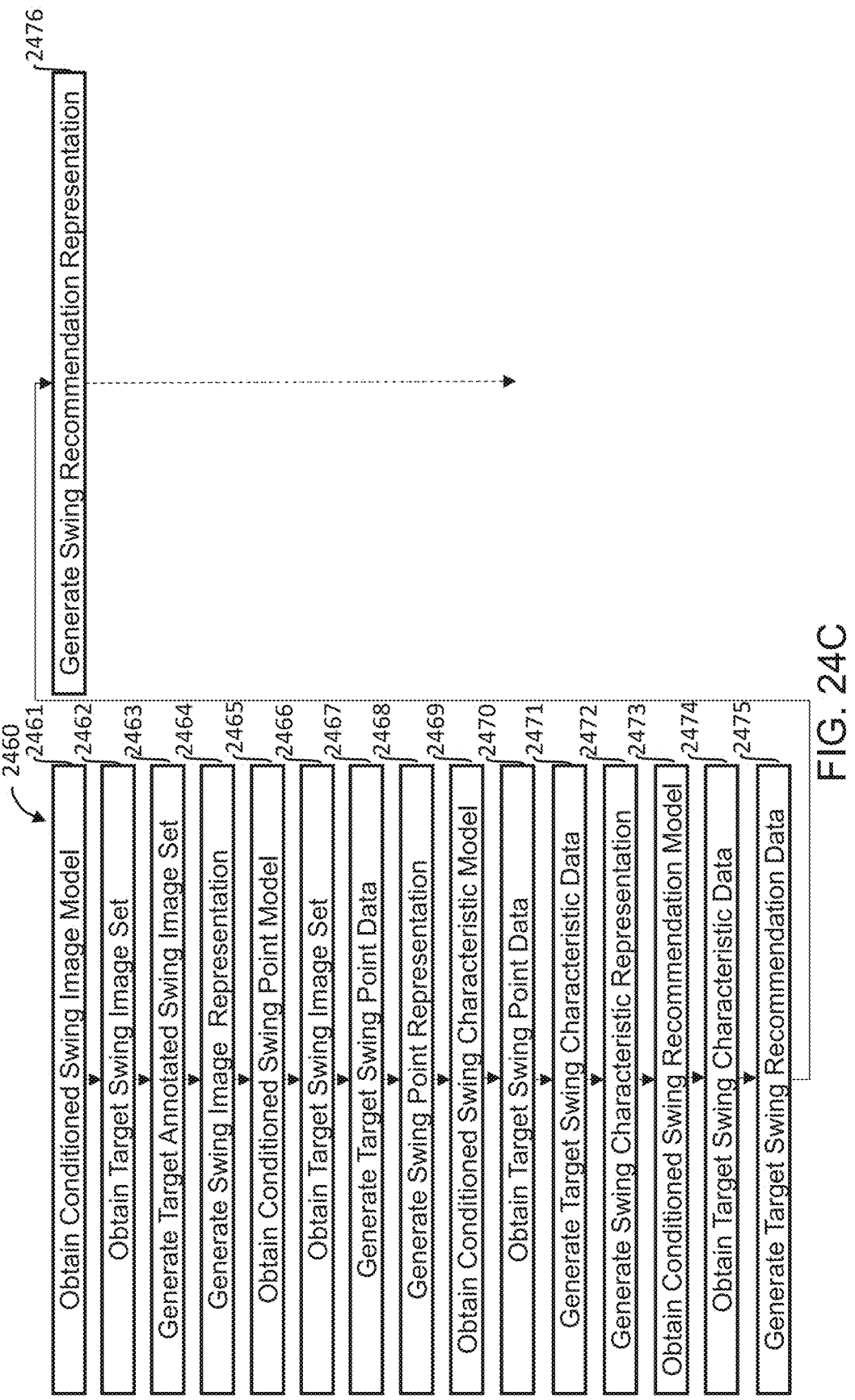
FIG. 24C illustrates an example operational flow diagram for generating annotated swing images, swing point data, swing characteristic data, and/or swing recommendation data in accordance with one or more embodiments of the presently disclosed technology.
Figure 24D:
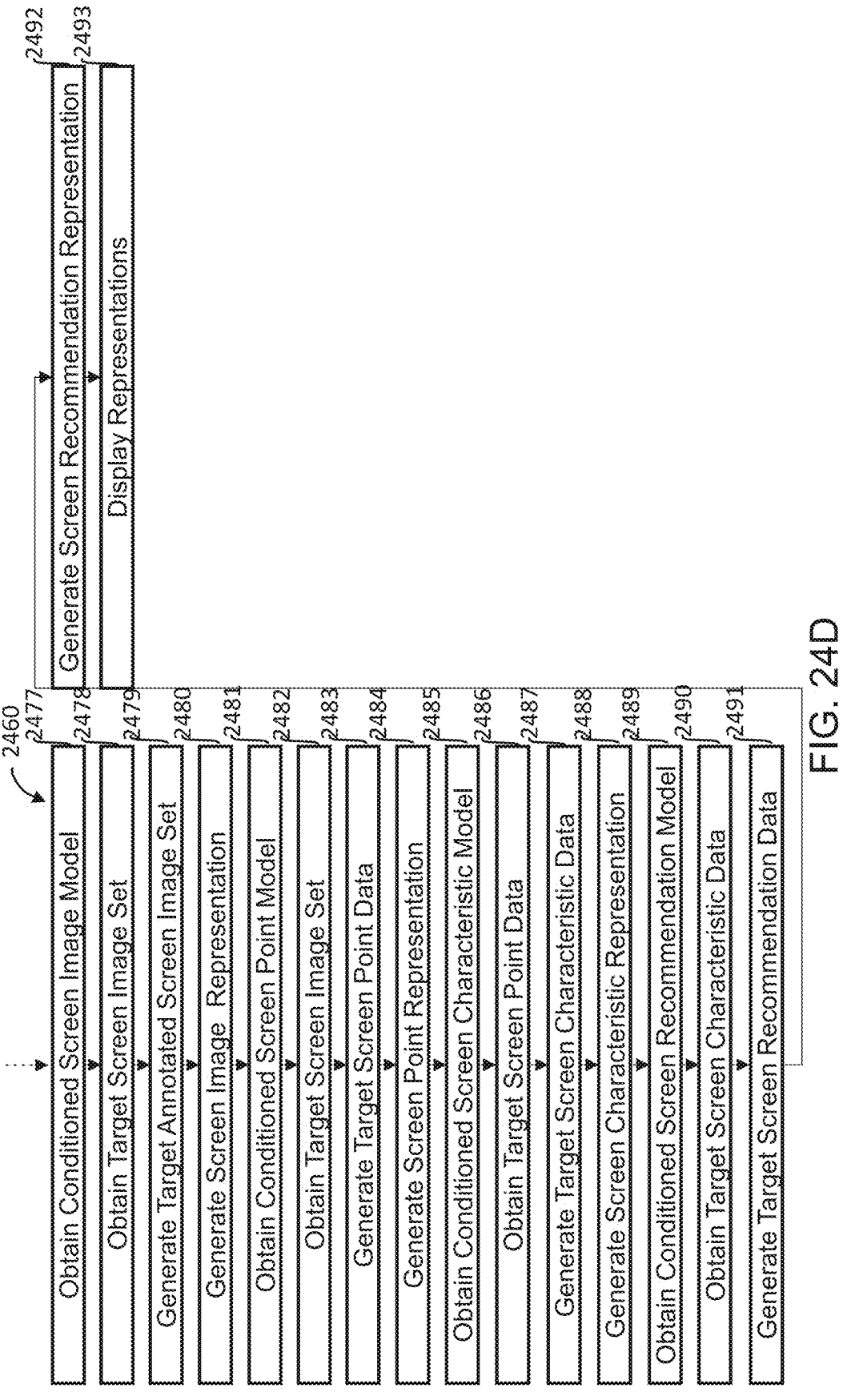
FIG. 24D illustrates an example operational flow diagram for generating annotated screen images, screen point data, screen characteristic data, and/or screen recommendation data in accordance with one or more embodiments of the presently disclosed technology.

FIGS. 24C and 24D illustrate example operational flow diagram 2460 for generating annotated swing images, swing point data, swing characteristic data, swing recommendation data, annotated screen images, screen point data, screen characteristic data, and/or screen recommendation data in accordance with one or more embodiments of the presently disclosed technology. 2461 may include obtaining a conditioned swing image model, as discussed herein. 2461 may be performed by a physical computer processor configured by machine-readable instructions including a component that is the same as or similar to swing image model component 108A, swing image model component 208, and/or swing image model component 508, in accordance with one or more embodiments.

2462 may include obtaining a target swing image set, as discussed herein. 2462 may be performed by a physical computer processor configured by machine-readable instructions including a component that is the same as or similar to swing image component 110A, swing image component 210, and/or swing image component 510, in accordance with one or more embodiments.

2463 may include generating a target annotated swing image set, as discussed herein. 2463 may be performed by a physical computer processor configured by machine-readable instructions including a component that is the same as or similar to annotated swing image component 112A, annotated swing image component 212, and/or annotated swing image component 512, in accordance with one or more embodiments.

2464 may include generating a swing image representation of the target annotated swing image set, as discussed herein. 2464 may be performed by a physical computer processor configured by machine-readable instructions including a component that is the same as or similar to swing image representation component 114A, swing representation component 226, and/or representation component 550, in accordance with one or more embodiments.

2465 may include obtaining a conditioned swing point model, as discussed herein. 2465 may be performed by a physical computer processor configured by machine-readable instructions including a component that is the same as or similar to swing point model component 108B, swing point model component 214, and/or swing point model component 514, in accordance with one or more embodiments.

2466 may include obtaining a target swing image set, as discussed herein. 2466 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

2467 may include generating target swing point data, as discussed herein. 2467 may be performed by a physical computer processor configured by machine-readable instructions including a component that is the same as or similar to swing point component 112B, swing point component 110C, swing point component 216, and/or swing point component 516, in accordance with one or more embodiments.

2468 may include generating a swing point representation of the target swing point data, as discussed herein. 2468 may be performed by a physical computer processor configured by machine-readable instructions including a component that is the same as or similar to swing point representation component 114B, swing representation component 226, and/or representation component 550, in accordance with one or more embodiments.

2469 may include obtaining a conditioned swing characteristic model, as discussed herein. 2469 may be performed by a physical computer processor configured by machine-readable instructions including a component that is the same as or similar to swing characteristic model component 108C, swing characteristic model component 218, and/or swing characteristic model component 518, in accordance with one or more embodiments.

2470 may include obtaining target swing point data, as discussed herein. 2470 may be performed by a physical computer processor configured by machine-readable instructions including a component that is the same as or similar to swing point component 112B, swing point component 110C, swing point component 216, and/or swing point component 516, in accordance with one or more embodiments.

2471 may include generating target swing characteristic data, as discussed herein. 2471 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

2472 may include generating a swing characteristic representation of the target swing characteristic data, as discussed herein. 2472 may be performed by a physical computer processor configured by machine-readable instructions including a component that is the same as or similar to swing characteristic representation component 114C, swing representation component 226, and/or representation component 550, in accordance with one or more embodiments.

2473 may include obtaining a conditioned swing recommendation model, as discussed herein. 2473 may be performed by a physical computer processor configured by machine-readable instructions including a component that is the same as or similar to swing recommendation model component 108D, swing recommendation model component 222, and/or swing recommendation model component 522, in accordance with one or more embodiments.

2474 may include target swing characteristic data, as discussed herein. 2474 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments

2475 may include generating target swing recommendation data, as discussed herein. 2475 may be performed by a physical computer processor configured by machine-readable instructions including a component that is the same as or similar to swing recommendation component 112D, swing recommendation component 224, and/or swing recommendation component 524, in accordance with one or more embodiments.

2476 may include generating a swing recommendation representation of the target swing recommendation data, as discussed herein. 2476 may be performed by a physical computer processor configured by machine-readable instructions including a component that is the same as or similar to swing recommendation representation component 114D, swing representation component 226, and/or representation component 550, in accordance with one or more embodiments.

2477 may include obtaining a conditioned screen image model, as discussed herein. 2477 may be performed by a physical computer processor configured by machine-readable instructions including a component that is the same as or similar to screen image model component 308A, screen image model component 408, and/or screen image model component 526, in accordance with one or more embodiments.

2478 may include obtaining a target screen image set, as discussed herein. 2478 may be performed by a physical computer processor configured by machine-readable instructions including a component that is the same as or similar to screen image component 310A, screen image component 410, and/or screen image component 534, in accordance with one or more embodiments.

2479 may include generating a target annotated screen image set, as discussed herein. 2479 may be performed by a physical computer processor configured by machine-readable instructions including a component that is the same as or similar to annotated screen image component 312A, annotated screen image component 412, and/or annotated screen image component 536, in accordance with one or more embodiments.

2480 may include generating a screen image representation of the target annotated screen image set, as discussed herein. 2480 may be performed by a physical computer processor configured by machine-readable instructions including a component that is the same as or similar to screen image representation component 314A, screen representation component 426, and/or representation component 550, in accordance with one or more embodiments.

2481 may include obtaining a conditioned screen point model, as discussed herein. 2481 may be performed by a physical computer processor configured by machine-readable instructions including a component that is the same as or similar to screen point model component 308B, screen point model component 414, and/or screen point model component 538, in accordance with one or more embodiments.

2482 may include obtaining a target screen image set, as discussed herein. 2482 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2483 may include generating target screen point data, as discussed herein. 2483 may be performed by a physical computer processor configured by machine-readable instructions including a component that is the same as or similar to screen point component 312B, screen point component 310C, screen point component 416, and/or screen point component 540, in accordance with one or more embodiments.

2484 may include generating a screen point representation of the target screen point data, as discussed herein. 2484 may be performed by a physical computer processor configured by machine-readable instructions including a component that is the same as or similar to screen point representation component 314B, screen representation component 426, and/or representation component 550, in accordance with one or more embodiments.

2485 may include obtaining a conditioned screen characteristic model, as discussed herein. 2485 may be performed by a physical computer processor configured by machine-readable instructions including a component that is the same as or similar to screen characteristic model component 308C, screen characteristic model component 418, and/or screen characteristic model component 542, in accordance with one or more embodiments.

2486 may include obtaining target screen point data, as discussed herein. 2486 may be performed by a physical computer processor configured by machine-readable instructions including a component that is the same as or similar to screen point component 312B, screen point component 310C, screen point component 416, and/or screen point component 540, in accordance with one or more embodiments.

2487 may include generating target screen characteristic data, as discussed herein. 2487 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2488 may include generating a screen characteristic representation of the target screen characteristic data, as discussed herein. 2488 may be performed by a physical computer processor configured by machine-readable instructions including a component that is the same as or similar to screen characteristic representation component 314C, screen representation component 426, and/or representation component 550, in accordance with one or more embodiments.

2489 may include obtaining a conditioned screen recommendation model, as discussed herein. 2489 may be performed by a physical computer processor configured by machine-readable instructions including a component that is the same as or similar to screen recommendation model component 308D, screen recommendation model component 422, and/or screen recommendation model component 546, in accordance with one or more embodiments.

2490 may include target screen characteristic data. As discussed herein, the target screen characteristic data may include screen characteristics specifying screen characteristic values. 2490 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments 2491 may include generating target screen recommendation data, as discussed herein. 2491 may be performed by a physical computer processor configured by machine-readable instructions including a component that is the same as or similar to screen recommendation component 312D, screen recommendation component 424, and/or screen recommendation component 548, in accordance with one or more embodiments.

2492 may include generating a screen recommendation representation of the target screen recommendation data, as discussed herein. 2492 may be performed by a physical computer processor configured by machine-readable instructions including a component that is the same as or similar to screen recommendation representation component 314D, screen representation component 426, and/or representation component 550, in accordance with one or more embodiments.

2493 may include displaying the swing image representation. 2493 may include displaying the swing point representation. 2493 may include displaying the swing characteristic representation. 2493 may include displaying the swing recommendation representation. 2493 may include displaying the screen image representation. 2493 may include displaying the screen point representation. 2493 may include displaying the screen characteristic representation. 2493 may include displaying the screen recommendation representation. 2493 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, screen image representation component 314A, screen point representation component 314B, screen characteristic representation component 314C, screen recommendation representation component 314D, screen representation component 426, and/or representation component 550, in accordance with one or more embodiments.

Figure 25A:
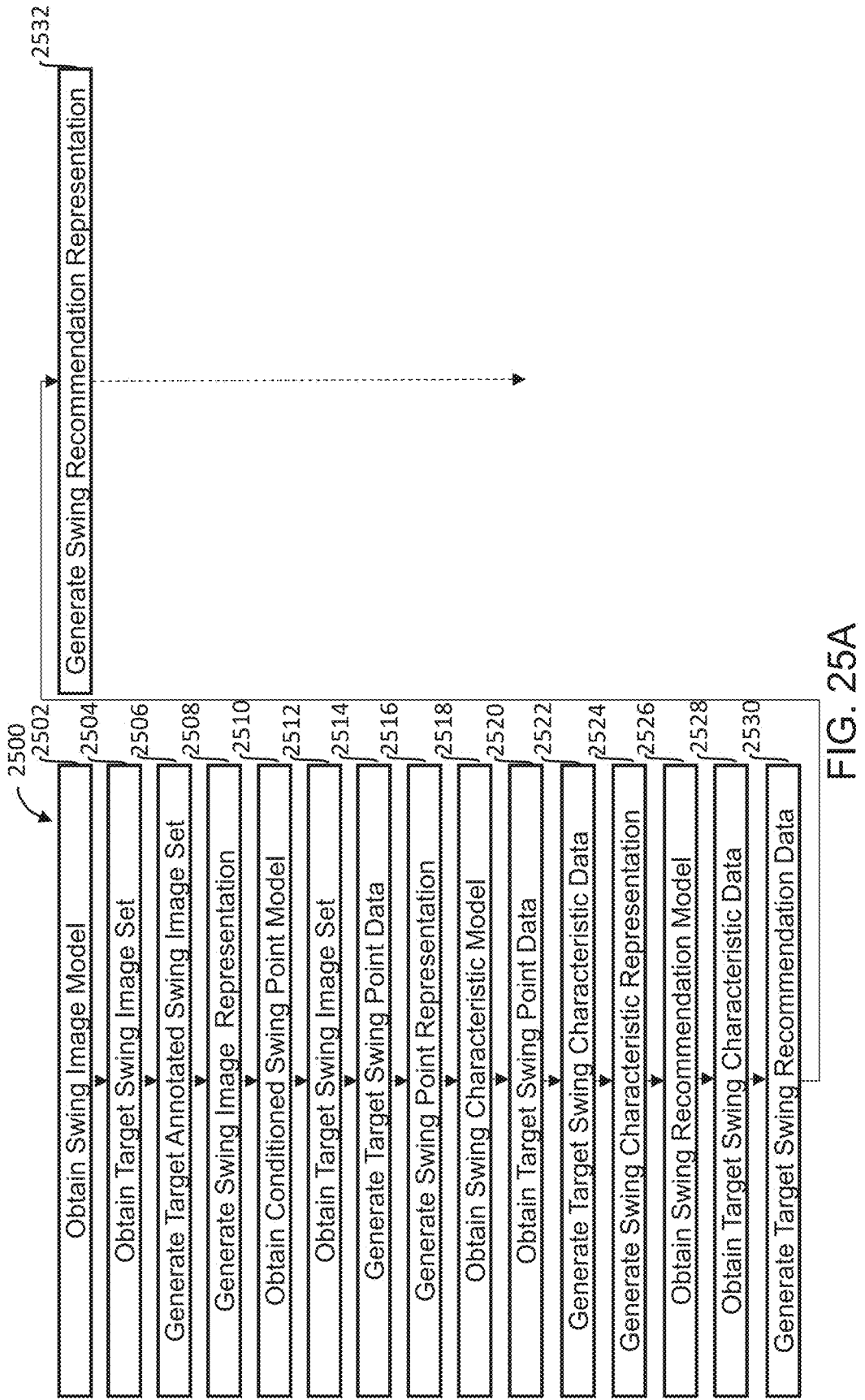
FIG. 25A illustrates an example operational flow diagram for generating annotated swing images, swing point data, swing characteristic data, and/or swing recommendation data in accordance with one or more embodiments of the presently disclosed technology.
Figure 25B:
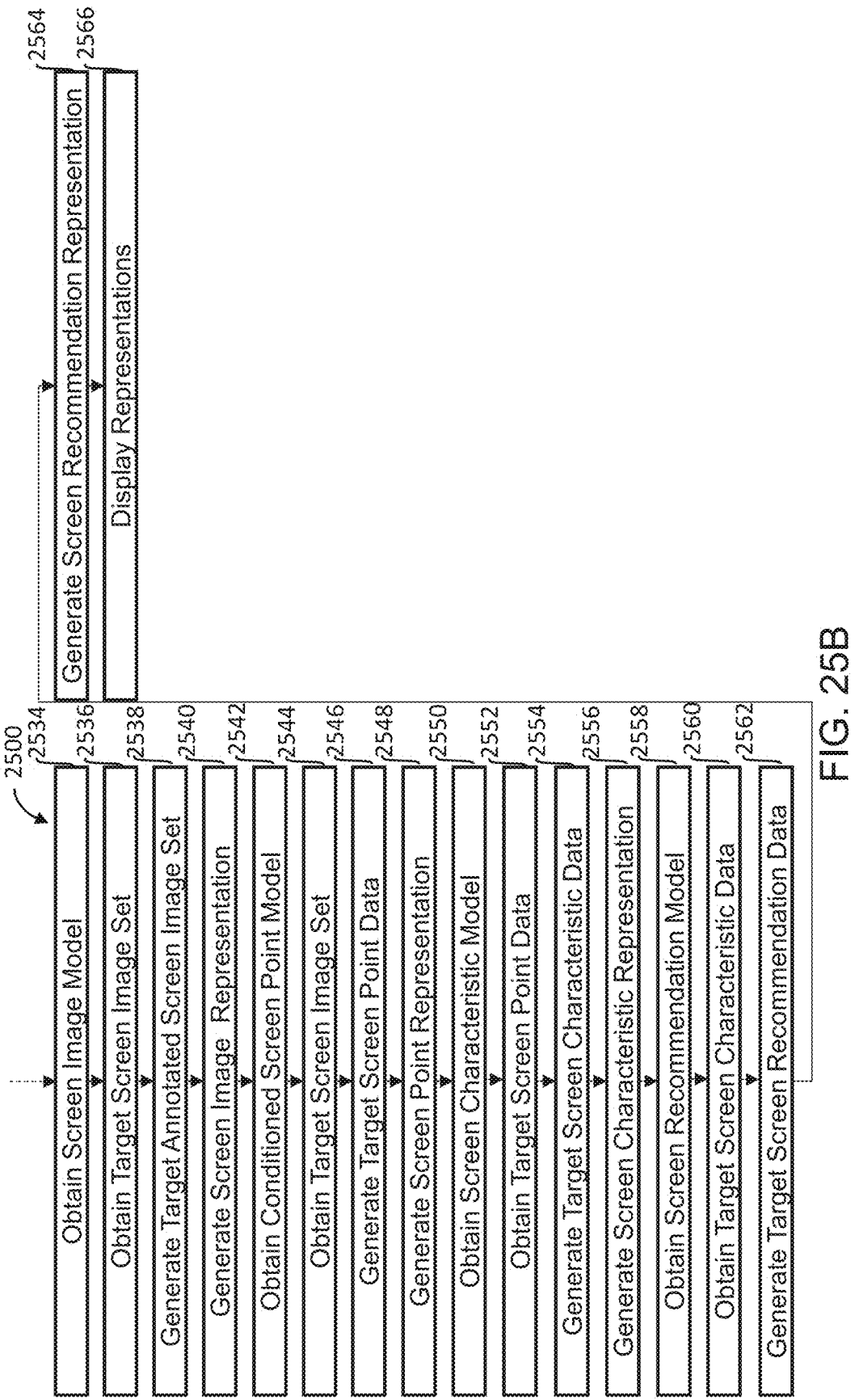
FIG. 25B illustrates an example operational flow diagram for generating annotated screen images, screen point data, screen characteristic data, and/or screen recommendation data in accordance with one or more embodiments of the presently disclosed technology.

FIGS. 25A and 25B illustrate example operational flow diagram 2500 for generating annotated swing images, swing point data, swing characteristic data, swing recommendation data, annotated screen images, screen point data, screen characteristic data, and/or screen recommendation data in accordance with one or more embodiments of the presently disclosed technology. 2502 may include obtaining a swing image model, as discussed herein. 2502 may be performed by a physical computer processor configured by machine-readable instructions including a component that is the same as or similar to swing image model component 108A, swing image model component 208, and/or swing image model component 508, in accordance with one or more embodiments.

2504 may include obtaining a target swing image set, as discussed herein. 2504 may be performed by a physical computer processor configured by machine-readable instructions including a component that is the same as or similar to swing image component 110A, swing image component 210, and/or swing image component 510, in accordance with one or more embodiments.

2506 may include generating a target annotated swing image set, as discussed herein. 2506 may be performed by a physical computer processor configured by machine-readable instructions including a component that is the same as or similar to annotated swing image component 112A, annotated swing image component 212, and/or annotated swing image component 512, in accordance with one or more embodiments.

2508 may include generating a swing image representation of the target annotated swing image set, as discussed herein. 2508 may be performed by a physical computer processor configured by machine-readable instructions including a component that is the same as or similar to swing image representation component 114A, swing representation component 226, and/or representation component 550, in accordance with one or more embodiments.

2510 may include obtaining a conditioned swing point model, as discussed herein. 2510 may be performed by a physical computer processor configured by machine-readable instructions including a component that is the same as or similar to swing point model component 108B, swing point model component 214, and/or swing point model component 514, in accordance with one or more embodiments.

2512 may include obtaining a target swing image set, as discussed herein. 2512 may be performed by a physical computer processor configured by machine-readable instructions including a component that is the same as or similar to swing image component 110A, annotated swing image component 112A, swing image component 110B, swing image component 210, annotated swing image component 212, swing image component 510, and/or annotated swing image component 512, in accordance with one or more embodiments.

2514 may include generating target swing point data, as discussed herein. 2514 may be performed by a physical computer processor configured by machine-readable instructions including a component that is the same as or similar to swing point component 112B, swing point component 110C, swing point component 216, and/or swing point component 516, in accordance with one or more embodiments.

2516 may include generating a swing point representation of the target swing point data, as discussed herein. 2516 may be performed by a physical computer processor configured by machine-readable instructions including a component that is the same as or similar to swing point representation component 114B, swing representation component 226, and/or representation component 550, in accordance with one or more embodiments.

2518 may include obtaining a swing characteristic model, as discussed herein. 2518 may be performed by a physical computer processor configured by machine-readable instructions including a component that is the same as or similar to swing characteristic model component 108C, swing characteristic model component 218, and/or swing characteristic model component 518, in accordance with one or more embodiments.

2520 may include obtaining target swing point data, as discussed herein. 2520 may be performed by a physical computer processor configured by machine-readable instructions including a component that is the same as or similar to swing point component 112B, swing point component 110C, swing point component 216, and/or swing point component 516, in accordance with one or more embodiments.

2522 may include generating target swing characteristic data, as discussed herein. 2522 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments.

2524 may include generating a swing characteristic representation of the target swing characteristic data, as discussed herein. 2524 may be performed by a physical computer processor configured by machine-readable instructions including a component that is the same as or similar to swing characteristic representation component 114C, swing representation component 226, and/or representation component 550, in accordance with one or more embodiments.

2526 may include obtaining a swing recommendation model, as discussed herein. 2526 may be performed by a physical computer processor configured by machine-readable instructions including a component that is the same as or similar to swing recommendation model component 108D, swing recommendation model component 222, and/or swing recommendation model component 522, in accordance with one or more embodiments.

2528 may include target swing characteristic data, as discussed herein. 2528 may be performed by a physical computer processor configured by machine-readable instructions including a component that is the same as or similar to swing characteristic component 112C, swing characteristic component 110D, swing characteristic component 220, and/or swing characteristic component 520, in accordance with one or more embodiments

2530 may include generating target swing recommendation data, as discussed herein. 2530 may be performed by a physical computer processor configured by machine-readable instructions including a component that is the same as or similar to swing recommendation component 112D, swing recommendation component 224, and/or swing recommendation component 524, in accordance with one or more embodiments.

2532 may include generating a swing recommendation representation of the target swing recommendation data, as discussed herein. 2532 may be performed by a physical computer processor configured by machine-readable instructions including a component that is the same as or similar to swing recommendation representation component 114D, swing representation component 226, and/or representation component 550, in accordance with one or more embodiments.

2534 may include obtaining a screen image model, as discussed herein. 2534 may be performed by a physical computer processor configured by machine-readable instructions including a component that is the same as or similar to screen image model component 308A, screen image model component 408, and/or screen image model component 526, in accordance with one or more embodiments.

2536 may include obtaining a target screen image set, as discussed herein. 2304 may be performed by a physical computer processor configured by machine-readable instructions including a component that is the same as or similar to screen image component 310A, screen image component 410, and/or screen image component 534, in accordance with one or more embodiments.

2538 may include generating a target annotated screen image set, as discussed herein. 2538 may be performed by a physical computer processor configured by machine-readable instructions including a component that is the same as or similar to annotated screen image component 312A, annotated screen image component 412, and/or annotated screen image component 536, in accordance with one or more embodiments.

2540 may include generating a screen image representation of the target annotated screen image set, as discussed herein. 2540 may be performed by a physical computer processor configured by machine-readable instructions including a component that is the same as or similar to screen image representation component 314A, screen representation component 426, and/or representation component 550, in accordance with one or more embodiments.

2542 may include obtaining a conditioned screen point model, as discussed herein. 2542 may be performed by a physical computer processor configured by machine-readable instructions including a component that is the same as or similar to screen point model component 308B, screen point model component 414, and/or screen point model component 538, in accordance with one or more embodiments.

2544 may include obtaining a target screen image set, as discussed herein. 2544 may be performed by a physical computer processor configured by machine-readable instructions including a component that is the same as or similar to screen image component 310A, annotated screen image component 312A, screen image component 310B, screen image component 410, annotated screen image component 412, screen image component 534, and/or annotated screen image component 536, in accordance with one or more embodiments.

2546 may include generating target screen point data, as discussed herein. 2546 may be performed by a physical computer processor configured by machine-readable instructions including a component that is the same as or similar to screen point component 312B, screen point component 310C, screen point component 416, and/or screen point component 540, in accordance with one or more embodiments.

2548 may include generating a screen point representation of the target screen point data, as discussed herein. 2548 may be performed by a physical computer processor configured by machine-readable instructions including a component that is the same as or similar to screen point representation component 314B, screen representation component 426, and/or representation component 550, in accordance with one or more embodiments.

2550 may include obtaining a screen characteristic model, as discussed herein. 2550 may be performed by a physical computer processor configured by machine-readable instructions including a component that is the same as or similar to screen characteristic model component 308C, screen characteristic model component 418, and/or screen characteristic model component 542, in accordance with one or more embodiments.

2552 may include obtaining target screen point data as discussed herein. 2552 may be performed by a physical computer processor configured by machine-readable instructions including a component that is the same as or similar to screen point component 312B, screen point component 310C, screen point component 416, and/or screen point component 540, in accordance with one or more embodiments.

2554 may include generating target screen characteristic data as discussed herein. 2554 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments.

2556 may include generating a screen characteristic representation of the target screen characteristic data, as discussed herein. 2556 may be performed by a physical computer processor configured by machine-readable instructions including a component that is the same as or similar to screen characteristic representation component 314C, screen representation component 426, and/or representation component 550, in accordance with one or more embodiments.

2558 may include obtaining a screen recommendation model, as discussed herein. 2558 may be performed by a physical computer processor configured by machine-readable instructions including a component that is the same as or similar to screen recommendation model component 308D, screen recommendation model component 422, and/or screen recommendation model component 546, in accordance with one or more embodiments.

2560 may include target screen characteristic data, as discussed herein. 2560 may be performed by a physical computer processor configured by machine-readable instructions including a component that is the same as or similar to screen characteristic component 312C, screen characteristic component 310D, screen characteristic component 420, and/or screen characteristic component 544, in accordance with one or more embodiments 2562 may include generating target screen recommendation data, as discussed herein. 2562 may be performed by a physical computer processor configured by machine-readable instructions including a component that is the same as or similar to screen recommendation component 312D, screen recommendation component 424, and/or screen recommendation component 548, in accordance with one or more embodiments.

2564 may include generating a screen recommendation representation of the target screen recommendation data, as discussed herein. 2564 may be performed by a physical computer processor configured by machine-readable instructions including a component that is the same as or similar to screen recommendation representation component 314D, screen representation component 426, and/or representation component 550, in accordance with one or more embodiments.

2566 may include displaying the swing image representation. 2566 may include displaying the swing point representation. 2566 may include displaying the swing characteristic representation. 2566 may include displaying the swing recommendation representation. 2566 may include displaying the screen image representation. 2566 may include displaying the screen point representation. 2566 may include displaying the screen characteristic representation. 2566 may include displaying the screen recommendation representation. 2566 may be performed by a physical computer processor configured by machine-readable instructions including a component that is the same as or similar to swing image representation component 114A, swing point representation component 114B, swing characteristic representation component 114C, swing recommendation representation component 114D, swing representation component 226, screen image representation component 314A, screen point representation component 314B, screen characteristic representation component 314C, screen recommendation representation component 314D, screen representation component 426, and/or representation component 550, in accordance with one or more embodiments.

Figure 26:
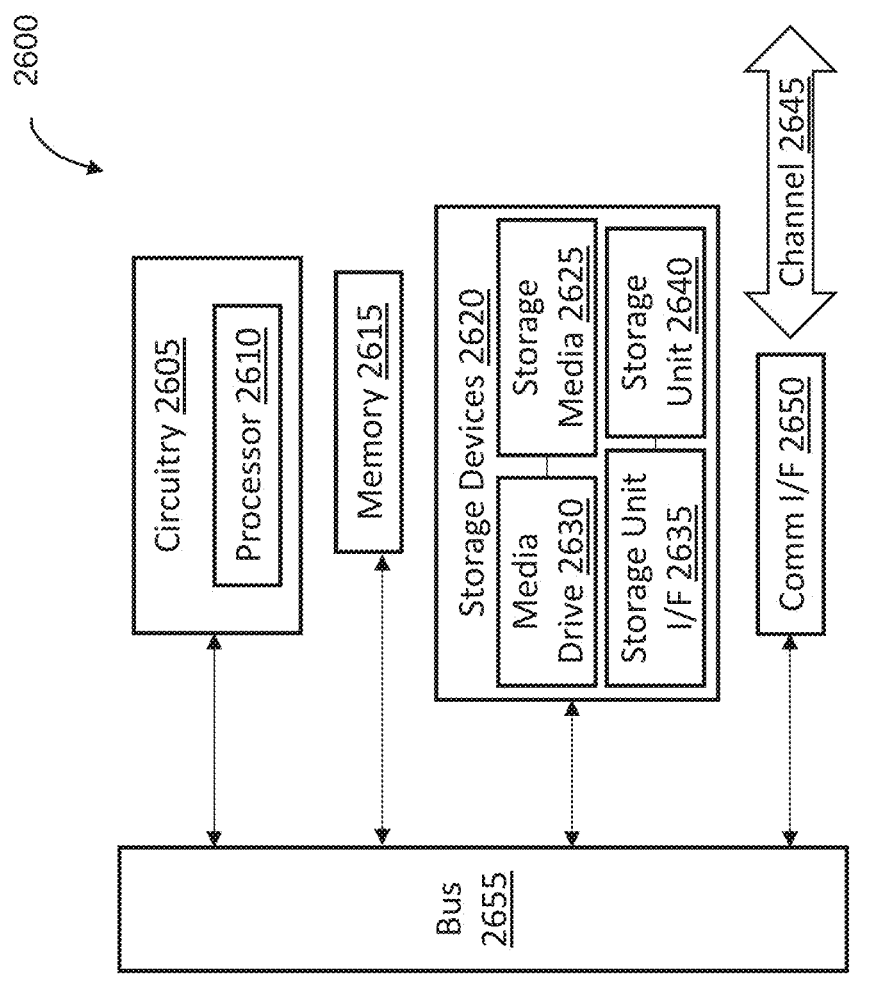
FIG. 26 illustrates an example computing component that may be used in implementing various features of the presently disclosed technology.

As used herein, the term component might describe a given unit of functionality that can be performed in accordance with one or more embodiments of the presently disclosed technology. As used herein, a component might be implemented utilizing any form of hardware, software, or a combination thereof. For example, a processor, controller, ASIC, PLA, PAL, CPLD, FPGA, logical component, software routine or other mechanism might be implemented to make up a component. In embodiments, the various components described herein might be implemented as discrete components or the functions and features described can be shared in part or in total among components. It should be appreciated that the various features and functionality described herein may be implemented in any given application and can be implemented in separate or shared components in various combinations and permutations. Even though various features or elements of functionality may be individually described or claimed as separate components, one of ordinary skill in the art will understand that these features and functionality can be shared among common software and hardware elements, and such description shall not require or imply that separate hardware or software components are used to implement such features or functionality.

Where components of the technology are implemented in whole or in part using software, in one or more embodiments, these software elements can be implemented to operate with a computing or processing component capable of carrying out the functionality described with respect thereto. One such example computing component is shown in FIG. 26. Various embodiments are described in terms of this example-computing component 2600. After reading this description, it will become apparent to a person skilled in the relevant art how to implement the technology using other computing components or architectures.

Referring now to FIG. 26, computing component 2600 may represent, for example, computing or processing capabilities found within mainframes, supercomputers, workstations, or servers; desktop, laptop, notebook, or tablet computers; hand-held computing devices (tablets, PDA's, smartphones, cell phones, palmtops, and/or other hand-held computing devices); or the like, depending on the application and/or environment for which computing component 1700 is specifically purposed.

Computing component 2600 may include, for example, a processor, controller, control component, or other processing device, such as processor 2610, and such as may be included in circuitry 2605. Processor 2610 may be implemented using a special-purpose processing component such as, for example, a microprocessor, controller, or other control logic. In the illustrated example, processor 2610 is connected to bus 2655 by way of circuitry 2605, although any communication medium may be used to facilitate interaction with other components of computing component 2600 or to communicate externally.

Computing component 2600 may also include a memory component, simply referred to herein as main memory 2615. For example, random access memory (RAM) or other dynamic memory may be used for storing information and instructions to be executed by processor 2610 or circuitry 2605. Main memory 2615 may also be used for storing temporary variables or other intermediate information during execution of instructions to be executed by processor 2610 or circuitry 2605. Computing component 2600 may likewise include a read only memory (ROM) or other static storage device coupled to bus 2655 for storing static information and instructions for processor 2610 or circuitry 2605.

Computing component 2600 may also include various forms of information storage devices 2620, which may include, for example, media drive 2630 and storage unit interface 2635. Media drive 2630 may include a drive or other mechanism to support fixed or removable storage media 2625. For example, a hard disk drive, a floppy disk drive, a magnetic tape drive, an optical disk drive, a CD or DVD drive (R or RW), a thumb drive, a flash drive, a solid state drive, cloud storage, or other removable or fixed media drive may be provided. Accordingly, removable storage media 2625 may include, for example, a hard disk, a floppy disk, magnetic tape, cartridge, optical disk, a CD or DVD, or other fixed or removable medium that is read by, written to, or accessed by media drive 2630. As these examples illustrate, removable storage media 2625 may include a computer usable storage medium having stored therein computer software or data.

In alternative embodiments, information storage devices 2620 may include other similar instrumentalities for allowing computer programs or other instructions or data to be loaded into computing component 2600. Such instrumentalities may include, for example, fixed or removable storage unit 2640 and storage unit interface 2635. Examples of such removable storage units 2640 and storage unit interfaces 2635 may include a program cartridge and cartridge interface, a removable memory (for example, a flash memory or other removable memory component) and memory slot, a PCMCIA slot and card, and other fixed or removable storage units 2640 and storage unit interfaces 2635 that allow software and data to be transferred from removable storage unit 2640 to computing component 2600.

Computing component 2600 may also include a communications interface 2650. Communications interface 2650 may be used to allow software and data to be transferred within and/or between computing component 2600 and external devices. Examples of communications interface 2650 include a modem or softmodem, a network interface (such as, for example, an Ethernet, network interface card, WiMedia, IEEE 1702.XX, or other interface), a communications port (such as, for example, a USB port, IR port, RS232 port Bluetooth® interface, or other port), or other communications interface. Software and data transferred via communications interface 2650 may typically be carried on signals, which may be electronic, electromagnetic (which includes optical) or other signals capable of being exchanged by a given communications interface 2650. These signals may be provided to/from communications interface 2650 via channel 2645. Channel 2645 may carry signals and may be implemented using a wired or wireless communication medium. Some non-limiting examples of channel 2645 include a phone line, a cellular or other radio link, a RF link, an optical link, a network interface, a local or wide area network, and other wired or wireless communications channels.

In this document, the terms "computer program medium" and "computer usable medium" are used to generally refer to transitory or non-transitory media such as, for example, main memory 2615, storage unit interface 2635, removable storage media 2625, and channel 2645. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 2600 or a processor to perform features or functions of the present application as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It should be appreciated how alternative functional, logical or physical partitioning, and configurations can be implemented to achieve the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations be implemented to perform the recited functionality in the same order unless the context dictates otherwise.

Although the disclosed technology is described above in terms of various exemplary embodiments and implementations, it should be understood that the various features, aspects, and functionality described in one of the individual embodiments are not limited in their applicability to the particular embodiments with which they are described, but instead can be applied, alone or in various combinations, to one of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Other than in at least some of the operating examples, or unless otherwise expressly specified, any and all of the numerical ranges, amounts, values and percentages such as those for amounts of materials, moment of inertias, center of gravity locations, loft, angles, various ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and appended claims are approximations that may vary depending upon the desired properties sought to be obtained by the presently disclosed technology. At the very least, and not as an attempt to limit the application of the doctrine of equivalents to the scope of the claims, each numerical parameter should at least be construed in light of the number of reported significant digits and by applying ordinary rounding techniques.

In some examples, substantially parallel may be defined to include zero degrees, or between zero degrees and one degree, or between zero degrees and two degrees, or between zero degrees and five degrees, or between zero degrees and ten degrees of deviation from being exactly parallel to the disclosed front surface. Substantially may be defined to be a value within 10% of the identified value.

Notwithstanding that the numerical ranges and parameters setting forth the broad scope of the presently disclosed technology are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

While various embodiments of the disclosed technology have been described above, it should be appreciated these are examples only, and not limiting. Likewise, the various figures may depict an example configuration or structure to aid in understanding the features and functionality that can be included in the disclosed technology. The presently disclosed technology is not intended to be restricted to the illustrated example configurations and structures, and the desired features can be implemented with a variety of alternative configurations and structures. It may be apparent to one of skill in the art how alternative embodiments can be implemented to impart the desired features of the presently disclosed technology. Therefore, it will be understood that the appended claims are intended to cover all such modifications and embodiments, which would come within the spirit and scope of the presently disclosed technology.

While the presently disclosed technology may be described herein in terms of various exemplary embodiments, it should be understood that the various features described in any individual embodiment is not limited to its particular embodiment, and can be applied, whether alone or in combinations with features of other embodiments, to another embodiment, whether or not such an embodiment is described herein or described as part of a single embodiment. Thus, the breadth and scope of the presently disclosed technology should not be limited to any of the above-described exemplary embodiments.

Words, phrases, and their variations that are used herein, unless otherwise expressly stated, should be construed as open ended, not as limiting. For example, the term "include" should be read to mean "include, without limitation"; the term "example" should be read to mean the following provides exemplary instances, not an exhaustive or limiting list thereof; "a" or "an" should be read as meaning "at least one," "one or more" etc.; and "traditional," "normal," and similar terms should not be construed as limiting to a given time period, but should be read to encompass traditional, normal, like technologies that may be known now or at any future point; and a heel-to-toe direction should be read as meaning either the toe-to-heel direction or the heel-to-toe direction, a bottom-to-top direction should be read as meaning either the bottom-to-top direction or the top-to-bottom direction, and a back-to-front direction should be read as meaning either a back-to-front direction or a front-to-back direction. In addition, references herein to technologies that would be apparent or known to one of ordinary skill in the art includes such technologies that are apparent or known to one of ordinary skill in the art now or at any time in the future.

The presence of words and phrases such as "one or more," "at least," "not limited to," or other similar phrases shall not be read to necessarily mean that the narrower case is intended in instances where such broadening phrases may be absent. The presence of words such as "first," "second," or other similar words shall not be read to mean that there can only be one or two elements; it should be appreciated that there may be more than one or two elements used in the presently disclosed technology. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations. While golf swings and golf screens may be discussed herein, it should be appreciated that the presently disclosed technology may apply with equal force to other sports involving swings and/or physical screens, including, for example, baseball, softball, tennis, hockey, cricket, badminton, pickleball, and/or other sports.

Additionally, the various embodiments set forth herein are described in terms of exemplary block diagrams, flow charts, and other illustrations. It should be appreciated that the illustrated embodiments and their various alternatives can be implemented without confinement to the illustrated examples. For example, block diagrams and their accompanying description should not be construed as mandating a particular architecture or configuration.

What is claimed is:

1. A method for training an initial golf screen characteristic model to generate golf screen characteristics, the method being implemented in a computer system comprising electronic storage and a physical computer processor, the method comprising:

obtaining, from the electronic storage, the initial golf screen characteristic model;

obtaining, from the electronic storage, (i) training golf screen point data specifying golf screen points of one or more objects as a function of position and time and (ii) training golf screen characteristic data comprising the golf screen characteristics specifying golf screen characteristic values;

generating, with the physical computer processor, a conditioned golf screen characteristic model by training the initial golf screen characteristic model using the training golf screen point data and the training golf screen characteristic data, thereby generating a set of golf screen characteristic relationships between golf screen point data and golf screen characteristic data;

storing the conditioned golf screen characteristic model in the electronic storage;

obtaining, from the electronic storage, target golf screen point data; and generating, with the physical computer processor, target golf screen characteristic data by applying the conditioned golf screen characteristic model to the target golf screen point data, wherein the target golf screen characteristic data comprises the golf screen characteristics specifying golf screen characteristic values corresponding to the target golf screen point data.

2. The method of claim 1, further comprising generating, with the physical computer processor, a golf screen characteristic representation of the target golf screen characteristic data using visual effects to depict at least some of the target golf screen characteristic data.

3. The method of claim 2, wherein the computer system further comprises a display, and wherein the method further comprises displaying the golf screen characteristic representation via the display.

4. The method of claim 1, wherein the golf screen characteristics are one or more traits corresponding to one or more screen poses in a golf screen.

5. The method of claim 4, wherein the one or more screen poses comprises one or more of a multi-segmental rotation screen, seated windshield wipers screen, limited 90/90 golf posture screen, wrist flexion and extension screen, wrist forearm supination and pronation screen, wide base deep squat screen, toe touch screen, or standing shoulder flexion screen.

6. The method of claim 1, wherein the golf screen characteristics comprise one or more of a limited multi-segmental rotation swing characteristic, limited seated windshield wipers swing characteristic, limited 90/90 golf posture swing characteristic, limited wrist flexion and extension swing characteristic, limited wrist forearm supination and pronation swing characteristic, limited wide base deep squat swing characteristic, limited toe touch swing characteristic, or limited standing shoulder flexion screen characteristic.

7. The method of claim 1, wherein the golf screen characteristic values comprise one of detecting a given golf screen characteristic, detecting a potential given golf screen characteristic, or detecting no given golf screen characteristic.

8. The method of claim 1, wherein the target golf screen point data comprises one or more position-specific areas on the one or more objects.

9. The method of claim 1, wherein the target golf screen point data comprises one or more screen points, and wherein positions of the one or more screen points are used to determine one or more golf screen characteristics.

*    *    *    *    *